United States Patent
Sasaki et al.

(10) Patent No.: US 8,149,267 B2
(45) Date of Patent: Apr. 3, 2012

(54) RECORDING MEDIUM, PLAYBACK DEVICE, AND INTEGRATED CIRCUIT

(75) Inventors: Taiji Sasaki, Osaka (JP); Hiroshi Yahata, Osaka (JP); Wataru Ikeda, Osaka (JP); Tomoki Ogawa, Osaka (JP)

(73) Assignee: Panasonic Corporation, Osaka (JP)

( * ) Notice: Subject to any disclaimer, the term of this patent is extended or adjusted under 35 U.S.C. 154(b) by 205 days.

(21) Appl. No.: 12/699,163

(22) Filed: Feb. 3, 2010

(65) Prior Publication Data
US 2010/0202759 A1 Aug. 12, 2010

Related U.S. Application Data

(60) Provisional application No. 61/149,798, filed on Feb. 4, 2009.

(51) Int. Cl.
*H04N 15/00* (2006.01)
(52) U.S. Cl. ............................................ 348/42
(58) Field of Classification Search ............ 348/42–49; 386/108; *H04N 15/00*
See application file for complete search history.

(56) References Cited

U.S. PATENT DOCUMENTS

| 6,925,250 | B1 | 8/2005 | Oshima et al. |
| 7,747,145 | B2 * | 6/2010 | Oshima et al. ................ 386/201 |
| 2007/0002041 | A1 * | 1/2007 | Kim et al. .................... 345/419 |
| 2009/0142041 | A1 * | 6/2009 | Nagasawa et al. ............ 386/124 |

FOREIGN PATENT DOCUMENTS

| JP | 11-191895 | 7/1999 |
| WO | 2010/032404 | 3/2010 |

OTHER PUBLICATIONS

JPO International Search Report issued May 11, 2010 in corresponding International (PCT) Application No. PCT/JP2010/000609.

* cited by examiner

*Primary Examiner* — Tung Vo
(74) *Attorney, Agent, or Firm* — Wenderoth, Lind & Ponack, L.L.P.

(57) ABSTRACT

A recording medium according to an embodiment of the present invention includes a base-view stream and a dependent-view stream. The base-view stream is used for monoscopic video playback. The dependent-view stream is used for stereoscopic video playback in combination with the base-view stream. The recording medium further includes a first file and a second file. The first file refers to the base-view stream in monoscopic video playback, and the second file refers to the base-view stream in stereoscopic video playback.

7 Claims, 75 Drawing Sheets

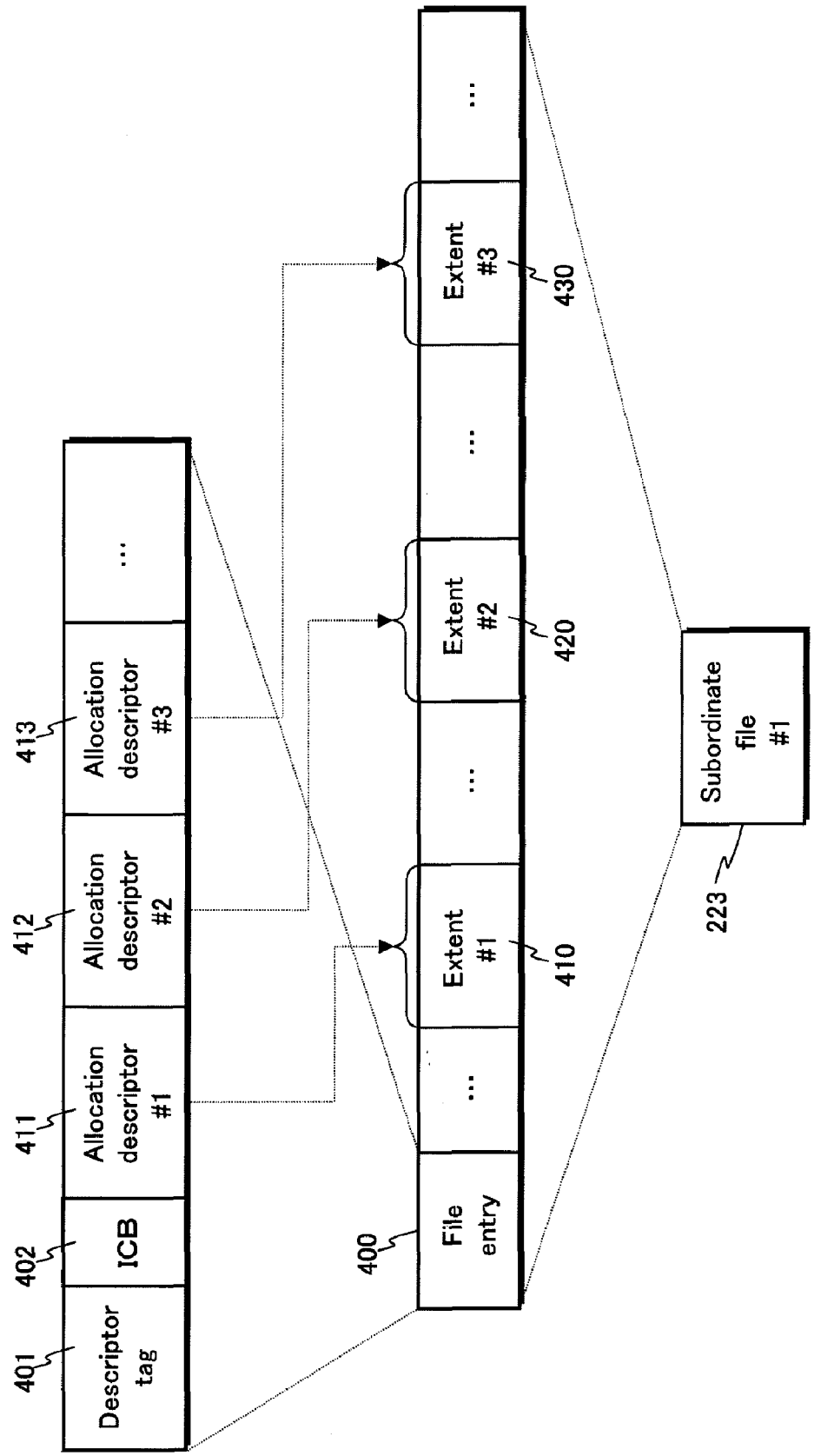

FIG.6A

| PID=0x1011 | Primary video stream |
|---|---|
| 0x1100 | Primary audio stream |
| 0x1101 | Primary audio stream |
| 0x1200 | PG stream |
| 0x1201 | PG stream |
| 0x1400 | IG stream |
| 0x1A00 | Secondary audio stream |
| 0x1B00 | Secondary video stream |

FIG.6B

| PID=0x1012 | Primary video stream |
|---|---|
| 0x1220 | Left-view PG stream |
| 0x1221 | Left-view PG stream |
| 0x1240 | Right-view PG stream |
| 0x1241 | Right-view PG stream |
| 0x1420 | Left-view IG stream |
| 0x1440 | Right-view IG stream |
| 0x1B20 | Secondary video stream |

FIG.6C

| PID=0x1013 | Primary video stream |
|---|---|
| 0x1260 | Depth map PG stream |
| 0x1261 | Depth map PG stream |
| 0x1460 | Depth map IG stream |
| 0x1B40 | Secondary video stream |

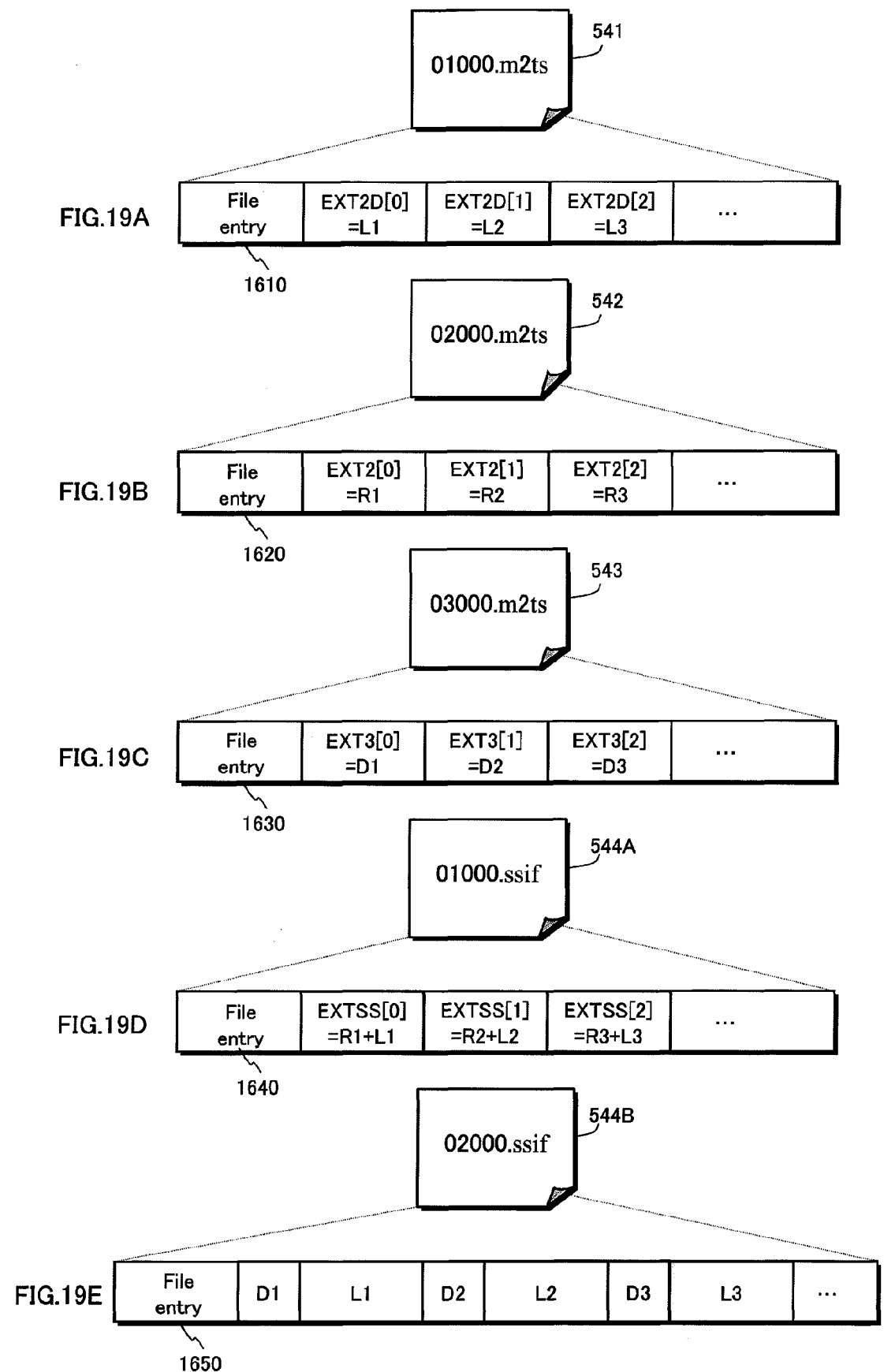

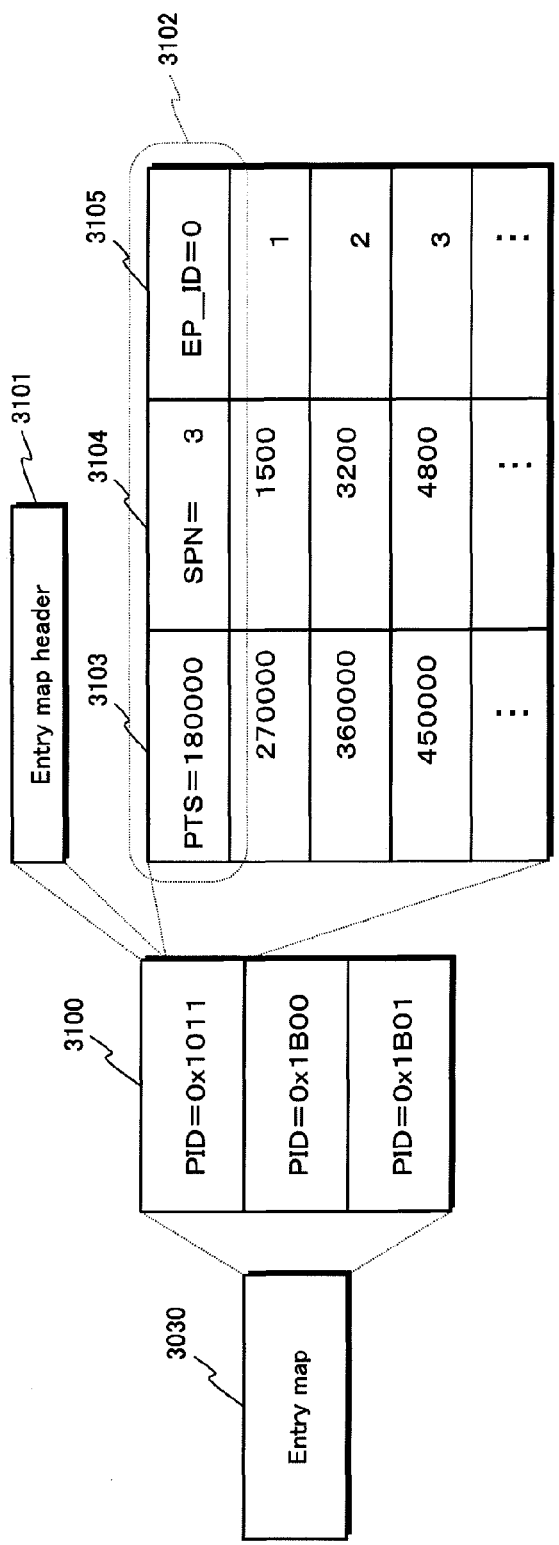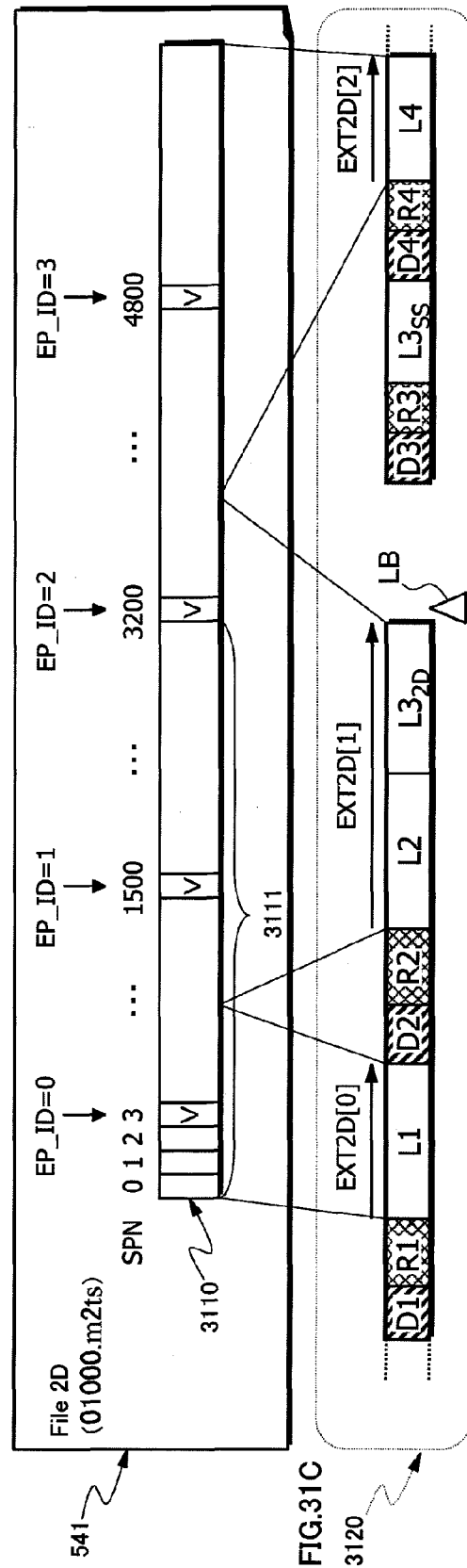

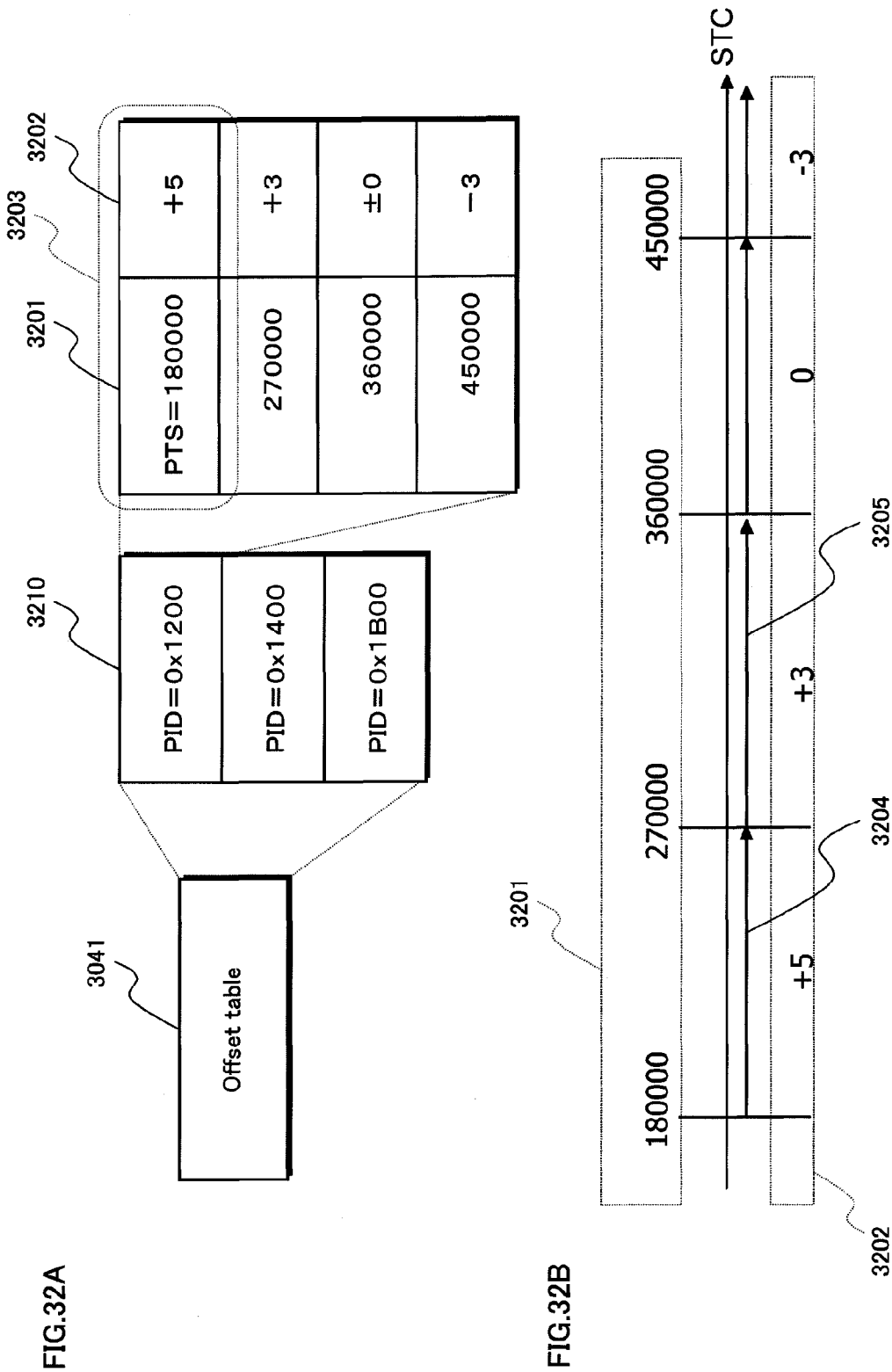

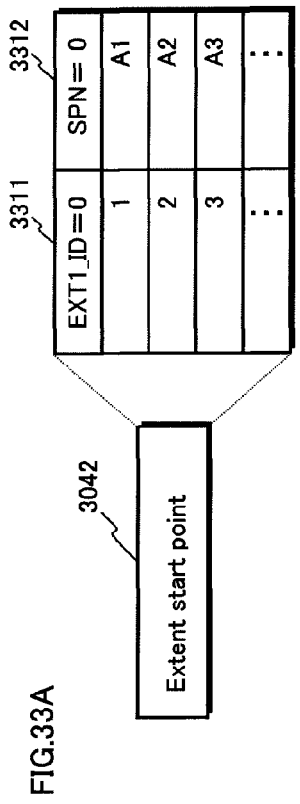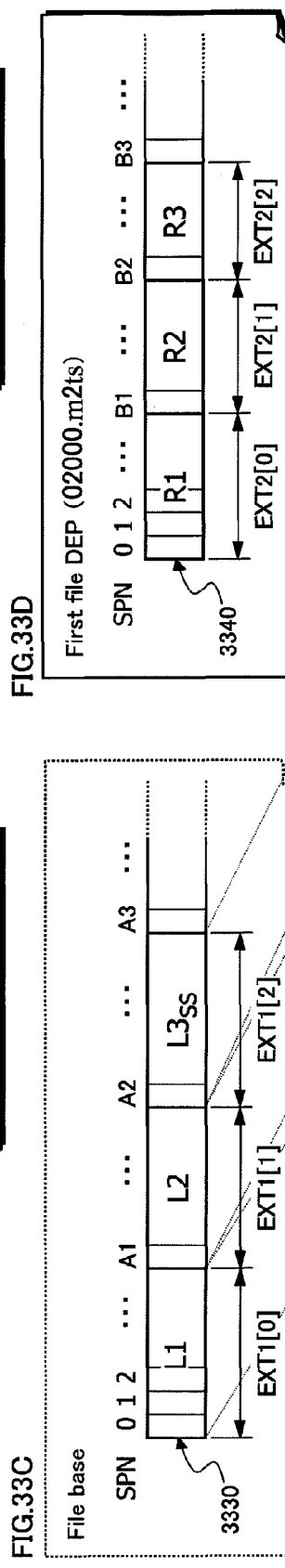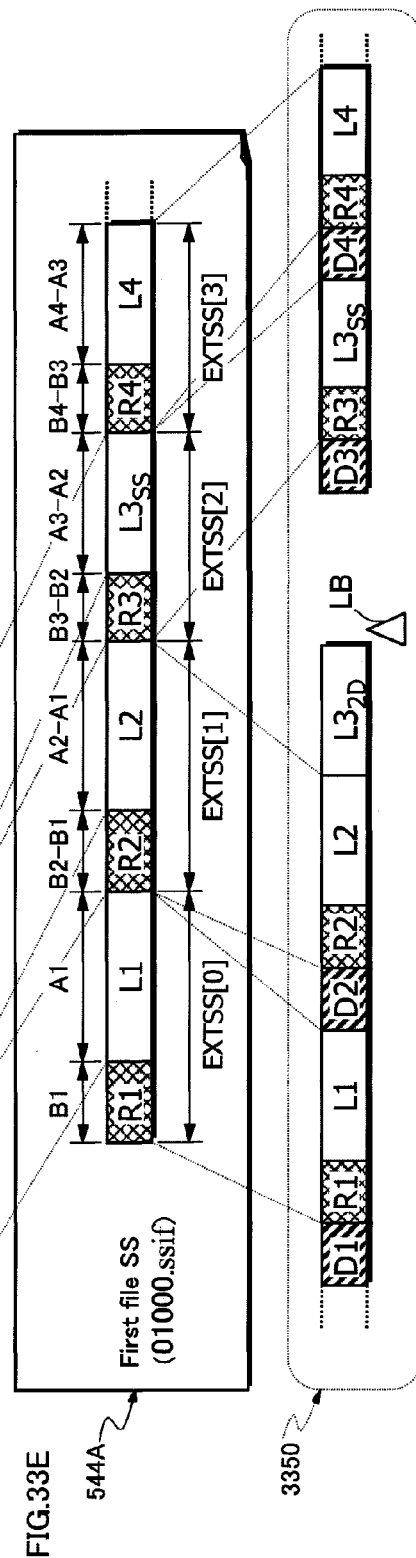
FIG.33A
FIG.33B
FIG.33C
FIG.33D
FIG.33E

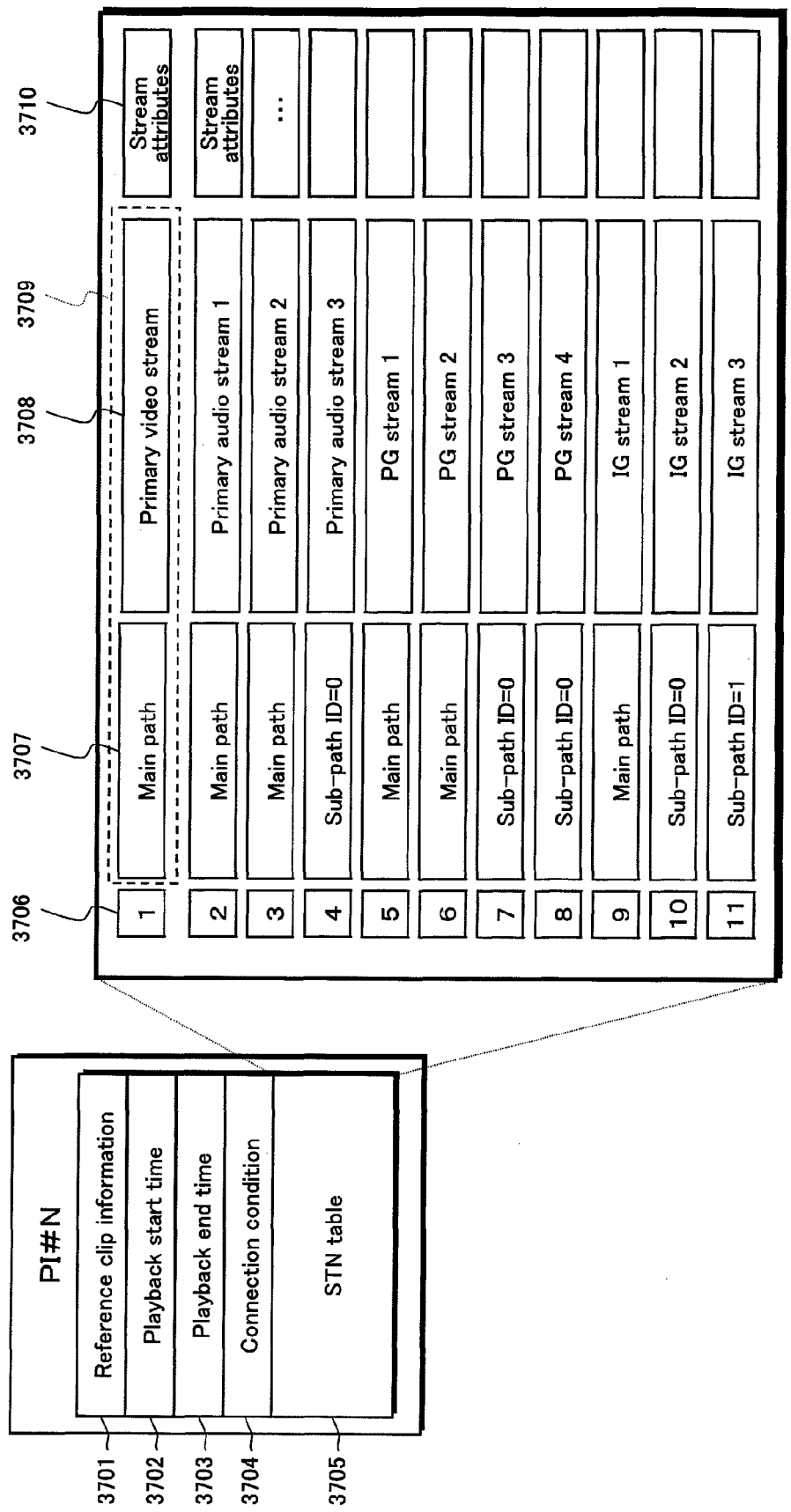

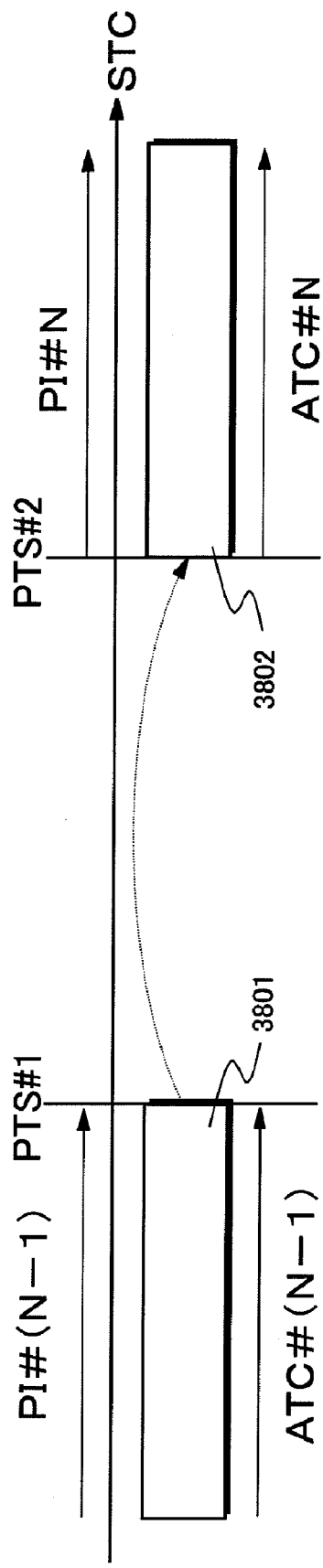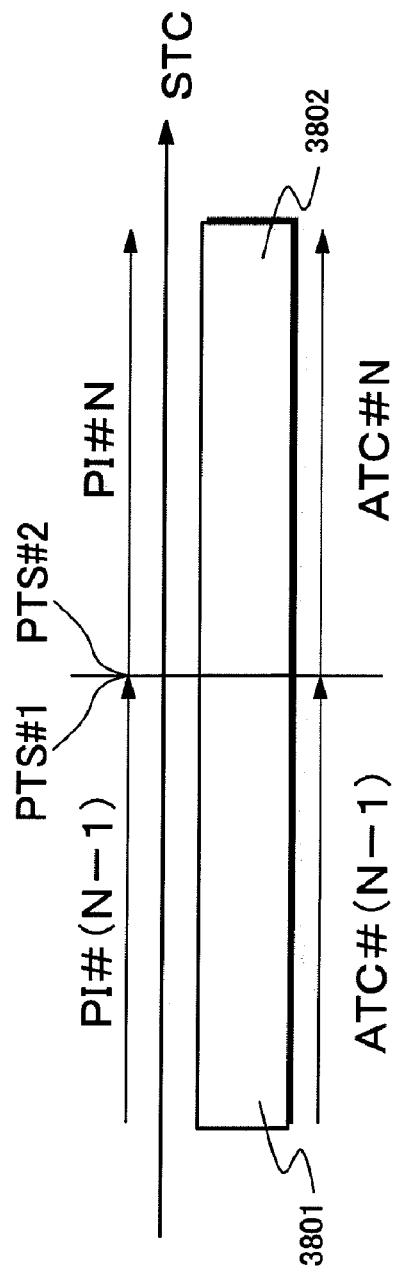
FIG.38A
FIG.38B

FIG.47

| | | | | | | |
|---|---|---|---|---|---|---|
| 0 | Language Code | 11 | Player audio mixing mode for Karaoke | 22 | Secondary Audio Stream number |
| 1 | Audio stream number | 12 | Country code for parental management | 23 | Player status |
| 2 | Subtitle stream number | 13 | Parental level | 24 | reserved |
| 3 | Angle number | 14 | Player configuration for Video | 25 | reserved |
| 4 | Title number | 15 | Player configuration for Audio | 26 | reserved |
| 5 | Chapter number | 16 | Language code for AST | 27 | reserved |
| 6 | Program number | 17 | Language code ext. for AST | 28 | reserved |
| 7 | Cell number | 18 | Language code for STST | 29 | reserved |
| 8 | Key name | 19 | Language coded ext. for STST | 30 | reserved |
| 9 | Navigation timer | 20 | Player region code | 31 | reserved |
| 10 | Current playback time | 21 | Secondary Video Stream number | 32 | reserved |

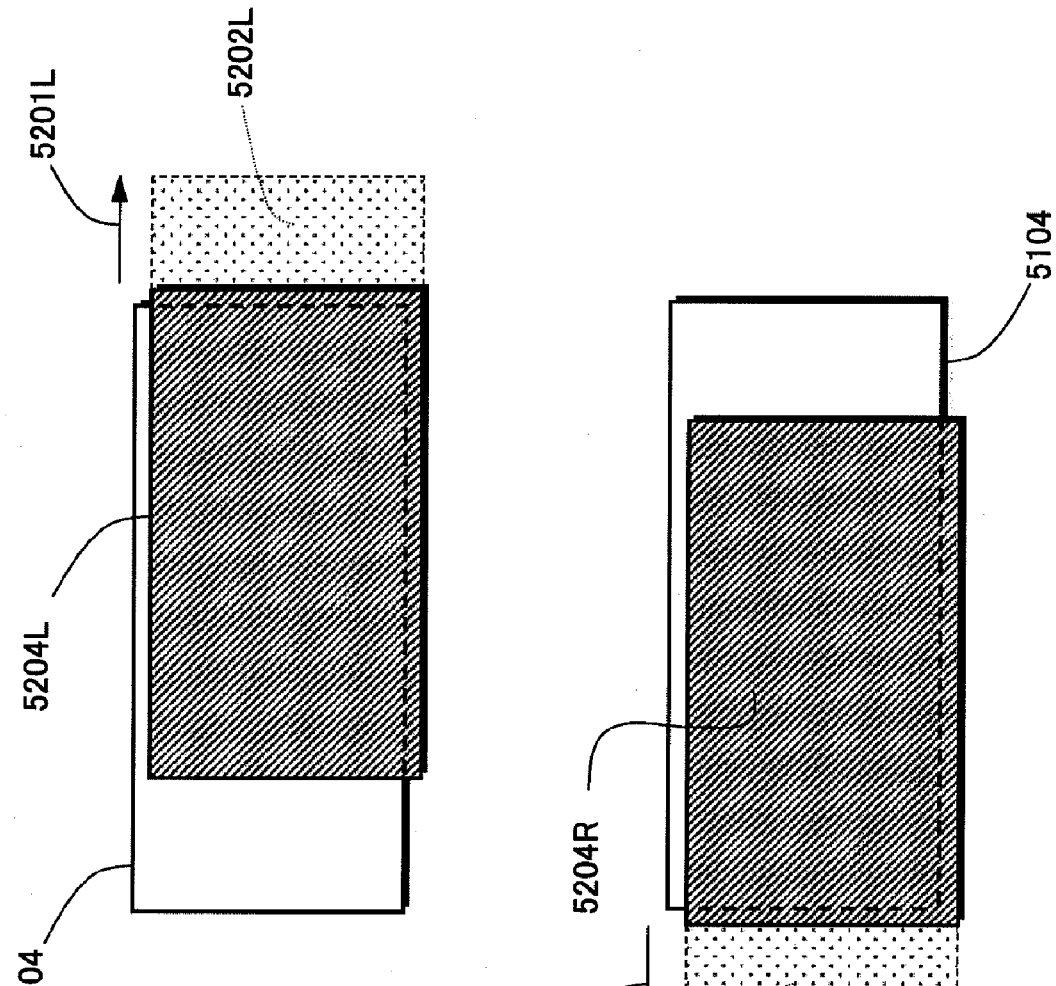

FIG.56

| SJUMP (sectors) | 0 | 1 - 10000 | 10001 - 20000 | 20001 - 40000 | 40000 - 1/10 stroke | 1/10 stroke or greater |
|---|---|---|---|---|---|---|
| TJUMP (ms) | 50(=Tjump0) | 250 | 300 | 350 | 700 | 1400 |

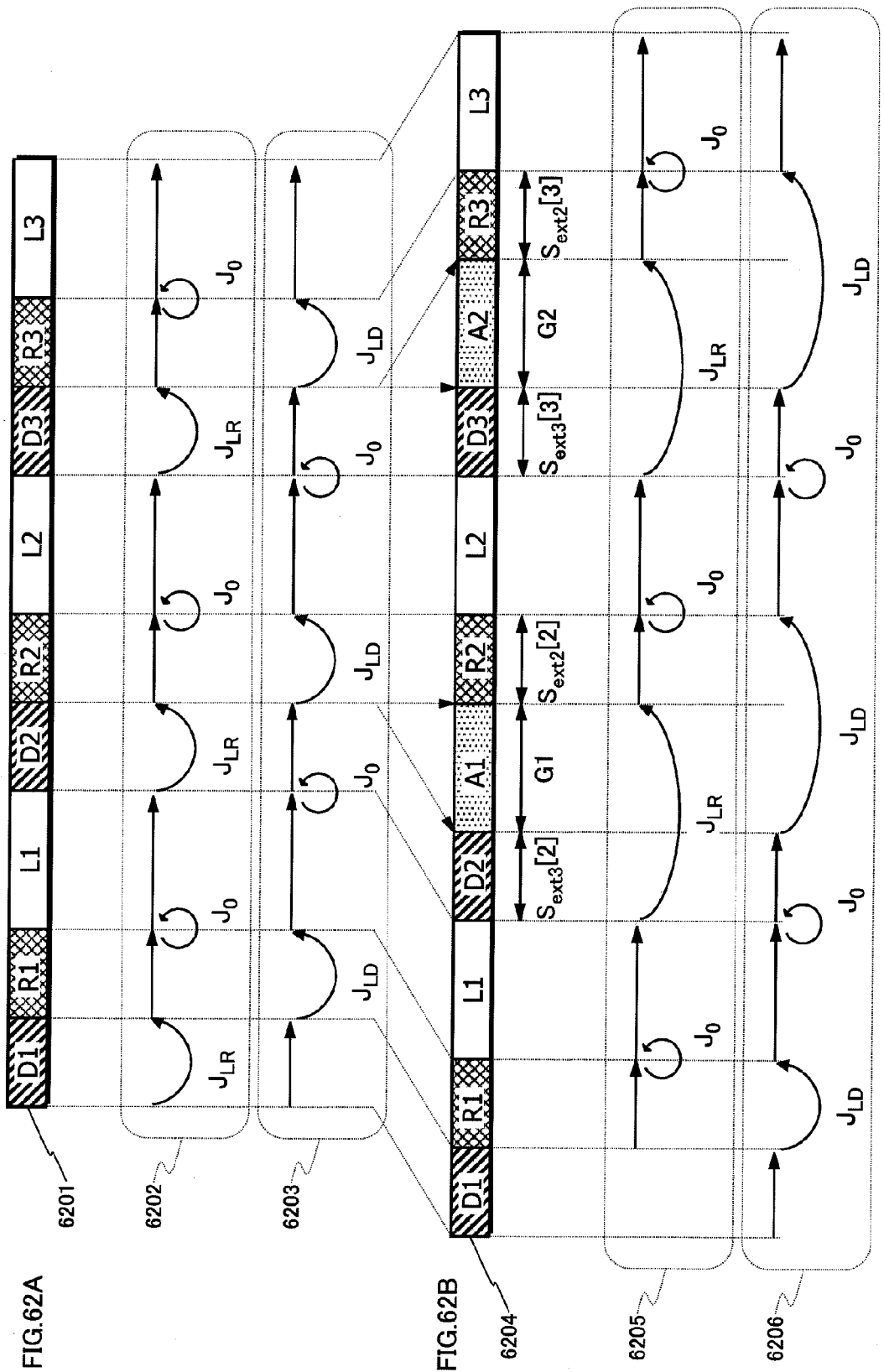

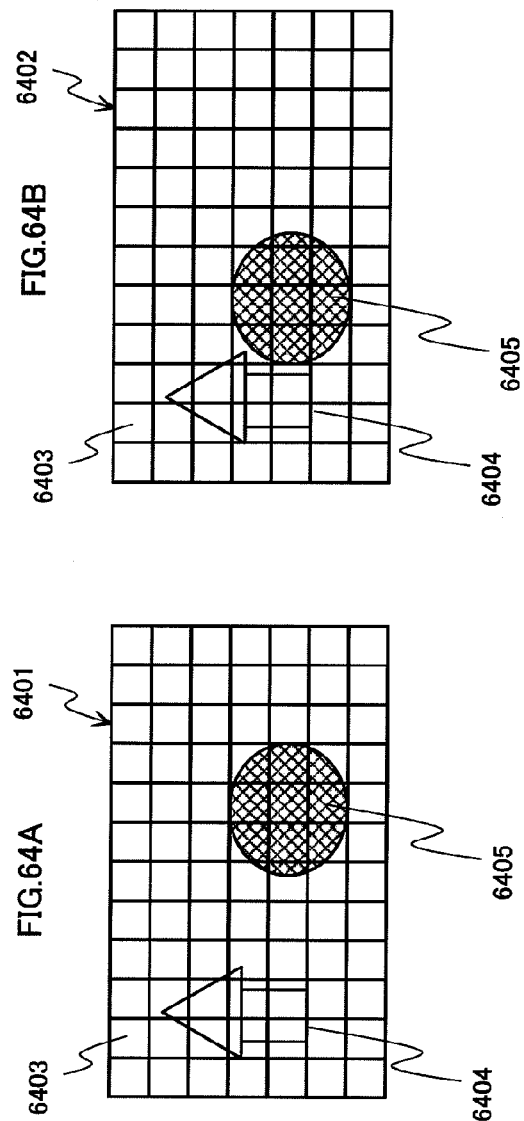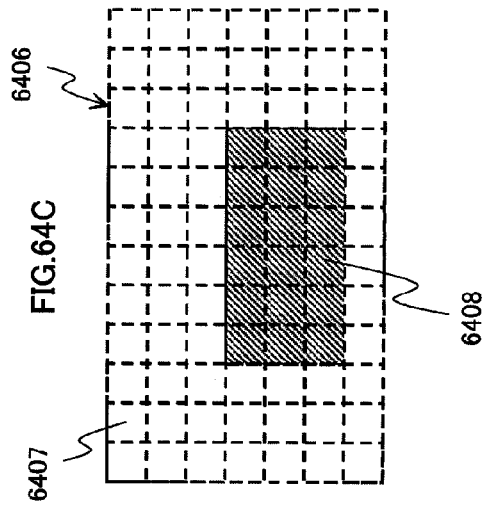

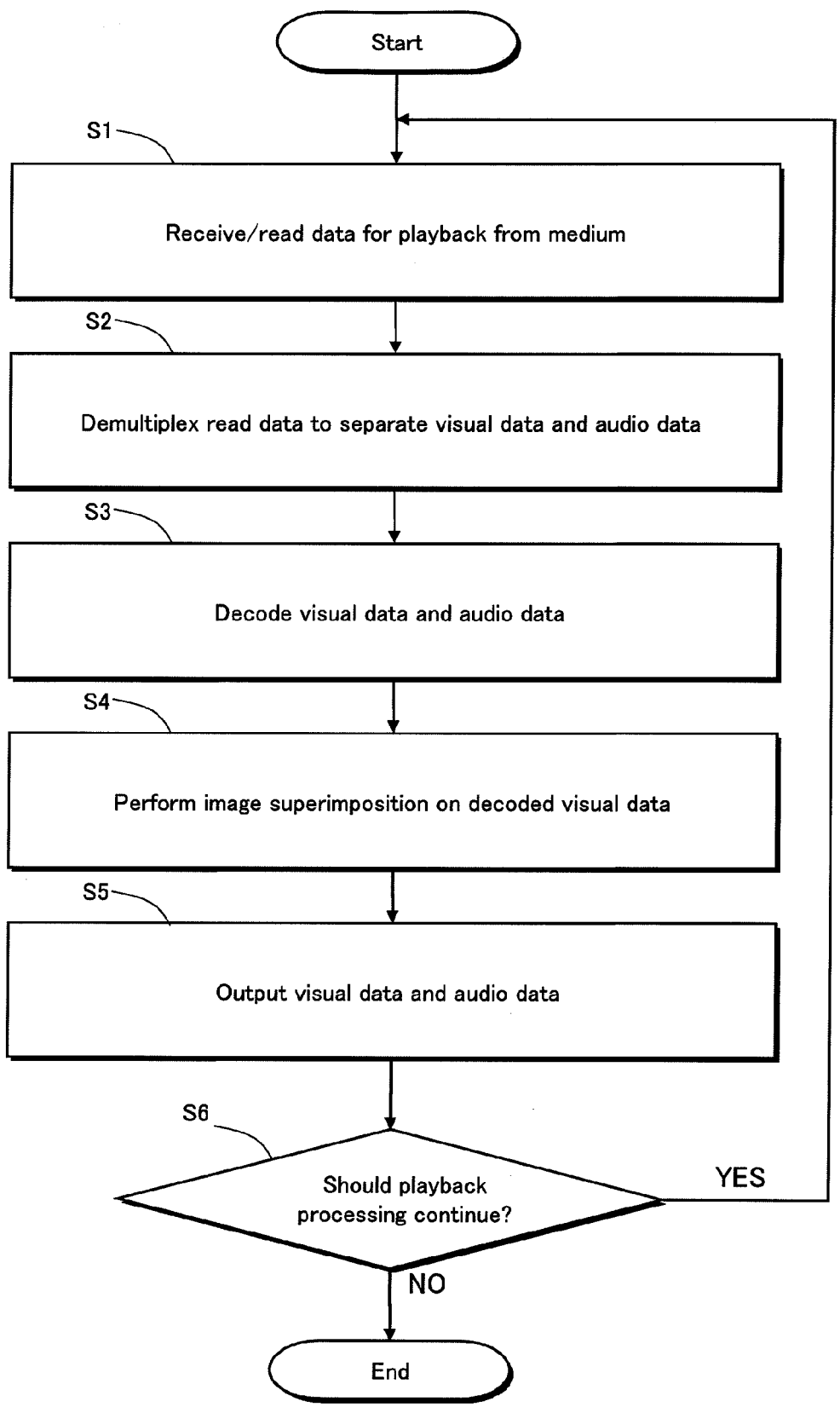

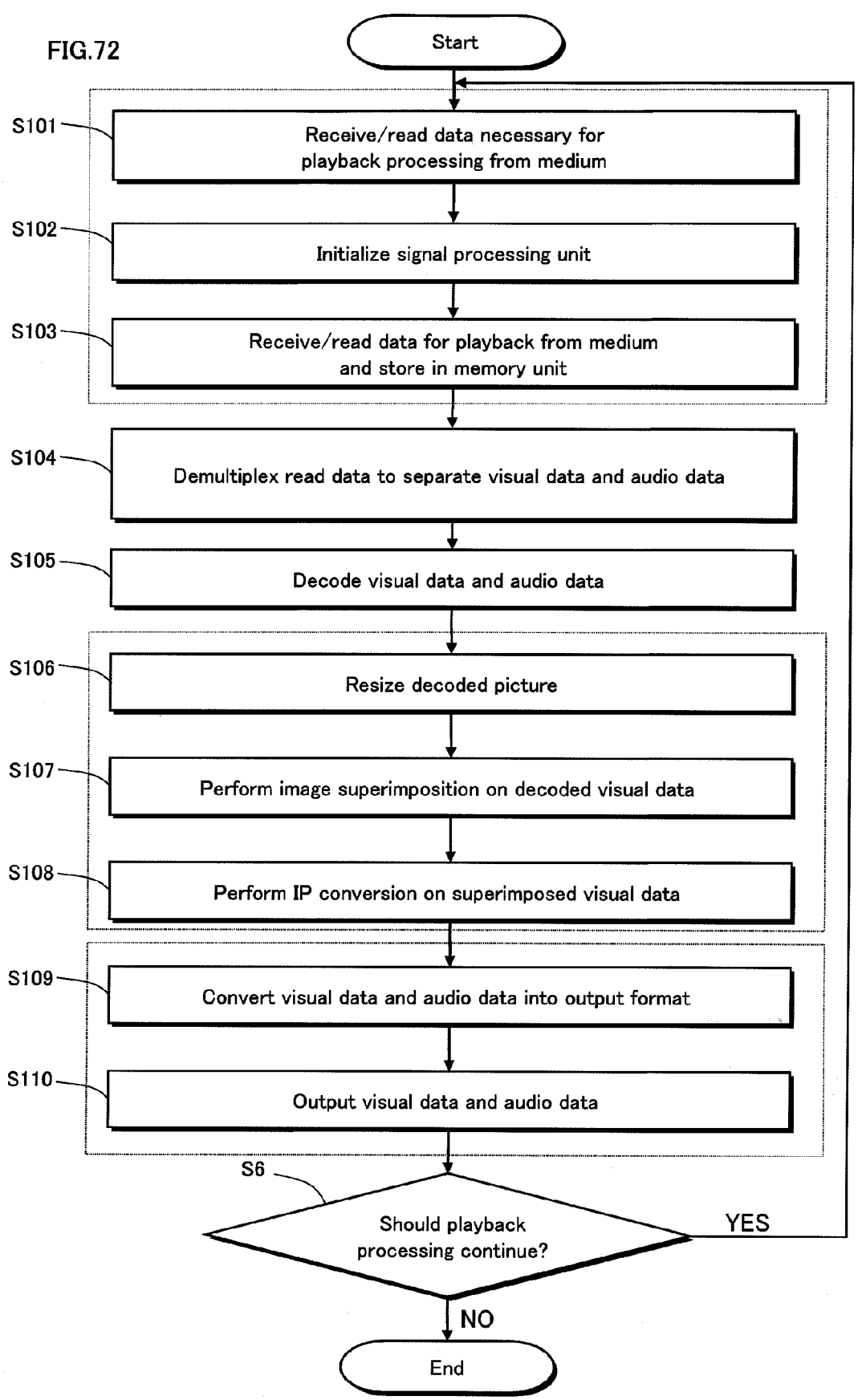

RECORDING MEDIUM, PLAYBACK DEVICE, AND INTEGRATED CIRCUIT

This application claims benefit of U.S. provisional application 61/149,798, which was filed Feb. 4, 2009.

BACKGROUND OF THE INVENTION

1. Field of the Invention

The present invention relates to a technology for stereoscopic, i.e. three-dimensional (3D), video playback and especially to the allocation of a video stream on a recording medium.

2. Description of the Related Art

In recent years, general interest in 3D video has been increasing. For example, amusement park attractions that incorporate 3D video images are popular. Furthermore, throughout the country, the number of movie theaters showing 3D movies is increasing. Along with this increased interest in 3D video, the development of technology that enables playback of 3D video images in the home has also been progressing. There is demand for this technology to store 3D video content on a portable recording medium, such as an optical disc, while maintaining the 3D video content at high image quality. Furthermore, there is demand for the recording medium to be compatible with a two-dimensional (2D) playback device. That is, it is preferable for a 2D playback device to be able to play back 2D video images and a 3D playback device to be able to play back 3D video images from the same 3D video content recorded on the recording medium. Here, a "2D playback device" refers to a conventional playback device that can only play back monoscopic video images, i.e. 2D video images, whereas a "3D playback device" refers to a playback device that can play back 3D video images. Note that in the present description, a 3D playback device is assumed to be able to also play back conventional 2D video images.

FIG. 75 is a schematic diagram illustrating the technology for ensuring the compatibility of an optical disc storing 3D video content with 2D playback devices (see Patent Literature 1). An optical disc 6701 stores two types of video stream files. One is a 2D/left-view video stream file, and the other is a right-view video stream file. A "2D/left-view video stream" represents a 2D video image to be shown to the left eye of a viewer during 3D playback, i.e. a "left-view". During 2D playback, this stream constitutes the 2D video image. A "right-view video stream" represents a 2D video image to be shown to the right eye of a viewer during 3D playback, i.e. a "right-view". The left and right video streams have the same frame rate but different presentation times shifted from each other by half a frame period. For example, when the frame rate of each video stream is 24 frames per second, the frames of the 2/D left-view video stream and the right-view video stream are alternately displayed every ¹⁄₄₈ seconds.

As shown in FIG. 75, the left-view and right-view video streams are divided into a plurality of extents 6702A-C and 6703A-C respectively on the optical disc 6701. Each extent contains at least one group of pictures (GOP), GOPs being read together from the optical disc. Hereinafter, the extents belonging to the 2D/left-view video stream are referred to as "2D/left-view extents", and the extents belonging to the right-view video stream are referred to as "right-view extents". The 2D/left-view extents 6702A-C and the right-view extents 6703A-C are alternately arranged on a track 6701A of the optical disc 6701. Each two adjacent extents 6702A-6703A, 6702B-6703B, and 6702C-6703C have the same length of playback time. Such an arrangement of extents is referred to as an interleaved arrangement. A group of extents recorded in an interleaved arrangement on a recording medium is used both in 3D video playback and 2D video image playback, as described below.

From among the extents recorded on the optical disc 6701, a 2D playback device 6704 causes an optical disc drive 6704A to read only the 2D/left-view extents 6702A-C sequentially from the start, skipping the reading of right-view extents 6703A-C. Furthermore, an image decoder 6704B sequentially decodes the extents read by the optical disc drive 6704A into a video frame 6706L. In this way, a display device 6707 only displays left-views, and viewers can watch normal 2D video images.

A 3D playback device 6705 causes an optical disc drive 6705A to alternately read 2D/left-view extents and right-view extents from the optical disc 6701. When expressed as codes, the extents are read in the order 6702A, 6703A, 6702B, 6703B, 6702C, and 6703C. Furthermore, from among the read extents, those belonging to the 2D/left-view video stream are supplied to a left video decoder 6705L, whereas those belonging to the right-view video stream are supplied to a right-video decoder 6705R. The video decoders 6705L and 6705R alternately decode each video stream into video frames 6706L and 6706R, respectively. As a result, left-views and right-views are alternately displayed on a display device 6708. In synchronization with the switching of the views by the display device 6708, shutter glasses 6709 cause the left and right lenses to become opaque alternately. Therefore, a viewer wearing the shutter glasses 6709 sees the views displayed by the display device 6708 as 3D video images.

When 3D video content is stored on any recording medium, not only on an optical disc, the above-described interleaved arrangement of extents is used. In this way, the recording medium can be used both for playback of 2D video images and 3D video images.

REFERENCES

Patent Documents

[Patent Document 1]
Japanese Patent No. 3935507

SUMMARY OF THE INVENTION

Problems to be Solved by the Invention

Some optical discs include multiple recording layers, like so-called two-layer discs. On such optical discs, a sequence of stream data may in some cases be recorded across two layers. On the other hand, even on a single layer disc, a sequence of stream data may in some cases be recorded with other data inserted in-between. In these cases, while the pickup of an optical disc drive reads data from the optical disc, the pickup has to perform focus jumps caused by the switching of layers and track jumps caused by radial movement along the disc. These jumps are called "long jumps" since their seek time is generally long. In order to make playback of video images seamless despite the occurrence of long jumps, it is necessary to make the size of the extent read immediately before a long jump sufficiently large and make the extent satisfy certain conditions so that underflow does not occur in the buffer in the video decoder during the long jump.

For playback of both 2D video images and 3D video images in the interleaved arrangement of extents shown in FIG. 75 to satisfy the above-mentioned conditions, the 2D/left-view extent accessed immediately before a long jump needs to be sufficiently large. However, in this case, the right-view extent that has the same playback time as the 2D/left-view extent also needs to be enlarged. As a result, the buffer capacity that needs to be guaranteed in the right-video decoder 6705R is larger than the capacity sufficient to satisfy the above-mentioned conditions. This is not desirable, since it prevents both further reduction of the buffer capacities in the 3D playback device 6705 and further improvement of efficient memory use.

To keep the buffer capacity that should be guaranteed in the right-video decoder 6705R down to a minimum, one possibility is, for example, to separate the playback path for 2D video images from the playback path for 3D video images immediately before or after a long jump. A "playback path for video images" refers to the relationship between each part of a video stream representing video images and the playback order thereof. Furthermore, "separation of playback paths" refers to recording, on the recording medium, a section for playback of a video stream and duplicate data for the section, allocating a different playback path to each. When the playback path for 2D video images and the playback path for 3D video images are separated in the above-described way, the sizes of the 2D/left-view extents to be read immediately before a long jump during playback of 2D video images and during playback of 3D video images can be designed differently. Accordingly, while keeping the buffer capacity to be guaranteed in the right-video decoder 6705R down to a minimum, it is possible to prevent buffer underflow in the video decoders 6705L and 6705R during a long jump in both playback of 2D video images and playback of 3D video images. At the same time, however, a duplicate of the same section in the 2D/left-view video stream is stored in a different extent. Accordingly, the relationship between extents to be read before and after a long jump and the sections of video streams to be stored therein becomes complicated. As a result, a file structure in which these extents can easily be read quickly is not obvious.

It is an object of the present invention to provide a recording medium that both includes an extent group arranged so that the buffer capacity to be guaranteed in a playback device can be reduced and that also has a file structure that easily allows the playback device to quickly access each extent.

Means for Solving the Problems

A base-view stream used for monoscopic video playback and a dependent-view stream used for stereoscopic video playback in combination with the base-view stream are recorded on a non-transitory recording medium according to an embodiment of the present invention.

A first file and a second file are further recorded on a recording medium according to one aspect of the present invention. The first file refers to the base-view stream in monoscopic video playback, and the second file refers to the base-view stream in stereoscopic video playback.

In a recording medium according to another aspect of the present invention, the base-view stream is divided into a plurality of base-view data blocks, and the dependent-view stream is divided into a plurality of dependent-view data blocks. Furthermore, the plurality of base-view data blocks and the plurality of, dependent-view data blocks are recorded in an interleaved arrangement. A first file and a second file are also recorded on the recording medium. The first file refers to the base-view stream in monoscopic video playback, and the second file refers to the plurality of base-view data blocks and the plurality of dependent-view data blocks in an interleaved arrangement as a sequence of data in stereoscopic video playback.

Advantageous Effects of the Invention

In the recording media according to the present invention, a part of the base-view stream that is common to the playback paths for monoscopic video and for stereoscopic video is referred to by two types of reference files. These recording media cause a playback device to choose between the two types of reference files depending on whether monoscopic or stereoscopic video images are being played back. As a result, it is possible to configure extents from data blocks on these recording media so as to reduce the buffer capacity that needs to be guaranteed in the playback device, and it also becomes easy to allow the playback device to quickly access each extent.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 4 is a schematic diagram showing the data structure of the subordinate file #1 223 shown in FIG. 2;

FIG. 6A is a schematic diagram showing the elementary streams multiplexed in the main TS on the BD-ROM disc 101 shown in FIG. 2, FIG. 6B is a schematic diagram showing the elementary streams multiplexed in the first sub-TS on the BD-ROM disc 101 shown in FIG. 2, and FIG. 6C is a schematic diagram showing the elementary streams multiplexed in the second sub-TS on the BD-ROM disc 101 shown in FIG. 2;

FIGS. 19A, 19B, 19C, 19D, and 19E are schematic diagrams respectively showing the data structure for file 2D (01000.m2ts) 541, first file DEP (02000.m2ts) 542, second file DEP (03000.m2ts) 543, first file SS (01000.ssif) 544A, and second file SS (02000.ssif) 544B shown in FIG. 5;

FIG. 31A is a schematic diagram showing the data structure of the entry map 3030 shown in FIG. 30, FIG. 31B is a schematic diagram showing source packets in the source packet group 3110 belonging to the file 2D 541, shown in FIG. 5, that are associated with each EP_ID 3105 by the entry map 3030, and FIG. 31C is a schematic diagram showing the relationships between the source packet group 3110 and the data block group 3120 on the BD-ROM disc;

FIG. 32A is a schematic diagram showing the data structure of an offset table 3041, and FIG. 32B is a schematic diagram showing the valid section of an offset entry;

FIG. 33A is a schematic diagram showing the data structure of the extent start points 3042 shown in FIG. 30, FIG. 33B is a schematic diagram showing the data structure of extent start points 3320 included in the right-view clip information file (02000.clpi) shown in FIG. 5, FIG. 33C is a schematic diagram representing the base-view data blocks L1, L2, . . . extracted from the first file SS (01000.ssif) 544A by the playback device 102 in L/R mode, FIG. 33D is a schematic diagram representing the relationship between right-view extents EXT2[0], EXT2[1] . . . belonging to the first file DEP (02000.m2ts) 542 and the SPNs 3322 shown by the extent start points 3320, and FIG. 33E is a schematic diagram showing an example of the relationship between 3D extents EXTSS[0], EXTSS[1], . . . belonging to the first file SS 544A and a data block group 3350 on the BD-ROM disc 101;

FIG. 37 is a schematic diagram showing the data structure of the PI#N shown in FIG. 36;

FIGS. 38A and 38B are schematic diagrams showing the relationship between playback sections 3801 and 3802 that are to be connected when the connection condition 3704 shown in FIG. 37 respectively indicates "5" and "6";

FIG. 47 is a list of system parameters in the player variable storage unit 4608 shown in FIG. 46;

FIGS. 52A and 52B are schematic diagrams showing cropping processing by the second cropping processing unit 5132 shown in FIG. 51;

FIG. 56 is an example of a correspondence table between jump distances $S_{jump}$ and maximum jump times $T_{jump}$ for a BD-ROM disc according to embodiment 1 of the present invention;

FIG. 62A is a schematic diagram showing, on a BD-ROM disc according to embodiment 1 of the present invention, data blocks in an interleaved arrangement that includes only multiplexed stream data, and FIG. 62B is a schematic diagram showing data blocks in an interleaved arrangement that includes extents belonging to another file;

FIGS. 64A and 64B are schematic diagrams showing a left-video image picture and a right-video image picture used in display of one scene in a 3D video image in a recording device according to embodiment 2 of the present invention, and FIG. 64C is a schematic diagram showing depth information calculated from these pictures by a video encoder 6301;

FIG. 71 is a flowchart of playback processing by a playback device 102 that uses the integrated circuit 3 shown in FIG. 65;

FIG. 72 is a flowchart showing details on steps S1-5 shown in FIG. 71;

DESCRIPTION OF THE PREFERRED EMBODIMENTS

The following describes a recording medium and a playback device pertaining to preferred embodiments of the present invention with reference to the drawings.

Embodiment 1

Figure 1:
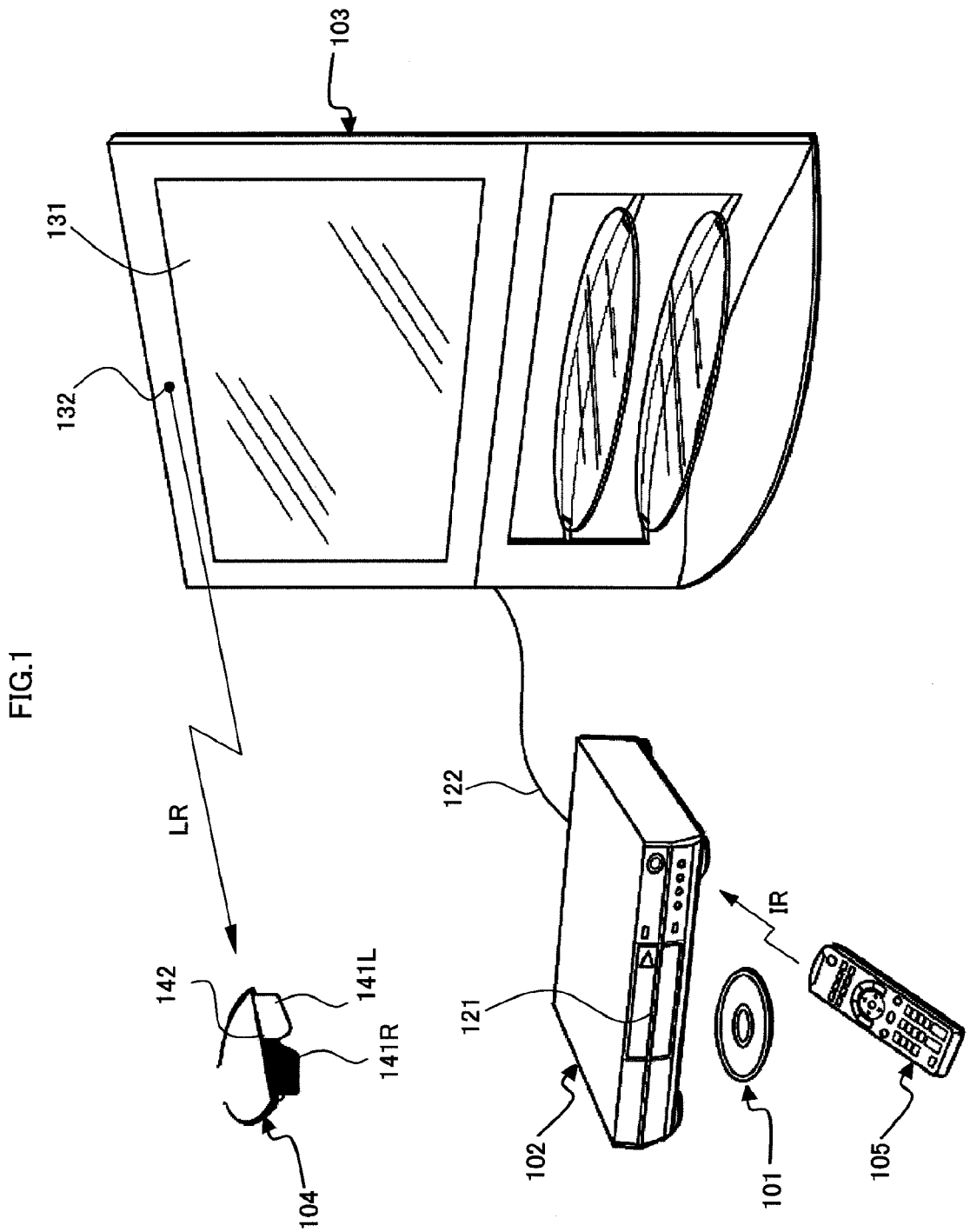
FIG. 1 is a schematic diagram showing a home theater system that uses a recording medium according to embodiment 1 of the present invention.

FIG. 1 is a schematic diagram showing a home theater system using a recording medium according to embodiment 1 of the present invention. This home theater system adopts a 3D video image (stereoscopic video image) playback method that uses parallax video images, and in particular adopts an alternate-frame sequencing method as a display method (see <Supplementary Explanation> for details). As shown in FIG. 1, this home theater system has a recording medium 101 as a playback target, and includes a playback device 102, a display device 103, shutter glasses 104, and a remote control 105.

The recording medium 101 is a read-only Blu-ray disc (BD)™, i.e. a BD-ROM disc. The recording medium 101 can be a different portable recording medium, such as an optical disc with a different format such as DVD or the like, a removable hard disk drive (HDD), or a semiconductor memory device such as an SD memory card. This recording medium, i.e. the BD-ROM disc 101, stores a movie content as 3D video images. This content includes video streams representing a left-view and a right-view for the 3D video images. The content may further include a video stream representing a depth map for the 3D video images. These video streams, as described below, are arranged on the BD-ROM disc 101 in units of data blocks and are accessed using a file structure described below. The video streams representing the left-view or the right-view are used by both a 2D playback device and a 3D playback device to play the content back as 2D video images. Conversely, a pair of video streams representing a left-view and a right-view, or a pair of video streams representing either a left-view or a right-view and a depth map, are used by a 3D playback device to play the content back as 3D video images.

A BD-ROM drive 121 is mounted on the playback device 102. The BD-ROM drive 121 is an optical disc drive conforming to the BD-ROM format. The playback device 102 uses the BD-ROM drive 121 to read content from the BD-ROM disc 101. The playback device 102 further decodes the content into video data/audio data. In this case, the playback device 102 is a 3D playback device and can play the content back as both 2D video images and as 3D video images. Hereinafter, the operational modes of the playback device 102 when playing back 2D video images and 3D video images are respectively referred to as "2D playback mode" and "3D playback mode". In 2D playback mode, video data only includes either a left-view or a right-view video frame. In 3D playback mode, video data includes both left-view and right-view video frames.

3D playback mode is further divided into left/right (L/R) mode and depth mode. In "L/R mode", a pair of left-view and right-view video frames is generated from a combination of video streams representing the left-view and right-view. In "depth mode", a pair of left-view and right-view video frames is generated from a combination of video streams representing either a left-view or a right-view and a depth map. The playback device 102 is provided with an L/R mode. The playback device 102 may be further provided with a depth mode.

The playback device 102 is connected to the display device 103 via an HDMI (High-Definition Multimedia Interface) cable 122. The playback device 102 converts the video data/audio data into a video signal/audio signal in the HDMI format and transmits the signals to the display device 103 via the HDMI cable 122. In 2D playback mode, only one of either the left-view or the right-view video frame is multiplexed in the video signal. In 3D playback mode, both the left-view and the right-view video frames are time-multiplexed in the video signal. Additionally, the playback device 102 exchanges CEC messages with the display device 103 via the HDMI cable 122. In this way, the playback device 102 can ask the display device 103 whether it supports playback of 3D video images.

The display device 103 is a liquid crystal display. Alternatively, the display device 103 can be another type of flat panel display, such as a plasma display, an organic EL display, etc., or a projector. The display device 103 displays video on the screen 131 in accordance with a video signal, and causes the speakers to produce audio in accordance with an audio signal. The display device 103 supports playback of 3D video images. During playback of 2D video images, either the left-view or the right-view is displayed on the screen 131. During playback of 3D video images, the left-view and right-view are alternately displayed on the screen 131.

The display device 103 includes a left/right signal transmitting unit 132. The left/right signal transmitting unit 132 transmits a left/right signal LR to the shutter glasses 104 via infrared rays or by radio transmission. The left/right signal LR indicates whether the image currently displayed on the screen 131 is a left-view or a right-view image. During playback of 3D video images, the display device 103 detects switching of frames by distinguishing between a left-view frame and a right-view frame from a control signal that accompanies a video signal. Furthermore, the display device 103 switches the left/right signal LR synchronously with the detected switching of frames.

The shutter glasses 104 include two liquid crystal display panels 141L and 141R and a left/right signal receiving unit 142. Each of the liquid crystal display panels 141L and 141R constitute each of the left and right lens parts. The left/right signal receiving unit 142 receives a left/right signal LR, and in accordance with changes therein, transmits the signal to the left and right liquid crystal display panels 141L and 141R. In accordance with the signal, each of the liquid crystal display panels 141L and 141R either lets light pass through the entire panel or shuts light out. For example, when the left/right signal LR indicates a left-view display, the liquid crystal display panel 141L for the left eye lets light pass through, while the liquid crystal display panel 141R for the right eye shuts light out. When the left/right signal LR indicates a right-view display, the display panels act oppositely. In this way, the two liquid crystal display panels 141L and 141R alternately let light pass through in sync with the switching of frames. As a result, when a viewer looks at the screen 131 while wearing the shutter glasses 104, the left-view is shown only to the viewer's left eye, and the right-view is shown only to the right eye. At that time, the viewer is made to perceive the difference between the images seen by each eye as the binocular parallax for the same stereoscopic image, and thus the video image appears to be stereoscopic.

The remote control 105 includes an operation unit and a transmitting unit. The operation unit includes a plurality of buttons. The buttons correspond to each of the functions of the playback device 102 and the display device 103, such as turning the power on or off, starting or stopping playback of the BD-ROM disc 101, etc. The operation unit detects when the user presses a button and conveys identification information for the button to the transmitting unit as a signal. The transmitting unit converts this signal into a signal IR and outputs it via infrared rays or radio transmission to the playback device 102 or the display device 103. On the other hand, the playback device 102 and display device 103 each receive this signal IR, determine the button indicated by this signal IR, and execute the function associated with the button. In this way, the user can remotely control the playback device 102 or the display device 103.

<Data Structure of the BD-ROM Disc>

Figure 2:
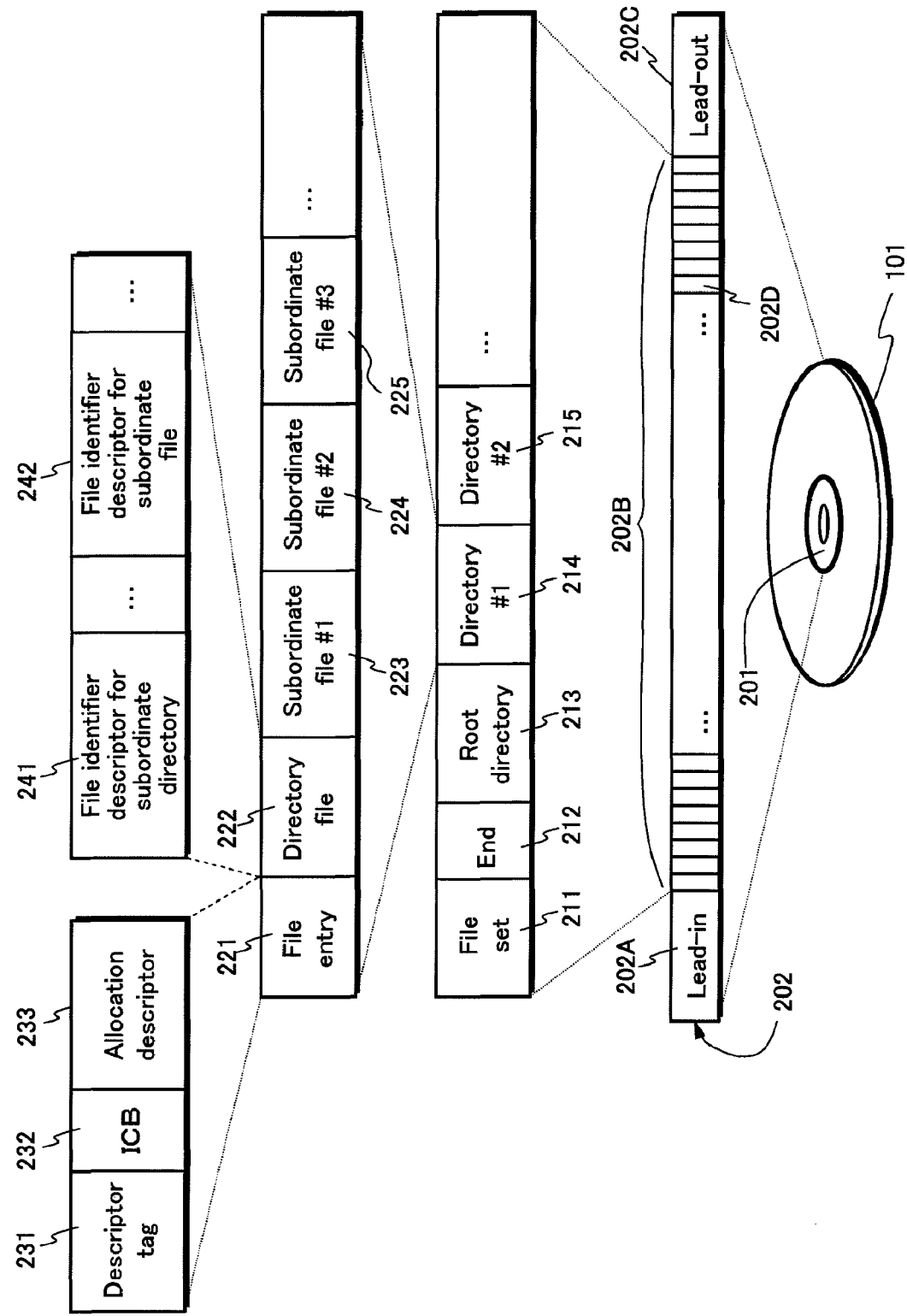
FIG. 2 is a schematic diagram showing the data structure of the BD-ROM disc 101 shown in FIG. 1.

FIG. 2 is a schematic diagram showing the data structure of the BD-ROM disc 101. As shown in FIG. 2, a BCA (Burst Cutting Area) 201 is provided at the innermost part of the data recording area on the BD-ROM disc 101. Only the BD-ROM drive 121 is permitted to access the BCA, and access by application programs is prohibited. In this way, the BCA 201 can be used as technology for copyright protection. In the data recording area outside of the BCA 201, tracks spiral from the inner to the outer circumference. In FIG. 2, the track 202 is schematically extended in a transverse direction. The left side represents the inner circumferential part of the disc 101, and the right side represents the outer circumferential part. As shown in FIG. 2, track 202 contains a lead-in area 202A, a volume area 202B, and a lead-out area 202C in order from the inner circumference. The lead-in area 202A is provided immediately on the outside edge of the BCA 201. The lead-in area 202A includes information necessary for the BD-ROM drive 121 to access the volume area 202B, such as the size, the physical address, etc. of the data recorded in the volume area 202B. The lead-out area 202C is provided on the outermost circumferential part of the data recording area and indicates the end of the volume area 202B. The volume area 202B includes application data such as video images, audio, etc.

The volume area 202B is divided into small areas 202D called "sectors". The sectors have a common size, for example 2,048 bytes. Each sector 202D is consecutively assigned a number in order from the top of the volume area 202B. These consecutive numbers are called logical block numbers (LBN) and are used in logical addresses on the BD-ROM disc 101. During reading of data from the BD-ROM disc 101, data targeted to be read is specified through designation of the LBN for the sector to be read. In this way, the volume area 202B can be accessed in units of sectors. Furthermore, on the BD-ROM disc 101, logical addresses are substantially the same as physical addresses. In particular, in an area where the LBNs are consecutive, the physical addresses are also substantially consecutive. Accordingly, the BD-ROM drive 121 can consecutively read data pieces having consecutive LBNs without making the optical pickup perform a seek.

The data recorded in the volume area 202B is managed under a predetermined file system. UDF (Universal Disc Format) is adopted as this file system. Alternatively, the file system may be ISO9660. The data recorded on the volume area 202B is represented in a directory/file format in accordance with the file system. In other words, the data is accessible in units of directories or files.

FIG. 2 shows the data structure of the volume area 202B when UDF is used as the file system. As shown in FIG. 2, the volume area 202B generally includes areas in which a plurality of directories 213-215, a file set descriptor 211, and a terminating descriptor 212 are respectively recorded. Each "directory" 213, 214, and 215 is a data group composing the directory. The "file set descriptor" 211 indicates the LBN of a sector in which a file entry for the root directory 213 is stored. The "terminating descriptor" 212 indicates the termination of the recording area for the file set descriptor 211.

Each directory 213, 214, and 215 shares a common data structure. FIG. 2 shows the data structure of directory #1 214 as a typical example. The directory #1 214 includes a file entry 211, directory file 222, and a subordinate file group 223-225.

The "file entry" 221 includes a descriptor tag 231, information control block (ICB) tag 232, and allocation descriptor 233. The "descriptor tag" 231 indicates that the type of the data that includes the descriptor tag is a file entry. For example, when the value of the descriptor tag is "261", the type of that data is a file entry. The "ICB tag" 232 indicates attribute information for the file entry itself. The "allocation descriptor" 233 indicates the LBN of the sector on which the directory file 222 belonging to the directory #1 214 is recorded.

Figure 3A:
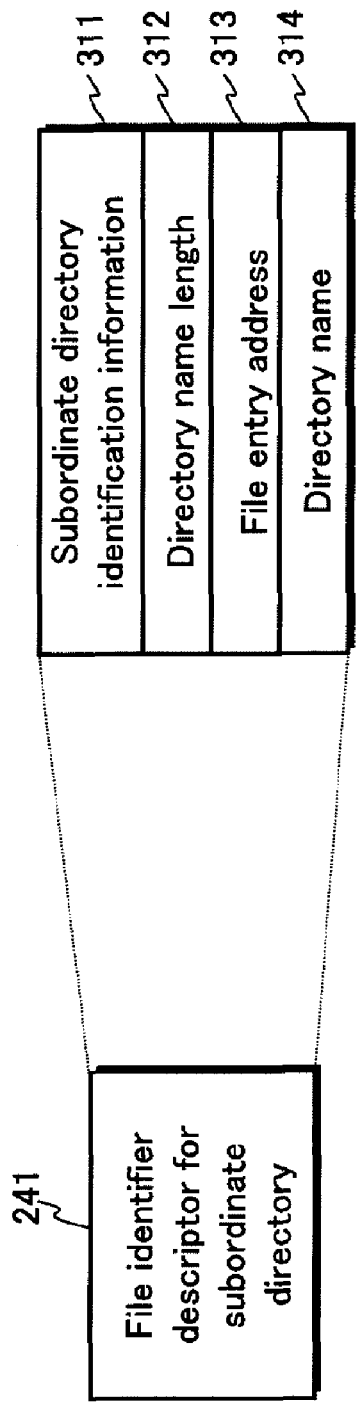
FIG. 3A is a schematic diagram showing the data structure of a file identifier descriptor 241 for the subordinate directory shown in FIG. 2.
Figure 3B:
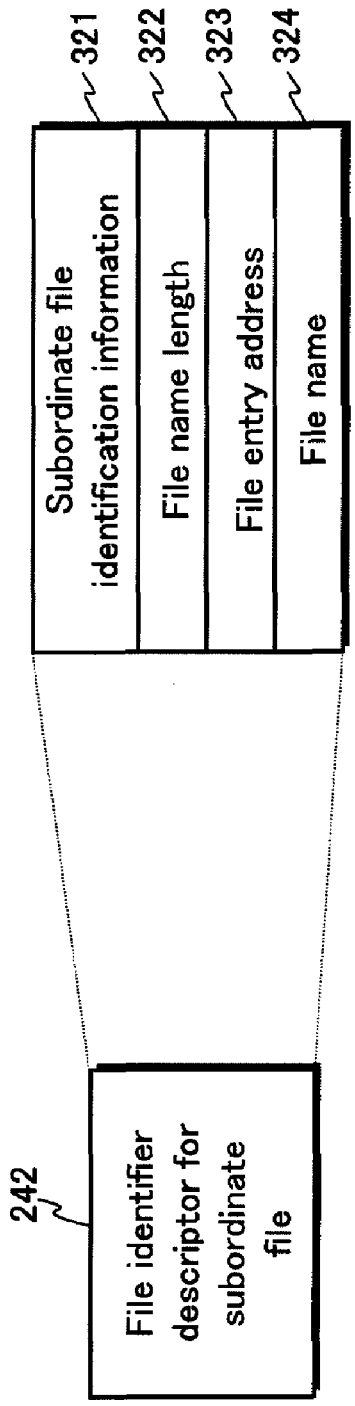
FIG. 3B is a schematic diagram showing the data structure of a file identifier descriptor 242 for the subordinate file shown in FIG. 2.

The "directory file" 222 typically includes several of each of a file identifier descriptor 241 for a subordinate directory and a file identifier descriptor 242 for a subordinate file. FIG. 3A is a schematic diagram showing the data structure of a file identifier descriptor 241 for a subordinate directory. The "file identifier descriptor 241 for a subordinate directory" is information for accessing the subordinate directory located directly below directory #1. As shown in FIG. 3A, the file identifier descriptor 241 for a subordinate directory includes identification information 311 for the subordinate directory, directory name length 312, file entry address 313, and actual directory name 314. In particular, the file entry address 313 indicates the LBN of the sector on which the file entry of the subordinate directory is recorded. FIG. 3B is a schematic diagram showing the data structure of a file identifier descriptor 242 for a subordinate file. The "file identifier descriptor 242 for a subordinate file" is information for accessing the subordinate file located directly below directory #1. As shown in FIG. 3B, the file identifier descriptor 242 for a subordinate file includes identification information 321 for the subordinate file, file name length 322, file entry address 323, and actual file name 324. In particular, the file entry address 323 indicates the LBN of the sector on which the file entry of the subordinate file is recorded. The "file entry of the subordinate file", as described below, includes address information for the data constituting the actual subordinate file.

As can be understood from FIGS. 2 and 3, by tracing the file set descriptors 211 and the file identifier descriptors of subordinate directories/files in order, the file entry of an arbitrary directory/file recorded on the volume area 202B can be accessed. As a specific example, access to the subordinate file #1 223 in the directory #1 214 is considered. First, the file entry of the root directory 213 is specified from the file set descriptor 211, and the directory file for the root directory 213 is specified from the allocation descriptor in this file entry. Next, the file identifier descriptor for the directory #1 214 is detected from the directory file, and the file entry 221 for the directory #1 214 is specified from the file entry address therein. Furthermore, the directory file 222 for the directory #1 214 is specified from the allocation descriptor 233 in the file entry 221. Subsequently, from within the directory file 222, the file entry for the subordinate file #1 223 is specified from the file entry address 323 in the file identifier descriptor 242 for the subordinate file #1.

The subordinate files 223, 224, 225, . . . shown in FIG. 2 have a common data structure. FIG. 4 is a schematic diagram showing the data structure of the subordinate file #1 223 as a typical example of this common data structure. As shown in FIG. 4, the subordinate file #1 223 includes extents 410-430 and a file entry 400. The "extents" 410, 420, 430, . . . are a generally multiple in number and are data sequences whose logical addresses, i.e. LBNs, are consecutive on the disc. The entirety of the extents 410, 420, 430, . . . comprise the actual subordinate file #1 223. The "file entry" 400 includes a descriptor tag 401, ICB tag 402, and allocation descriptors 411-413. The "descriptor tag" 401 indicates that the type of the data 400 that includes the descriptor tag 401 is a file entry. The "ICB tag" 402 indicates attribute information of the actual file entry 400. The "allocation descriptors" 411, 412, 413, . . . are provided in a one-to-one correspondence with each extent 410, 420, 430, . . . and indicate the arrangement of each extent 410-430 on the volume area 202B, specifically the size of each extent and the LBN for the top of the extent. Alternatively, by making the LBNs consecutive between areas that indicate allocation descriptors, these allocation descriptors taken as a whole may indicate the allocation of one extent. As shown by the dashed lines with an arrow, by referring to each allocation descriptor 411, 412, ... , each extent 410, 420, ... can be accessed. Also, the two most significant bits of each allocation descriptor 411, ... indicate whether an extent 410, ... is actually recorded on the sector for the LBN indicated by the allocation descriptor. More specifically, when the two most significant bits indicate "0", an extent has been assigned to the sector and has been actually recorded thereat. When the two most significant bits indicate "1", an extent has been assigned to the sector but has not been yet recorded thereat.

Like the above-described file system employing a UDF, when each file recorded on the volume area 202B is divided into a plurality of extents, the file system for the volume area 202B also generally stores the information showing the locations of the extents, as with the above-mentioned allocation descriptors, in the volume area 202B. By referring to the information, the location of each extent, particularly the logical address thereof, can be found.

<<Directory/File Structure on the BD-ROM Disc>>

Figure 5:
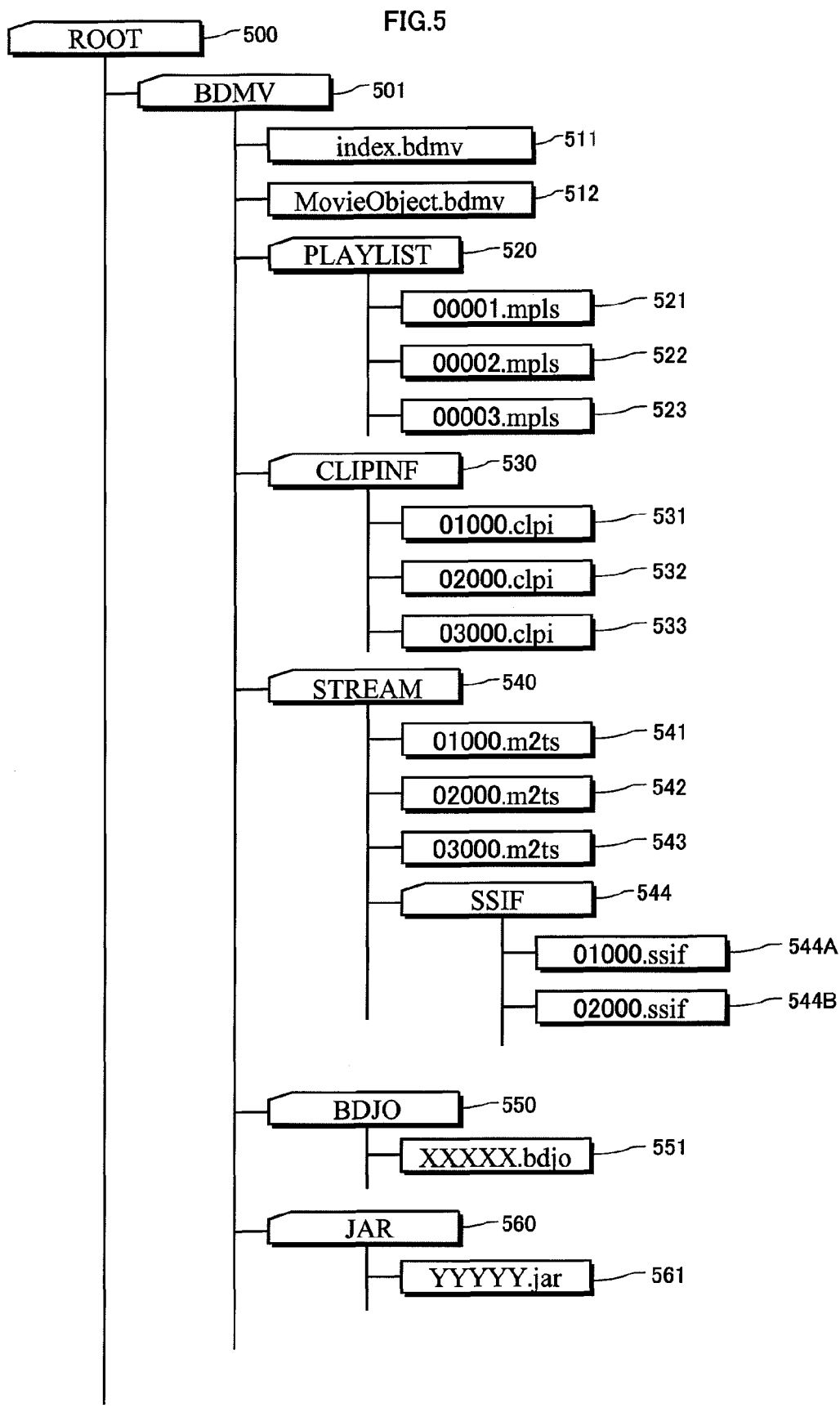
FIG. 5 is a schematic diagram showing the directory/file structure of the data stored in the volume area 202B on the BD-ROM disc 101 shown in FIG. 2.

FIG. 5 is a schematic diagram showing the directory/file structure of the data stored in the volume area 202B on a BD-ROM disc 101. As shown in FIG. 5, in this directory/file structure, a BD movie (BDMV) directory 501 is located directly below a ROOT directory 500. Below the BDMV directory 501 are an index file (index.bdmv) 511 and a movie object file (MovieObject.bdmv) 512.

The index file 511 contains information for managing as a whole the content recorded on the BD-ROM disc 101. In particular, this information includes information to make the playback device 102 recognize the content, as well as an index table. The index table is a correspondence table between a title constituting the content and a program to control the operation of the playback device 102. This program is called an "object". Object types are a movie object and a BD-J (BD Java™) object.

The movie object file 512 generally stores a plurality of movie objects. Each movie object stores a sequence of navigation commands. A navigation command is a control command causing the playback device 102 to execute playback processes similarly to general DVD players. Types of navigation commands are, for example, a read-out command to read out a playlist file corresponding to a title, a playback command to play back stream data from an AV stream file indicated by a playlist file, and a transition command to make a transition to another title. Navigation commands are written in an interpreted language and are deciphered by an interpreter, i.e. a job control program, included in the playback device to make the control unit execute the desired job. A navigation command is composed of an opcode and an operand. The opcode describes the type of operation that the playback device is to execute, such as dividing, playing back, or calculating a title, etc. The operand indicates identification information targeted by the operation such as the title's number, etc. The control unit of the playback device 102 calls a movie object in response, for example, to a user operation and executes navigation commands included in the called movie object in the order of the sequence. Thus, in a manner similar to general DVD players, the playback device 102 first makes the display device 103 display a menu to allow the user to select a command. The playback device 102 then executes playback start/stop of a title, switches to another title, etc. in accordance with the selected command, thereby dynamically changing the progress of video playback.

As shown in FIG. 5, the BDMV directory 501 further contains a playlist (PLAYLIST) directory 520; a clip information (CLIPINF) directory 530; a stream (STREAM) directory 540; a BD-J object (BDJO: BD Java Object) directory 550; and a Java archive (JAR: Java Archive) directory 560.

Three types of AV stream files, (01000.m2ts) 541, (02000.m2ts) 542, and (03000.m2ts) 543, as well as a stereoscopic interleaved file (SSIF) directory 544 are located directly under the STREAM directory 540. Two types of AV stream files, (01000.ssif) 544A and (02000.ssif) 544B are located directly under the SSIF directory 544.

An "AV stream file" refers to a file, from among an actual video content recorded on a BD-ROM disc 101, that complies with the file format determined by the file system. Such an actual video content generally refers to stream data in which different types of stream data representing video, audio, subtitles, etc. have been multiplexed. This multiplexed stream data can be broadly divided into a main transport stream (TS) and a sub-TS depending on the type of the internal primary video stream. A "main TS" includes a base-view video stream as a primary video stream. A "base-view video stream" can be played back independently and represents 2D video images. A "sub-TS" includes a dependent-view video stream as a primary video stream. A "dependent-view video stream" requires a base-view video stream for playback and represents 3D video images by being combined with the base-view video stream. The types of dependent-view video streams are a right-view video stream, left-view video stream, and depth map stream. When the 2D video images represented by a base-view video stream are used as the left-view of 3D video images by a playback device in L/R mode, a "right-view video stream" is used as the video stream representing the right-view of the 3D video images. The reverse is true for a "left-view video stream". When the 2D video images represented by a base-view video stream are used to project 3D video images on a virtual 2D screen by a playback device in depth mode, a "depth map stream" is used as the video stream representing a depth map for the 3D video images.

Depending on the type of internal multiplexed stream data, an AV stream file can be divided into three types: file 2D, dependent file (hereinafter, abbreviated as "file DEP"), and interleaved file (hereinafter, abbreviated as "file SS"). A "file 2D" is an AV stream file for playback of 2D video in 2D playback mode and includes a main TS. A "file DEP" includes a sub-TS. An "file SS" includes a main TS and a sub-TS representing the same 3D video images. In particular, a file SS shares its main TS with a certain file 2D and shares its sub-TS with a certain file DEP. In other words, in the file system on the BD-ROM disc 101, a main TS can be accessed by both a file SS and a file 2D, and a sub TS can be accessed by both a file SS and a file DEP. This setup, whereby a sequence of data recorded on the BD-ROM disc 101 is common to different files and can be accessed by all of the files, is referred to as "file cross-link".

In the example shown in FIG. 5, the first AV stream file (01000.m2ts) 541 is a file 2D, and the second AV stream file (02000.m2ts) 542 and third AV stream file (03000.m2ts) 543 are both files DEP. In this way, files 2D and files DEP are located directly below the STREAM directory 540. The first AV stream file, i.e. the base-view video stream that includes the file 2D 541, represents a left-view of 3D video images. The second AV stream file, i.e. the dependent-view video stream that includes the first file DEP 542, is a right-view video stream. The third AV stream file, i.e. the dependent-view video stream that includes the second file DEP 543, is a depth map stream.

In the example shown in FIG. 5, the fourth AV stream file (01000.ssif) 544A and the fifth AV stream file (02000.ssif) 544B are both a file SS. In this way, files SS are located directly below the SSIF directory 544. The fourth AV stream file, i.e. the first file SS 544A, shares a main TS, and in particular a base-view video stream, with the file 2D 541 and shares a sub-TS, in particular a right-view video stream, with the first file DEP 542. The fifth AV stream file, i.e. the second file SS 544B, shares a main TS, and in particular a base-view video stream, with the file 2D 541 and shares a sub-TS, in particular a depth map stream, with the second file DEP 543.

Three types of clip information files, (01000.clpi) 531, (02000.clpi) 532, and (03000.clpi) 533 are located in the CLIPINF directory 530. A "clip information file" is associated on a one-to-one basis with a file 2D and a file DEP even within an AV stream file and in particular contains the entry map for each file. An "entry map" is a correspondence table between the presentation time for each scene represented by a file 2D or a file DEP and the address within each file at which the scene is recorded. Among the clip information files, a clip information file associated with a file 2D is referred to as a "2D clip information file", and a clip information file associated with a file DEP is referred to as a "dependent-view clip information file". Furthermore, when a file DEP includes a right-view video stream, the corresponding dependent-view clip information file is referred to as a "right-view clip information file". When a file DEP includes a depth map stream, the corresponding dependent-view clip information file is referred to as a "depth map clip information file". In the example shown in FIG. 5, the first clip information file (01000.clpi) 531 is a 2D clip information file and is associated with the file 2D 541. The second clip information file (02000.clpi) 532 is a right-view clip information file and is associated with the first file DEP 542. The third clip information file (03000.clpi) 533 is a depth map clip information file and is associated with the second file DEP 543.

Three types of playlist files, (00001.mpls) 521, (00002.mpls) 522, and (00003.mpls) 523 are located in the PLAYLIST directory 520. A "playlist file" specifies the playback path of an AV stream file, i.e. the part of an AV stream file to decode, and the order of decoding. The types of playlist files are a 2D playlist file and a 3D playlist file. A "2D playlist file" specifies the playback path of a file 2D. A "3D playlist file" specifies, for a playback device in 2D playback mode, the playback path of a file 2D, and for a playback device in 3D playback mode, the playback path of a file SS. As shown in the example in FIG. 5, the first playlist file (00001.mpls) 521 is a 2D playlist file and specifies the playback path of the file 2D 541. The second playlist file (00002.mpls) 522 is a 3D playlist file that specifies, for a playback device in 2D playback mode, the playback path of the file 2D 541, and for a playback device in L/R mode, the playback path of the first file SS 544A. The third playlist file (00003.mpls) is a 3D playlist file that specifies, for a playback device in 2D playback mode, the playback path of the file 2D 541, and for a playback device in depth mode, the playback path of the second file SS 544B.

A BD-J object file (XXXXX.bdjo) 551 is located in the BDJO directory 550. The BD-J object file 551 includes a single BD-J object. The BD-J object is a bytecode program to cause a Java virtual machine mounted on the playback device 102 to execute the processes of title playback and graphics rendering. The BD-J object is written in a compiler language such as Java or the like. The BD-J object includes an application management table and identification information for the playlist file to which is referred. The application management table is a list of the Java application programs to be executed by the Java virtual machine and their period of execution (lifecycle). The identification information of the playlist file to which is referred identifies a playlist file that corresponds to a title to be played back. The Java virtual machine calls a BD-J object in accordance with a user operation or an application program, and executes the Java application program according to the application management table included in the BD-J object. Consequently, the playback device 102 dynamically changes the progress of the video for each title played back, or causes the display device 103 to display graphics independently of the title video.

A JAR file (YYYYY.jar) 561 is located in the JAR directory 560. The JAR directory 561 generally includes a plurality of actual Java application programs to be executed in accordance with the application management table shown in the BD-J object. A Java application program is a bytecode program written in a compiler language such as Java or the like, as is the BD-J object. Types of Java application programs include programs causing the Java virtual machine to execute playback of a title process and programs causing the Java virtual machine to execute graphics rendering. The JAR file 561 is a Java archive file, and when it is read by the playback device 102, it is extracted in internal memory. In this way, a Java application program is stored in memory.

<<Structure of Multiplexed Stream Data>>

FIG. 6A is a schematic diagram showing the elementary streams multiplexed in a main TS on a BD-ROM disc 101. The main TS is a digital stream in MPEG-2 transport stream (TS) format and includes the file 2D 541 shown in FIG. 5. As shown in FIG. 6A, the main TS includes a primary video stream 601 and primary audio streams 602A and 602B. The main TS may additionally include presentation graphics (PG) streams 603A and 603B, an interactive graphics (IG) stream 604, a secondary audio stream 605, and a secondary video stream 606.

The primary video stream 601 represents the primary video of a movie, and the secondary video stream 606 represents secondary video of the movie. The primary video is the major video of a content, such as the main feature of a movie, and is displayed on the entire screen, for example. On the other hand, the secondary video is displayed simultaneously with the primary video with the use, for example, of a picture-in-picture method, so that the secondary video images are displayed in a smaller window presented on the full screen displaying the primary video image. The primary video stream 601 and the secondary video stream 606 are both a base-view video stream. Each of the video streams 601 and 606 is encoded by a video compression encoding method, such as MPEG-2, MPEG-4 AVC, or SMPTE VC-1.

The primary audio streams 602A and 602B represent the primary audio of the movie. In this case, the two primary audio streams 602A and 602B are in different languages. The secondary audio stream 605 represents secondary audio to be mixed with the primary audio. Each of the audio streams 602A, 602B, and 605 is encoded by a method such as AC-3, Dolby Digital Plus ("Dolby Digital" is a registered trademark), Meridian Lossless Packing™ (MLP), Digital Theater System™ (DTS), DTS-HD, or linear pulse code modulation (PCM).

Each of the PG streams 603A and 603B represent subtitles or the like via graphics and are graphics video images to be displayed superimposed on the video images represented by the primary video stream 601. The two PG streams 603A and 603B represent, for example, subtitles in a different language. The IG stream 604 represents graphical user interface (GUI)

graphics components, and the arrangement thereof, for constructing an interactive screen on the screen 131 in the display device 103.

The elementary streams 601-606 are identified by packet IDs (PIDs). PIDs are assigned, for example, as follows. Since one main TS includes only one primary video stream, the primary video stream 601 is assigned a hexadecimal value of 0x1011. When up to 32 other elementary streams can be multiplexed by type in one main TS, the primary audio streams 602A and 602B are each assigned any value from 0x1100 to 0x111F. The PG streams 603A and 603B are each assigned any value from 0x1200 to 0x121F. The IG stream 604 is assigned any value from 0x1400 to 0x141F. The secondary audio stream 605 is assigned any value from 0x1A00 to 0x1A1F. The secondary video stream 606 is assigned any value from 0x1B00 to 0x1B1F.

FIG. 6B is a schematic diagram showing the elementary streams multiplexed in the first sub-TS on a BD-ROM disc 101. The first sub-TS is multiplexed stream data in MPEG-2 TS format and is included in the first file DEP 542 shown in FIG. 5. As shown in FIG. 6B, the first sub-TS includes a primary video stream 611. The first sub-TS may additionally include left-view PG streams 612A and 612B, right-view PG streams 613A and 613B, left-view IG stream 614, right-view IG stream 615, and secondary video stream 616. The primary video stream 611 is a right-view video stream, and when the primary video stream 601 in the main TS represents the left-view for 3D video images, the primary video stream 611 represents the right-view for the 3D video images. When graphics video images for subtitles or the like are represented as 3D video images, pairs formed by the left-view or right-view and a PG stream, i.e. 612A+613A and 612B+613B, represent the corresponding left-view and right-view. When graphics video images for an interactive display are represented as 3D video images, pairs formed by the left-view or right-view and the IG streams 614 and 615 represent the corresponding left-view and right-view. The secondary video stream 616 is a right-view video stream, and when the secondary video stream 606 in the main TS represents the left-view for 3D video images, the secondary video stream 616 represents the right-view for the 3D video images.

PIDs are assigned to the elementary streams 611-616, for example, as follows. The primary video stream 611 is assigned a value of 0x1012. When up to 32 other elementary streams can be multiplexed by type in one sub-TS, the left-view PG streams 612A and 612B are assigned any value from 0x1220 to 0x123F, and the right-view PG streams 613A and 613B are assigned any value from 0x1240 to 0x125F. The left-view IG stream 614 is assigned any value from 0x1420 to 0x143F, and the right-view IG stream 615 is assigned any value from 0x1440 to 0x145F. The secondary video stream 616 is assigned any value from 0x1B20 to 0x1B3F.

FIG. 6C is a schematic diagram showing the elementary streams multiplexed in the second sub-TS on a BD-ROM disc 101. The second sub-TS is multiplexed stream data in MPEG-2 TS format and is included in the second file DEP 543 shown in FIG. 5. As shown in FIG. 6C, the second sub-TS includes a primary video stream 621. The second sub-TS may additionally include depth map PG streams 623A and 623B, depth map IG stream 624, and secondary video stream 626. The primary video stream 621 is a depth map stream and represents 3D video images in combination with the primary video stream 601 in the main TS. When the 2D video images represented by the PG streams 623A and 623B in the main TS are used to project 3D video images on a virtual 2D screen, the depth map PG streams 623A and 6233 are used as the PG streams representing a depth map for the 3D video images. When the 2D video images represented by the IG stream 604 in the main TS are used to project 3D video images on a virtual 2D screen, the depth map IG stream 624 is used as the IG stream representing a depth map for the 3D video images. The secondary video stream 626 is a depth map stream and represents 3D video images in combination with the secondary video stream 606 in the main TS.

PIDs are assigned to the elementary streams 621-626, for example, as follows. The primary video stream 621 is assigned a value of 0x1013. When up to 32 other elementary streams can be multiplexed by type in one sub-TS, the depth map PG streams 623A and 623B are assigned any value from 0x1260 to 0x127F. The depth map IG stream 624 is assigned any value from 0x1460 to 0x147F. The secondary video stream 626 is assigned any value from 0x1B40 to 0x1B5F.

Figure 7:
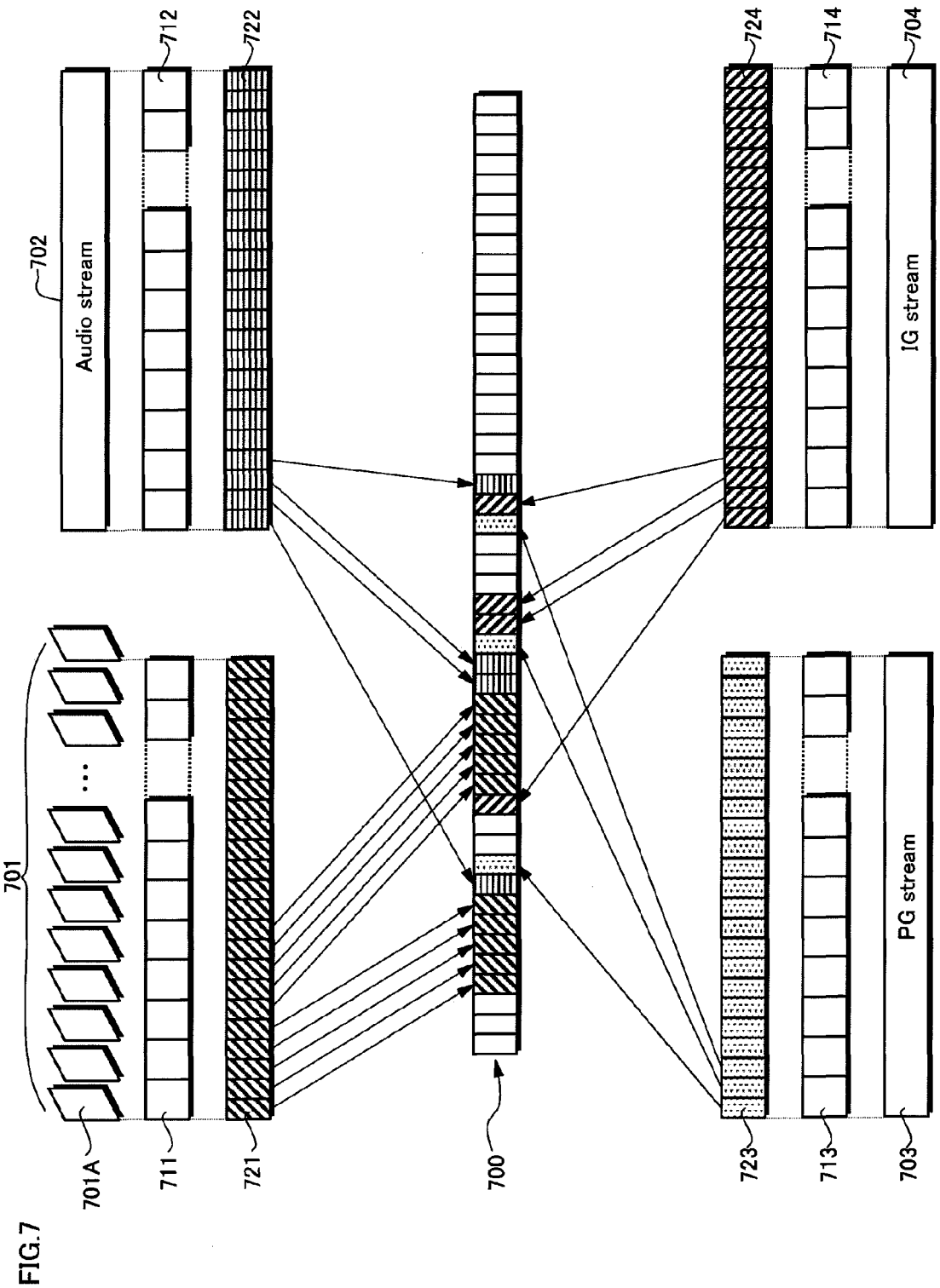
FIG. 7 is a schematic diagram showing the arrangement of TS packets belonging to elementary streams 701, 702, 703, and 704 in the multiplexed stream data 700 shown in FIG. 6.

FIG. 7 is a schematic diagram showing the arrangement of TS packets belonging to elementary streams 701, 702, 703, and 704 in the main TS 700. In the video stream 701, each frame 701A is first converted into a packetized elementary stream (PES) packet 711. Next, each PES packet 711 is generally converted into a plurality of TS packets 721. Similarly, the audio stream 702, PG stream 703, and IG stream 704 are each first converted into a sequence of PES packets 712, 713, and 714, after which they are converted into TS packets 722, 723, and 724. Finally, the TS packets 721, 722, 723, and 724 obtained from the elementary streams 701, 702, 703, and 704 are time-multiplexed into one piece of stream data, i.e. the main TS 700.

FIG. 8A is a schematic diagram of a TS packet sequence comprising the main TS. As shown in FIG. 8A, each TS packet 801 is a 188 byte long packet and includes a four-byte long TS header 801H and a 184-byte long TS payload 801P. The PES packets 711-714 shown in FIG. 7 are each typically divided into a plurality of sections, with each section being stored in a different TS payload 801P. On the other hand, the TS header 801H stores the PID for the elementary stream to which the data stored in the TS payload 801P for the same TS packet 801 belongs.

FIG. 8B is a schematic diagram of a source packet sequence composed of the TS packet sequence for the main TS. When the TS packet 801 shown in FIG. 8A is recorded on the BD-ROM disc 101, as shown in FIG. 8B, a four-byte long header (TP_Extra_Header) 802H is added to the TS packet 801. The 192-byte long packet 802 formed by the combination of this header 802H and a TS packet 802P is referred to as a "source packet". The header 802H in the source packet 802 includes an Arrival_Time_Stamp (ATS). When a source packet 802 is transferred from the BD-ROM disc 101 to the system target decoder in the playback device 102, the ATS indicates the time at which the TS packet 802P should be extracted from within the source packet 802 and should start being transferred to the PID filter in the system target decoder. Details regarding the system target decoder and use of the ATS by the playback device 102 are provided below.

FIG. 8C is a schematic diagram of a sector group, in which a sequence of source packets 802 are consecutively recorded, in the volume area 202B of the BD-ROM disc 101. As shown in FIG. 8C, 32 source packets 802 are recorded at a time as a sequence in three consecutive sectors 811, 812, and 813. This is because the data amount for 32 source packets, i.e. 192 bytes×32=6144 bytes, is the same as the total size of three sectors, i.e. 2,048 bytes×3=6144 bytes. 32 source packets 802 that are recorded in this way in three consecutive sectors 811, 812, and 813 are referred to as an "aligned unit" 820. The playback device 102 reads source packets 802 from the BD-ROM disc 101 by each aligned unit 820, i.e. 32 source packets at a time. Also, the sector group 811, 812, 813, . . . is divided into 32 pieces in order from the top, and each forms one error correction code block 830. The BD-ROM drive 121 performs error correction processing for each ECC block 830.

Figure 8:
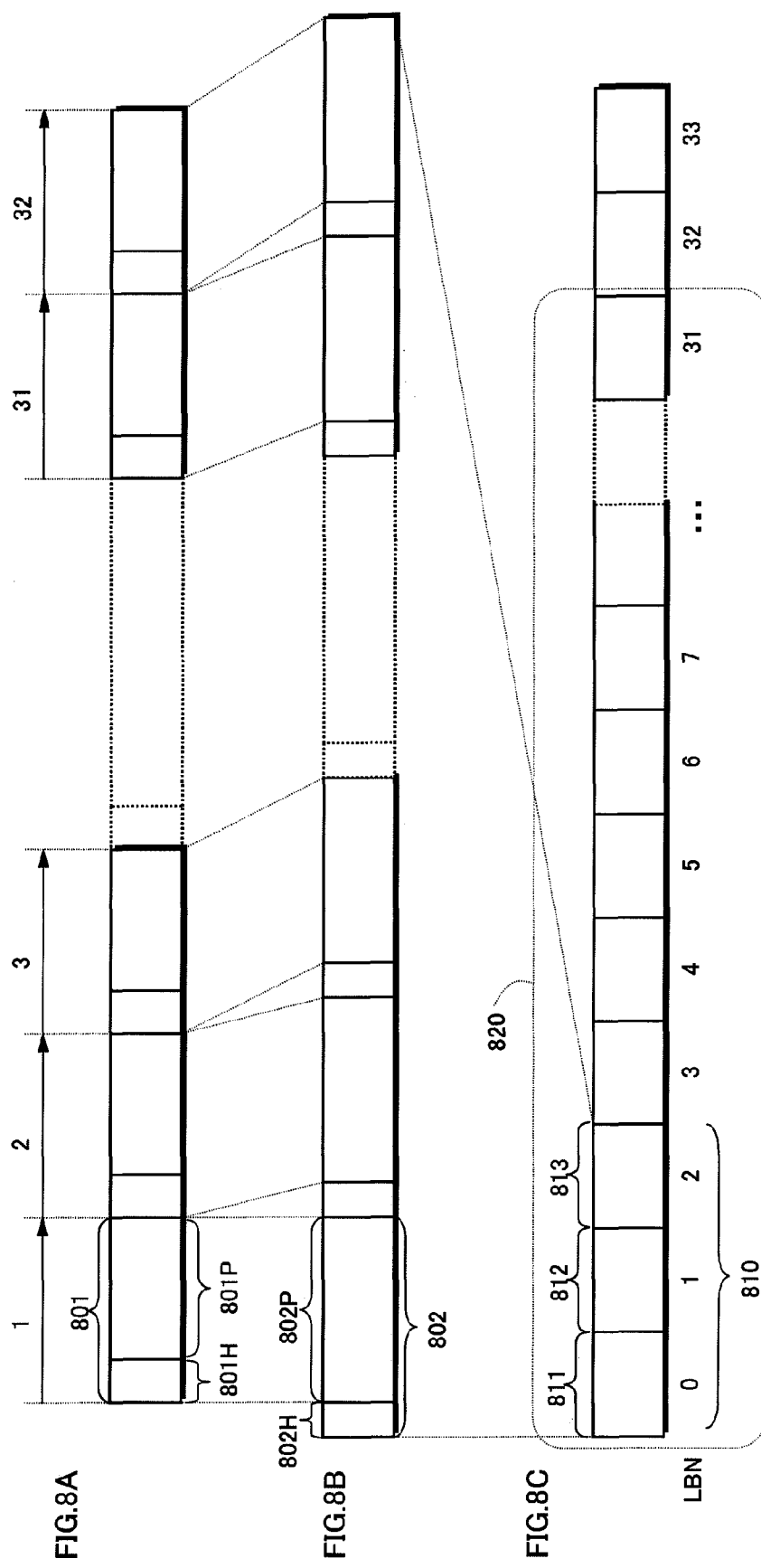
FIG. 8A is a schematic diagram of the TS packet sequence shown in FIG. 7.
FIG. 8B is a schematic diagram of the source packet sequence composed of the TS packet sequence shown in FIG. 8A.
FIG. 8C is a schematic diagram showing a sector group in a volume area on a BD-ROM disc on which the source packet sequence shown in FIG. 8B is continuously recorded.

A sub-TS also has the same packet structure as the packet structure for the main TS shown in FIGS. 7 and 8. However, the data structure for the video stream differs between the sub-TS and the main TS.

<<Data Structure for the Video Stream>>

Figure 9:
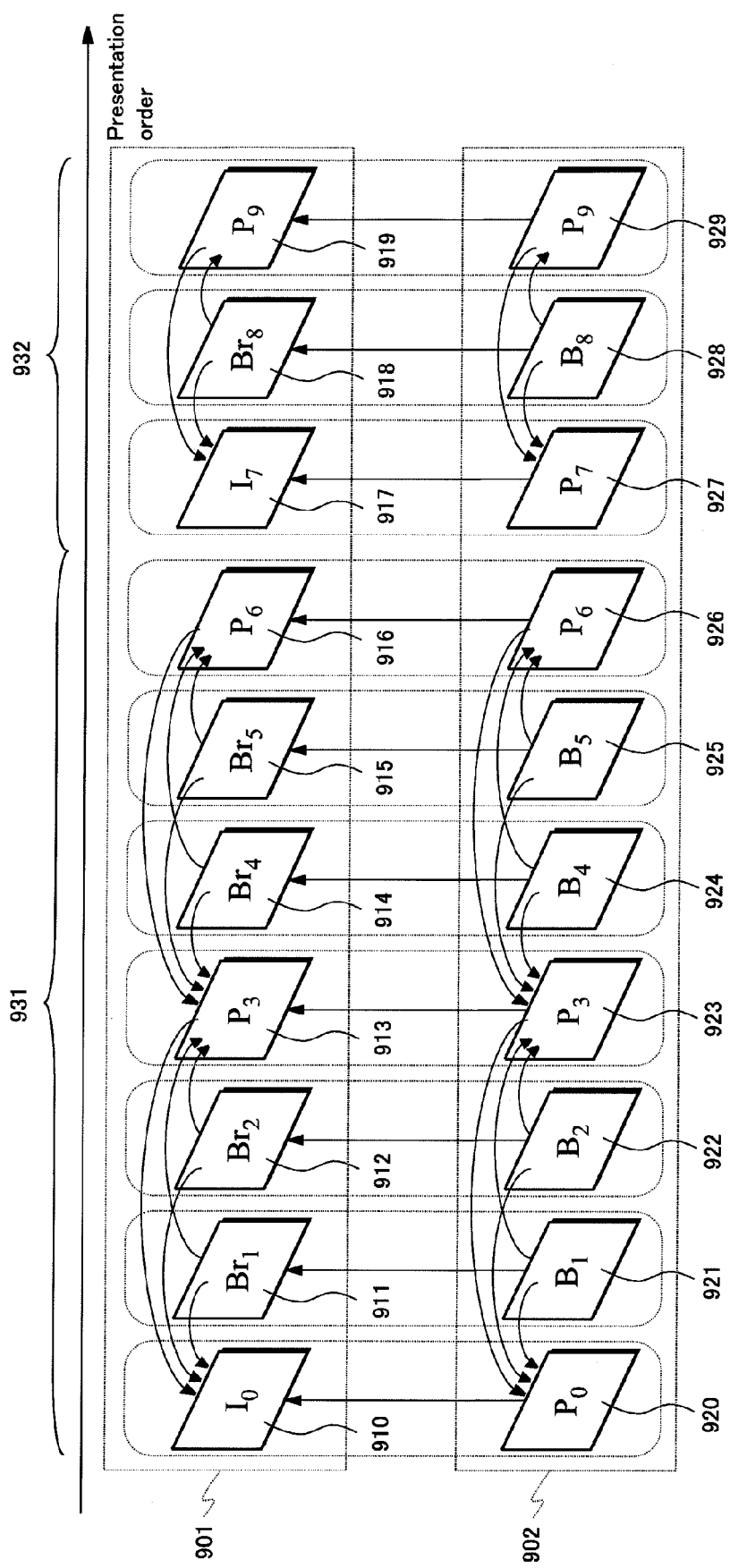
FIG. 9 is a schematic diagram showing the pictures in the base-view video stream 901 shown in FIG. 6A and in the right-view video stream 902 shown in FIG. 6B in order of presentation time.

FIG. 9 is a schematic diagram showing the pictures in the base-view video stream 901 and in the right-view video stream 902 in order of presentation time. As shown in FIG. 9, the base-view video stream 901 includes pictures 910, 911, 912, ..., 919, and the right-view video stream 902 includes pictures 920, 921, 922, ..., 929. Each of the pictures 910-919 and 920-929 represent one frame or one field and are compressed by a video compression encoding method, such as MPEG-2, MPEG-4 AVC, etc.

Compression of each picture by the above-mentioned encoding method uses the picture's spatial or temporal redundancy. Here, picture encoding that only uses the picture's spatial redundancy is referred to as "intra-picture encoding". On the other hand, picture encoding that uses the similarity between data for multiple pictures displayed sequentially is referred to as "inter-picture predictive encoding". In inter-picture predictive encoding, first, a picture earlier or later in presentation time is assigned to the picture to be encoded as a reference picture. Next, a motion vector is detected between the picture to be encoded and the reference picture, and then motion compensation is performed using the motion vector. Furthermore, the difference value between the picture after motion compensation and the picture to be encoded is sought, and temporal redundancy is removed using the difference value. In this way, the amount of data for each picture is compressed.

As shown in FIG. 9, the pictures included in the base-view video stream 901 are generally divided into a plurality of GOPs 931 and 932. Here, a "GOP" refers to a sequence of pictures starting with an I (intra) picture. An "I Picture" refers to a picture compressed by intra-picture encoding. A GOP generally has a P (predictive) picture and a B (bi-directionally predictive) picture in addition to an I picture. A "P picture" refers to a picture compressed by inter-picture predictive encoding, having used as a reference picture either an I picture or a different P picture that are earlier in presentation time. A "B picture" refers to a picture compressed by inter-picture predictive encoding, having used two reference pictures that are I or P pictures earlier or later in presentation time. B pictures that are used as a reference picture for other pictures in inter-picture predictive encoding are particularly referred to as "Br (reference B) pictures".

In the example in FIG. 9, the pictures in the GOPs 931 and 932 are compressed in the following order. In the first GOP 931, the top picture is compressed as $I_0$ picture 910. The subscripted number indicates the sequential number allotted to each picture in the order of presentation time. Next, the fourth picture is compressed as $P_3$ picture 913 using $I_0$ picture 910 as a reference picture. The arrows shown in FIG. 9 indicate that the picture at the head of the arrow is a reference picture for the picture at the tail of the arrow. Next, the second and third pictures are compressed as $Br_1$ picture 911 and $Br_2$ picture 912 respectively, using $I_0$ picture 910 and $P_3$ picture 913 as reference pictures. Furthermore, the seventh picture is compressed as $P_6$ picture 916 using $P_3$ picture 913 as a reference picture. Next, the fourth and fifth pictures are compressed as $Br_4$ picture 914 and $Br_5$ picture 915 respectively, using $P_3$ picture 913 and $P_6$ picture 916 as reference pictures. Similarly, in the second GOP 932, the top picture is first compressed as $I_7$ picture 917. Next, the third picture is compressed as $P_9$ picture 919 using $I_7$ picture 917 as a reference picture. Subsequently, the second picture is compressed as $Br_8$ picture 918 using $I_7$ picture 917 and $P_9$ picture 919 as reference pictures.

In the base-view video stream 901, each GOP 931 and 932 always contains an I picture at the top, and thus pictures can be decoded by GOP. For example, in the first GOP 931, the $I_0$ picture 910 is first decoded independently. Next, the $P_3$ picture 913 is decoded using the decoded $I_0$ picture 910. Then the $Br_1$ picture 911 and $Br_2$ picture 912 are decoded using the decoded $I_0$ picture 910 and $P_3$ picture 913. The subsequent picture group 914, 915, ... is similarly decoded. In this way, the base-view video stream 901 can be decoded independently and furthermore can be randomly accessed in units of GOPs.

As further shown in FIG. 9, the pictures 920-929 in the right-view video stream 902 are compressed by inter-picture encoding. However, the encoding method differs from the encoding method for the pictures 910-919 in the base-view video stream 901, since in addition to redundancy in the temporal direction of video images, redundancy between the left and right video images is also used. Specifically, the reference pictures for the pictures 920-929 are selected not only from the same stream 902, but also from the base-view video stream 901, as shown by the arrows in FIG. 9. In particular, the presentation times for the pictures 920-929 in the right-view video stream 902 and the respective reference pictures selected from the base-view video stream 901 are substantially the same. These pictures represent a pair of a right-view and a left-view for the same 3D video image, i.e. a parallax video image. In this way, the pictures 920-929 in the right-view video stream are in one-to-one correspondence with the pictures 910-919 in the base-view video stream 901. In particular, the right-view video stream 902 is divided into units of GOPs in the same way as the base-view video stream 901.

In the example shown in FIG. 9, the top picture in the right-view video stream 902 is compressed as $P_0$ picture 920 using $I_0$ picture 910 in the base-view video stream 901 as a reference picture. These pictures 910 and 920 represent the left-view and right-view of the top frame in the 3D video images. Next, the fourth picture is compressed as $P_3$ picture 923 using $P_3$ picture 913 in the base-view video stream 901 and $P_0$ picture 920 as reference pictures. Next, the second picture is compressed as $B_1$ picture 921, using $Br_1$ picture 911 in the base-view video stream 901 in addition to $P_0$ picture 920 and $P_3$ picture 923 as reference pictures. Similarly, the third picture is compressed as $B_2$ picture 922, using $Br_2$ picture 912 in the base-view video stream 901 in addition to $P_0$ picture 920 and $P_3$ picture 923 as reference pictures. Similarly, for subsequent pictures 924-929, the pictures in the base-view video stream 901 for which the presentation time is substantially the same are used as reference pictures.

The revised standards for MPEG-4 AVC/H.264, called multiview video coding (MVC), are known as a video compression encoding method that makes use of correlation between left and right video images as described previously. MVC was created in July of 2008 by the joint video team (JVT), a joint project between ISO/IEC MPEG and ITU-T VCEG, and is a standard for collectively encoding video that can be seen from a plurality of perspectives. With MVC, not only is temporal similarity in video used for inter-video predictive encoding, but so is similarity between videos from differing perspectives. This type of predictive encoding has a higher video compression ratio than predictive encoding that individually compresses video seen from each perspective.

As described previously, pictures in the base-view video stream 901 are used as reference pictures for compression of pictures in the right-view video stream 902. Therefore, unlike the base-view video stream 901, the right-view video stream 902 cannot be decoded independently. On the other hand, however, the difference between parallax images is generally very small, that is, the correlation between the left-view and the right-view is high. Accordingly, the pictures in the right-view video stream 902 generally have a significantly higher compression rate than the pictures in the base-view video stream 901, meaning that the amount of data is significantly smaller.

Figure 10:
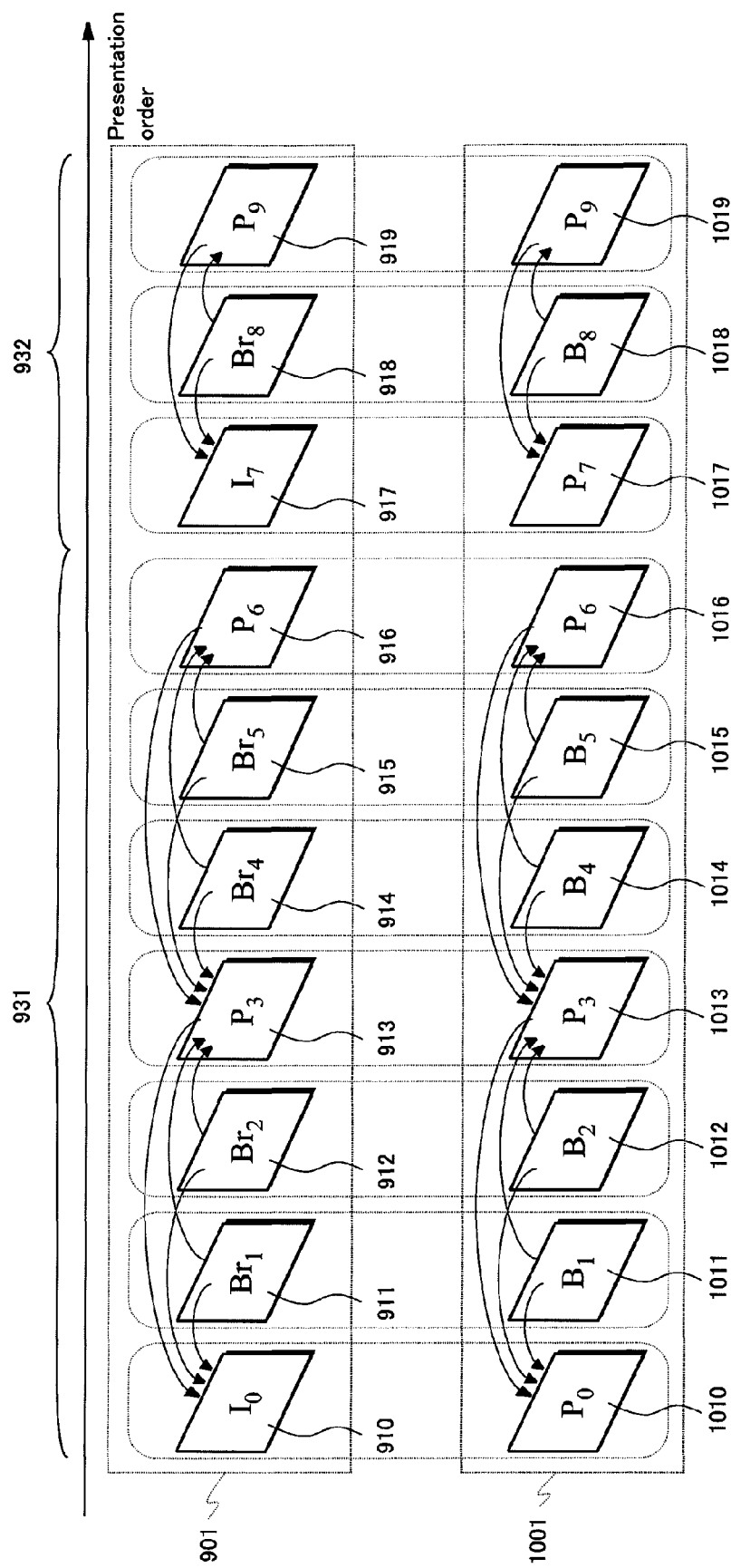
FIG. 10 is a schematic diagram showing the pictures in the base-view video stream 901 shown in FIG. 6A and in the depth map stream 1001 shown in FIG. 6C in order of presentation time.

FIG. 10 is a schematic diagram showing the pictures in the base-view video stream 901 and in the depth map stream 1001 in order of presentation time. As shown in FIG. 10, the base-view video stream 901 is the same as the one shown in FIG. 9. Accordingly, the description in FIG. 9 is referred to for a detailed description thereof. On the other hand, the depth map stream 1001 includes depth maps 1010, 1011, 1012, ..., 1019. The depth maps 1010-1019 are in a one-to-one correspondence with the pictures 910-919 in the base-view video stream 901 and represent a depth map for the 2D video image for one frame or field shown by each picture.

The depth maps 1010-1019 are compressed by a video compression encoding method, such as MPEG-2, MPEG-4 AVC, etc., in the same way as the pictures 910-919 in the base-view video stream 901. In particular, inter-picture encoding is used in this encoding method. In other words, each picture is compressed using another depth map as a reference picture. In the example shown in FIG. 10, first the top of the depth map group corresponding to the first GOP 931 is compressed as $I_0$ picture 1010. The subscripted number indicates the sequential number allotted to each picture in the order of presentation time. Next, the fourth depth map is compressed as $P_3$ picture 1013 using $I_0$ picture 1010 as a reference picture. The arrows shown in FIG. 10 indicate that the picture at the head of the arrow is a reference picture for the picture at the tail of the arrow. Next, the second and third depth maps are compressed as $B_1$ picture 1011 and $B_2$ picture 1012 respectively, using $I_0$ picture 1010 and $P_3$ picture 1013 as reference pictures. Furthermore, the seventh depth map is compressed as $P_6$ picture 1016 using $P_3$ picture 1013 as a reference picture. Next, the fourth and fifth depth maps are compressed as $B_4$ picture 1014 and $B_5$ picture 1015 respectively, using $P_3$ picture 1013 and $P_6$ picture 1016 as reference pictures. Similarly, in the depth map group corresponding to the second GOP 932, the top depth map is first compressed as $I_7$ picture 1017. Next, the third depth map is compressed as $P_9$ picture 1019 using $I_7$ picture 1017 as a reference picture. Subsequently, the second depth map is compressed as $B_8$ picture 1018 using $I_7$ picture 1017 and $P_9$ picture 1019 as reference pictures.

The depth map stream 1001 is divided into units of GOPs in the same way as the base-view video stream 901, and each GOP always contains an I picture at the top. Accordingly, depth maps can be decoded by GOP. For example, the $I_0$ picture 1010 is first decoded independently. Next, the $P_3$ picture 1013 is decoded using the decoded $I_0$ picture 1010. Then, the $B_1$ picture 1011 and $B_2$ picture 1012 are decoded using the decoded $I_0$ picture 1010 and $P_3$ picture 1013. The subsequent picture group 1014, 1015, ... is similarly decoded. However, since a depth map itself is only information representing the depth of each part of a 2D video image by pixel, the depth map stream 1001 cannot be used independently for playback of video images.

The same encoding method is used for compression of the right-view video stream 902 and the depth map stream 1001. For example, if the right-view video stream 902 is encoded in MVC format, the depth map stream 1001 is also encoded in MVC format. In this case, during playback of 3D video images, the playback device 102 can smoothly switch between L/R mode and depth mode, while maintaining a constant encoding method.

Figure 11:
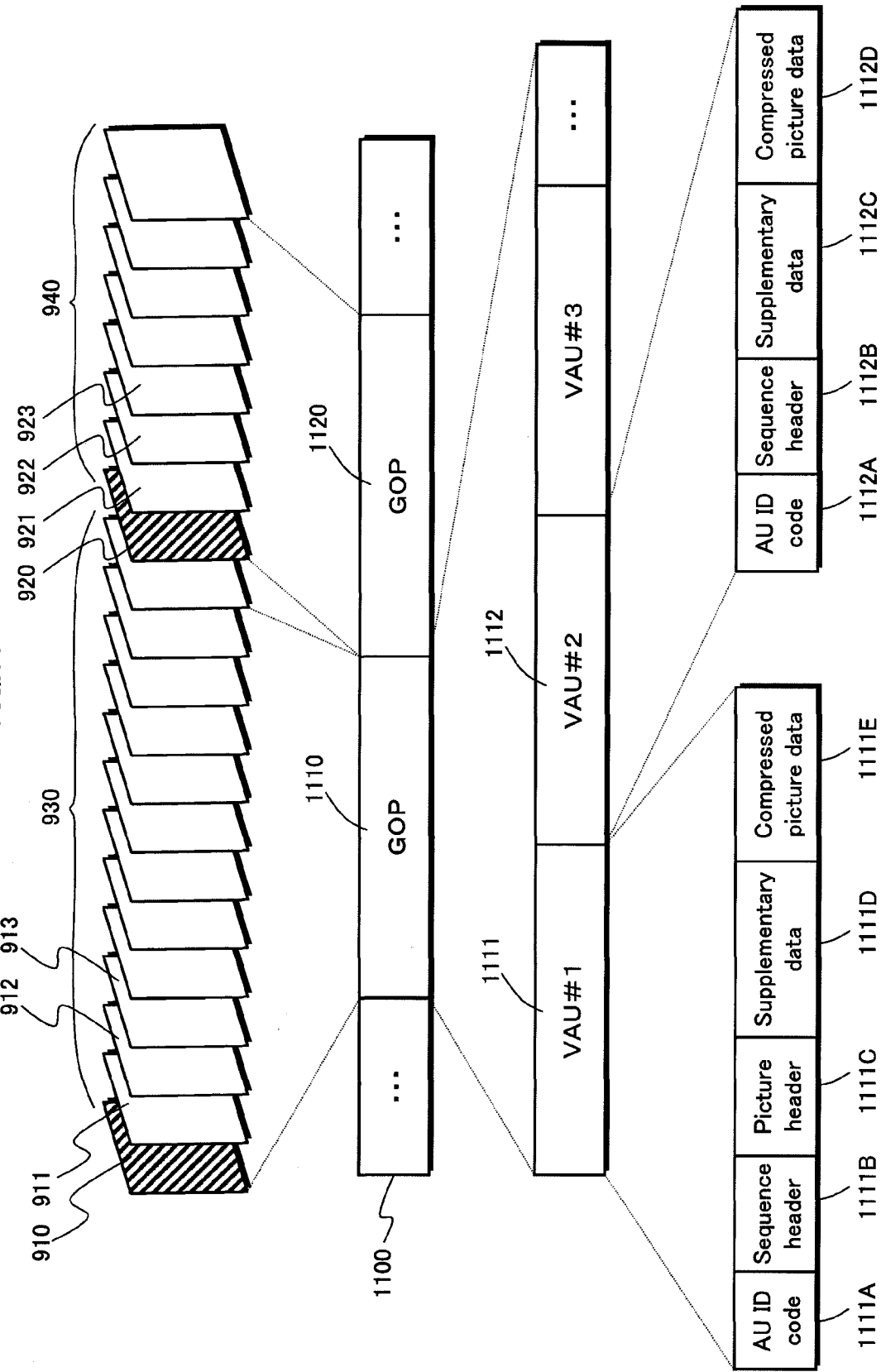
FIG. 11 is a schematic diagram showing details of the data structure of the video stream 1100 shown in FIG. 7.

FIG. 11 is a schematic diagram showing details of the data structure of the video stream 1100. The video stream 1100 may be either a base-view video stream 901 or a dependent-view video stream 902 or 1001. As shown in FIG. 11, in addition to the actual GOPs 930 and 940, which are the same as the GOPs shown in FIG. 9, a header is assigned to each picture 910, 911, 912, ... in the GOPs 1110 and 1120, which constitute the actual video stream 1100. This combination of a header and each picture is called a "video access unit (VAU)". In other words, each picture is organized as a single VAU 1111, 1112, ... in the GOPs 1110 and 1120. Each picture can be read from the video stream 1100 in VAUs.

As further shown in FIG. 11, the top VAU (VAU#1) 1111 in the GOPs 1110 and 1120 includes an $I_0$ picture 910 and a header. The $I_0$ picture 911 is stored as compressed picture data 1111E. The header includes an access unit (AU) identification code 1111A, a sequence header 1111B, a picture header 1111C, and supplementary data 1111D. The AU identification code 1111A is a predetermined code indicating the top of each VAU. The sequence header 1111B, also called a GOP header, includes information shared by the whole GOP 1110, e.g. the resolution, frame rate, aspect ratio, and bit rate. The picture header 1111C includes information necessary for decoding of the $I_0$ picture 910, such as the encoding method, etc. The supplementary data 1111D includes additional information regarding matters other than the decoding of the $I_0$ picture 910, for example closed caption text information, as well as time code information. The second and subsequent VAUs in the GOPs 1110 and 1120 have the same structure as VAU #1 1111, with the exception that the header does not include a sequence header 1111B. For example, VAU #2 1112 includes a $P_3$ picture 913 and a header. The actual content of each element in VAUs 1111, 1112 varies according to the encoding method for the video stream 1100. For example, when the encoding method is MPEG-4 AVC, the VAUs 1111 and 1112 are comprised of a plurality of NAL units. In this case, the AU identification code 1111A, sequence header 1111B, picture header 1111C, supplementary data 1111D, and compression picture data 1111E respectively correspond to an Access Unit Delimiter (AU delimiter), sequence parameter set (SPS), picture parameter set (PPS), supplemental enhancement information (SEI), and view component.

Figure 12:
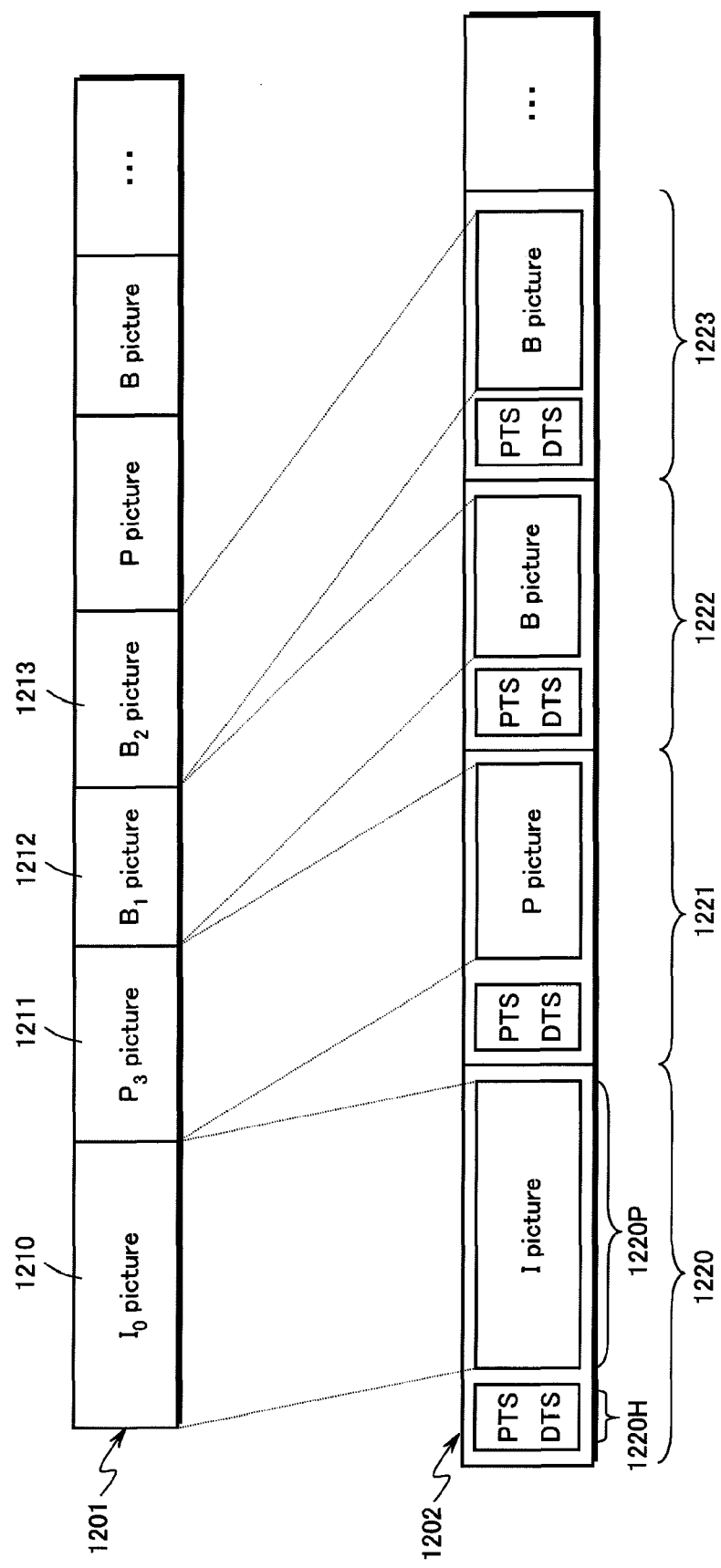
FIG. 12 is a schematic diagram showing details on the method for storing the video stream 1201 into the PES packet sequence 1202 shown in FIG. 7.

FIG. 12 is a schematic diagram showing details on the method for storing the video stream 1201 into a PES packet sequence 1202. The video stream 1201 may be either a base-view video stream 901 or a dependent-view video stream 902 or 1001. As shown in FIG. 12, in the actual video stream 1201, pictures are multiplexed in the order of encoding, not in the order of presentation time. In other words, as shown in FIG. 12, in each VAU comprising the video stream 1201, $I_0$ picture 1210, $P_3$ picture 1211, $B_1$ picture 1212, $B_2$ picture 1213, ... are stored in order from the top. The subscripted number indicates the sequential number allotted to each picture in the order of presentation time. The $I_0$ picture 1210 is used as a reference picture for encoding the $P_3$ picture 1211, and the $I_0$ picture 1210 and the $P_3$ picture 1211 are used as reference pictures for encoding the $B_1$ picture 1212 and $B_2$ picture 1213. Each of these VAUs is stored as a different PES packet 1220, 1221, 1222, 1223, ..., and each PES packet 1220, ... includes a PES payload 1220P and a PES header 1220H. VAUs are stored in a PES payload 1220P. PES headers 1220H include a presentation time, (presentation time-stamp, or PTS), and a decoding time (decoding time-stamp, or DTS), for the picture stored in the PES payload 1220P in the same PES packet 1220.

As with the video stream 1201 shown in FIG. 12, the other elementary streams shown in FIGS. 6A, 6B, and 6C are stored in PES payloads in a sequence of PES packets. Furthermore, the PES header in each PES packet includes the PTS for the data stored in the PES payload for the PES packet.

Figures 13A, 13B:
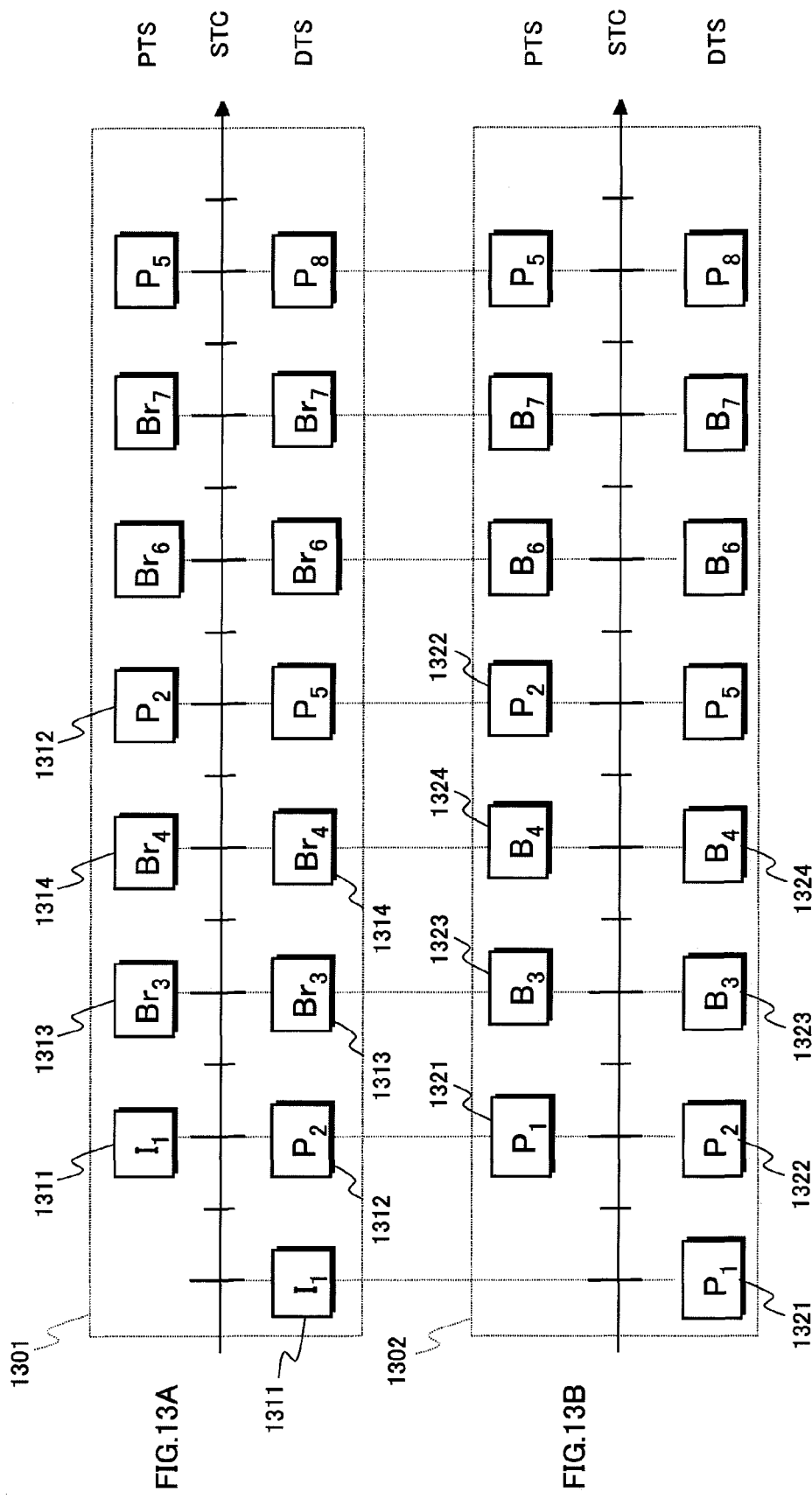
FIG. 13 is a schematic diagram showing the relationship between the PTSs and DTSs assigned to each picture in the base-view video stream 1301 shown in FIG. 6A and in the dependent-view video stream 1302 shown in FIGS. 6B and 6C.

FIGS. 13A and 13B are schematic diagrams showing the relationship between the PTS and DTS assigned to each picture in the base-view video stream 1301 and in the dependent-view video stream 1302. As shown in FIG. 13, between the video streams 1301 and 1302, the same PTSs and DTSs are assigned to a pair of pictures representing the same frame or field in a 3D video image. For example, the top frame or field in the 3D video image is rendered from a combination of $I_1$ picture 1311 in the base-view video stream 1301 and $P_1$ picture 1321 in the dependent-view video stream 1302. Accordingly, the PTS and DTS for these two pictures 1311 and 1321 are the same. The subscripted numbers indicate the sequential number allotted to each picture in the order of DTSs. Also, when the dependent-view video stream 1302 is a depth map stream, $P_1$ picture 1321 is replaced by an I picture representing a depth map for the $I_1$ picture 1311. Similarly, the PTS and DTS for the pair of second pictures in the video streams 1301 and 1302, i.e. $P_2$ pictures 1312 and 1322, are the same. The PTS and DTS are both the same for the pair of third pictures in the video streams 1301 and 1302, i.e. $Br_3$ picture 1313 and $B_3$ picture 1323. The same is also true for the pair $Br_4$ picture 1314 and $B_4$ picture 1324.

A pair of VAUs that include pictures for which the PTS and DTS are the same between the base-view video stream 1301 and the dependent-view video stream 1302 is called a "3D VAU". Using the allocation of PTSs and DTSs shown in FIG. 13, it is easy to cause the decoder in the playback device 102 in 3D mode to process the base-view video stream 1301 and the dependent-view video stream 1302 in parallel in units of 3D VAUs. In this way, the decoder definitely processes a pair of pictures representing the same frame or field in a 3D video image in parallel. Furthermore, the sequence header in the 3D VAU at the top of each GOP includes the same resolution, the same frame rate, and the same aspect ratio. In particular, this frame rate is equal to the value when the base-view video stream 1301 is decoded independently in 2D playback mode.

Figure 14:
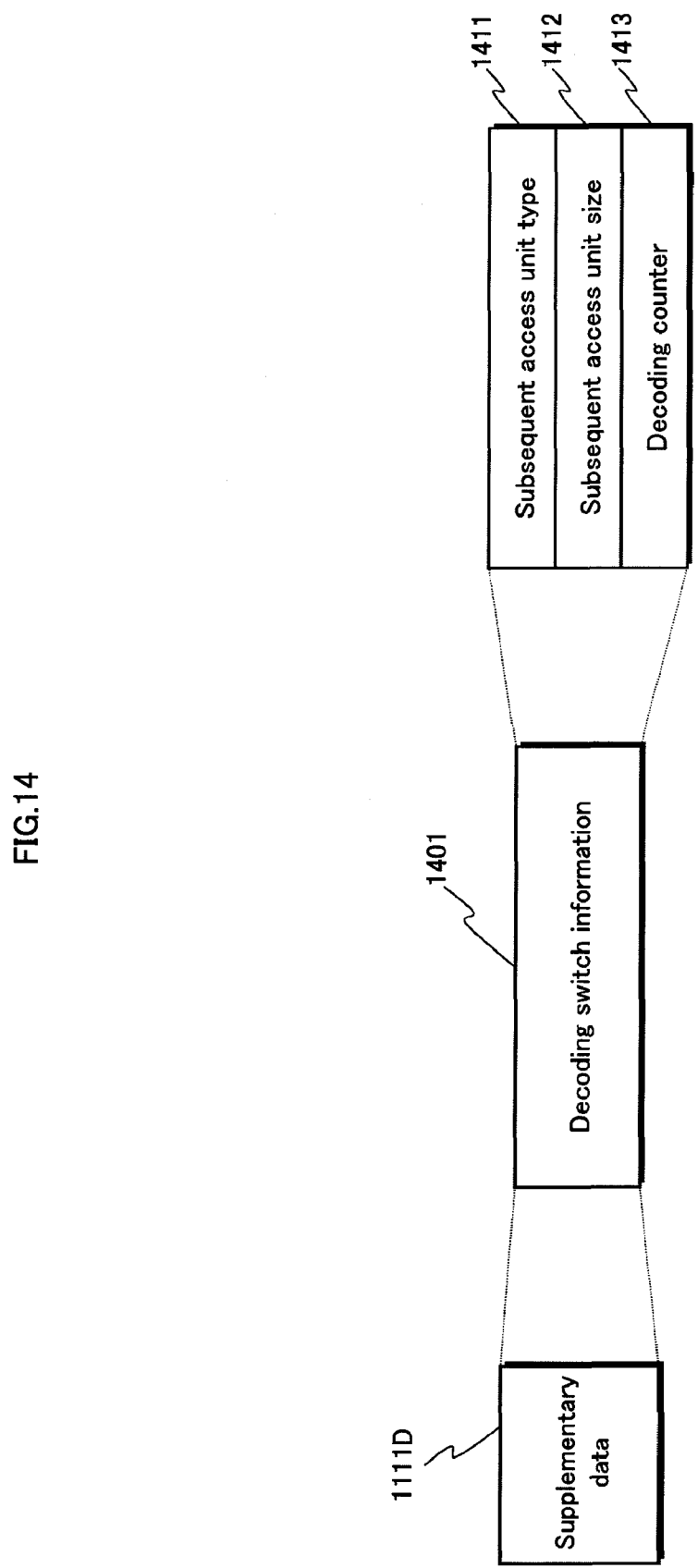
FIG. 14 is a schematic diagram showing the data structure of supplementary data 1111D shown in FIG. 11.

FIG. 14 is a schematic diagram showing the data structure of supplementary data 1111D shown in FIG. 11. Supplementary data 1111D corresponds to a type of NAL unit, "SEI", in particular in MPEG-4 AVC. As shown in FIG. 14, supplementary data 1111D includes decoding switch information 1401. The decoding switch information 1401 is included in each VAU in both the base-view video stream and the dependent-view video stream. The decoding switch information 1401 is information to cause the decoder in the playback device 102 to easily specify the next VAU to decode. As described below, the decoder alternately decodes the base-view video stream and the dependent-view video stream in units of VAUs. At that time, the decoder generally specifies the next VAU to be decoded in alignment with the time shown by the DTS assigned to each VAU. Many types of decoders, however, continue to decode VAUs in order, ignoring the DTS. For such decoders, it is preferable for each VAU to include decoding switch information 1401 in addition to a DTS.

As shown in FIG. 14, decoding switch information 1401 includes a subsequent access unit type 1411, subsequent access unit size 1412, and decoding counter 1413. The subsequent access unit type 1411 indicates whether the next VAU to be decoded belongs to a base-view video stream or a dependent-view video stream. For example, when the value of the subsequent access unit type 1411 is "1", the next VAU to be decoded belongs to a base-view video stream, and when the value of the subsequent access unit type 1411 is "2", the next VAU to be decoded belongs to a dependent-view video stream. When the value of the subsequent access unit type 1411 is "0", the current VAU is located at the end of the stream targeted for decoding, and the next VAU to be decoded does not exist. The subsequent access unit size 1412 indicates the size of the next VAU that is to be decoded. By referring to the subsequent access unit size 1412, the decoder in the playback device 102 can specify the size of a VAU without analyzing its actual structure. Accordingly, the decoder can easily extract VAUs from the buffer. The decode counter 1413 shows the decoding order of the VAU to which it belongs. The order is counted from a VAU that includes an I picture in the base-view video stream.

Figure 15A:
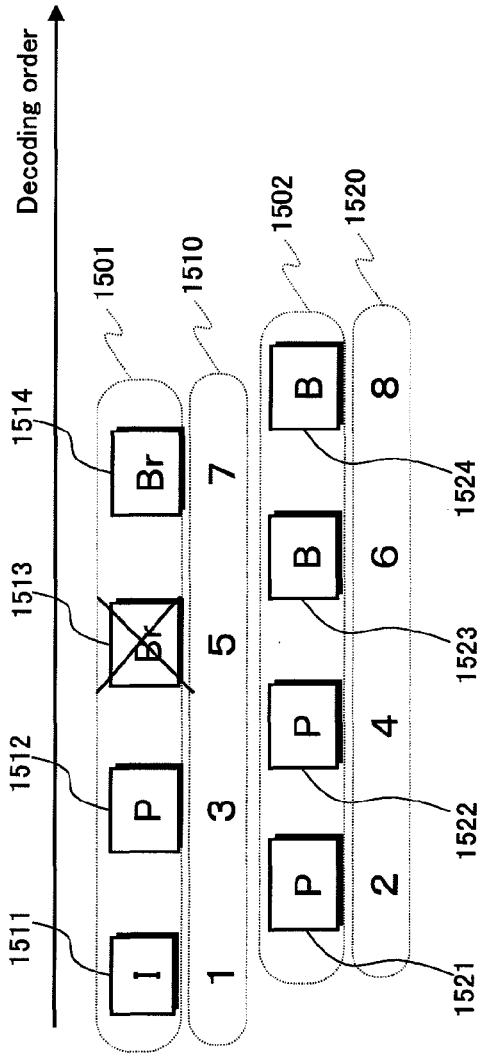
FIGS. 15A and 15B are schematic diagrams showing two examples of decoding counters 1510 and 1520, assigned to each picture in the base-view video stream 1501 shown in FIG. 6A and in the dependent-view video stream 1502 shown in FIGS. 6B and 6C.

FIG. 15A is a schematic diagram showing an example of decoding counters, 1510 and 1520, assigned to each picture in the base-view video stream 1501 and in the dependent-view video stream 1502. As shown in FIG. 15A, the decode counters 1510 and 1520 are incremented alternately between the two video streams 1501 and 1502. For example, for VAU 1511 that includes an I picture in the base-view video stream 1501, a value of "1" is assigned to the decode counter 1510. Next, a value of "2" is assigned to the decode counter 1520 for the VAU 1521 that includes the next P picture to be decoded in the dependent-view video stream 1502. Furthermore, a value of "3" is assigned to the decode counter 1510 for the VAU 1512 that includes the next P picture to be decoded in the base-view video stream 1501. By assigning values in this way, even when the decoder in the playback device 102 fails to read one of the VAUs due to some error, the decoder can immediately specify the missing picture using the decode counters 1510 and 1520. Accordingly, the decoder can perform error processing appropriately and promptly.

In the example shown in FIG. 15A, an error occurs during the reading of the third VAU 1513 in the base-view video stream 1501, and the Br picture is missing. During decoding processing of the P picture contained in the second VAU 1522 in the dependent-view video stream 1502, however, the decoder has read the decode counter 1520 for this VAU 1522 and retained the value. Accordingly, the decoder can predict the decode counter 1510 for the next VAU to be processed. Specifically, the decode counter 1520 in the VAU 1522 that includes the P picture is "4". Therefore, the decode counter 1510 for the next VAU to be read can be predicted to be "5". The next VAU that is actually read, however, is the fourth VAU 1514 in the base-view video stream 1501, whose decode counter 1510 is "7". The decoder thus detects that it failed to read a VAU. Accordingly, the decoder can execute the following processing: "skip decoding processing of the B picture extracted from the third VAU 1523 in the dependent-view video stream 1502, since the Br picture to be used as a reference is missing". In this way, the decoder checks the decode counters 1510 and 1520 during each decoding process. Consequently, the decoder can promptly detect errors during reading of VAUs and can promptly execute appropriate error processing. As a result, the decoder can prevent noise from contaminating the playback video.

Figure 15B:
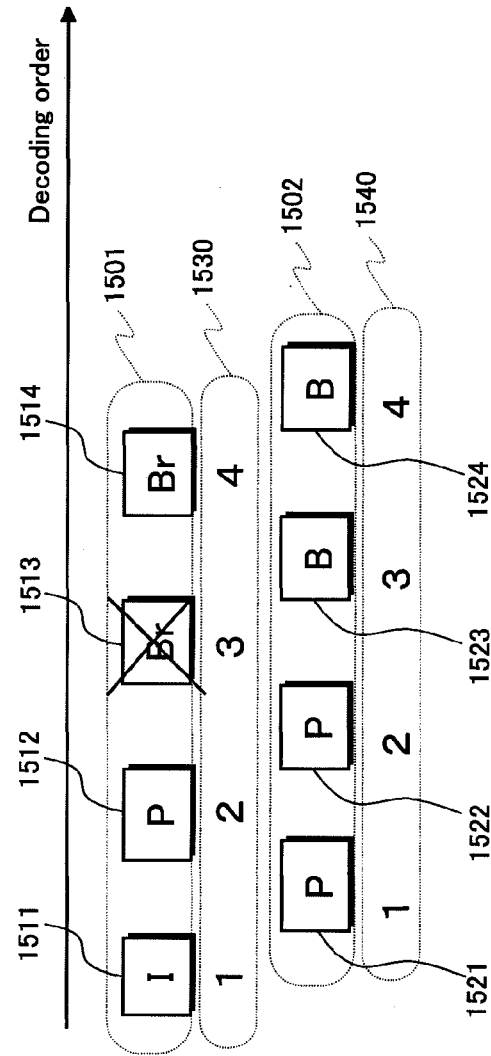

FIG. 15B is a schematic diagram showing another example of decoding counters, 1530 and 1540, assigned to each picture in the base-view video stream 1501 and in the dependent-view video stream 1502. As shown in FIG. 15B, decode counters 1530 and 1540 are incremented separately in the video streams 1501 and 1502. Therefore, the decode counters 1530 and 1540 are the same for a pair of pictures in the same 3D VAU. In this case, when the decoder has decoded a VAU in the base-view video stream 1501, it can predict that "the decode counter 1530 is the same as the decode counter 1540 for the next VAU to be decoded in the dependent-view video stream 1502". Conversely, when the decoder has decoded a VAU in the dependent-view video stream 1502, it can predict that "the decode counter 1530 for the next VAU to be decoded in the base-view video stream 1501 is the same as the decode counter 1540 plus one". Accordingly, at any point in time, the decoder can promptly detect an error in reading a VAU using the decode counters 1530 and 1540 and can promptly execute appropriate error processing. As a result, the decoder can prevent noise from contaminating the playback video.

<<Interleaved Arrangement of Multiplexed Stream Data>>

For seamless playback of 3D video images, the physical arrangement of the base-view video stream and dependent-view video stream on the BD-ROM disc 101 is important. This "seamless playback" refers to playing back video and audio from multiplexed stream data without interruption.

Figure 16:
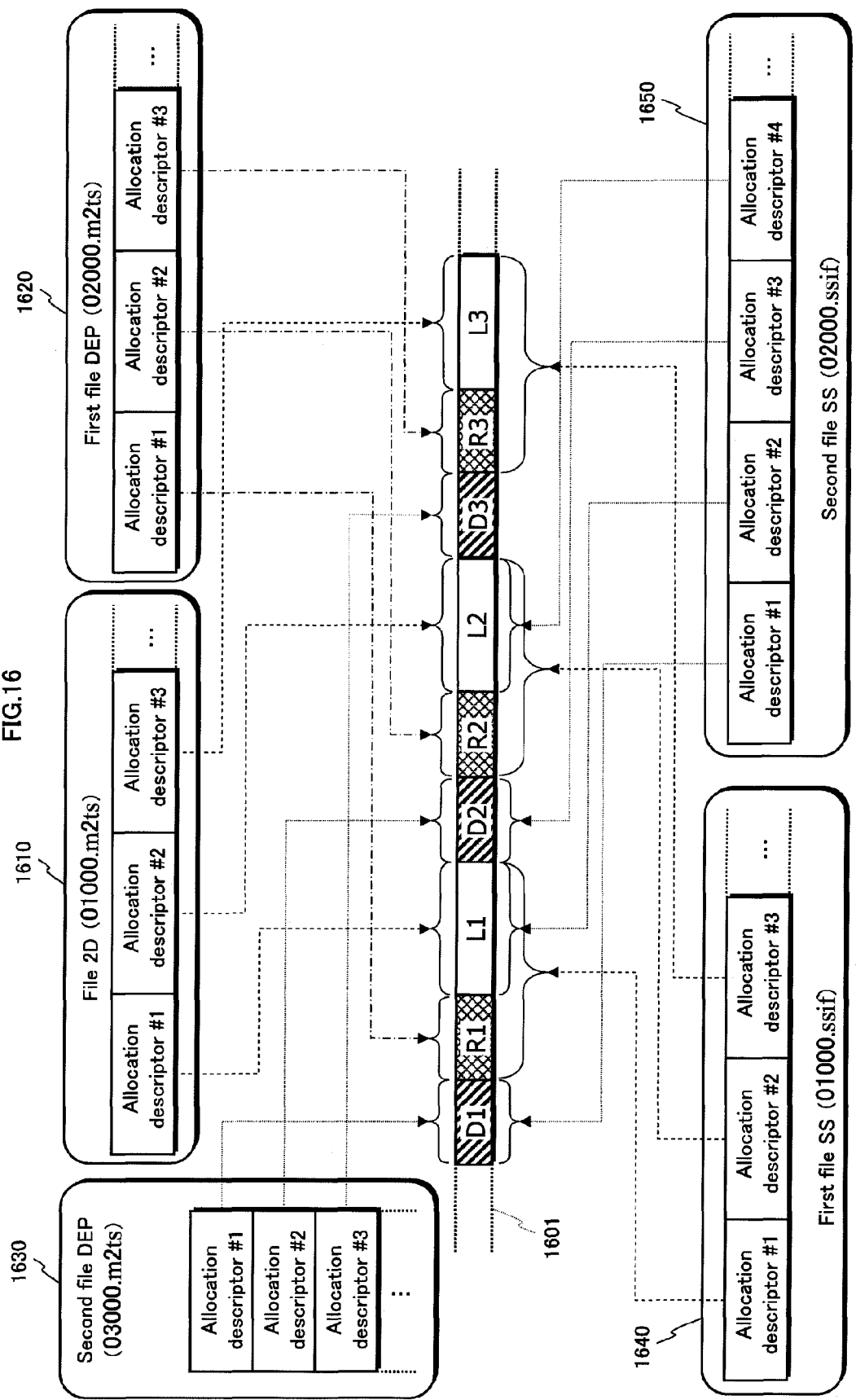
FIG. 16 is a schematic diagram showing the physical arrangement on the BD-ROM disc 101 of data block groups belonging to the main TS, first sub-TS, and second sub-TS shown in FIGS. 6A, 6B, and 6C.

FIG. 16 is a schematic diagram showing the physical arrangement on the BD-ROM disc 101 of a data block group belonging to the main TS, first sub-TS, and second sub-TS respectively shown in FIGS. 6A, 6B, and 6C. A "data block" refers to a sequence of data recorded on a contiguous area on the BD-ROM disc 101, i.e. a plurality of physically contiguous sectors. Since physical addresses and logical addresses on the BD-ROM disc 101 are substantially the same, the LBNs within each data block are also continuous. Accordingly, the BD-ROM drive 121 can continuously read a data block without causing the optical pickup to perform a seek. Hereinafter, data blocks L1, L2, L3, . . . belonging to a main TS are referred to as "base-view data blocks", and data blocks R1, R2, R3, . . . , and D1, D2, D3, . . . belonging to a sub-TS are referred to as "dependent-view data blocks". In particular, the data blocks R1, R2, R3, . . . belonging to the first sub-TS are referred to as "right-view data blocks", and the data blocks D1, D2, D3, . . . belonging to the second sub-TS are referred to as "depth map data blocks". As shown in FIG. 16, a data block group is recorded continuously along track 1601 on the BD-ROM disc 101. Furthermore, the base-view data blocks L1, L2, L3, . . . , right-view data blocks R1, R2, R3, . . . , and depth map data blocks D1, D2, D3, . . . are arranged alternately one by one. This type of arrangement of data blocks is referred to as "interleaved arrangement".

In the interleaved arrangement according to embodiment 1 of the present invention, the extent ATC time is the same between the three types of contiguous data blocks. For example, in FIG. 16, the top depth map data block D1, top right-view data block R1, and top base-view data block L1 are contiguous. The extent ATC time is the same between these data blocks D1, R1, and L1. In this context, an "Arrival Time Clock (ATC)" refers to a clock that acts as a standard for an ATS. Also, the "extent ATC time" is defined by the value of the ATC and represents the range of the ATS assigned to source packets in an extent, i.e. the time interval from the ATS of the source packet at the top of the extent to the ATS of the source packet at the top of the next extent. In other words, the extent ATC time is the same as the time required to transfer all of the source packets in the extent from the read buffer in the playback device 102 to the system target decoder. The "read buffer" is a buffer memory in the playback device 102 where data blocks read from the BD-ROM disc 101 are temporarily stored before being transmitted to the system target decoder.

Between the three types of contiguous data blocks whose extent ATC time is the same, the playback periods may match, and the playback times of the video streams may be the same. For example, in FIG. 16, between the three data blocks D1, and L1, the playback periods match, and the playback times of the video streams are the same. Similarly, in subsequent data block groups, between the three types of contiguous data blocks data blocks D2, R2, and L2 whose extent ATC time is the same, the playback periods may match, and the playback times of the video streams may be the same.

Furthermore, in the interleaved arrangement according to embodiment 1 of the present invention, the three contiguous data blocks with the same extent ATC time are arranged in the order of the depth map block, right-view data block, and base-view data block, that is, starting with the smallest amount of data. For example, in FIG. 16, the picture included in the top right-view data block R1 is compressed using the picture included in the top base-view data block L1 as a reference picture, as shown in FIG. 9. Accordingly, the size $S_{ext2}[1]$ of the top right-view data block R1 is equal to or less than the size $S_{ext1}[1]$ of the top base-view data block L1: $S_{ext2}[1] \leq S_{ext1}[1]$. On the other hand, the amount of data per pixel in the depth map, i.e. the number of bits of the depth value, is in general smaller than the amount of data per pixel of the picture included in the base-view video stream, i.e. the sum of the number of bits of the chromatic coordinate value and the α value. Furthermore, as shown in FIGS. 6A and 6B, unlike the second sub-TS, the main TS includes other elementary streams, such as a primary audio stream, in addition to the primary video stream. Therefore, in FIG. 16 the size of the top depth map data block D1, $S_{ext3}[1]$ is less than or equal to the size of the top base-view data block $L_1$, $S_{ext1}[1]$: $S_{ext3}[1] \leq S_{ext1}[1]$. Therefore, in FIG. 16, the top depth map data block D1, the top right-view data block R1, and the top base-view data block L1 are recorded in that order. The same is true for the next three consecutive extents, D2, R2, and L2.

The VAUs located at the top of data blocks with the same extent ATC time belong to the same 3D VAU, and in particular include the top picture of the GOP representing the same 3D video image. For example, in FIG. 16, among the three contiguous data blocks Dn, Rn, Ln (n=1, 2, 3, . . . ) with the same extent ATC time, the top of the depth map data block Dn includes an I picture for the depth map stream, the top of the right-view data block Rn includes a P picture for the right-view video stream, and the top of the base-view data block Ln includes an I picture for the base-view video stream. The I picture for the depth map stream represents a depth map for the 2D video image represented by the I picture for the base-view video stream. The P picture for the right-view video stream represents the right-view when the 2D video image represented by the I picture in the base-view video stream is used as the left-view. In particular, the P picture, as shown in FIG. 9, is compressed using the I picture for the base-view video stream as a reference picture. Accordingly, the playback device 102 in 3D playback mode can start playback of 3D video images from any set of data blocks Dn, Rn, and Ln.

<<Significance of Dividing Multiplexed Stream Data into Data Blocks>>

In order to play 3D video images back seamlessly from the BD-ROM disc 101, the playback device 102 has to process the main TS and sub-TS in parallel. The read buffer capacity usable in such processing, however, is generally limited. In particular, there is a limit to the amount of data that can be continuously read into the read buffer from the BD-ROM disc 101. Accordingly, the playback device 102 has to read sections of the main TS and sub-TS with the same extent ATC time by dividing the sections.

Figure 17A:
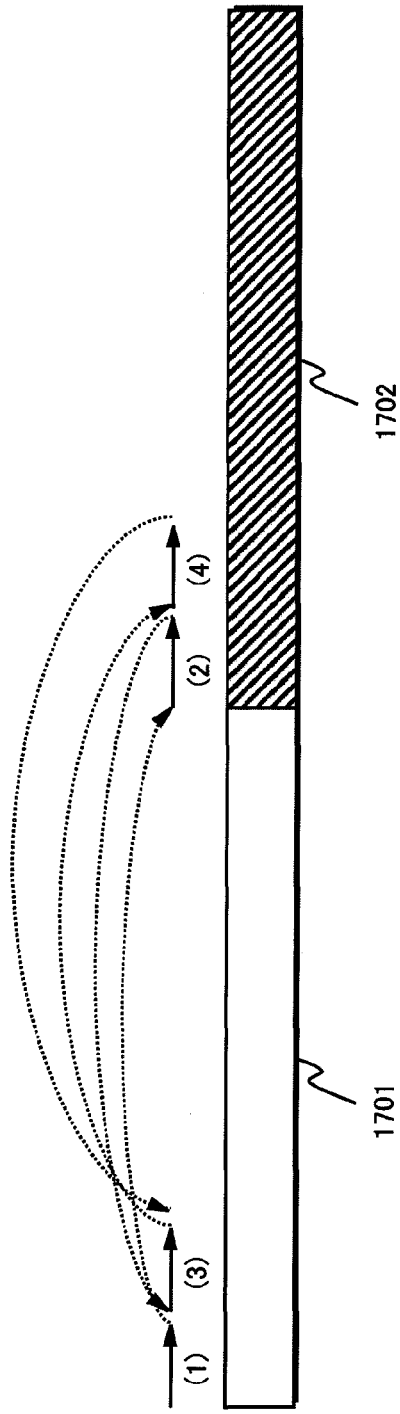
FIG. 17A is a schematic diagram showing the arrangement of the main TS 1701 and sub-TS 1702 recorded separately and consecutively on a BD-ROM disc, and FIG. 17B a schematic diagram showing the interleaved arrangement of the base-view data blocks B[0], B[1], B[2], . . . and dependent-view data blocks D[0], D[1], D[2], . . . recorded on a BD-ROM disc 101 according to embodiment 1 of the present invention.

FIG. 17A is a schematic diagram showing the arrangement of the main TS 1701 and sub-TS 1702 recorded separately and consecutively on a BD-ROM disc. When the playback device 102 processes the main TS 1701 and sub-TS 1702 in parallel, as shown by the arrows (1)-(4) on the solid lines in FIG. 17A, the BD-ROM drive 121 alternately reads sections of the main TS 1701 and the sub-TS 1702 that have the same extent ATC time. At this time, as shown by the arrows in the dashed lines in FIG. 17A, during read processing the BD-ROM drive 121 has to make a large change in the area to be read on the BD-ROM disc. For example, after the top section of the main TS 1701 shown by arrow (1) is read, the BD-ROM drive 121 temporarily stops the read operation by the optical pickup and increases the rotation speed of the BD-ROM disc. In this way, the BD-ROM drive 121 rapidly moves the sector on the BD-ROM disc on which the top section of the sub-TS 1702 shown by arrow (2) is recorded to the position of the optical pickup. This operation to temporarily stop reading by the optical pickup and, while reading is stopped, position the optical pickup above the next area to be read is referred to as a "jump". The dashed lines with an arrow shown in FIG. 17A indicate the range of the jumps necessary during read processing. During each jump period, read processing by the optical pickup stops, and only decoding processing by the decoder progresses. As a result, it is difficult to cause read processing to keep up with decoding processing, and thus it is difficult to stably maintain seamless playback.

Figure 17B:
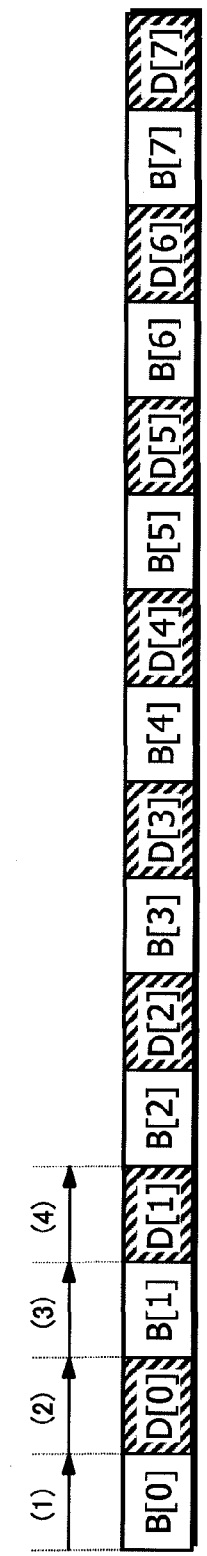

FIG. 17B is a schematic diagram showing the arrangement of base-view data blocks B[0], B[1], B[2], . . . and dependent-view data blocks D[0], D[1], D[2], . . . recorded alternately on a BD-ROM disc 101 according to embodiment 1 of the present invention. As shown in FIG. 17B, the main TS and sub-TS are divided into a plurality of data blocks and are arranged alternately. In this case, during playback of 3D video images, the playback device 102 reads data blocks B[0], D[0], B[1], D[1], . . . in order from the top, as shown by arrows (1)-(4) in FIG. 17B. By simply reading these data blocks in order, the playback device 102 can smoothly read the main TS and sub-TS alternately. In particular, since no jump occurs during read processing, seamless playback of 3D video images can be stably maintained.

<<Significance of Providing Contiguous Data Blocks with the Same Extent ATC Time>>

In the interleaved arrangement shown in FIG. 16, the three types of contiguous data blocks Dn, Rn, and Ln all have the same extent ATC time. In other words, between these extents, the difference between ATSs from the source packet at the top of each extent to the source packet at the top of the next extent is the same (however, in calculating the difference, the occurrence of wrap-around in the ATS is taken into consideration). In this case, the system target decoder in the playback device 102 reads all of the TS packets included in the base-view data block Ln and the dependent-view data block Dn or Rn within the same length of time measured by the ATC. Accordingly, the system target decoder can easily synchronize decoding processing of TS packets between the base-view stream and the dependent-view stream, particularly during interrupt playback.

<<Significance of Adjacent Data Blocks Having Equivalent Playback Times>>

Figure 18A:
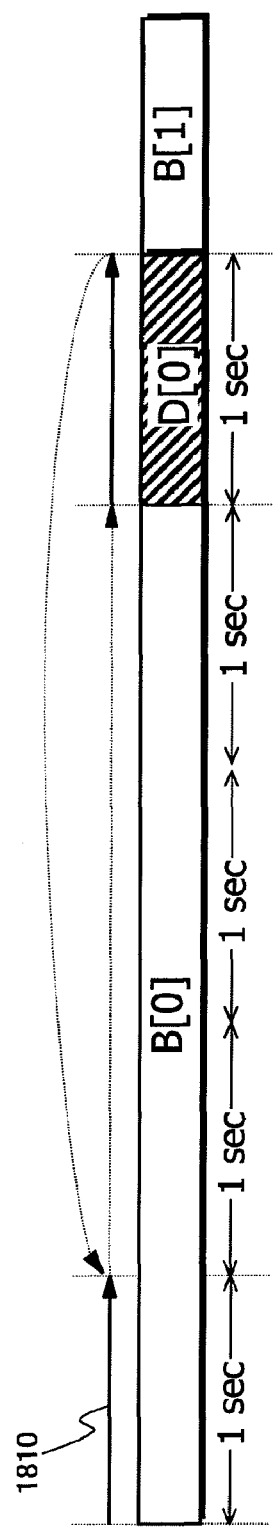
FIG. 18A is a schematic diagram showing the playback path when the playback times of the video stream differ between base-view data blocks and dependent-view data blocks that are adjacent on a BD-ROM disc.

FIG. 18A is a schematic diagram showing the playback path when the extent ATC times and the playback times of the video stream differ between base-view data blocks and dependent-view data blocks that are adjacent. In the example shown in FIG. 18, the playback time of the top base-view data block B[0] is four seconds, and the playback time of the top dependent-view data block D[0] is one second. In this case, the section of the base-view video stream that is necessary for decoding of the dependent-view data block D[0] has the same playback time as the dependent-view data block D[0]. Accordingly, to save read buffer capacity in the playback device 102, it is preferable, as shown by the arrow 1810 in FIG. 18A, to alternately read the base-view data block B[0] and the dependent-view data block D[0] into the buffer by the same amount of playback time, for example one second at a time. In that case, however, as shown by the dashed lines in FIG. 18A, jumps occur during read processing. As a result, it is difficult to cause read processing to keep up with decoding processing, and thus it is difficult to stably maintain seamless playback.

Figure 18B:
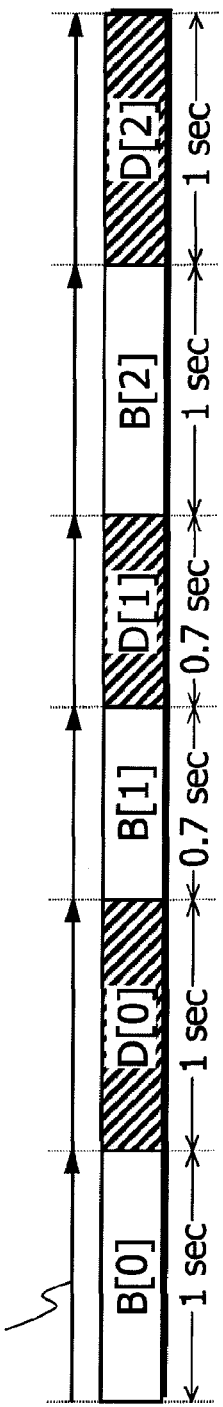
FIG. 18B is a schematic diagram showing the playback path when the playback times of the video stream are the same between base-view data blocks and dependent-view data blocks that are adjacent on a BD-ROM disc 101 according to embodiment 1 of the present invention.

FIG. 18B is a schematic diagram showing the playback path when the playback times of the video stream are the same between base-view data blocks and dependent-view data blocks that are adjacent. On a BD-ROM disc 101 according to embodiment 1 of the present invention, as shown in FIG. 18B, the playback time of the video stream between a pair of adjacent data blocks is the same. For example, for the pair of the top base-view data block B[0] and dependent-view data block D[0], the playback times of the video stream are both equal to one second, and the playback times of the video stream for the second pair of data blocks B[1] and D[1] are both equal to 0.7 seconds. In this case, during playback of 3D video images, the playback device 102 reads data blocks B[0], D[0], B[1], D[1] in order from the top, as shown by arrow 1820 in FIG. 18B. Simply in this way, the playback device 102 can smoothly read the main TS and sub-TS alternately. In particular, since no jump occurs during read processing, seamless playback of 3D video images can be stably maintained.

Note that if the extent ATC time is the same between a base-view data block and a dependent-view data block that are contiguous, the playback period between these data blocks may not match, and furthermore the playback time of the video streams may not be the same. Even in this case, the playback device 102 can smoothly read the main TS and sub-TS alternately by simply reading the data block groups in order from the top, in the same way as in FIG. 18B. In particular, since jumps do not occur during such read processing, seamless playback of 3D video images can be stably maintained.

<<Cross-Linking of AV Stream Files to Data Blocks>>

In the file system for the BD-ROM disc 101, each data block belonging to multiplexed stream data can be accessed as a single extent in either a file 2D or a file DEP. In other words, the logical address for each data block can be known from the allocation descriptor recorded in the file entry of a file 2D or file DEP. In the examples shown in FIGS. 5 and 16, the allocation descriptors #1, #2, #3, . . . included in the file entry 1610 in the file 2D (01000.m2ts) 541 indicate the sizes of the base-view data blocks L1, L2, L3, . . . and the LBNs of their tops. The allocation descriptors #1, #2, #3, . . . included in the file entry 1620 in the first file DEP (02000.m2ts) 542 indicate the sizes of the right-view data blocks R1, R2, R3, . . . and the LBNs of their tops. The allocation descriptors #1, #2, #3, . . . included in the file entry 1630 in the second file DEP (03000.m2ts) 543 indicate the sizes of the depth map data blocks D1, D2, D3, . . . and the LBNs of their tops.

FIG. 19A is a schematic diagram showing the data structure of the file 2D (01000.m2ts) 541. As shown in FIG. 16, the allocation descriptors #1, #2, #3, . . . in the file entry 1610 refer to the base-view data blocks L1, L2, L3, . . . . Accordingly, as shown in FIG. 19A, the base-view data blocks L1, L2, L3, . . . can be accessed as extents EXT2D[0], EXT2D[1], EXT2D[2], . . . in the file 2D 541. Hereinafter, the extents EXT2D[0], EXT2D[1], EXT2D[2], . . . belonging to the file 2D 541 are referred to as "2D extents".

FIG. 19B is a schematic diagram showing the data structure of the first file DEP (02000.m2ts) 542. As shown in FIG. 16, the allocation descriptors #1, #2, #3, . . . in the file entry 1620 refer to the right-view data blocks R1, R2, R3, . . . . Accordingly, as shown in FIG. 19B, the right-view data blocks R1, R2, R3, . . . can be accessed as extents EXT2[0], EXT2[1], EXT2[2], . . . in the first file DEP 542. Hereinafter, the extents EXT2[0], EXT2[1], EXT2[2], . . . belonging to the first file DEP 542 are referred to as "right-view extents".

FIG. 19C is a schematic diagram showing the data structure of a second file DEP (03000.m2ts) 543. As shown in FIG. 16, the allocation descriptors #1, #2, #3, . . . in the file entry 1630 refer to the depth map data blocks D1, D2, D3, . . . . Accordingly, as shown in FIG. 19C, the depth map data blocks D1, D2, D3, . . . can be accessed as extents EXT3 [0], EXT3 [1], EXT3 [2], . . . in the second file DEP 543. Hereinafter, the extents EXT3 [0], EXT3 [1], EXT3 [2], . . . belonging to the second file DEP 543 are referred to as "depth map extents". Furthermore, extents that belong to a file DEP, such as right-view extents and depth map extents, are collectively referred to as "dependent-view extents".

For the data block group shown in FIG. 16, the AV stream files are cross-linked as follows. The allocation descriptors #1, #2, #3, . . . included in the file entry 1640 in the first file SS (01000.ssif) 544A consider pairs of adjacent right-view data blocks and base-view data blocks R1+L1, R2+L2, R3+L3, . . . to each be one extent, indicating the size of each and the LBN of the top thereof. The allocation descriptors #1, #2, #3, . . . included in the file entry 1650 in the second file SS (02000.ssif) 544B alternately indicate, for depth map data blocks D1, D2, D3, . . . and base-view data blocks L1, L2, L3, . . . , the size of each block and the LBN of the top of the block.

FIG. 19D is a schematic diagram showing the data structure of the first file SS (01000.ssif) 544A. As shown in FIG. 16, the allocation descriptors #1, #2, #3, . . . in the file entry 1640 refer to pairs of adjacent right-view data blocks and base-view data blocks, R1+L1, R2+L2, R3+L3, . . . . Accordingly, as shown in FIG. 19D, the pairs of adjacent data blocks R1+L1, R2+L2, R3+L3, . . . can be accessed as extents EXTSS[0], EXTSS[1], EXTSS[2], in the first file SS 544A. Hereinafter, the extents EXTSS[0], EXTSS[1], EXTSS[2], . . . belonging to the first file SS 544A are referred to as "3D extents". The 3D extents EXTSS[n] (n=0, 1, 2, . . . ) have base-view data blocks Ln in common with the file 2D 541 and right-view data blocks Rn in common with the first file DEP 542.

FIG. 19E is a schematic diagram showing the data structure of the second file SS (02000.ssif) 544B. As shown in FIG. 16, the allocation descriptors #1, #2, #3, . . . in the file entry 1650 alternately refer to depth map data blocks D1, D2, D3, . . . , and to base-view data blocks L1, L2, L3, . . . . Accordingly, as shown in FIG. 19E, the data blocks D1, L1, D2, L2 can be accessed as extents EXTSS[0], EXTSS[1], EXTSS[2], EXTSS[3], . . . in the second file SS 544B. The extents in the second file SS 544B have base-view data blocks Ln in common with the file 2D 541 and depth map data blocks Dn in common with the second file DEP 543.

<<Playback Path for a Data Block Group in an Interleaved Arrangement>>

Figure 20:
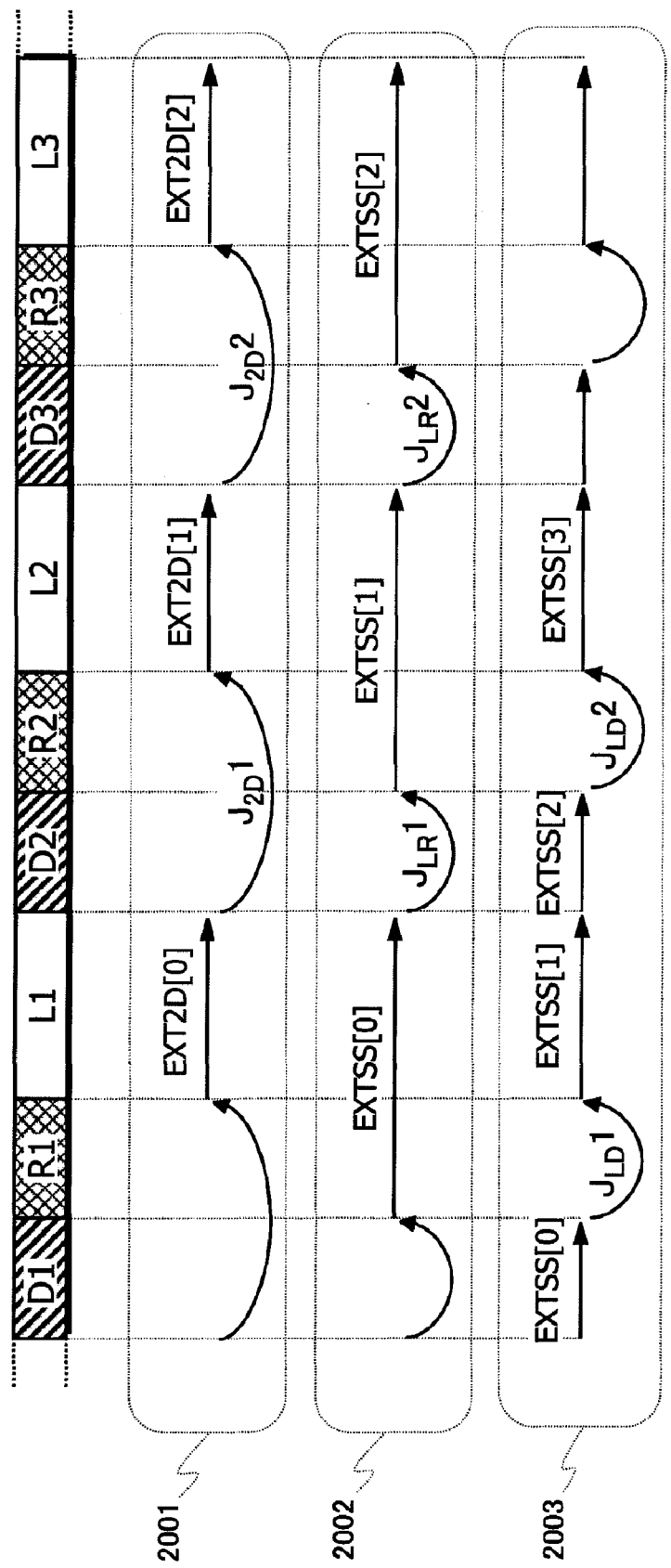
FIG. 20 is a schematic diagram showing the playback path 2001 in 2D playback mode, playback path 2002 in L/R mode, and the playback path 2003 in depth mode for the data block groups shown in FIG. 16.

FIG. 20 is a schematic diagram showing the playback path 2001 in 2D playback mode, playback path 2002 in L/R mode, and playback path 2003 in depth mode for the data block groups shown in FIG. 16.

In 2D playback mode, the playback device 102 plays back the file 2D 541. Accordingly, as the playback path 2001 for 2D playback mode shows, the base-view data blocks L1, L2, and L3 are read in order as 2D extents EXT2D[0], EXT2D[1], and EXT2D[2]. That is, the top base-view data block L1 is first read, then reading of the immediately subsequent depth map data block D2 and right-view data block R2 is skipped by a first jump $J_{2D}1$. Next, the second base-view data block. L2 is read, and then reading of the immediately subsequent depth map data block D3 and right-view data block R3 is skipped by a second jump $J_{2D}2$. Subsequently, the third base-view data block L3 is read.

In L/R mode, the playback device 102 plays back the first file SS 544A. Accordingly, as the playback path 2002 for L/R playback mode shows, pairs of adjacent right-view data blocks and base-view data blocks R1+L1, R2+L2, and R3+L3 are read in order as 3D extents EXTSS[0], EXTSS[1], and EXTSS[2]. That is, the top right-view data block R1 and the immediately subsequent base-view data block L1 are first continuously read, then reading of the immediately subsequent depth map data block D2 is skipped by a first jump $J_{LR}1$. Next, the second right-view data block R2 and the immediately subsequent base-view data block L2 are continuously read, and then reading of the immediately subsequent depth map data block D3 is skipped by a second jump $J_{LR}2$. Subsequently, the third right-view data block R3 and base-view data block L3 are continuously read.

In depth mode, the playback device 102 plays back the second file SS 544B. Accordingly, as the playback path 2003 for depth mode shows, depth map data blocks D1, D2, and D3 and base-view data blocks L1 and L2 are alternately read as extents EXTSS[0], EXTSS[1], EXTSS[2], and EXTSS[3] in the second file SS 544B. That is, the top depth map data block D1 is first read, then reading of the immediately subsequent right-view data block R1 is skipped by a first jump $J_{LD}1$. Next, the top base-view data block L1 and the immediately subsequent depth map extent D2 are continuously read. Furthermore, reading of the immediately subsequent right-view extent R2 is skipped by a second jump $J_{LD}2$, and the second base-view data block L2 is read.

As shown by the playback paths 2001-2003 in FIG. 20, in the area in which a data block group is recorded in an interleaved arrangement, the playback device 102 can substantially read the data block groups in order from the top. In this case, jumps occur during read processing. The distance of the jumps, however, differs from the jumps shown in FIG. 17A and is sufficiently shorter than the entire length of either the main TS or the sub-TS. Also, unlike the jumps shown in FIG. 18A, none of the jumps occur during reading of a single data block. Furthermore, for each pair of a base-view data block and dependent-view data block with the same extent ATC time, the dependent-view data block, which is comparatively small in size, is read first. Therefore, the read buffer capacity of the playback device 102 can be reduced more than if the data blocks were read in opposite order.

In L/R mode, the playback device 102 reads a data block group as an extent group in the first file SS 544A. That is, the playback device 102 reads the LBN of the top of the 3D extents EXTSS[0], EXTSS[1] . . . , as well as the size thereof, from the allocation descriptors #1, #2, . . . in the file entry 1640 in the first file SS 544A and then outputs the LBNs and sizes to the BD-ROM drive 121. The BD-ROM drive 121 continuously reads data having the input size from the input LBN. In such processing, control of the BD-ROM drive 121 is easier than processing to read the data block groups as the extents in the first file DEP 542 and the file 2D 541 for the following reasons (A) and (B): (A) the playback device 102 may refer in order to extents using a file entry in one location, and (B) since the total number of extents to be read substantially halves, the total number of pairs of an LBN and a size that need to be output to the BD-ROM drive 121 halves. Advantage (A) is also true for processing to read the data block group as extents in the second file SS 544B in depth mode. However, after the playback device 102 has read the 3D extents EXTSS[0], EXTSS[1], . . . , it needs to separate each into a right-view data block and a base-view data block and output them to the decoder. The clip information file is used for this separation processing. Details are provided below.

<<Arrangement of Multiplexed Stream Data Before and After a Layer Boundary<<

When the BD-ROM disc 101 has a plurality of recording layers, the main TS and sub-TS may be recorded across the boundary, i.e. the layer boundary, of two recording layers. Also, data other than the main TS and sub-TS may be recorded in-between. In these cases, the BD-ROM drive 121 generally has to perform a long jump during reading of the main TS and sub-TS. A "long jump" is a collective term for jumps with a long seek time and specifically refers to a jump distance that exceeds a predetermined threshold value. "Jump distance" refers to the length of the area on the BD-ROM disc 101 whose reading is skipped during a jump period. Jump distance is normally expressed as the number of sectors of the corresponding section. The threshold value used to define a long jump is specified, for example, as 40,000 sectors in the BD-ROM standard. This threshold value, however, depends on the type of BD-ROM disc and on the BD-ROM drive's read processing capability. Long jumps particularly include focus jumps and track jumps. A "focus jump" is a jump caused by switching recording layers, and includes processing to change the focus distance of the optical pickup. A "track jump" includes processing to move the optical pickup in a radial direction along the BD-ROM disc 101.

On the BD-ROM disc 101, when a sequence of a main TS and a sub-TS are divided, being located on either side of a position requiring a long jump, such as a layer boundary, another data recording area, etc., then the respective data block groups are recorded in one of the following three types of arrangements, 1-3. Furthermore, cross-links in AV stream files are used when accessing these data block groups. In this way, as described below, the playback device 102 can easily perform seamless playback of video images during a long jump while keeping the read buffer capacity to the minimum necessary.

[Arrangement 1]

Figure 21:
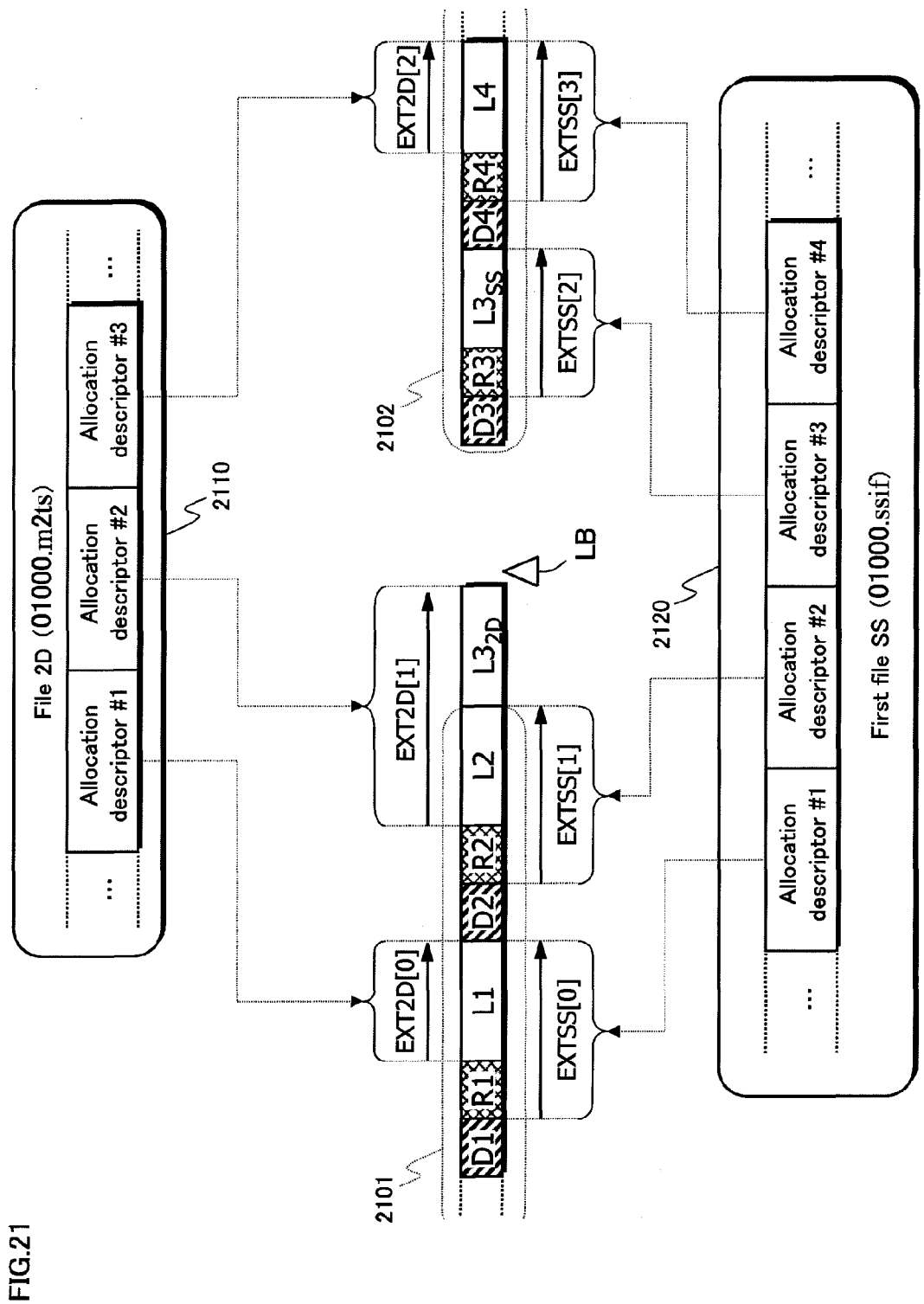
FIG. 21 is a schematic diagram showing a first example of a physical arrangement of the data block groups recorded before and after a layer boundary in a BD-ROM disc 101 according to embodiment 1 of the present invention.

FIG. 21 is a schematic diagram showing a first example of a physical arrangement of the data block groups recorded before and after a layer boundary in the BD-ROM disc 101. These data block groups belong to the main TS, first sub-TS, and second sub-TS respectively shown in FIGS. 6A, 6B, and 6C. Hereinafter, this arrangement is referred to as "arrangement 1". As shown in FIG. 21, on the first recording layer located before a layer boundary LB, the depth map data block group . . . , D1, D2, the right-view data block group . . . , R1, R2, and the base-view data block group . . . , L1, L2 are recorded in an interleaved arrangement. Hereinafter, these data block groups are referred to as the "first 3D extent block" 2101. Furthermore, one base-view data block $L3_{2D}$ is placed between the end L2 of the first 3D extent block 2101 and the layer boundary LB. On the other hand, on the second recording layer located after the layer boundary LB, the depth map data block group D3, D4, . . . , the right-view data block group R3, R4, . . . , and the base-view data block group $L3_{SS}$, L4, . . . are recorded in an interleaved arrangement. Hereinafter, these data block groups are referred to as the "second 3D extent block" 2102.

The interleaved arrangement for 3D extent blocks 2101 and 2102 is the same as the one shown in FIG. 16. In other words, a depth map data block, right-view data block, and base-view data block are alternately arranged in that order. Furthermore, between three consecutive data blocks Dn, Rn, Ln (n= . . . , 1, 2, 3, 4, . . . ), the extent ATC time is the same. The content of each piece of stream data is continuous between the three data blocks D2, R2, and L2 located at the end of the first 3D extent block 2101 and the three data blocks D3, R3, $L3_{SS}$ located at the top of the second 3D extent block 2102.

The base-view data block $L3_{2D}$ located immediately before the layer boundary LB matches bit-for-bit with the base-view data block $L3_{SS}$ at the top of the second 3D extent block 2102. In other words, the data blocks $L3_{2D}$ and $L3_{SS}$ are duplicate data. Hereinafter, $L3_{2D}$ is referred to as a "block exclusively for 2D playback", and $L3_{SS}$ is referred to as a "block exclusively for 3D playback".

The data blocks shown in FIG. 21 can be accessed as an extent in either file 2D or file DEP, with the exception of the block exclusively for 3D playback $L3_{SS}$. For example, in the file entry 2110 in the file 2D (01000.m2ts) 541, the allocation descriptor #1 indicates the size and the LBN of the top of the base-view data block L1, which is second from the end of the first 3D extent block 2101. Accordingly, the base-view data block L1 can be accessed as one 2D extent EXT2D[0] in the file 2D 541. The allocation descriptor #2 considers the pair L2+$L3_{2D}$, i.e. the base-view data block L2, the last in the first 3D extent block 2101, and the immediately subsequent block exclusively for 2D playback $L3_{2D}$, to be a single extent and indicates the size and the LBN of the top thereof. Accordingly, the pair of base-view data blocks L2+$L3_{2D}$ can be accessed as one 2D extent EXT2D[1] in the file 2D 541. Furthermore, the allocation descriptor #3 indicates the size and the LBN of the top of the second base-view data block L4 in the second 3D extent block 2102. Accordingly, the base-view data block L4 can be accessed as a different 2D extent EXT2D[2].

Cross-linking of AV stream files is performed the same way as in FIG. 16 for the data block groups shown in FIG. 21. In particular, in the file entry 2120 in the first file SS 544A, the allocation descriptors #1, #2, #3, and #4 consider adjacent pairs of right-view data blocks and base-view data blocks R1+L1, R2+L2, R3+$L3_{SS}$, and R4+L4 to each be one extent and indicate the size and the LBN of the top thereof. Accordingly, each pair of adjacent data blocks R1+L1, R2+L2, R3+$L3_{SS}$, and R4+L4 can be accessed respectively as a 3D extent EXTSS[0], EXTSS[1], EXTSS[2], and EXTSS[3] in the first file SS 544A. In this case, with the exception of the 3D extent EXTSS[2] immediately after the layer boundary LB, the 3D extents EXTSS[0], EXTSS[1], and EXTSS[3] respectively share base-view data blocks L1, L2, and L4 with the file 2D 541. On the other hand, the block exclusively for 2D playback $L3_{2D}$ can only be accessed as part of the extent EXT2D[1] in the file 2D 541, the extent EXT2D[1] being located immediately before the layer boundary LB. Furthermore, the block exclusively for 3D playback $L3_{SS}$ can only be accessed as part of the 3D extent EXTSS[2], located immediately after the layer boundary LB.

Figure 22:
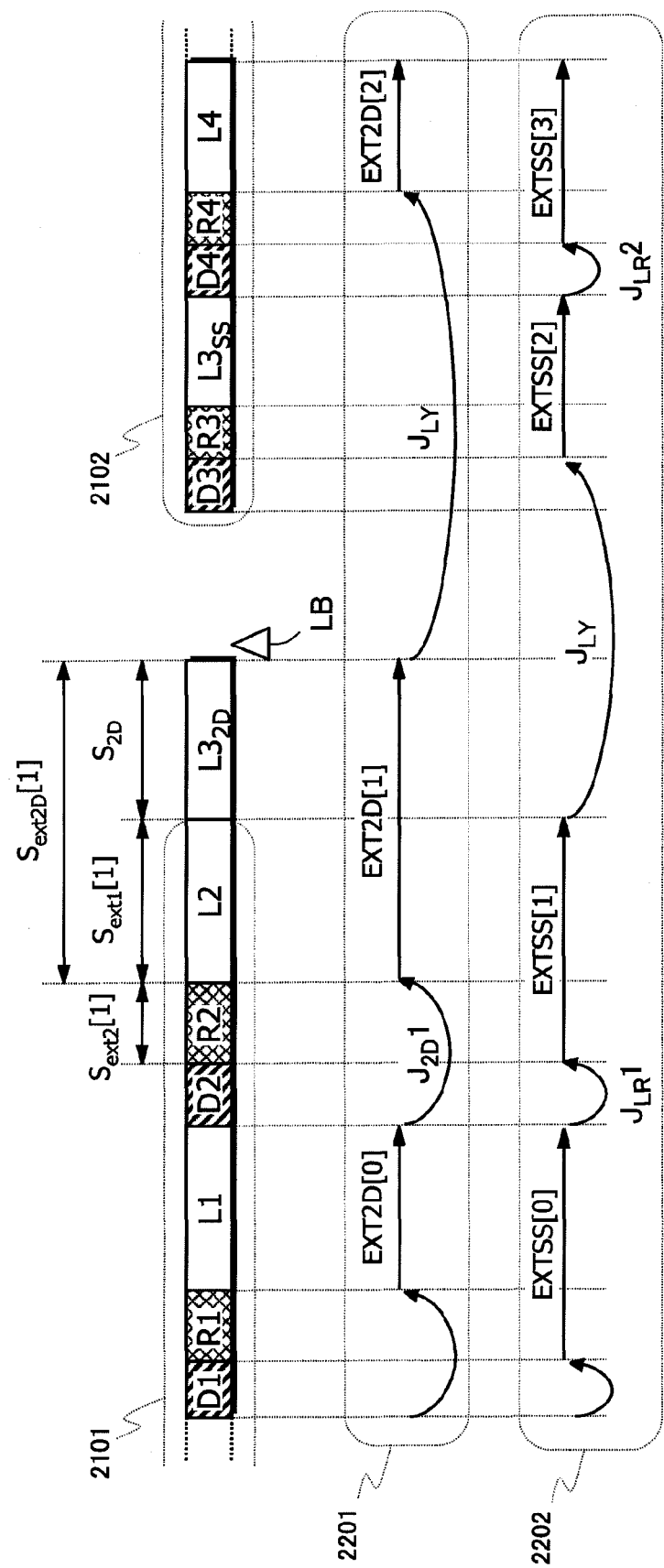
FIG. 22 is a schematic diagram showing the playback path 2201 in 2D playback mode and the playback path 2202 in L/R mode for the data block groups shown in FIG. 21.

FIG. 22 is a schematic diagram showing the playback path 2201 in 2D playback mode and the playback path 2202 in L/R mode for the data block groups shown in FIG. 21. Note that a person of ordinary skill in the art can easily infer by analogy the playback path in depth mode from the arrangement shown in FIG. 16.

In 2D playback mode, the playback device 102 plays back the file 2D 541. Accordingly, as shown by the playback path 2201 in 2D playback mode, first the base-view data block L1, which is second from the end of the first 3D extent block 2101, is read as the first 2D extent EXT2D[0], and reading of the immediately subsequent depth map data block D2 and right-view data block R2 is skipped by a first jump $J_{2D}1$. Next, a pair L2+L3$_{2D}$ of the base-view data block L2, located last in the first 3D extent block 2101, and the immediately subsequent block exclusively for 2D playback L3$_{2D}$ is continuously read as the second 2D extent EXT2D[1]. A long jump $J_{LY}$ occurs at the immediately subsequent layer boundary LB, and along with performance of a focus jump, reading of the five data blocks D3, R3, L3$_{SS}$, D4, and R4, located at the top of the second 3D extent block 2102, is skipped. Next, the second base-view data block L4 in the second 3D extent block 2102 is read as the third 2D extent EXT2D[2].

In L/R mode, the playback device 102 plays back the first file SS 544A. Accordingly, as shown by the playback path 2202 in L/R mode, first a pair R1+L1 of the top right-view data block R1 and the immediately subsequent base-view data block L1 is read continuously as the first 3D extent EXTSS[0], and reading of the immediately subsequent depth map data block D2 is skipped by a first jump $J_{LR}1$. Next, the second right-view data block R2 and the immediately subsequent base-view data block L2 are read continuously as the second 3D extent EXTSS[1]. The long jump $J_{LY}$ occurs immediately thereafter, and along with performance of a focus jump, reading of the block exclusively for 2D playback L3$_{2D}$ and the top depth map data block D3 in the second 3D extent block 2102 is skipped. Next, the top right-view data block R3 in the second 3D extent block 2102 and the immediately subsequent block exclusively for 3D playback L3$_{SS}$ are read continuously as the third 3D extent EXTSS[2], and reading of the immediately subsequent depth map data block D4 is skipped by a second jump $J_{LR}2$. Furthermore, the next right-view data block R4 and the immediately subsequent base-view data block L4 are read continuously as the fourth 3D extent EXTSS[3].

As shown in FIG. 22, in 2D playback mode, the block exclusively for 2D playback L3$_{2D}$ is read, while reading of the block exclusively for 3D playback L3$_{SS}$ is skipped. Conversely, in L/R mode, reading of the block exclusively for 2D playback L3$_{2D}$ is skipped, while the block exclusively for 3D playback L3$_{SS}$ is read. However, since the data blocks L3$_{2D}$ and L3$_{SS}$ match bit-for-bit, the left-view video frame that is played back is the same in both playback modes. In arrangement 1, the playback path 2201 in 2D playback mode and the playback path 2202 in L/R mode are divided before and after the long jump $J_{LY}$ in this way. The same is also true for depth mode.

[Advantages of Arrangement 1]

Figure 23:
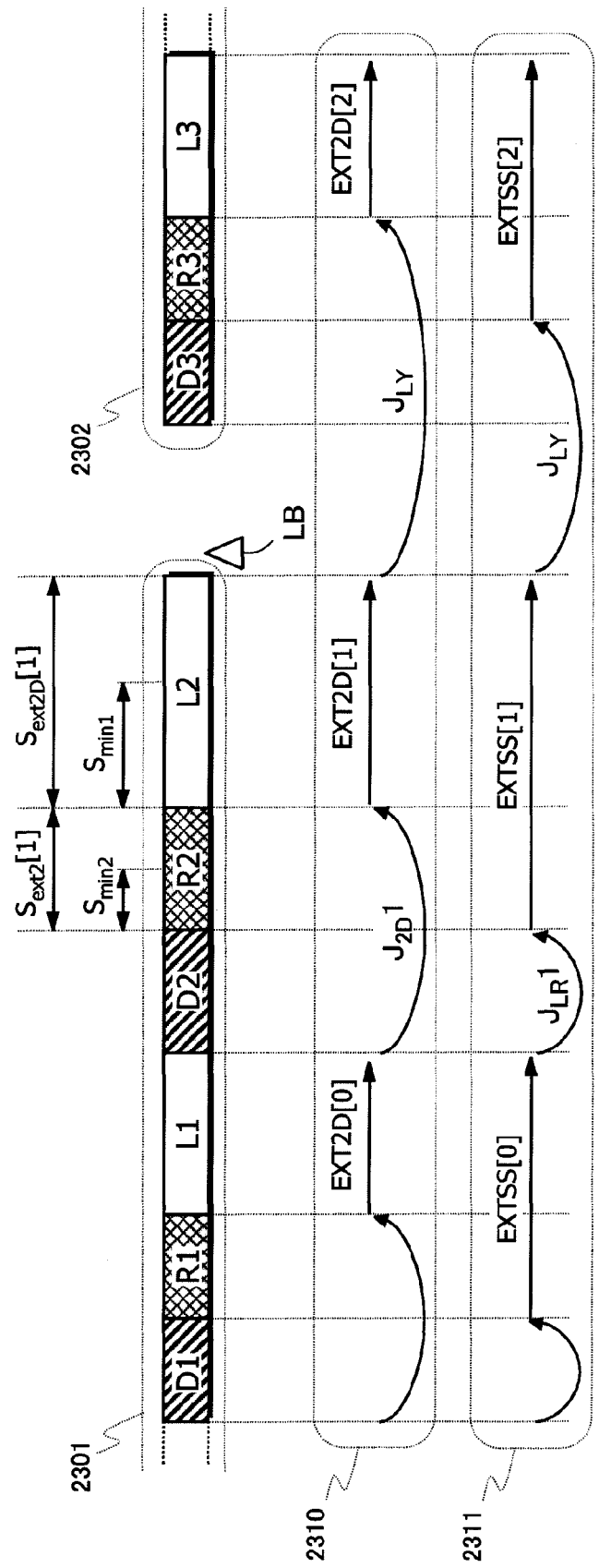
FIG. 23 is a schematic diagram showing data block groups recorded in an interleaved arrangement before and after a layer boundary in a BD-ROM disc and the corresponding playback path in each playback mode.

FIG. 23 is a schematic diagram showing data block groups recorded in an interleaved arrangement before and after a layer boundary in a BD-ROM disc and the corresponding playback path in each playback mode. As shown in FIG. 23, in the same way as the arrangement shown in FIG. 21, on the first recording layer, the depth map data block group . . . , D1, D2, the right-view data block group . . . , R1, R2, and the base-view data block group . . . , L1, L2 are recorded in an interleaved arrangement to constitute the first 3D extent block 2301. On the other hand, on the second recording layer, the depth map data block group D3, . . . , the right-view data block group R3, . . . , and the base-view data block group L3, . . . are recorded in an interleaved arrangement to constitute the second 3D extent block 2302. The interleaved arrangement of the 3D extent blocks 2301 and 2302 is the same as 2101 and 2102 shown in FIG. 21. Furthermore, the content of each piece of stream data is continuous between the three data blocks D2, R2, and L2 located at the end of the first 3D extent block 2301 and the three data blocks D3, R3, L3 located at the top of the second 3D extent block 2302.

Unlike those shown in FIG. 21, the data block groups shown in FIG. 23 do not include a pair of a block exclusively for 2D playback L3$_{2D}$ and a block exclusively for 3D playback L3$_{SS}$ before and after the layer boundary LB. Accordingly, as shown below, the playback path 2310 in 2D playback mode and the playback path 2311 in L/R mode are not divided immediately before the long jump $J_{LY}$, and both playback paths traverse the same base-view data block L2.

The base-view data blocks L1-L3 shown in FIG. 23 can each be accessed as one extent EXT2D[0]-EXT2D[2] in the file 2D. On the other hand, each pair of adjacent right-view data blocks and base-view data blocks, R1+L1, R2+L2, and R3+L3, can be accessed as 3D extents EXTSS[0], EXTSS[1], and EXTSS[2] in the file SS. All of the 3D extents EXTSS[0], EXTSS[1], and EXTSS[2] respectively share base-view data blocks L1, L2, and L3 with the file 2D 541.

The playback device 102 in 2D playback mode plays back the file 2D. Accordingly, as shown by the playback path 2310 in 2D playback mode, the base-view data block L1, which is second from the end of the first 3D extent block 2301, is read as the first 2D extent EXT2D[0], and reading of the immediately subsequent depth map data block D2 and right-view data block R2 is skipped by the first jump $J_{2D}1$. Next, the base-view data block L2, located last in the first 3D extent block 2301, is read as the second 2D extent EXT2D[1]. The long jump $J_{LY}$ occurs at the immediately subsequent layer boundary LB, and along with performance of a focus jump, reading of the two data blocks D3, and R3, located at the top of the second 3D extent block 2302, is skipped. Next, the top base-view data block L3 in the second 3D extent block 2302 is read as the third 2D extent EXT2D[2].

The playback device 102 in L/R mode plays back the file SS. Accordingly, as shown by the playback path 2311 in L/R mode, first a pair R1+L1 of the top right-view data block R1 and the immediately subsequent base-view data block L1 is read continuously as the first 3D extent EXTSS[0], and reading of the immediately subsequent depth map data block D2 is skipped by the first jump $J_{LR}1$. Next, the second right-view data block R2 and the immediately subsequent base-view data block L2 are read continuously as the second 3D extent EXTSS[1]. The long jump $J_{LY}$ occurs immediately thereafter, and along with performance of a focus jump, reading of the top depth map data block D3 in the second 3D extent block 2302 is skipped. Next, the top right-view data block R3 in the second 3D extent block 2302 and the immediately subsequent base-view data block L3 are read continuously as the third 3D extent EXTSS[2].

As described above, in the data block groups shown in FIG. 23, the playback path 2310 in 2D playback mode and the playback path 2311 in L/R mode both traverse the same base-view data block L2 immediately before the long jump $S_{LY}$, unlike the data block groups shown in FIG. 21. During the long jump $J_{LY}$, the BD-ROM drive 121 stops read processing, but the system target decoder continues to decode stream data accumulated in the read buffer. Accordingly, to cause the playback device 102 to seamlessly play back video images before and after the long jump $J_{LY}$, it is necessary to prevent buffer underflow during the long jump $J_{LY}$.

In L/R mode, while the first 3D extent block 2301 is being decoded, a constant amount of data accumulates in the read buffer. This constant amount of data is referred to as the "buffer margin amount" (details provided below). During the long jump $J_{LY}$, the 3D extent EXTSS[1] read immediately before, i.e. data for the right-view data block R2 and the base-view data block L2, as well as the buffer margin amount, is decoded. Accordingly, in order to prevent buffer underflow in L/R mode, the buffer margin amount should be set sufficiently large. On the other hand, it suffices for the size of the data blocks R2 and L2, Smin2 and Smin1, to be values for which the buffer margin amount can be maintained until immediately before the long jump $J_{LY}$. However, to prevent buffer underflow in 2D playback mode, the 2D extent EXT2D[1], i.e. the size $S_{ext2D}[1]$ of the base-view data block L2, has to satisfy the following requirement: "equal to or greater than the data amount transmitted from the read buffer to the system target decoder between the start of reading of the 2D extent EXT2D[1] and the completion of the long jump $J_{LY}$". The size $S_{ext2D}[1]$ that satisfies this requirement is generally larger than the size Smin1, the minimum necessary for seamless playback in L/R mode, as shown in FIG. 23. Accordingly, the capacity of the read buffer that should be guaranteed in the playback device 102 in L/R mode has to be larger than the minimum value for seamless playback in L/R mode. Furthermore, the extent ATC times for the right-view data block R2 and the base-view data block L2 have to be the same. Accordingly, the size $S_{ext2}[1]$ of the right-view data block R2 is generally larger than the size Smin2, the minimum necessary for seamless playback in L/R mode. Therefore, the capacity of the read buffer that should be guaranteed in the playback device 102 in L/R mode has to be even larger than the minimum value for seamless playback in L/R mode. As a result of these facts, in the arrangement shown in FIG. 23, it is difficult to further decrease the capacity of the read buffer that should be guaranteed in the playback device 102 in L/R mode.

Conversely, as described above, in arrangement 1 shown in FIG. 22, the playback path 2201 in 2D playback mode and the playback path 2202 in L/R mode are divided before and after the long jump $J_{LY}$. Accordingly, unlike the arrangement shown in FIG. 23, the size $S_{ext2D}[1]$ of the 2D extent EXT2D[1] located immediately before the layer boundary LB and the size $S_{ext2}[1]$ of the immediately preceding right-view data block R2 can be determined separately as below.

First, the size $S_{ext2D}[1]$ of the 2D extent EXT2D[1] is the same as the sum $S_{ext1}[1]+S_{2D}$ of the size $S_{ext1}[1]$ of the base-view data block L2 and the size $S_{2D}$ of the block exclusively for 2D playback $L3_{2D}$. Accordingly, for seamless playback in 2D playback mode, this sum $S_{ext1}[1]+S_{2D}$ should be greater than or equal to the data amount that is transmitted from the read buffer to the system target decoder between the start of reading of the 2D extent EXT2D[1] and the completion of the long jump $J_{LY}$. On the other hand, the sizes $S_{ext2}[1]$ and $S_{ext1}[1]$ of the right-view data block R2 and the base-view data block L2 belonging to the 3D extent EXTSS[1] located immediately before the layer boundary LB should be values such that the buffer margin amount can be maintained until immediately before the long jump $J_{LY}$. In this case, within the 2D extent EXT2D[1], only the base-view data block L2 located earlier in the extent is shared with the 3D extent EXTSS[1]. Accordingly, by appropriately enlarging the size $S_{2D}$ of the block exclusively for 2D playback $L3_{2D}$, the size $S_{ext1}[1]$ of the base-view data block L2 can be further limited while keeping the size $S_{ext2D}[1]=S_{ext1}[1] S_{2D}$ of the 2D extent EXT2D[1] constant. Correspondingly, the size $S_{ext2}[1]$ of the right-view data block R2 can also be further limited.

Since the block exclusively for 3D playback $L3_{SS}$ and the block exclusively for 2D playback $L3_{2D}$ are duplicate data, enlarging the size $S_{2D}$ of the block exclusively for 2D playback $L3_{2D}$ enlarges the size of the right-view data block R3 located immediately before the block exclusively for 3D playback $L3_{SS}$. However, this size can be made sufficiently smaller than the size of the right-view data block R3 located immediately before the layer boundary LB shown in FIG. 23. In this way, the read buffer capacity to be guaranteed in the playback device 102 in L/R mode can be brought even closer to the minimum necessary for seamless playback in L/R mode.

It is possible to thus set each data block in arrangement 1 to be a size at which seamless playback of video images during a long jump is possible in both 2D playback mode and L/R mode while keeping the read buffer amount that is to be guaranteed in the playback device 102 to the minimum necessary. Furthermore, changing the data block that is to be read in 2D playback mode and L/R mode, in particular switching between a block exclusively for 2D playback $L3_{2D}$ and a block exclusively for 3D playback $L3_{SS}$, is possible simply by switching the AV stream file for playback between the file 2D and the file SS.

[Arrangement 2]

Figure 24:
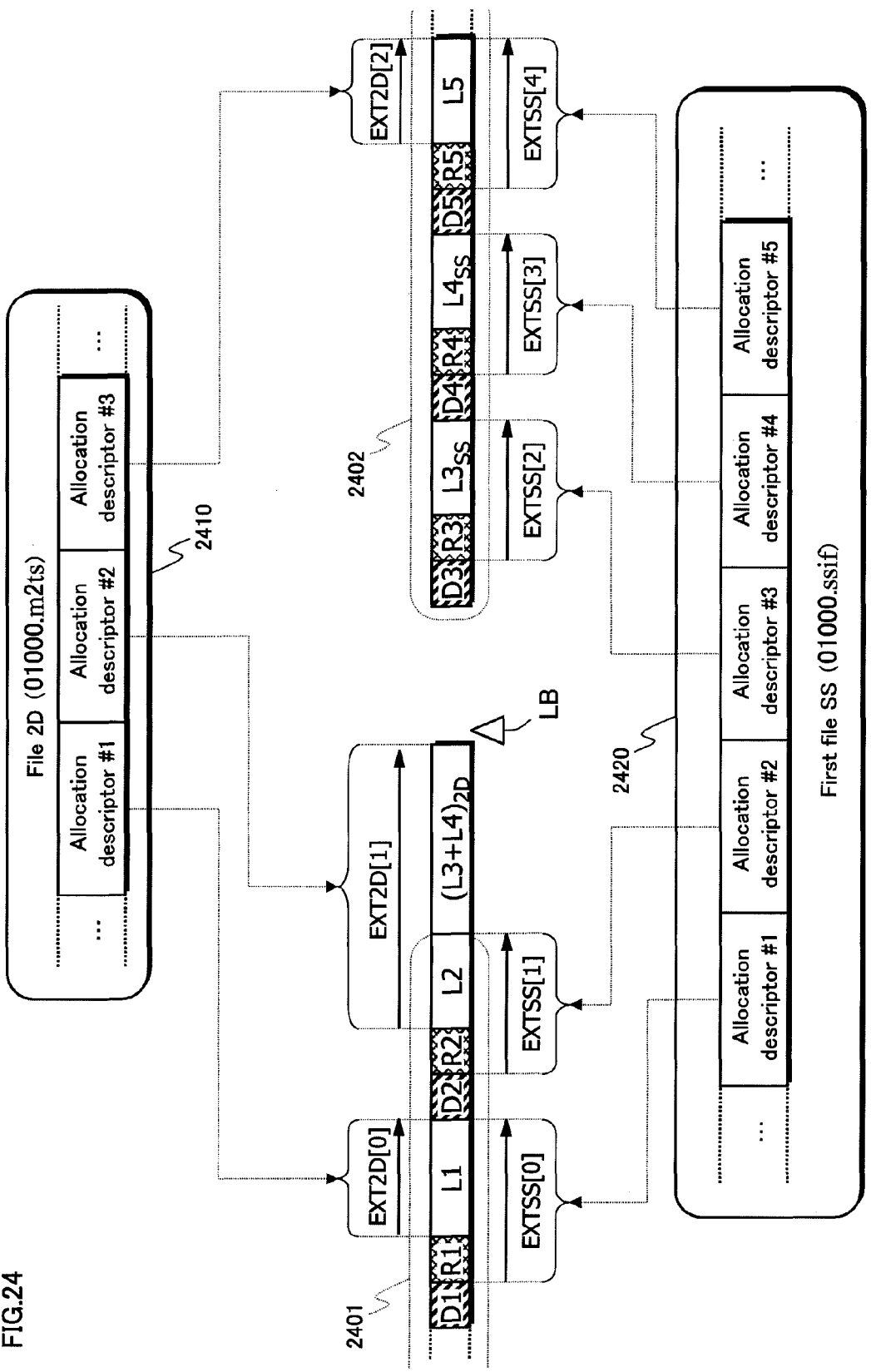
FIG. 24 is a schematic diagram showing a second example of a physical arrangement of the data block groups recorded before and after a layer boundary in a BD-ROM disc 101 according to embodiment 1 of the present invention.

FIG. 24 is a schematic diagram showing a second example of a physical arrangement of the data block groups recorded before and after a layer boundary in the BD-ROM disc 101. These data block groups belong to the main TS, first sub-TS, and second sub-TS respectively shown in FIGS. 6A, 6B, and 6C. Hereinafter, this arrangement is referred to as "arrangement 2". As seen by comparing FIG. 24 and FIG. 21, arrangement 2 differs from arrangement 1 in that two blocks exclusively for 3D playback $L3_{SS}$ and $L4_{SS}$ are provided at the top of the second 3D extent block 2402. As other characteristics of arrangement 2 are the same as arrangement 1, the description for arrangement 1 is referred to for a detailed description of such characteristics.

The block exclusively for 2D playback $(L3+L4)_{2D}$ located immediately before the layer boundary LB matches bit-for-bit with the pair of blocks exclusively for 3D playback $L3_{SS}$ and $L4_{SS}$ in the 3D extent block 2402. In other words, the block exclusively for 2D playback $(L3+L4)_{2D}$ and the blocks exclusively for 3D playback $L3_{SS}$ and $L4_{SS}$ are duplicate data.

The data blocks shown in FIG. 24 can be accessed as an extent in either a file 2D or a file DEP, with the exception of the blocks exclusively for 3D playback $L3_{SS}$ and $L4_{SS}$. For example, in the file entry 2410 in the file 2D 541, the allocation descriptor #1 indicates the size and the LBN of the top of the base-view data block L1, which is second from the end of the first 3D extent block 2401. Accordingly, the base-view data block L1 can be accessed as one 2D extent EXT2D[0] in the file 2D 541. The allocation descriptor #2 considers the pair L2+$(L3+L4)_{2D}$ i.e. the base-view data block L2, the last in the first 3D extent block 2401, and the immediately subsequent block exclusively for 2D playback $(L3+L4)_{2D}$, to be a single extent and indicates the size and the LBN of the top thereof. Accordingly, the pair of base-view data blocks L2+$(L3+L4)_{2D}$ can be accessed as one 2D extent EXT2D[1] in the file 2D 541. Furthermore, the allocation descriptor #3 indicates the size and the LBN of the top of the third base-view data block L5 in the second 3D extent block 2402. Accordingly, the base-view data block L5 can be accessed as a different 2D extent EXT2D[2].

In the file entry 2420 in the first file SS 544A, the allocation descriptors #1, #2, #3, #4, and #5 consider adjacent pairs of right-view data blocks and base-view data blocks R1+L1, R2+L2, R3+$L3_{SS}$, R4+$L4_{SS}$, and R5+L5 to each be one extent and indicate the size and the LBN of the top thereof. Accordingly, each pair of adjacent data blocks R1+L1, . . . , R5+L5 can be accessed respectively as a 3D extent EXTSS[0], EXTSS[1], EXTSS[2], EXTSS[3], and EXTSS[4] in the first file SS 544A. The block exclusively for 2D playback $(L3+L4)_{2D}$ can only be accessed as part of the extent EXT2D[1] in the file 2D 541, and the blocks exclusively for 3D playback L3$_{SS}$ and L4$_{SS}$ can only be accessed as part of the 3D extents EXTSS[2] and EXTSS[3].

Figure 25:
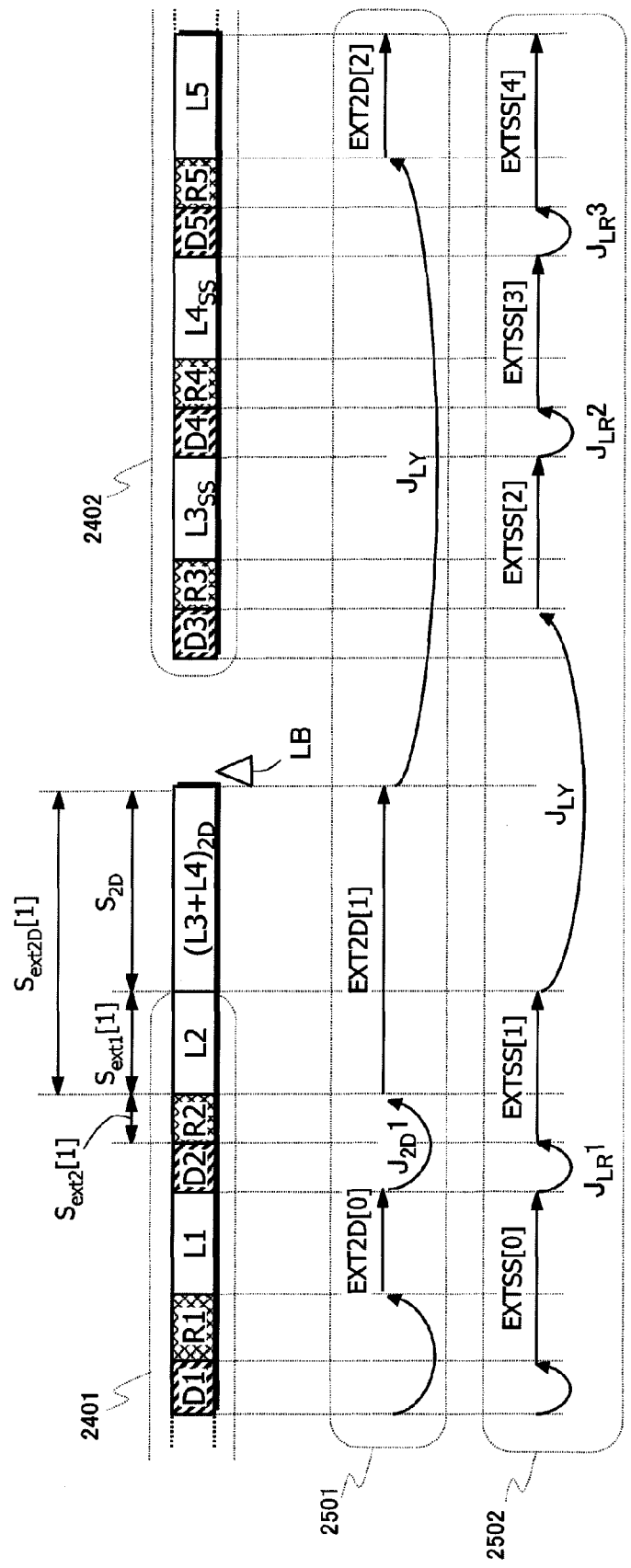
FIG. 25 is a schematic diagram showing the playback path 2501 in 2D playback mode and the playback path 2502 in L/R mode for the data block group shown in FIG. 24.

FIG. 25 is a schematic diagram showing the playback path 2501 in 2D playback mode and the playback path 2502 in L/R mode for the data block group shown in FIG. 24. Note that a person of ordinary skill in the art can easily infer by analogy the playback path in depth mode from the arrangement shown in FIG. 16.

In 2D playback mode, the playback device 102 plays back the file 2D 541. Accordingly, as shown by the playback path 2501 in 2D playback mode, first the base-view data block L1, which is second from the end of the first 3D extent block 2401, is read as the first 2D extent EXT2D[0], and reading of the immediately subsequent depth map data block D2 and right-view data block R2 is skipped by the first jump J$_{2D}$1. Next, a pair L2+(L3+L4)$_{2D}$ of the base-view data block L2, located last in the first 3D extent block 2401, and the immediately subsequent block exclusively for 2D playback (L3+L4)$_{2D}$ is continuously read as the second 2D extent EXT2D[1]. The long jump J$_{LY}$ occurs at the immediately subsequent layer boundary LB, and along with performance of a focus jump, reading of the eight data blocks D3, R3, L3$_{SS}$, D4, R4, L4$_{SS}$, D5, and R5, located at the top of the second 3D extent block 2402, is skipped. Next, the third base-view data block L5 in the second 3D extent block 2402 is read as the third 2D extent EXT2D[2].

In L/R mode, the playback device 102 plays back the first file SS 544A. Accordingly, as shown by the playback path 2502 in L/R mode, first a pair R1+L1 of the top right-view data block R1 and the immediately subsequent base-view data block L1 is read continuously as the first 3D extent EXTSS[0], and reading of the immediately subsequent depth map data block D2 is skipped by the first jump J$_{LR}$1. Next, the second right-view data block R2 and the immediately subsequent base-view data block L2 are read continuously as the second 3D extent EXTSS[1]. The long jump J$_{LY}$ occurs immediately thereafter, and along with performance of a focus jump, reading of the block exclusively for 2D playback (L3+L4)$_{2D}$ and the top depth map data block D3 in the second 3D extent block 2402 is skipped. Next, the top right-view data block R3 in the second 3D extent block 2402 and the immediately subsequent block exclusively for 3D playback L3$_{SS}$ are read continuously as the third 3D extent EXTSS[2], and reading of the immediately subsequent depth map data block D4 is skipped by a second jump J$_{LR}$2. Similarly, the next right-view data block R4 and the immediately subsequent block exclusively for 3D playback L4$_{SS}$ are read continuously as the fourth 3D extent EXTSS[3], and reading of the immediately subsequent depth map data block D5 is skipped by a third jump J$_{LR}$3. Furthermore, the next right-view data block R5 and the immediately subsequent base-view data block L5 are read continuously as the fifth 3D extent EXTSS[4].

As shown in FIG. 25, in 2D playback mode, the block exclusively for 2D playback (L3+L4)$_{2D}$ is read, while reading of the blocks exclusively for 3D playback L3$_{SS}$ and L4$_{SS}$ is skipped. Conversely, in L/R mode, reading of the block exclusively for 2D playback (L3+L4)$_{2D}$ is skipped, while the blocks exclusively for 3D playback L3$_{SS}$ and L4$_{SS}$ are read. However, since the block exclusively for 2D playback (L3+L4)$_{2D}$ and the blocks exclusively for 3D playback L3$_{SS}$ and L4$_{SS}$ match bit-for-bit, the left-view video frames that are played back are the same in both playback modes. In arrangement 2, the playback path 2501 in 2D playback mode and the playback path 2502 in L/R mode are divided before and after the long jump J$_{LY}$ in this way. Accordingly, the size S$_{ext2D}$[1] of the 2D extent EXT2D[1] located immediately before the layer boundary LB and the size S$_{ext2}$[1] of the immediately preceding right-view data block R2 can be determined separately as below. Note that the same is also true for depth mode.

First, the size S$_{ext2D}$[1] of the 2D extent EXT2D[1] is the same as the sum S$_{ext1}$[1]+S$_{2D}$ of the size S$_{ext1}$[1] of the base-view data block L2 and the size S$_{2D}$ of the block exclusively for 2D playback (L3+L4)$_{2D}$. Accordingly, for seamless playback in 2D playback mode, this sum S$_{ext1}$[1]+S$_{2D}$ should be greater than or equal to the data amount that is transmitted from the read buffer to the system target decoder between the start of reading of the 2D extent EXT2D[1] and the completion of the long jump J$_{LY}$. On the other hand, the sizes S$_{ext2}$[1] and S$_{ext1}$[1] of the right-view data block R2 and the base-view data block L2 belonging to the 3D extent EXTSS[1] located immediately before the layer boundary LB should be values such that the buffer margin amount can be maintained until immediately before the long jump J$_{LY}$. By appropriately enlarging the size S$_{2D}$ of the block exclusively for 2D playback (L3+L4)$_{2D}$, the size S$_{ext1}$[1] of the base-view data block L2 can be further limited while keeping the size S$_{ext2D}$[1]=S$_{ext1}$[1]+S$_{2D}$ of the 2D extent EXT2D[1] constant. Correspondingly, the size S$_{ext2}$[1] of the right-view data block R2 can also be further limited.

In this case, since the blocks exclusively for 3D playback L3$_{SS}$ and L4$_{SS}$ and the block exclusively for 2D playback (L3+L4)$_{2D}$ are duplicate data, enlarging the size S$_{2D}$ of the block exclusively for 2D playback (L3+L4)$_{2D}$ enlarges the size of the right-view data blocks R3 and R4 located immediately before the blocks exclusively for 3D playback L3$_{SS}$ and L4$_{SS}$. However, as compared to one block exclusively for 2D playback (L3+L4)$_{2D}$, since the block exclusively for 3D playback is divided into two blocks, L3$_{SS}$ and L4$_{SS}$, the size of each can be made sufficiently smaller than the size of the right-view data block R3 located immediately before the layer boundary LB shown in FIG. 23. In this way, the read buffer amount to be guaranteed in the playback device 102 in L/R mode can be further reduced to the minimum necessary for seamless playback in L/R mode.

It is possible to thus set each data block in arrangement 2 to be a size at which seamless playback of video images during the long jump is possible in both 2D playback mode and L/R mode while keeping the buffer amount that is to be guaranteed in the decoder in the playback device 102 to the minimum necessary. Furthermore, changing the data block that is to be read in 2D playback mode and L/R mode, in particular switching between a block exclusively for 2D playback (L3+L4)$_{2D}$ and blocks exclusively for 3D playback L3$_{SS}$ and L4$_{SS}$, is possible simply by switching the AV stream file for playback between the file 2D and the file SS. Note that the same is also true for depth mode.

In arrangement 2, the duplicate data for the block exclusively for 2D playback (L3+L4)$_{2D}$ is set as two blocks exclusively for 3D playback L3$_{SS}$ and L4$_{SS}$. Alternatively, the duplicate data can be set as three or more blocks exclusively for 3D playback.

[Arrangement 3]

Figure 26:
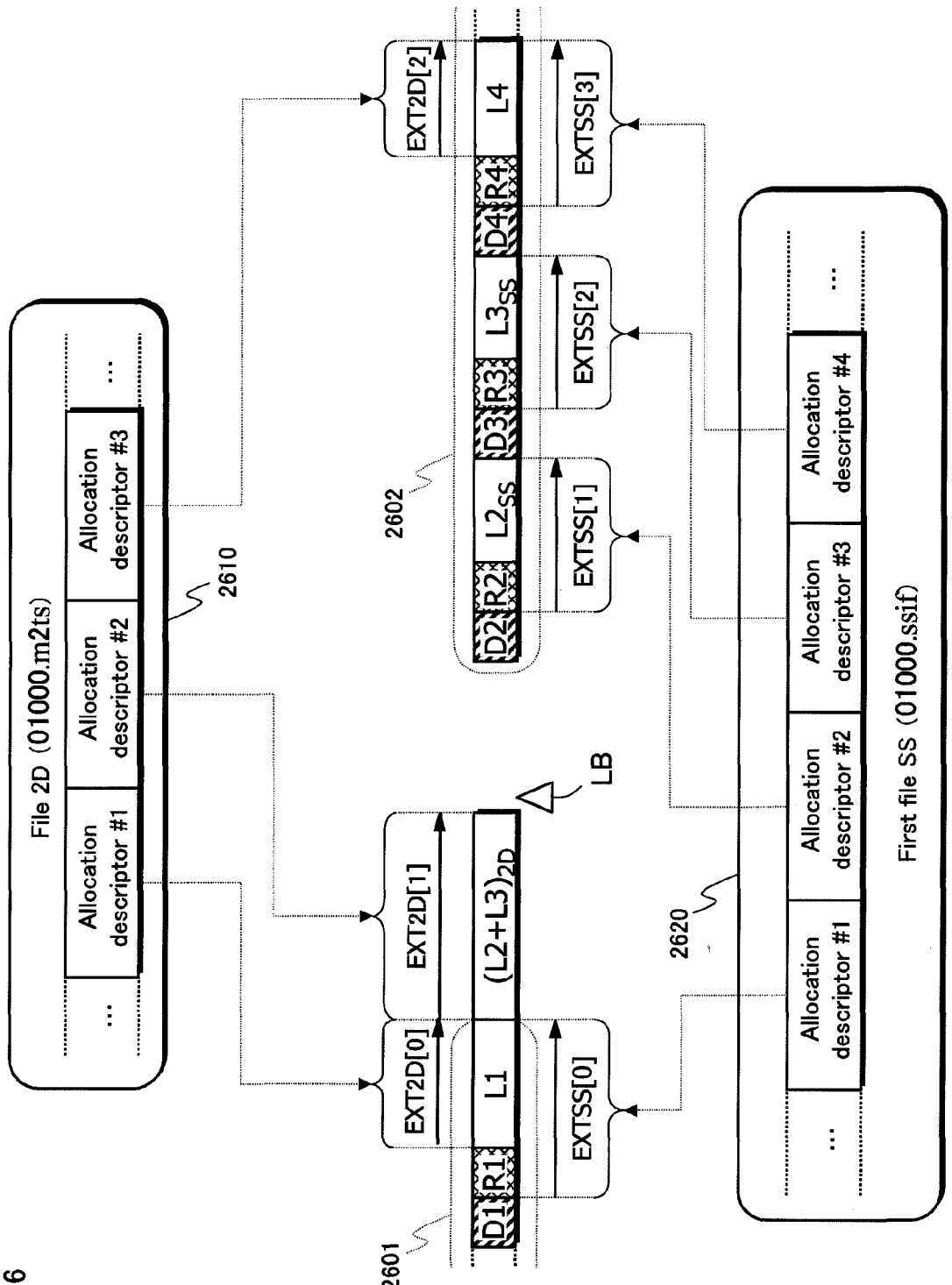
FIG. 26 is a schematic diagram showing a third example of a physical arrangement of the data block groups recorded before and after a layer boundary in a BD-ROM disc 101 according to embodiment 1 of the present invention.

FIG. 26 is a schematic diagram showing a third example of a physical arrangement of the data block groups recorded before and after a layer boundary in the BD-ROM disc 101. These data block groups belong to the main TS, first sub-TS, and second sub-TS respectively shown in FIGS. 6A, 6B, and 6C. Hereinafter, this arrangement is referred to as "arrangement 3". As seen by comparing FIG. 26 and FIG. 24, arrangement 3 differs from arrangement 2 in that the block exclusively for 2D playback (L2+L3)$_{2D}$ can be accessed as a single 2D extent EXT2D[1]. Since other characteristics of arrangement 3 are the same as arrangement 2, the description for arrangement 2 is referred to for a detailed description of such characteristics.

The block exclusively for 2D playback (L2+L3)$_{2D}$ located immediately before the layer boundary LB matches bit-for-bit with the pair of blocks exclusively for 3D playback L2$_{SS}$ and L3$_{SS}$ in the 3D extent block 2602. In other words, the block exclusively for 2D playback (L2+L3)$_{2D}$ and the blocks exclusively for 3D playback L2$_{SS}$ and L3$_{SS}$ are duplicate data.

The data blocks shown in FIG. 26 can be accessed as an extent in either a file 2D or a file DEP, with the exception of the two blocks exclusively for 3D playback L2$_{SS}$ and L3$_{SS}$. For example, in the file entry 2610 in the file 2D 541, the allocation descriptor #1 indicates the size and the LBN of the top of the base-view data block L1, the last data block in the first 3D extent block 2601. Accordingly, the base-view data block L1 can be accessed as one 2D extent EXT2D[0]. The allocation descriptor #2 considers the block exclusively for 2D playback (L2+L3)$_{2D}$ to be a single extent and indicates the size and the LBN of the top thereof. Accordingly, the block exclusively for 2D playback (L2+L3)$_{2D}$ can be accessed as the next 2D extent EXT2D[1]. The allocation descriptor #3 indicates the size and the LBN of the top of the third base-view data block L4 in the second 3D extent block 2602. Accordingly, the base-view data block L4 can be accessed as the third 2D extent EXT2D[2].

In the file entry 2620 in the first file SS 544A, the allocation descriptors #1, #2, #3, and #4 consider adjacent pairs of right-view data blocks and base-view data blocks R1+L1, R2+L2$_{SS}$, R3+L3$_{SS}$, and R4+L4 to each be one extent and indicate the size and the LBN of the top thereof. Accordingly, each pair of adjacent data blocks R1+L1, R4+L4 can be accessed respectively as a 3D extent EXTSS[0], EXTSS[1], EXTSS[2], and EXTSS[3] in the first file SS 544A. The block exclusively for 2D playback (L2+L3)$_{2D}$ can only be accessed as part of the extent EXT2D[1] in the file 2D 541, and the blocks exclusively for 3D playback L2$_{SS}$ and L3$_{SS}$ can only be accessed as part of the extents EXTSS[1] and EXTSS[2].

Figure 27:
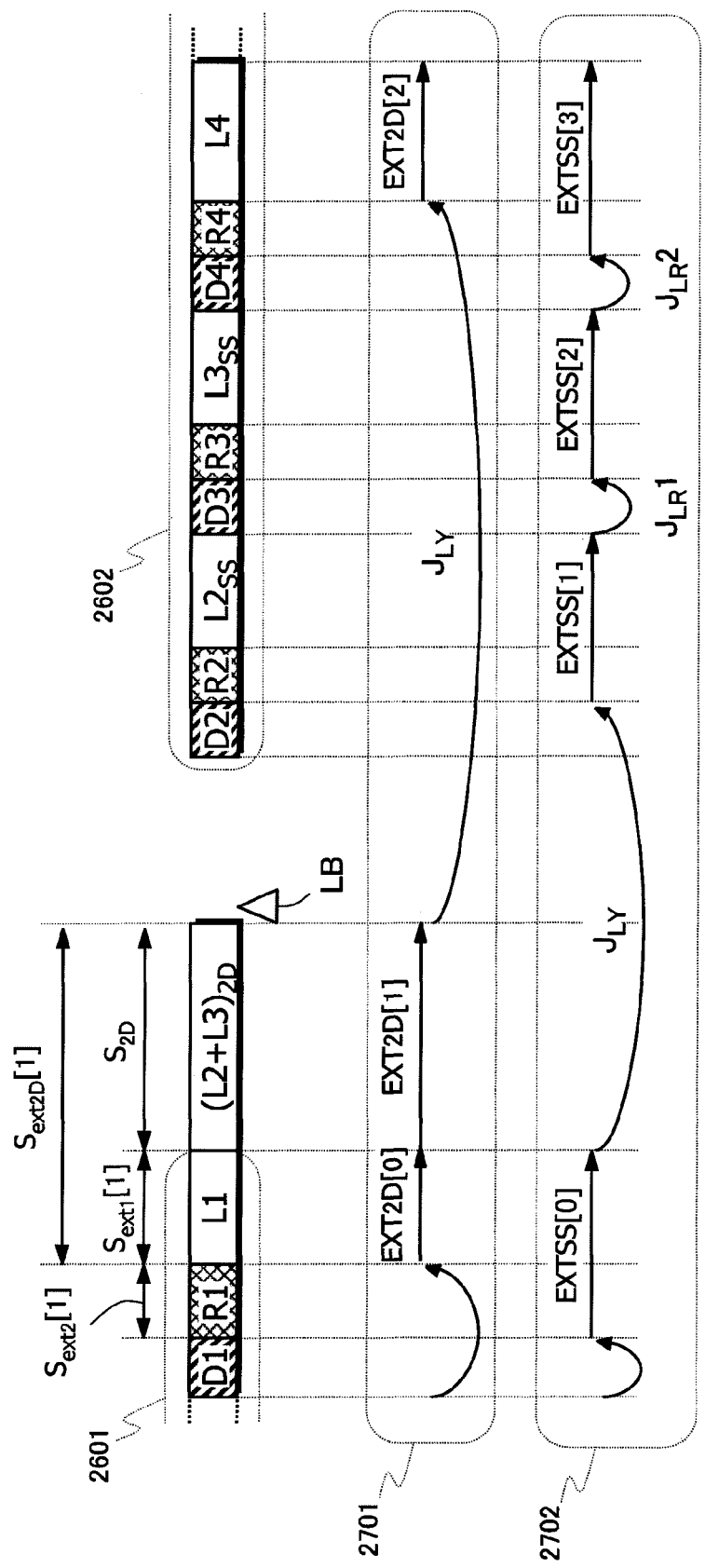
FIG. 27 is a schematic diagram showing the playback path 2701 in 2D playback mode and the playback path 2702 in L/R mode for the data block group shown in FIG. 26.

FIG. 27 is a schematic diagram showing the playback path 2701 in 2D playback mode and the playback path 2702 in L/R mode for the data block group shown in FIG. 26. Note that a person of ordinary skill in the art can easily infer by analogy the playback path in depth mode from the arrangement shown in FIG. 16.

In 2D playback mode, the playback device 102 plays back the file 2D 541. Accordingly, as shown by the playback path 2701 in 2D playback mode, first the base-view data block L1, which is the last data block in the first 3D extent block 2601, is read as the first 2D extent EXT2D[0]. Next, the immediately subsequent block exclusively for 2D playback (L2+L3)$_{2D}$ is continuously read as the second 2D extent EXT2D[1]. The long jump J$_{LY}$ occurs at the immediately subsequent layer boundary LB, and along with performance of a focus jump, reading of the eight data blocks D2, R2, L2$_{SS}$, D3, R3, L3$_{SS}$, D4, and R4, located at the top of the second 3D extent block 2602 is skipped. Next, the third base-view data block L4 in the second 3D extent block 2602 is read as the third 2D extent EXT2D[2].

In L/R mode, the playback device 102 plays back the first file SS 544A. Accordingly, as shown by the playback path 2702 in L/R mode, first a pair R1+L1 of the top right-view data block R1 and the immediately subsequent base-view data block L1 is read continuously as the first 3D extent EXTSS[0]. The long jump J$_{LY}$ occurs immediately thereafter, and along with performance of a focus jump, reading of the block exclusively for 2D playback (L2+L3)$_{2D}$ and the top depth map data block D3 in the second 3D extent 2602 is skipped. Next, the top right-view data block R2 in the second 3D extent block 2602 and the immediately subsequent block exclusively for 3D playback L2$_{SS}$ are read continuously as the second 3D extent EXTSS[1], and reading of the immediately subsequent depth map data block D3 is skipped by the first jump J$_{LR}$1. Similarly, the next right-view data block R3 and the immediately subsequent block exclusively for 3D playback L3$_{SS}$ are read continuously as the third 3D extent EXTSS[2], and reading of the immediately subsequent depth map data block D4 is skipped by a second jump J$_{LR}$2. Furthermore, the next right-view data block R4 and the immediately subsequent base-view data block L4 are read continuously as the fourth 3D extent EXTSS[3].

As shown in FIG. 27, in 2D playback mode, the block exclusively for 2D playback (L2+L3)$_{2D}$ is read, while reading of the blocks exclusively for 3D playback L2$_{SS}$ and L3$_{SS}$ is skipped. Conversely, in L/R mode, reading of the block exclusively for 2D playback (L2+L3)$_{2D}$ is skipped, while the blocks exclusively for 3D playback L2$_{SS}$ and L3$_{SS}$ are read. However, since the block exclusively for 2D playback (L2+L3)$_{2D}$ and the blocks exclusively for 3D playback L2$_{SS}$ and L3$_{SS}$ match bit-for-bit, the left-view video frame that is played back is the same in both playback modes. In arrangement 3, the playback path 2701 in 2D playback mode and the playback path 2702 in L/R mode are divided before and after the long jump J$_{LY}$ in this way. Accordingly, the size S$_{ext2D}$[1] of the 2D extent EXT2D[1] located immediately before the layer boundary LB and the size S$_{ext2}$[1] of the immediately preceding right-view data block R1 can be determined separately as below. Note that the same is also true for depth mode.

First, the sum S$_{ext2D}$[0]+S$_{ext2D}$[1] of the sizes of the two 2D extents EXT2D[0] and EXT2D[1] which are contiguous immediately before the layer boundary LB is the same as the sum S$_{ext1}$[1]+S$_{2D}$ of the size S$_{ext1}$[1] of the base-view data block L1 and the size S$_{2D}$ of the block exclusively for 2D playback (L2+L3)$_{2D}$. Accordingly, for seamless playback in 2D playback mode, this sum S$_{ext1}$[1]+S$_{2D}$ should be greater than or equal to the data amount that is transmitted from the read buffer to the system target decoder between the start of reading of the 2D extent EXT2D[1] and the completion of the long jump J$_{LY}$. On the other hand, the sizes S$_{ext2}$[0] and S$_{ext2D}$[0] of the right-view data block R1 and the base-view data block L1 belonging to the 3D extent EXTSS[0] located immediately before the layer boundary LB should be values such that the buffer margin amount can be maintained until immediately before the long jump J$_{LY}$. By appropriately enlarging the size S$_{2D}$ of the block exclusively for 2D playback (L2+L3)$_{2D}$, the size S$_{ext1}$[1] of the base-view data block L1 can be further limited while keeping the sum S$_{ext2D}$[0]+S$_{ext2D}$[1] of the sizes of the pair of 2D extents EXT2D[0] and EXT2D[1] constant. Correspondingly, the size S$_{ext2}$[0] of the right-view data block R1 can also be further limited.

In this case, since the blocks exclusively for 3D playback L2$_{SS}$ and L3$_{SS}$ and the block exclusively for 2D playback (L2+L3)$_{2D}$ are duplicate data, enlarging the size S$_{2D}$ of the block exclusively for 2D playback (L2+L3)$_{2D}$ enlarges the size of the right-view data blocks R2 and R3 located immediately before the blocks exclusively for 3D playback L2$_{SS}$ and L3$_{SS}$. However, as compared to one block exclusively for 2D playback (L2+L3)$_{2D}$, since the block exclusively for 3D playback is divided into two blocks, L2$_{SS}$ and L3$_{SS}$, the size of each can be made sufficiently smaller than the size of the right-view data block R3 located immediately before the layer boundary LB shown in FIG. 23. In this way, the read buffer amount to be guaranteed in the playback device 102 in L/R mode can be further reduced to the minimum necessary for seamless playback in L/R mode.

It is possible to thus set each data block in arrangement 3 to be a size at which seamless playback of video images during a long jump is possible in both 2D playback mode and L/R mode while keeping the read buffer amount that is to be guaranteed in the playback device 102 to the minimum necessary. Furthermore, changing the data block that is to be read in 2D playback mode and L/R mode, in particular switching between a block exclusively for 2D playback $(L2+L3)_{2D}$ and blocks exclusively for 3D playback $L2_{SS}$ and $L3_{SS}$, is possible simply by switching the AV stream file for playback between the file 2D and the file SS. Note that the same is also true for depth mode.

In arrangement 3, the duplicate data for the block exclusively for 2D playback $(L2+L3)_{2D}$ is set as two blocks exclusively for 3D playback $L2_{SS}$ and $L3_{SS}$. Alternatively, the duplicate data can be set as one block exclusively for 3D playback as in FIG. 1, or as three or more blocks exclusively for 3D playback.

Note that, unlike arrangements 1-3, the block exclusively for 2D playback may be accessible as two or more extents in the file 2D. Furthermore, each data block may be accessible as an extent in two or more types of files 2D or files SS.

<<Arrangement of Multiplexed Stream Data for L/R Mode Only>>

Figure 28A:
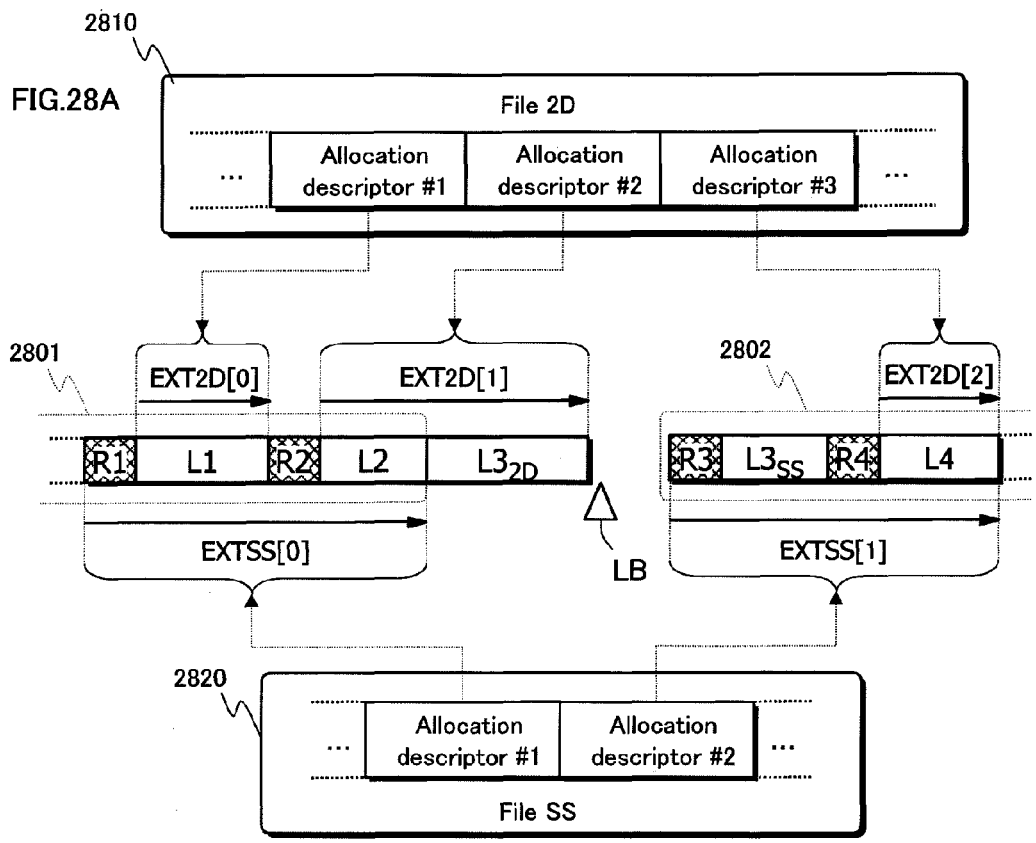
FIG. 28A is a schematic diagram showing the first arrangement example in FIG. 21 with the depth map data blocks removed.

When 3D video images are played back only L/R mode, the depth map data blocks may be removed from arrangements 1-3. FIG. 28A is a schematic diagram showing arrangement 1 in FIG. 21 with the depth map data blocks removed. These data block groups belong to the main TS and first sub-TS shown in FIG. 6. As shown in FIG. 28A, in the first 3D extent block 2801 located before the layer boundary LB, the right-view data block group . . . , R1, R2 and the base-view data block group . . . , L1, L2 are recorded in an interleaved arrangement. On the other hand, in the second 3D extent block 2802 located after the layer boundary LB, the right-view data block group R3, R4, . . . and the base-view data block group $L3_{SS}$, L4, . . . are recorded in an interleaved arrangement. Furthermore, a block exclusively for 2D playback $L3_{2D}$ is placed between L2, the last data block in the first 3D extent block 2801, and the layer boundary LB. Also, a block exclusively for 3D playback $L3_{SS}$ is placed at the top of the second 3D extent block 2802. These data blocks $L3_{2D}$ and $L3_{SS}$ are duplicate data and match bit-for-bit.

In the interleaved arrangement in the 3D extent blocks 2801 and 2802, right-view data blocks and base-view data blocks are alternately arranged in that order. Furthermore, between two contiguous data blocks Rn, Ln (n= . . . , 1, 2, 3, 4, . . . ), the extent ATC time is the same. The content of each piece of stream data is continuous between the two data blocks R2 and L2 located at the end of the first 3D extent block 2801 and the two data blocks R3 and $L3_{SS}$ located at the top of the second 3D extent block 2802.

The data blocks shown in FIG. 28A can be accessed as an extent in either a file 2D or a file DEP, with the exception of the block exclusively for 3D playback $L3_{SS}$. For example, in the file entry 2810 in the file 2D, the allocation descriptor #1 indicates the size and the LBN of the top of the base-view data block L1, which is second from the end of the first 3D extent block 2801. Accordingly, the base-view data block L1 can be accessed as one 2D extent EXT2D[0]. The allocation descriptor #2 considers the pair of base-view data blocks $L2+L3_{2D}$ to be a single extent and indicates the size and the LBN of the top thereof. Accordingly, the pair of base-view data blocks $L2+L3_{2D}$ can be accessed as the second 2D extent EXT2D[1]. The allocation descriptor #3 indicates the size and the LBN of the top of the second base-view data block L4 in the second 3D extent block 2802. Accordingly, the base-view data block L4 can be accessed as the third 2D extent EXT2D[2].

Cross-linking of AV stream files is performed the same way as in FIG. 16 for the data block groups shown in FIG. 28A. In particular, since the depth map data blocks are removed from the 3D extent blocks 2801 and 2802, two or more pairs of right-view data blocks and base-view data blocks having the same extent ATC time may be arranged contiguously. In this case, these two or more pairs may be accessed as one 3D extent. As shown in FIG. 28A, in the file entry 2820 in the file SS, within the first 3D extent block 2801, the allocation descriptor #1 considers four contiguous right-view data blocks and base-view data blocks R1, L1, R2, and L2 to be one extent, indicating the size and the LBN of the top thereof. Accordingly, these data blocks R1, L1, R2, and L2 can be accessed as one 3D extent EXTSS[0]. Within the second 3D extent block 2802, the allocation descriptor #2 considers four contiguous right-view data blocks and base-view data blocks R3, $L3_{SS}$, R4, and L4 to be one extent, indicating the size and the LBN of the top thereof. Accordingly, these data blocks R3, $L3_{SS}$, R4, and L4 can be accessed as one 3D extent EXTSS[1]. In this case, the 3D extents EXTSS[0] and EXTSS[1] respectively share base-view data blocks L1, L2, and L4 with the 2D extents EXT2D[0], EXT2D[1], and EXT2D[2]. On the other hand, the block exclusively for 2D playback $L3_{2D}$ can only be accessed as part of the extent EXT2D[1] located immediately before the layer boundary LB. Furthermore, the block exclusively for 3D playback $L3_{SS}$ can only be accessed as part of the extent EXTSS[1] located immediately after the layer boundary LB.

Figure 28B:
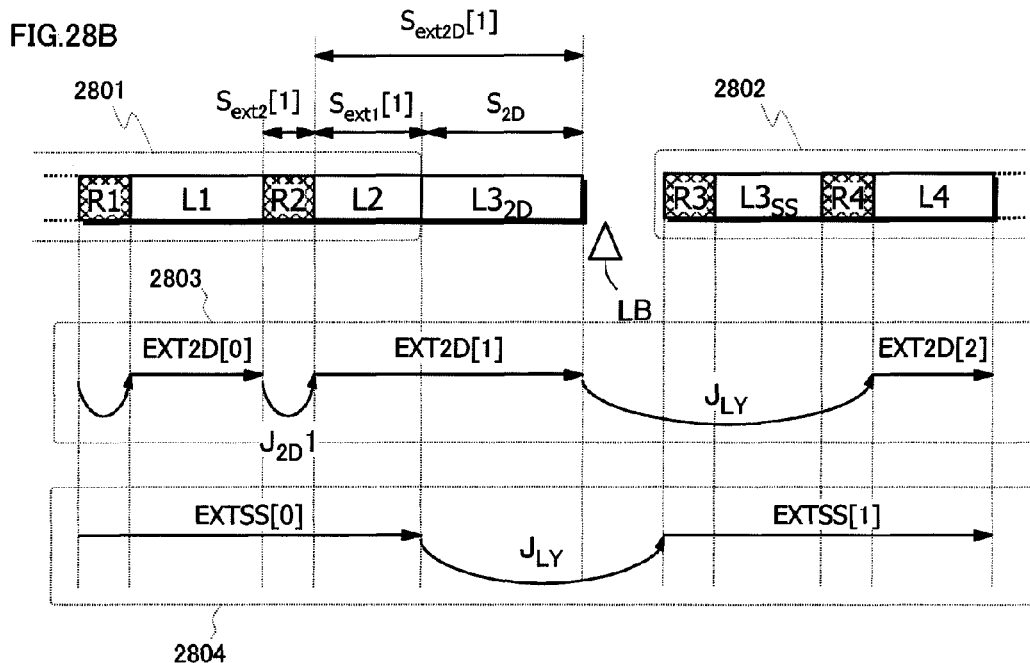
FIG. 28B is a schematic diagram showing the playback path 2803 in 2D playback mode and the playback path 2804 in L/R mode for the data block groups shown in FIG. 28A.

FIG. 28B is a schematic diagram showing the playback path 2803 in 2D playback mode and the playback path 2804 in L/R mode for the data block groups shown in FIG. 28A.

In 2D playback mode, the playback device 102 plays back the file 2D. Accordingly, as shown by the playback path 2803 in 2D playback mode, first the base-view data block L1, which is second from the end of the first 3D extent block 2801, is read as the first 2D extent EXT2D[0], and reading of the immediately subsequent right-view data block R2 is skipped by the first jump $J_{2D}1$. Next, a pair $L2+L3_{2D}$ of the base-view data block L2, located last in the first 3D extent block 2801, and the immediately subsequent block exclusively for 2D playback $L3_{2D}$ is continuously read as the second 2D extent EXT2D[1]. The long jump $J_{LY}$ occurs at the immediately subsequent layer boundary LB, and along with performance of a focus jump, reading of the three data blocks R3, $L3_{SS}$, and R4, located at the top of the second 3D extent block 2802, is skipped. Next, the second base-view data block L4 in the second 3D extent block 2802 is read as the third 2D extent EXT2D[2].

In L/R mode, the playback device 102 plays back the file SS. Accordingly, as shown by the playback path 2804 in L/R mode, first the data block group R1, L1, R2, and L2 in the first 3D extent block 2801 is read continuously as the first 3D extent EXTSS[0]. The long jump $J_{LY}$ occurs immediately thereafter, and along with performance of a focus jump, reading of the block exclusively for 2D playback $L3_{2D}$ is skipped. Next, the data block group R3, $L3_{SS}$, R4, and L4 in the second 3D extent block 2802 is read continuously as the next 3D extent EXTSS[1].

As shown in FIG. 28B, in 2D playback mode, the block exclusively for 2D playback $L3_{2D}$ is read, while reading of the block exclusively for 3D playback $L3_{SS}$ is skipped. Conversely, in L/R mode, reading of the block exclusively for 2D playback $L3_{2D}$ is skipped, while the block exclusively for 3D playback $L3_{SS}$ is read. However, since the data blocks $L3_{2D}$ and $L3_{SS}$ match bit-for-bit, the left-view video frame that is played back is the same in both playback modes. In arrangement 1, even when only L/R mode is supported, the playback path 2803 in 2D playback mode and the playback path 2804 in L/R mode are divided before and after the long jump $J_{LY}$ in this way. Accordingly, by appropriately enlarging the size $S_{2D}$ of the block exclusively for 2D playback $L3_{2D}$, the size $S_{ext1}$[1] of the base-view data block L2 can be further limited while keeping the size $S_{ext2D}[1]=S_{ext1}[1]+S_{2D}$ of the 2D extent EXT2D[1] constant. Correspondingly, the size $S_{ext2}[1]$ of the right-view data block R2 can also be further limited. As a result, the read buffer capacity to be guaranteed in the playback device 102 in L/R mode can be brought even closer to the minimum necessary for seamless playback in L/R mode. The same is also true for arrangements 2 and 3.

Even when arrangements 1-3 only support L/R mode, it is possible to thus set each data block to be a size at which seamless playback of video images during a long jump is possible in both 2D playback mode and L/R mode while keeping the read buffer amount that is to be guaranteed in the playback device 102 to the minimum necessary. Furthermore, changing the data block that is to be read in 2D playback mode and L/R mode, in particular switching between a block exclusively for 2D playback $L3_{2D}$ and a block exclusively for 3D playback $L3_{SS}$, is possible simply by switching the AV stream file for playback between the file 2D and the file SS.

<<Other TS Packets Included in the AV Stream File>>

The types of the TS packets contained in the AV stream file include not only those that are converted from the elementary streams shown in FIGS. 6 and 7, but also a program association table (PAT), program map table (PMT), and program clock reference (PCR). The PCR, PMT, and PAT are specified by the European Digital Broadcasting Standard and are intended to regulate the partial transport stream constituting a single program. By using PCR, PMT, and PAT, the AV stream file can be regulated in the same way as the partial transport stream. Specifically, the PAT shows the PID of a PMT included in the same AV stream file. The PID of the PAT itself is 0. The PMT includes the PIDs for the elementary streams representing video, audio, subtitles, etc. included in the same AV stream file, as well as the attribute information for the elementary streams. The PMT also includes various descriptors relating to the AV stream file. The descriptors particularly include copy control information showing whether copying of the AV stream file is permitted or not. The PCR includes information indicating the value of a system time clock (STC) to be associated with the ATS assigned to the PCR itself. The STC referred to here is a clock used as a reference for the PTS and the DTS in a decoder. The decoder uses the PCR to synchronize the STC with the ATC.

Figure 29:
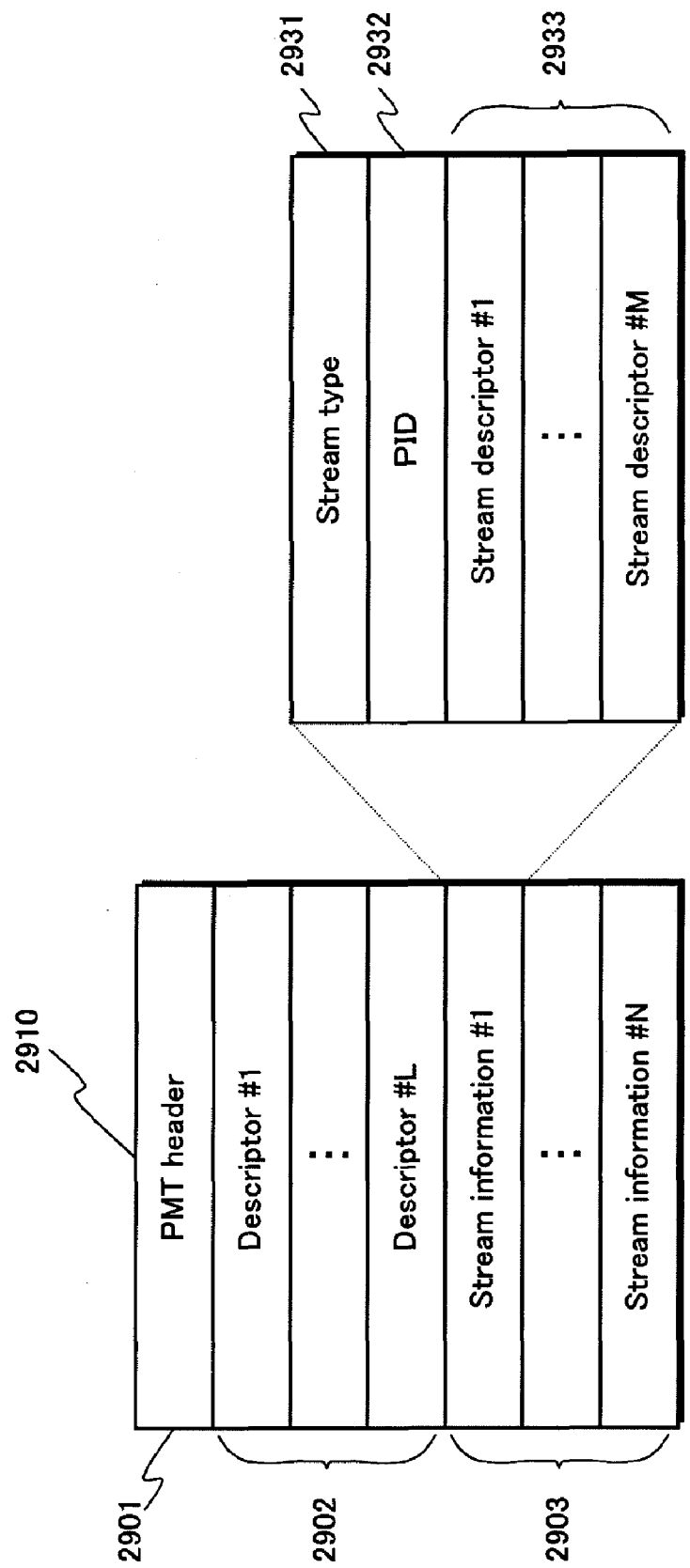
FIG. 29 is a schematic diagram showing the data structure of a PMT 2910.

FIG. 29 is a schematic diagram showing the data structure of a PMT 2910. The PMT 2910 includes a PMT header 2901, a plurality of descriptors 2902, and a plurality of pieces of stream information 2903. The PMT header 2901 indicates the length of data, etc. stored in the PMT 2910. Each descriptor 2902 relates to the entire AV stream file that includes the PMT 2910. The copy control information is included in one of the descriptors 2902. Each piece of stream information 2903 relates to one of the elementary streams included in the AV stream file and is assigned to a different elementary stream. Each piece of stream information 2903 includes a stream type 2931, a PID 2932, and a stream descriptor 2933. The stream type 2931 includes identification information for the codec used for compressing the elementary stream. The PID 2932 indicates the PID of the elementary stream. The stream descriptor 2933 includes attribute information of the elementary stream, such as a frame rate and an aspect ratio.

By using PCR, PMT, and PAT, the decoder in the playback device can be made to process the AV stream file in the same way as the partial transport stream in the European Digital Broadcasting Standard. In this way, it is possible to ensure compatibility between a playback device for the BD-ROM disc 101 and a terminal device conforming to the European Digital Broadcasting Standard.

<<Clip Information File>>

Figure 30:
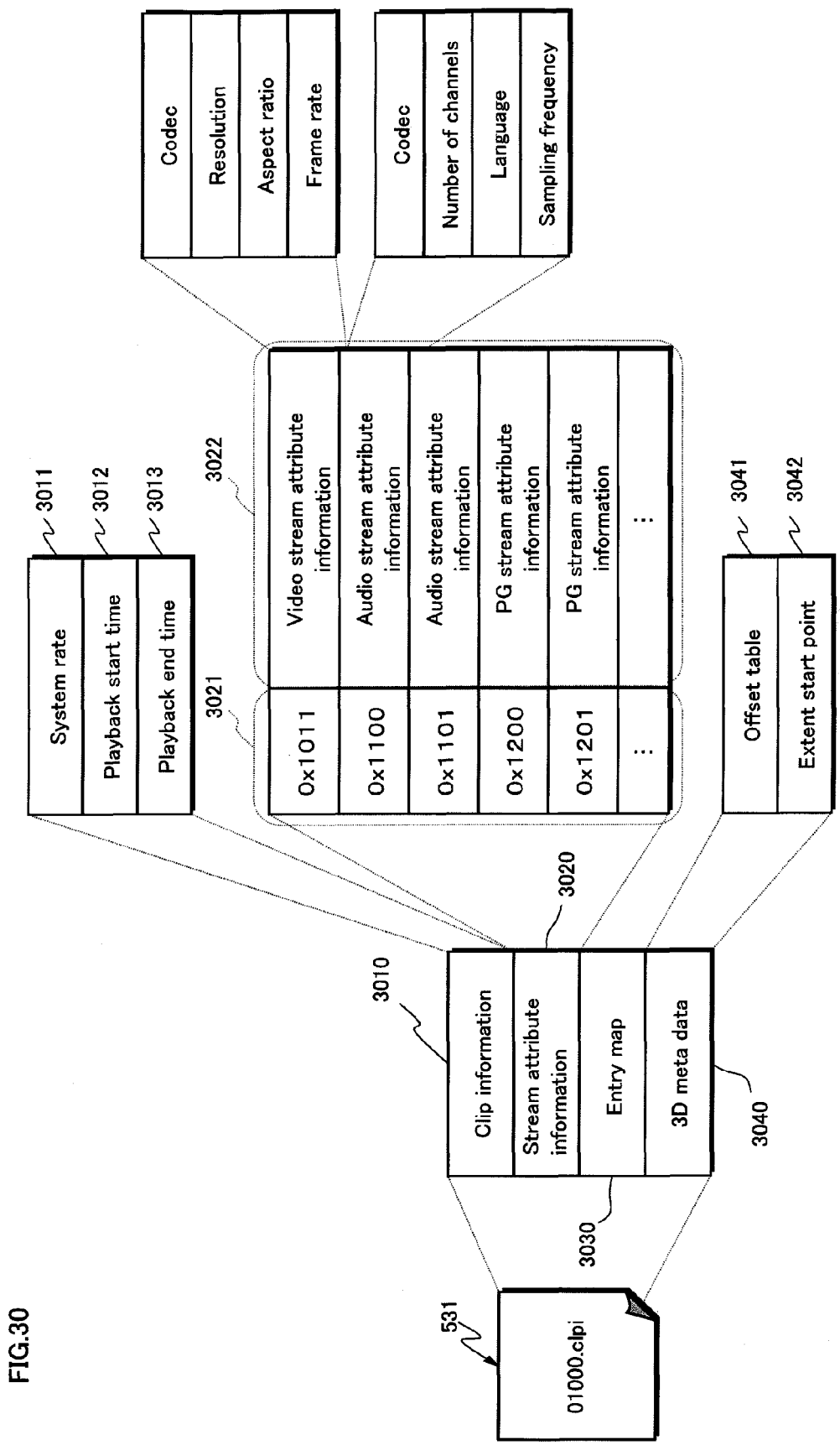
FIG. 30 is a schematic diagram showing the data structure of the 2D clip information file (01000.clip) 531 shown in FIG. 5.

FIG. 30 is a schematic diagram showing the data structure of the first clip information file (01000.clpi), i.e. the 2D clip information file 531. The dependent-view clip information files (02000.clip, 03000.clpi) 532 and 533 have the same data structure. Below, the data structure common to all clip information files is first described, using the data structure of the 2D clip information file 531 as an example. Afterwards, the differences in data structure between a 2D clip information file and a dependent-view clip information file are described.

As shown in FIG. 30, the 2D clip information file 531 includes clip information 3010, stream attribute information 3020, an entry map 3030, and 3D meta data 3040. The 3D meta data 3040 includes an offset table 3041 and an extent start point 3042.

As shown in FIG. 30, the clip information 3010 includes a system rate 3011, a playback start time 3012, and a playback end time 3013. The system rate 3011 indicates the maximum value of the transfer speed at which "TS packets" belonging to the file 2D (01000.m2ts) 541 are transferred from the read buffer in the playback device 102 to the system target decoder. The interval between the ATSs of the source packets in the file 2D 541 is set so that the transfer speed of the TS packets is limited to the system rate or lower. The playback start time 3012 indicates the PTS of the VAU located at the top of the file 2D 541, e.g. the PTS of the top video frame. The playback end time 3012 indicates the value of the STC delayed a predetermined time from the PTS of the VAU located at the end of the file 2D 541, e.g. the sum of the PTS of the last video frame and the playback time of one frame.

As shown in FIG. 30, the stream attribute information 3020 is a correspondence table between the PID 3021 for each elementary stream included in the file 2D 541 with pieces of attribute information 3022. Each piece of attribute information 3022 is different for a video stream, audio stream, PG stream, and IG stream. For example, the attribute information corresponding to the PID 0x1011 for the primary video stream includes a codec type used for the compression of the video stream, as well as a resolution, aspect ratio, and frame rate for each picture constituting the video stream. On the other hand, the attribute information corresponding to the PID 0x1101 for the primary audio stream includes a codec type used for compressing the audio stream, number of channels included in the audio stream, language, and sampling frequency. The playback device 102 uses this attribute information 3022 to initialize the decoder.

[Entry Map]

FIG. 31A is a schematic diagram showing the data structure of an entry map 3030. As shown in FIG. 31A, the entry map 3030 includes tables 3100. There is the same number of tables 3100 as there are video streams multiplexed in the main TS, and tables are assigned one-by-one to each video stream. In FIG. 31A, each table 3100 is distinguished by the PID of the video stream to which it is assigned. Each table 3100 includes an entry map header 3101 and an entry point 3102. The entry map header 3101 includes the PID corresponding to the table 3100 and the total number of entry points 3102 included in the table 3100. The entry point 3102 associates a pair of a PTS 3103 and source packet number (SPN) 3104 with one of individually differing entry points ID (EP_ID)

3105. The PTS 3103 is equivalent to the PTS for one of the I pictures included in the video stream for the PID indicated by the entry map header 3101. The SPN 3104 is equivalent to the SPN for the top of the source packet group stored in the corresponding I picture. An "SPN" refers to the number assigned consecutively from the top to a source packet group belonging to one AV stream file. The SPN is used as the address for each source packet in the AV stream file. In the entry map 3030 in the 2D clip information file 531, the SPN refers to the number assigned to the source packet group belonging to the file 2D 541, i.e. the source packet group constituting the main TS. Accordingly, the entry point 3102 expresses the relationship between the PTS and the address, i.e. the SPN, of each I picture included in the file 2D 541.

An entry point 3102 does not need to be set for all of the I pictures in the file 2D 541. However, when an I picture is located at the top of a GOP, and the TS packet that includes the top of that I picture is located at the top of a 2D extent, an entry point 3102 has to be set for that I picture.

FIG. 31B is a schematic diagram showing source packets in the source packet group 3110 belonging to the file 2D 541 that are associated with each EP_ID 3105 by the entry map 3030. FIG. 31C is a schematic diagram showing the relationships between the source packet group 3110 and the data block group 3120 on the BD-ROM disc 101. When the playback device 102 plays back 2D video images from the file 2D 541, it refers to the entry map 3030 to specify the SPN for the source packet that includes a frame representing an arbitrary scene from the PTS for that frame. Specifically, when for example a PTS=360,000 is indicated as the PTS for a specific entry point for the position to start playback, the playback device 102 first retrieves the SPN=3200 allocated to this PTS in the entry map 3030. Next, the playback device 102 seeks the quotient SPN×192/2,048, i.e. the value of the SPN multiplied by 192 bytes, the data amount per source packet, and divided by 2,048 bytes, the data amount per sector. As can be understood from FIGS. 8B and 8C, this value is the same as the total number of sectors recorded in the main TS prior to the aligned unit that includes the source packet to which the SPN is assigned. In the example shown in FIG. 31B, this value is 3,200×192/2,048=300, and is equal to the total number of sectors on which source packet groups 3111 are recorded from SPN 0 through 3199. Next, the playback device 102 refers to the allocation descriptor in the file entry in the file 2D 541 and specifies the LBN of the (total number+1)$^{th}$ sector, counting from the top of the sector groups in which 2D extent groups are recorded. In the example shown in FIG. 31C, within the sector groups in which the base-view data blocks L1, L2+L3$_{2D}$, L4, . . . which can be accessed as 2D extents EXT2D[0], EXT2D[1], EXT2D[2], . . . are recorded, the LBN of the 301$^{st}$ sector counting from the top is specified. The playback device 102 indicates this LBN to the BD-ROM drive 121. In this way, base-view data block groups are read as aligned units in order from the sector for this LBN. Furthermore, from the first aligned unit that is read in, the playback device 102 selects the source packet indicated by the entry point for the position to start playback and decodes an I picture. From then on, subsequent pictures are decoded in order referring to already decoded pictures. In this way, the playback device 102 can play back 2D video images from the file 2D 541 from a specified PTS onwards.

Furthermore, the entry map 3030 is useful for efficient processing during trickplay such as fast forward, reverse, etc. For example, the playback device 102 in 2D playback mode first refers to the entry map 3030 to read SPNs starting at the position to start playback, e.g. to read SPN=3200, 4800, . . . in order from the entry points EP_ID=2, 3, . . . that include PTSs starting at PTS=360,000. Next, the playback device 102 refers to the file entry in the file 2D 541 to specify the LBN of the sectors corresponding to each SPN. The playback device 102 then indicates each LBN to the BD-ROM drive 121. Aligned units are thus read from the sector for each LBN. Furthermore, from each aligned unit, the playback device 102 selects the source packet indicated by each entry point and decodes an I picture. The playback device 102 can thus selectively play back an I picture from the file 2D 541 without analyzing the 2D extent group EXT2D[n] itself.

[Offset Table]

FIG. 32A is a schematic diagram showing the data structure of an offset table 3041. The offset table 3041 is information used for cropping processing by the playback device 102 in 3D playback mode. "Cropping processing" refers to processing to generate, from a table representing a 2D video image, a pair of pieces of plane data that represent a left-view and a right-view. A piece of "plane data" refers to a two-dimensional array of pixel data. The size of the array is the same as the resolution of a video frame. A piece of pixel data consists of a chromatic coordinate value and an a value (opaqueness). The chromatic coordinate value is expressed as an RGB value or a YCrCb value. The target of cropping processing includes the pieces of plane data generated from the PG streams, IG streams, and secondary video streams in the main TS, as well as the pieces of image plane data generated in accordance with a BD-J object. Cropping processing changes the horizontal position of each piece of pixel data in a piece of plane data. Accordingly, in the pair of pieces of plane data obtained via cropping processing, the presentation positions in the left-view and right-view are shifted to the left and right from the original presentation position in the 2D video image. A viewer is made to perceive a pair of a left-view and a right-view as a single 3D video image due to the binocular parallax produced by these shifts.

As shown in FIG. 32A, the offset table 3041 includes a table 3210 for each PID in PG streams, IG streams, and secondary video streams. Each table 3210 is a correspondence table between PTSs 3201 and offset values 3202. The PTS 3201 represents each piece of plane data generated from PG streams, IG streams, and secondary video streams. The offset value 3202 represents the signed number of pixels by which each piece of pixel data is shifted horizontally by cropping processing. For example, a positive sign represents a shift to the right, and a negative sign a shift to the left. The sign of the offset value 3202 is determined by whether the 3D video image is deeper than the screen or closer to the viewer. Hereinafter, a pair 3203 of a PTS 3201 and an offset value 3202 is referred to as an "offset entry".

FIG. 32B is a schematic diagram showing the valid section of an offset entry. The valid section of an offset entry is, within the time measured by an STC, the interval from the time indicated by the PTS of the offset entry until the time indicated by the PTS of the next offset entry. When the PTS for a piece of plane data belongs to a valid section of a certain offset entry, then during cropping processing, the presentation position of the pixel data in that piece of plane data shifts by the offset value in the offset entry. In the example shown in FIG. 32A, the PTS of offset entry #1 is 180,000, the PTS of offset entry #2 is 270,000, and the PTS of offset entry #3 is 360,000. In this case, as shown in FIG. 32B, an offset value of "+5" in the offset entry #1 is valid in an STC range 3204 from 180,000 to 270,000, and an offset value of "+3" in the offset entry #2 is valid in an STC range 3205 from 270,000 to 360,000.

[Extent Start Point]

FIG. 33A is a schematic diagram showing the data structure of extent start points 3042. As shown in FIG. 33A, the "extent start point" 3042 includes a base-view extent ID (EXT1_ID) 3311 and an SPN 3312. The EXT1_ID 3311 is a serial number assigned consecutively from the top to the base-view data blocks belonging to the first file SS (01000.ssif) 544A. One SPN 3312 is assigned to each EXT1_ID 3311 and is the same as the SPN for the source packet located at the top of the base-view data block identified by the EXT1_ID 3311. This SPN is a serial number assigned from the top to the source packets included in the base-view data block group belonging to the first file SS 544A.

In the data block group in an interleaved arrangement shown in FIG. 16, the file 2D (01000.m2ts) and the first file SS 544A share the base-view data blocks in common. However, in arrangements 1-3 shown in FIGS. 21, 24, and 26, the blocks exclusively for 2D playback belong only to the file 2D 541, and the blocks exclusively for 3D playback belong only to the first file SS 544A. Accordingly, the SPN 3312 that indicates the extent start point 3042 generally differs from the SPN for the source packet located at the top of the 2D extent belonging to the file 2D 541.

FIG. 33B is a schematic diagram showing the data structure of extent start points 3320 included in the second clip information file (02000.clpi), i.e. the right-view clip information file 532. As shown in FIG. 33B, the extent start point 3320 includes right-view extent IDs (EXT2_ID) 3321 and SPNs 3322. The EXT2_IDs 3321 are serial numbers assigned from the top to the right-view data blocks belonging to the first file SS 544A. One SPN 3322 is assigned to each EXT2_ID 3321 and is the same as the SPN for the source packet located at the top of the right-view data block identified by the EXT2_ID 3321. This SPN is a serial number assigned in order from the top to the source packets included in the right-view data block group belonging to the first file SS 544A.

FIG. 33D is a schematic diagram representing the relationship between right-view extents EXT2[0], EXT2[1], . . . belonging to the first file DEP (02000.m2ts) 542 and the SPNs 3322 shown by the extent start points 3320. In all of the data block groups shown in FIGS. 16, 21, 24, and 26, the first file DEP 542 and the first file SS 544A share right-view data blocks in common. Accordingly, as shown in FIG. 33D, each SPN 3322 shown by the extent start point 3320 is the same as the SPN for the source packet located at the top of each right-view extent EXT2[0], EXT2[1], . . . .

As described below, the extent start point 3042 in the 2D clip information file 531 and the extent start point 3320 in the right-view clip information file 532 are used to detect the boundary of data blocks included in each 3D extent when playing back 3D video images from the first file SS 544A.

FIG. 33E is a schematic diagram showing an example of the relationship between 3D extents EXTSS[0], EXTSS[1], . . . belonging to the first file SS 544A and a data block group 3350 on the BD-ROM disc 101. As shown in FIG. 33E, the data block group 3350 is arranged the same way as arrangement 1 shown in FIG. 21. Note that the following description holds for an interleaved arrangement and arrangements 2 and 3. In the data block 3350, the pairs of contiguous right-view data blocks and base-view data blocks R1+L1, R2+L2, R3+L3$_{SS}$, and R4+L4 can respectively be accessed as 3D extents EXTSS[0], EXTSS[1], EXTSS[2], and EXTSS[3]. Furthermore, in the $n^{th}$ 3D extent EXTSS[n] (n=0, 1, 2, . . . ), the number of source packets included in the base-view data block L(n+1) is, in the extent start point 3042, the same as the difference A(n+1)−An between SPNs corresponding to EXT1_ID=n+1 and n (here, A0=0). On the other hand, the number of source packets included in the right-view data block R(n+1) is, in the extent start point 3320, the same as the difference B(n+1)−Bn between SPNs corresponding to EXT2_ID=n+1 and n (here, B0=0).

When the playback device 102 in L/R mode plays back 3D video images from the first file SS 544A, in addition to the entry maps in the clip information files 531 and 532, it also refers to the extent start points 3042 and 3320 to specify, from the PTS for a frame representing the right-view of an arbitrary scene, the LBN for the sector on which a right-view data block that includes the frame is recorded. Specifically, the playback device 102 for example first retrieves the SPN associated with the PTS from the entry map in the right-view clip information file 532. Suppose the source packet indicated by the SPN is included in the third right-view extent EXT2[2] in the first file DEP 542, i.e. the right-view data block R3. Next, the playback device 102 retrieves "B2", the largest SPN before the target SPN, from among the SPNs 3322 shown by the extent start points 3320 in the right-view clip information file 532. The playback device 102 also retrieves the corresponding EXT2_ID "2". Then the playback device 102 retrieves the value "A2" for the SPN 3312 corresponding to the EXT1_ID which is the same as the EXT2_ID "2". The playback device 102 further seeks the sum B2+A2 of the retrieved SPNs 3322 and 3312. As can be seen from FIG. 33E, this sum B2+A2 is the same as the total number of source packets included in the data blocks located before the third right-view data block R3 among the data blocks included in the 3D extent group EXTSS[0], EXTSS[1], . . . . Accordingly, this sum B2+A2 multiplied by 192 bytes, the data amount per source packet, and divided by 2,048 bytes, the data amount per sector, i.e. (B2+A2)×192/2,048, is the same as the number of sectors from the top of the 3D extent group until immediately before the third right-view data block R3. Using this quotient, the LBN for the sector on which the top of the right-view data block R3 is recorded can be specified by tracing the allocation descriptors in the file entry for the first file SS 544A.

After specifying the LBN via the above-described procedure, the playback device 102 indicates the LBN to the BD-ROM drive 121. In this way, the 3D extent group recorded starting with the sector for this LBN, i.e. the 3D extent group starting with the third right-view data block R3, is read as aligned units.

The playback device 102 further refers to the extent start points 3042 and 3320 to extract dependent-view data blocks and base-view data blocks alternately from the read 3D extents. For example, assume that the 3D extent group EXTSS[n] (n=0, 1, 2, . . . ) is read in order from the data block group 3350 shown in FIG. 33E. The playback device 102 first extracts B1 source packets from the top of the 3D extent EXTSS[0] as the dependent-view data block R1. Next, the playback device 102 extracts the B1$^{th}$ source packet and the subsequent (A1−1) source packets, a total of A1 source packets, as the first base-view data block L1. The playback device 102 then extracts the (B1+A1)$^{th}$ source packet and the subsequent (B2−B1−1) source packets, a total of (B2−B1) source packets, as the second dependent-view data block R2. The playback device 102 further extracts the (A1+B2)$^{th}$ source packet and the subsequent (A2−A1−1) source packets, a total of (A2−A1) source packets, as the second base-view data block L2. Thereafter, the playback device 102 thus continues to detect the boundary between data blocks in each 3D extent based on the number of read source packets, thereby alternately extracting dependent-view and base-view data blocks. The extracted base-view and right-view data blocks are transmitted to the system target decoder to be decoded in parallel.

In this way, the playback device 102 in L/R mode can play back 3D video images from the first file SS 544A starting at a specific PTS. As a result, the playback device 102 can in fact benefit from the above-described advantages (A) and (B) regarding control of the BD-ROM drive 121.

<<File Base>>

FIG. 33C is a schematic diagram representing the base-view data blocks L1, L2, . . . extracted from the first file SS 544A by the playback device 102 in L/R mode. The data block group 3350 shown in FIG. 33C includes both a block exclusively for 2D playback $L3_{2D}$ and a block exclusively for 3D playback $L3_{SS}$. Unlike the 2D extent group in the file 2D 541, the base-view data block group shown in FIG. 33C includes a block exclusively for 3D playback $L3_{SS}$ in addition to a block exclusively for 2D playback $L3_{2D}$. Accordingly, the SPNs 3312 shown by the extent start points 3042 are the same as the SPNs for the source packets located at the tops of base-view data blocks. The base-view data block group extracted from a single file SS by referring to extent start points, like the base-view data block group shown in FIG. 33C, is referred to as a "file base". Furthermore, the base-view data blocks included in a file base are referred to as "base-view extents". Each base-view extent, as shown in FIG. 33C, is referred to by an extent start point in a 2D clip information file.

With the exception of a block exclusively for 2D playback and a block exclusively for 3D playback, a base-view extent shares the same data, i.e. base-view data block, with a 2D extent. Furthermore, blocks exclusively for 2D playback and blocks exclusively for 3D playback match bit-for-bit. Accordingly, the file base includes the same main TS as the file 2D. Unlike 2D extents, however, base-view extents are not referred to by allocation descriptors in a file entry in any file. As described above, base-view extents refer to extent start points in a clip information file to extract 3D extents from the file SS. The file base thus differs from a conventional file shown in FIG. 4 by not including a file entry and by needing an extent start point as a reference for a base-view extent. In this sense, the file base is a "virtual file". In particular, the file base is not recognized by the file system and does not appear in the directory/file structure shown in FIG. 5.

Figure 34:
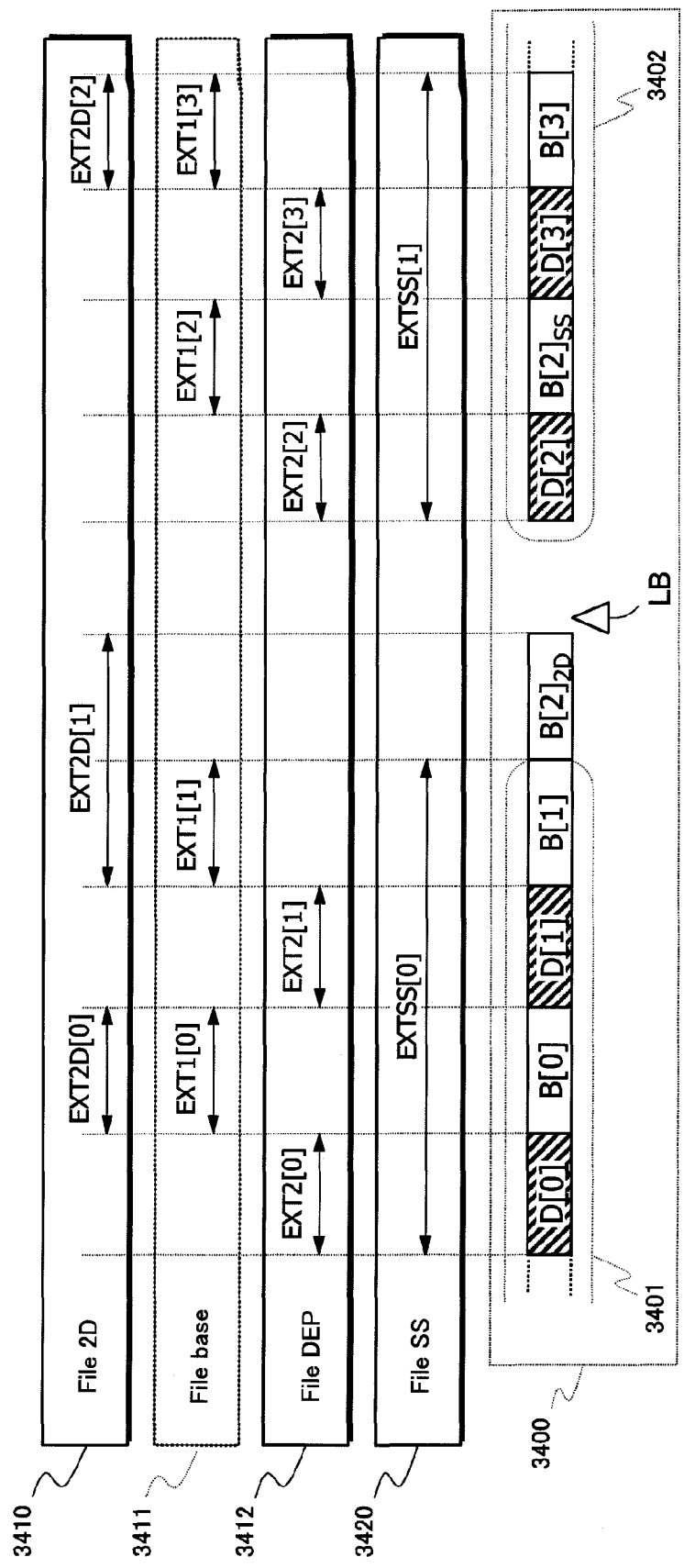
FIG. 34 is a schematic diagram showing an example of an arrangement of data blocks, which include 3D video content, that are recorded on a BD-ROM disc 101 according to embodiment 1 of the present invention.

The 3D video content recorded on the BD-ROM disc 101 may have only one type of sub-TS corresponding to the main TS. FIG. 34 is a schematic diagram showing an example of a physical arrangement on the BD-ROM 101 of data blocks that include such content (e.g., such that each of a shared stereoscopic/monoscopic area, a dedicated stereoscopic area and a dedicated monoscopic area is a physical area of the BD-ROM 101). As shown in FIG. 34, unlike the data block groups shown in FIGS. 16 and 21, the data block group 3400 alternately includes dependent-view data blocks D[n] (n= . . . , 0, 1, 2, 3, . . . ) and base-view data blocks B[n]. Before the layer boundary LB, the dependent-view data block group . . . , D[0], D[1] and the base-view data block group . . . , B[0], B[1] are recorded in an interleaved arrangement to constitute the first 3D extent block 3401. A block exclusively for 2D playback $B[2]_{2D}$ is placed between the last data block in the first 3D extent block 3401, B[1], and the layer boundary LB. On the other hand, after the layer boundary LB, the dependent-view data block group D[2], D[3], . . . and the base-view data block group $B[2]_{SS}$, B[3], . . . are recorded in an interleaved arrangement to constitute the second 3D extent block 3402. The base-view data block $B[2]_{SS}$ at the top of the second 3D extent block 3402 is a block exclusively for 3D playback and matches bit-for-bit with the block exclusively for 2D playback $B[2]_{2D}$.

FIG. 34 also shows the correspondence between the data block group 3400 and the extent group in the file 2D 3410. The base-view data blocks . . . , B[0] in the first 3D extent block 3401, with the exception of the last data block B[1], belong to the file 2D 3410 as independent, single 2D extents . . . , EXT2D[0]. A pair of the last base-view data block B[1] in the first 3D extent block 3401 and the immediately subsequent block exclusively for 2D playback $B[2]_{2D}$ belong to the file 2D 3410 as a single 2D extent EXT2D[1]. The base-view data blocks B[3], . . . in the second 3D extent block 3402, with the exception of the block exclusively for 3D playback $B[2]_{SS}$, belong to the file 2D 3410 as 2D extents EXT2D[2], . . . . The 2D extents can be accessed by referring to the allocation descriptors in the file entry of the file 2D 3410.

FIG. 34 also shows the correspondence between the data block group 3400 and the extent group in the file DEP 3412. The dependent-view data blocks . . . , D[0], D[1] in the first 3D extent block 3401 and the dependent-view data blocks D[2], D[3], . . . in the second 3D extent block 3402 belong to the file DEP 3412 as dependent-view extents . . . , EXT2[0], EXT2[1], EXT2[2], . . . . The dependent-view extents can be accessed by referring to the allocation descriptors in the file entry of the file DEP 3412.

FIG. 34 also shows the correspondence between the data block group 3400 and the extent group in the file SS 3420. Unlike the data block group shown in FIG. 16, the data block group 3400 does not include depth map data blocks. Accordingly, in any interleaved arrangement within the 3D extent blocks 3401 and 3402, the dependent-view data blocks . . . , D[0], D[1], D[2], D[3], . . . and the base-view data blocks . . . , B[0], B[1], $B[2]_{SS}$, B[3], . . . alternate. In this case, the file SS 3420 may include a section with two or more contiguous pairs of dependent-view data blocks and base-view data blocks having the same extent ATC time as one 3D extent. In FIG. 34, two contiguous dependent-view data blocks and base-view data blocks in the first 3D extent block 3401, the pairs D[0]+B[0] and D[1]+B[1], belong to the file SS 3420 as one 3D extent EXTSS[0]. Furthermore, two contiguous dependent-view data blocks and base-view data blocks in the second 3D extent block 3402, the pairs D[2]+B$[2]_{SS}$ and D[3]+B[3], belong to the file SS 3420 as one 3D extent EXTSS[1]. The 3D extents EXTSS[0] and EXTSS[1] share the base-view data blocks B[0], B[1], $B[2]_{SS}$, and B[3] with the 2D extents EXT2D[0], EXT2D[1], EXT2D[2], and EXT2D[3] and share the dependent-view data blocks D[0], D[1], D[2], and D[3] with the dependent-view extents EXT2[0], EXT2[1], EXT2[2], and EXT2[3]. The 3D extents can be accessed by referring to the allocation descriptors in the file entry of the file SS 3420.

After the playback device 102 reads the 3D extents EXTSS[0] and EXTSS[1], it refers to the extent start points in the respective clip information files for the file 2D 3410 and the file DEP 3412 to extract base-view data blocks B[0], B[1], $B[2]_{SS}$, and B[3] from the 3D extents EXTSS[0] and EXTSS[1]. These base-view data blocks B[0], B[1], $B[2]_{SS}$, and B[3] belong to the file base 3411 as base-view extents EXT1[0], EXT1[1], EXT1[2], and EXT1[3]. Each of the base-view extents EXT1[0], EXT1[1], EXT1[2], and EXT1[3] is referred to by an extent start point in the 2D clip information file corresponding to the file 2D 3410.

Hereinafter, except when there is a need to distinguish, base-view data blocks are equated with base-view extents (with the exception of blocks exclusively for 2D playback), and dependent-view data blocks are equated with dependent-view extents.

<<Dependent-View Clip Information File>>

The dependent-view clip information file has the same data structure as the 2D clip information file shown in FIGS. 30-33. Accordingly, the following description covers the differences between the dependent-view clip information file and the 2D clip information file, citing the above description with regard to the similarities.

A dependent-view clip information file differs from a 2D clip information file in the following three points: (i) conditions are placed on the stream attribute information, (ii) conditions are placed on the entry points, and (iii) the 3D meta data does not include offset tables.

(i) When the base-view video stream and the dependent-view video stream are to be used for playback of 3D video images by a playback device 102 in L/R mode, as shown in FIG. 9, the dependent-view video stream is compressed using the base-view video stream. At this point, the video stream attributes of the dependent-view video stream become equivalent to the base-view video stream. The video stream attribute information for the base-view video stream is associated with PID=0x1011 in the stream attribute information 3020 in the 2D clip information file. The video stream attribute information for the dependent-view video stream is associated with PID=0x1012 or 0x1013 in the stream attribute information in the dependent-view clip information file. Accordingly, the items shown in FIG. 30, i.e. the codec, resolution, aspect ratio, and frame rate, have to match between these two pieces of video stream attribute information. If the codec type matches, then a reference relationship between pictures in the base-view video stream and the dependent-view video stream is established during coding, and thus each picture can be decoded. If the resolution, aspect ratio, and frame rate all match, then on-screen presentation of the left and right videos can be synchronized. Therefore, these videos can be shown as 3D video images without making the viewer feel uncomfortable.

(ii) The entry map in the dependent-view clip information file includes a table allocated to the dependent-view video stream. Like the table 3100 shown in FIG. 31A, this table includes an entry map header and entry points. The entry map header indicates the PID for the dependent-view video stream allocated to the table, i.e. either 0x1012 or 0x1013. In each entry point, a pair of a PTS and an SPN is associated with a single EP_ID. The PTS for each entry point is the same as the PTS for the top picture in one of the GOPs included in the dependent-view video stream. The SPN for each entry point is the same as the top SPN of the source packet group stored in the picture indicated by the PTS belonging to the same entry point. This SPN refers to a serial number assigned consecutively from the top to the source packet group belonging to the file DEP, i.e. the source packet group constituting the sub-TS. The PTS for each entry point has to match the PTS, within the entry map in the 2D clip information file, for the entry point in the table allotted to the base-view video stream. In other words, whenever an entry point is set to the top of a source packet group that includes one of a set of pictures included in the same 3D VAU, an entry point always has to be set to the top of the source packet group that includes the other picture.

Figure 35:
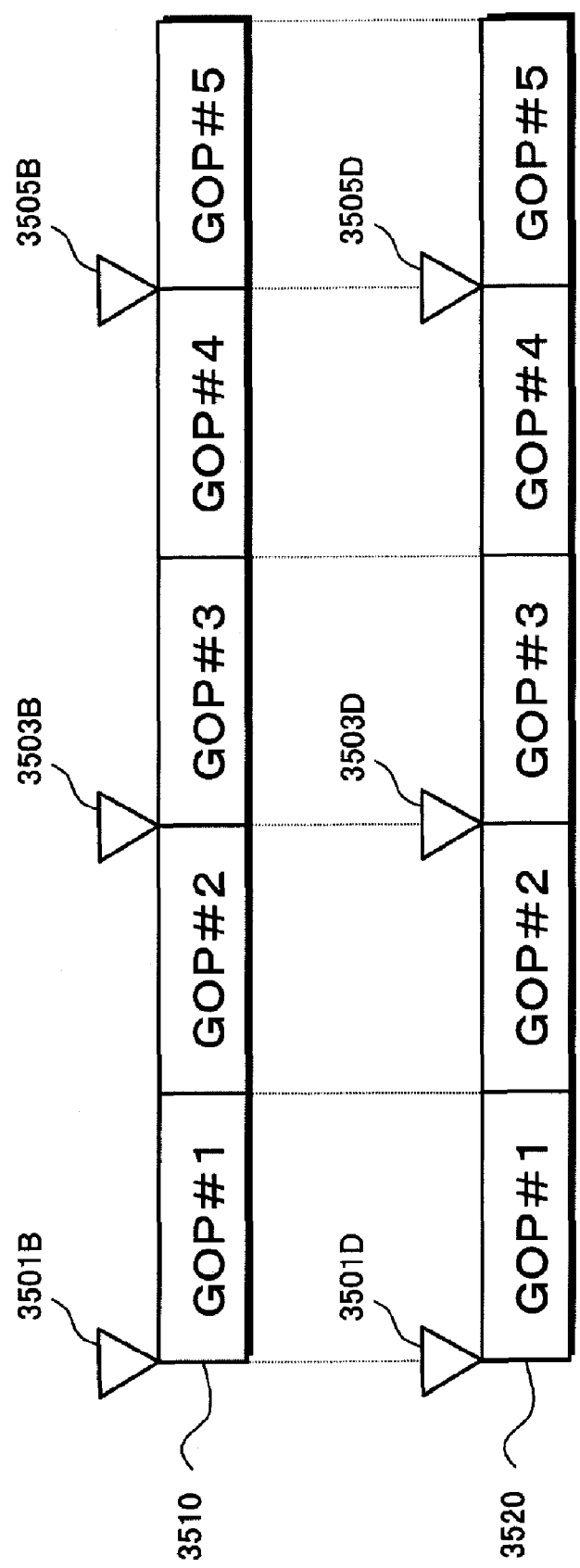
FIG. 35 is a schematic diagram showing an example of entry points set in a base-view video stream 3510 and a dependent-view video stream 3520 on a BD-ROM disc 101 according to embodiment 1 of the present invention.

FIG. 35 is a schematic diagram showing an example of entry points set in a base-view video stream 3510 and a dependent-view video stream 3520. In the two video streams 3510 and 3520, GOPs that are the same number from the top represent video for the same playback period. As shown in FIG. 35, in the base-view video stream 3510, entry points 3501B, 3503B, and 3505B are set to the top of the odd-numbered GOPS as counted from the top, i.e. GOP #1, GOP #3, and GOP #5. Accordingly, in the dependent-view video stream 3520 as well, entry points 3501D, 3503D, and 3505D are set to the top of the odd-numbered GOPS as counted from the top, i.e. GOP #1, GOP #3, and GOP #5. In this case, when the 3D playback device 102 begins playback of 3D video images from GOP #3, for example, it can immediately calculate the address of the position to start playback in the file SS from the SPN of the corresponding entry points 3503B and 3503D. In particular, when both entry points 3503B and 3503D are set to the top of a data block, then as can be understood from FIG. 33E, the sum of the SPNs of the entry points 3503B and 3503D is the same as the number of source packets from the top of the file SS up to the position to start playback. As described with reference to FIG. 33E, from this number of source packets, it is possible to calculate the LBN of the sector on which the part of the file SS for the position to start playback is recorded. In this way, even during playback of 3D video images, it is possible to improve response speed for processing that requires random access to the video stream, such as interrupt playback or the like.

<<2D Playlist File>>

Figure 36:
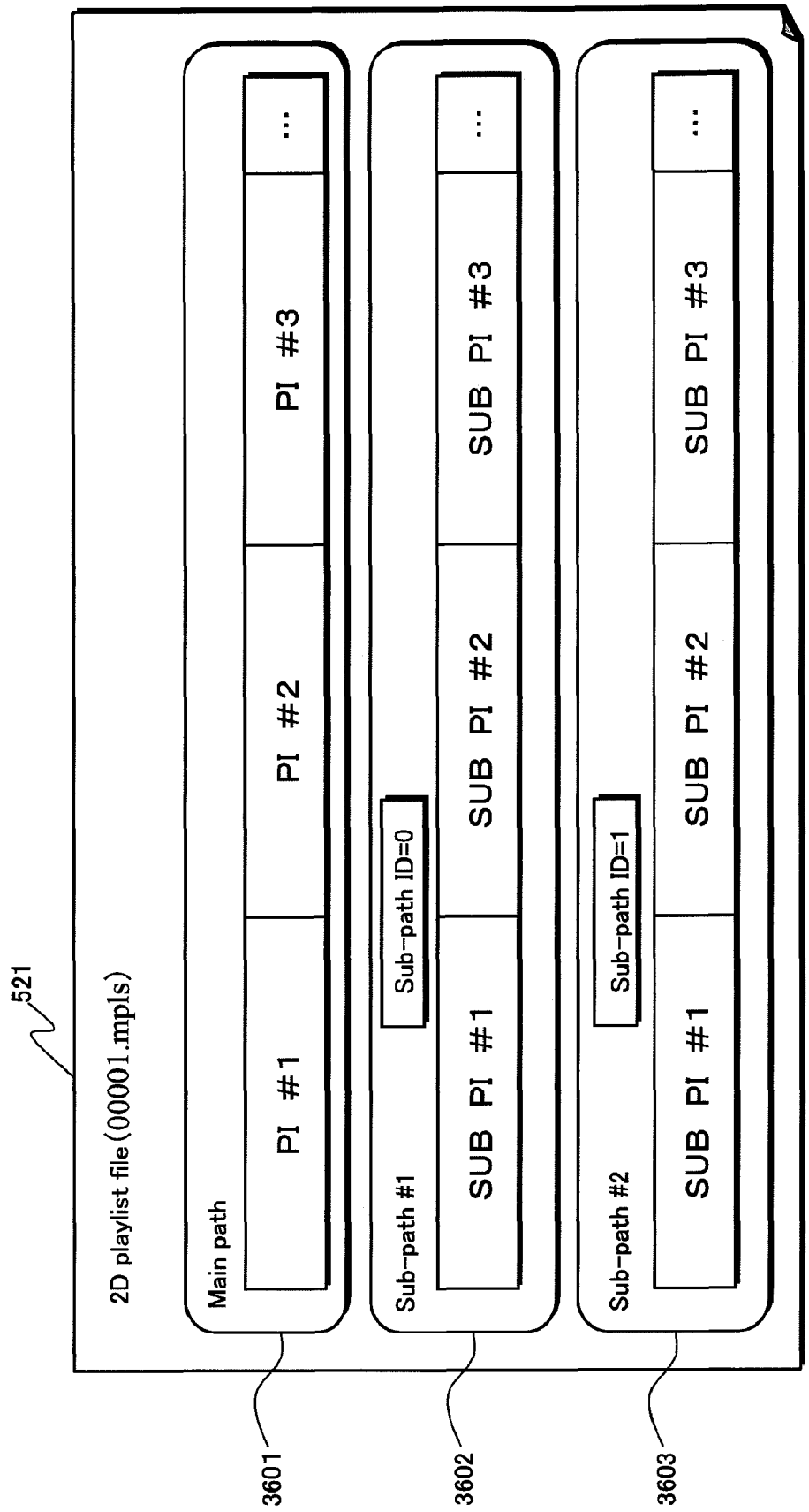
FIG. 36 is a schematic diagram showing the data structure of the 2D playlist file (00001.mpls) shown in FIG. 5.

FIG. 36 is a schematic diagram showing the data structure of a 2D playlist file. The first playlist file (00001.mpls) 521 shown in FIG. 5 has this data structure. As shown in FIG. 36, the 2D playlist file 521 includes a main path 3601 and two sub-paths 3602 and 3603.

The main path 3601 is a sequence of playitem information pieces (PI) that defines the main playback path for the file 2D 541, i.e. the section for playback and the section's playback order. Each PI is identified with a unique playitem ID=#N (N=1, 2, 3, . . . ). Each PI#N defines a different playback section along the main playback path with a pair of PTSs. One of the PTSs in the pair represents the start time (In-Time) of the playback section, and the other represents the end time (Out-Time). Furthermore, the order of the PIs in the main path 3601 represents the order of corresponding playback sections in the playback path.

Each of the sub-paths 3602 and 3603 is a sequence of sub-playitem information pieces (SUB_PI) that defines a playback path that can be associated in parallel with the main playback path for the file 2D 541. Such a playback path is a different section of the file 2D 541 than is represented by the main path 3601, or is a section of stream data multiplexed in another file 2D, along with the corresponding playback order. Such stream data represents other 2D video images to be played back simultaneously with 2D video images played back from the file 2D 541 in accordance with the main path 3601. These other 2D video images include, for example, sub-video in a picture-in-picture format, a browser window, a pop-up menu, or subtitles. Serial numbers "0" and "1" are assigned to the sub-paths 3602 and 3603 in the order of registration in the 2D playlist file 521. These serial numbers are used as sub-path IDs to identify the sub-paths 3602 and 3603. In the sub-paths 3602 and 3603, each SUB_PI is identified by a unique sub-playitem ID=#M (M=1, 2, 3, . . . ). Each SUB_PI#M defines a different playback section along the playback path with a pair of PTSs. One of the PTSs in the pair represents the playback start time of the playback section, and the other represents the playback end time. Furthermore, the order of the SUB_PIs in the sub-paths 3602 and 3603 represents the order of corresponding playback sections in the playback path.

FIG. 37 is a schematic diagram showing the data structure of a PI#N. As shown in FIG. 37, a PI#N includes a piece of reference clip information 3701, a playback start time (In_Time) 3702, a playback end time (Out_Time) 3703, a connection condition 3704, and a stream selection table (hereinafter referred to as "STN table" (stream number table)) 3705. The reference clip information 3701 is information for identifying the 2D clip information file 531. The playback start time 3702 and playback end time 3703 respectively indicate PTSs for the beginning and the end of the section for playback of the file 2D 541. The connection condition 3704 specifies a condition for connecting video in the playback section specified by a playback start time 3702 and a playback end time 3703 to video in the playback section specified by the previous PI# (N−1). The STN table 3705 is a list of elementary streams that can be selected from the file 2D 541 by the decoder in the playback device 102 from the playback start time 3702 until the playback end time 3703.

The data structure of a SUB_PI is the same as the data structure of the PI shown in FIG. 37 insofar as it includes reference clip information, a playback start time, and a playback end time. In particular, the playback start time and playback end time of a SUB_PI are expressed as values along the same time axis as a PI. The SUB_PI further includes an "SP connection condition" field. The SP connection condition has the same meaning as a PI connection condition.

[Connection Condition]

The connection condition 3704 has three possible values, "1", "5", and "6". When the connection condition 3704 is "1", the video to be played back from the section of the file 2D 541 specified by the PI#N does not need to be seamlessly connected to the video played back from the section of the file 2D 541 specified by the immediately preceding PI#N. On the other hand, when the connection condition 3704 indicates "5" or "6", both video images need to be seamlessly connected.

FIGS. 38A and 38B are schematic diagrams showing the relationship between playback sections 3801 and 3802 that are to be connected when the connection condition 3704 shown in FIG. 37 respectively indicates "5" and "6". In this case, the PI#N(N−1) specifies a first section 3801 in the file 2D 541, and the PI#N specifies a second section 3802 in the file 2D 541. As shown in FIG. 38A, when the connection condition 3704 indicates "5", the STCs of the PI#(N−1) and PI#N may be nonconsecutive. That is, the PTS#1 at the end of the first section 3801 and the PTS#2 at the top of the second section 3802 may be nonconsecutive. Several constraint conditions, however, need to be satisfied. For example, the first section 3801 and second section 3802 need to be created so that the decoder can smoothly continue to decode data even when the second section 3802 is supplied to the decoder consecutively after the first section 3801. Furthermore, the last frame of the audio stream contained in the first section 3801 needs to overlap the top frame of the audio stream contained in the second section 3802. On the other hand, as shown in FIG. 38B, when the connection condition 3704 indicates "6", the first section 3801 and the second section 3802 need to be able to be handled as successive sections for the decoder to duly decode. That is, STCs and ATCs need to be consecutive between the first section 3801 and the second section 3802. Similarly, when the SP connection condition is "5" or "6", STCs and ATCs need to be consecutive between sections of the file 2D specified by two consecutive SUB_PIs.

[STN Table]

Referring again to FIG. 37, the STN table 3705 is an array of stream registration information. "Stream registration information" is information individually listing the elementary streams that can be selected for playback from the main TS between the playback start time 3702 and playback end time 3703. The stream number (STN) 3706 is a serial number allocated individually to stream registration information and is used by the playback device 102 to identify each elementary stream. The STN 3706 further indicates priority for selection among elementary streams of the same type. The stream registration information includes a stream entry 3709 and stream attribute information 3710. The stream entry 3709 includes stream path information 3707 and stream identification information 3708. The stream path information 3707 is information indicating the file 2D to which the selected elementary stream belongs. For example, if the stream path information 3707 indicates "main path", the file 2D corresponds to the 2D clip information file indicated by reference clip information 3701. On the other hand, if the stream path information 3707 indicates "sub-path ID=1", the file 2D to which the selected elementary stream belongs corresponds to the 2D clip information file indicated by the reference clip information of the SUB_PI included in the sub-path with a sub-path ID=1. The playback start time and playback end time specified by this SUB_PI are both included in the interval from the playback start time 3702 until the playback end time 3703 specified by the PI included in the STN table 3705. The stream identification information 3708 indicates the PID for the elementary stream multiplexed in the file 2D specified by the stream path information 3707. The elementary stream indicated by this PID can be selected from the playback start time 3702 until the playback end time 3703. The stream attribute information 3710 indicates attribute information for each elementary stream. For example, the attribute information of an audio stream, a PG stream, and an IG stream indicates a language type of the stream.

[Playback of 2D Video Images in Accordance with a 2D Playlist File]

Figure 39:
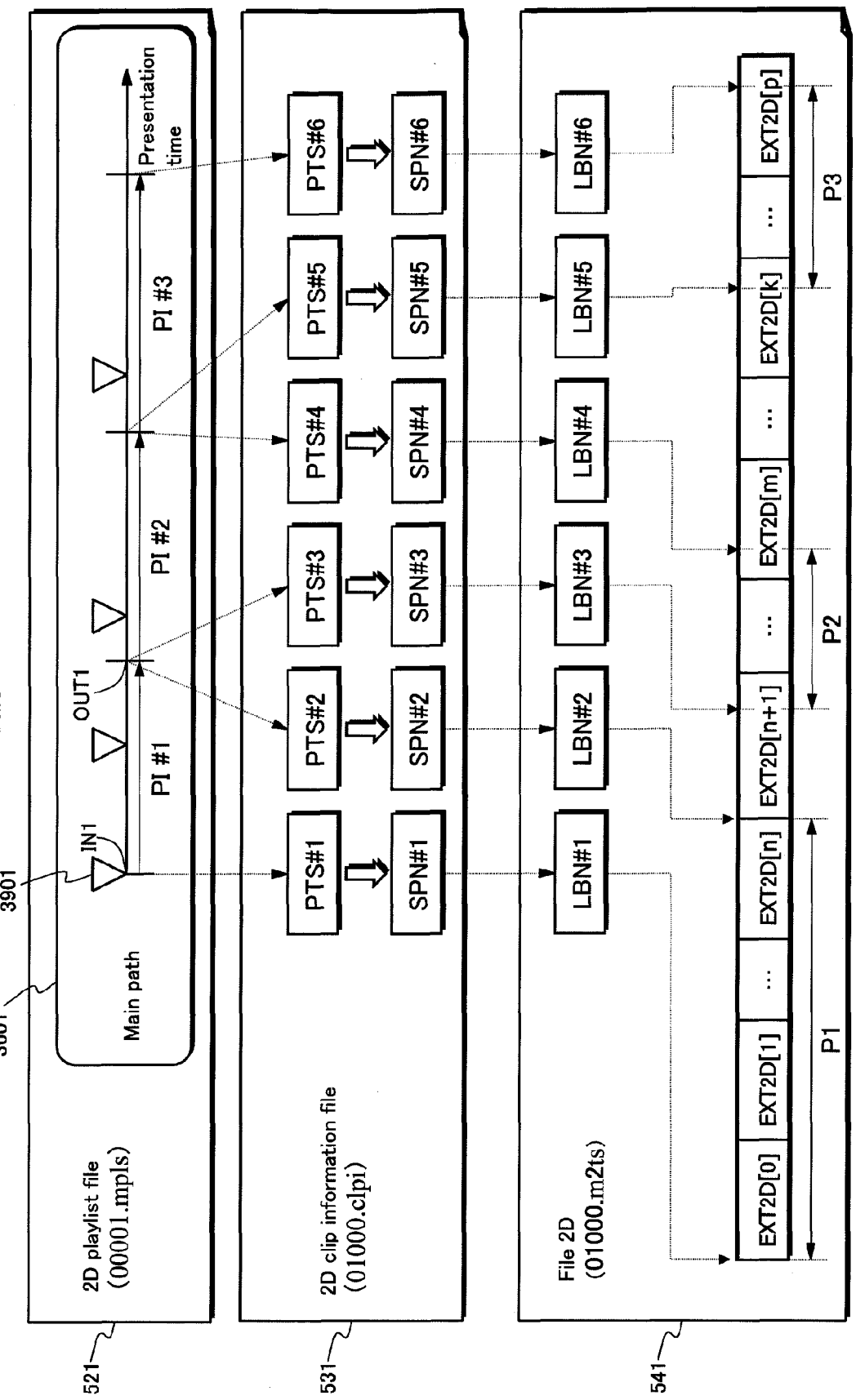
FIG. 39 is a schematic diagram showing the relationships between the PTSs indicated by the 2D playlist file (00001.mpls) 521 shown in FIG. 36 and the sections played back from the file 2D (01000.m2ts) 541 shown in FIG. 5.

FIG. 39 is a schematic diagram showing the relationships between the PTSs indicated by the 2D playlist file (00001.mpls) 521 and the sections played back from the file 2D (01000.m2ts) 541. As shown in FIG. 39, in the main path 3601 in the 2D playlist file 521, the PI#1 specifies a PTS#1, which indicates a playback start time IN1, and a PTS#2, which indicates a playback end time OUT1. The reference clip information 3701 for the PI#1 indicates the 2D clip information file (01000.clpi) 531. When playing back 2D video images in accordance with the 2D playlist file 521, the playback device 102 first reads the PTS#1 and PTS#2 from the PI#1. Next, the playback device 102 refers to the entry map in the 2D clip information file 531 to retrieve from the file 2D 541 the SPN#1 and SPN#2 that correspond to the PTS#1 and PTS#2. The playback device 102 then calculates the corresponding numbers of sectors from the SPN#1 and SPN#2. Furthermore, the playback device 102 refers to these numbers of sectors and the allocation descriptors in the file entry for the file 2D 541 to specify the LBN#1 and LBN#2 at the beginning and end, respectively, of the sector group P1 on which the 2D extent group EXT2D[0], ..., EXT2D[n] to be played back is recorded. Calculation of the numbers of sectors and specification of the LBNs are as per the description of FIGS. 31B and 31C. Finally, the playback device 102 indicates the range from LBN#1 to LBN#2 to the BD-ROM drive 121. The source packet group belonging to the 2D extent group EXT2D[0], ..., EXT2D[n] is thus read from the sector group P1 in this range. Similarly, the pair PTS#3 and PTS#4 indicated by the PI#2 are first converted into a pair of SPN#3 and SPN#4 by referring to the entry map in the 2D clip information file 531. Then, referring to the allocation descriptors in the file entry for the file 2D 541, the pair of SPN#3 and SPN#4 are converted into a pair of LBN#3 and LBN#4. Furthermore, a source packet group belonging to the 2D extent group is read from the sector group P2 in a range from the LBN#3 to the LBN#4. Conversion of a pair of PTS#5 and PTS#6 indicated by the PI#3 to a pair of SPN#5 and SPN#6, conversion of the pair of SPN#5 and SPN#6 to a pair of LBN#5 and LBN#6, and reading of a source packet group from the sector group P3 in a range from the LBN#5 to the LBN#6 are similarly performed. The playback device 102 thus plays back 2D video images from the file 2D 541 in accordance with the main path 3601 in the 2D playlist file 521.

The 2D playlist file 521 may include an entry mark 3901. The entry mark 3901 indicates a time point in the main path 3601 at which playback is actually to start. For example, as shown in FIG. 39, multiple entry marks 3901 can be set for the PI#1. The entry mark 3901 is particularly used for searching for a position to start playback during random access. For example, when the 2D playlist file 521 specifies a playback path for a movie title, the entry marks 3901 are, assigned to the top of each chapter. Consequently, the playback device 102 can play back the movie title by chapters.

[3D Playlist File]

Figure 40:
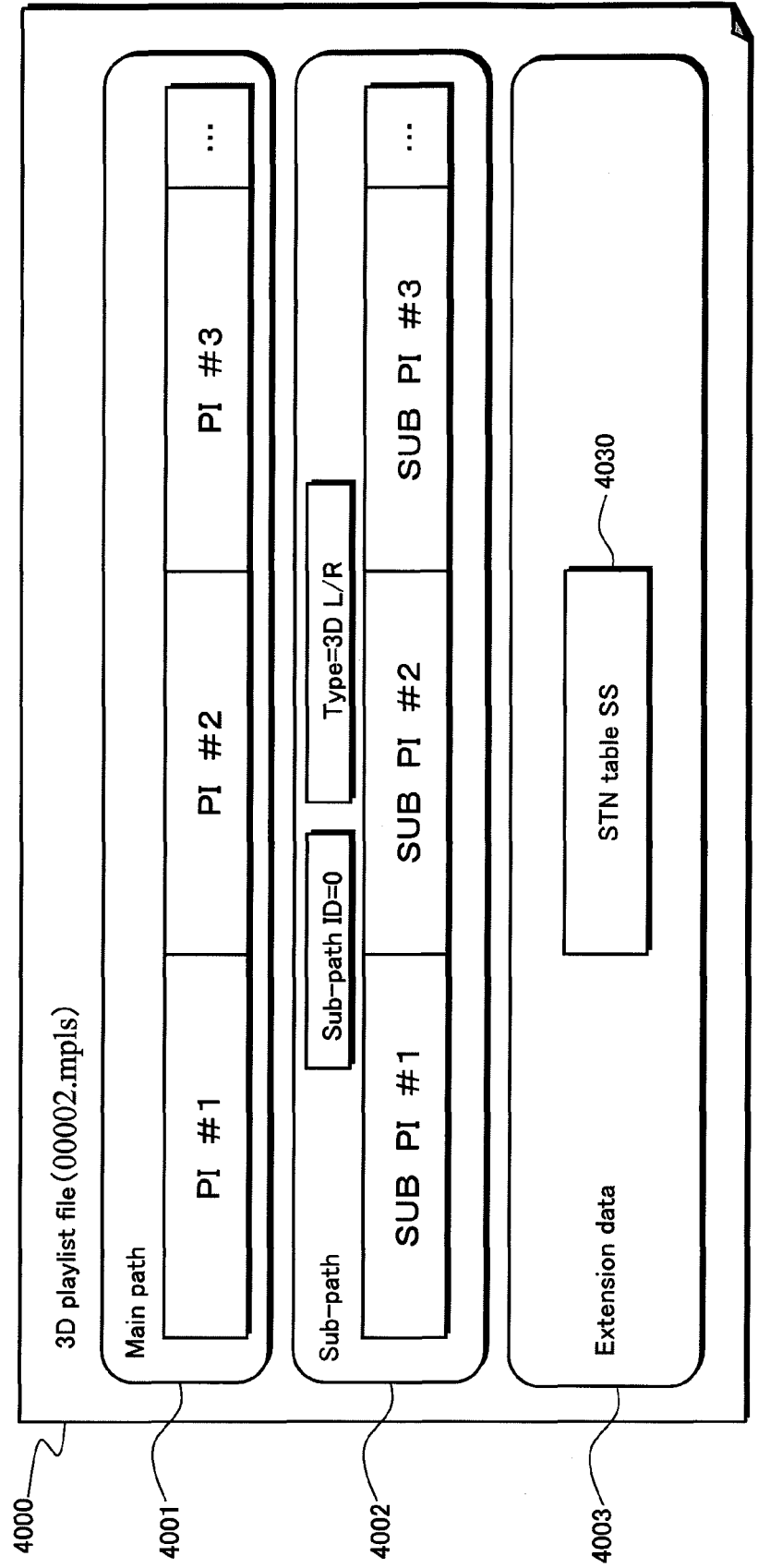
FIG. 40 is a schematic diagram showing the data structure of the 3D playlist file (00002.mpls) 522 or (00003.mpls) 523 shown in FIG. 5.

FIG. 40 is a schematic diagram showing the data structure of the 3D playlist file 4000. The second playlist file (00002.mpls) 522 and second playlist file (00003.mpls) 523 shown in FIG. 5 both have the same data structure as this 3D playlist file. As shown in FIG. 40, the 3D playlist file 4000 includes a main path 4001, sub-path 4002, and extension data 4003.

The main path 4001 specifies the playback path of the main TS shown in FIG. 6A. Accordingly, the main path 4001 is the same as the main path 3601 for the 2D playlist file shown in FIG. 36. The playback device 102 in 2D playback mode can play back 2D video images from the file 2D 541 in accordance with the main path 4001 in the 3D playlist file 4000.

The sub-path 4002 specifies the playback path for the sub-TSs shown in FIGS. 6B and 6C, i.e. the playback path for both the first file DEP 542 and the second file DEP 543. The data structure of the sub-path 4002 is the same as the data structure of the sub-paths 3602 and 3603 in the 2D playlist file shown in FIG. 36. Accordingly, the description of FIG. 36 is cited regarding details on this similar data structure, in particular regarding details on the data structure of the SUB_PI.

The SUB_PI#N (N=1, 2, 3, . . . ) in the sub-path 4002 are in one-to-one correspondence with the PI#N in the main path 4001. Furthermore, the playback start time and playback end time specified by each SUB_PI#N is the same as the playback start time and playback end time specified by the corresponding PI#N. The sub-path 4002 additionally includes a sub-path type 4021. The "sub-path type" generally indicates whether playback processing should be synchronized between the main path and the sub-path. In the 3D playlist file 4000, the sub-path type 4021 in particular indicates the type of the 3D playback mode, i.e. the type of the dependent-view video stream to be played back in accordance with the sub-path 4002. In FIG. 40, the value of the sub-path type 4021 is "3D L/R", thus indicating that the 3D playback mode is L/R mode, i.e. that the right-view video stream is targeted for playback. On the other hand, a value of "3D depth" for the sub-path type 4021 indicates that the 3D playback mode is depth mode, i.e. that the depth map stream is targeted for playback. When the playback device 102 in 3D playback mode detects that the value of the sub-path type 4021 is "3D L/R" or "3D depth", the playback device 102 synchronizes playback processing in accordance with the main path 4001 with playback processing in accordance with the sub-path 4002.

Only the playback device 102 in 3D playback mode interprets the extension data 4003; the playback device 102 in 2D playback mode ignores the extension data 4003. In particular, the extension data 4003 includes an extension stream selection table 4030. The "extension stream selection table (STN_table_SS)" (hereinafter abbreviated as STN table SS) is an array of stream registration information to be added to the STN tables indicated by each PI in the main path 4001. This stream registration information indicates elementary streams that can be selected for playback from the main TS.

Figure 41:
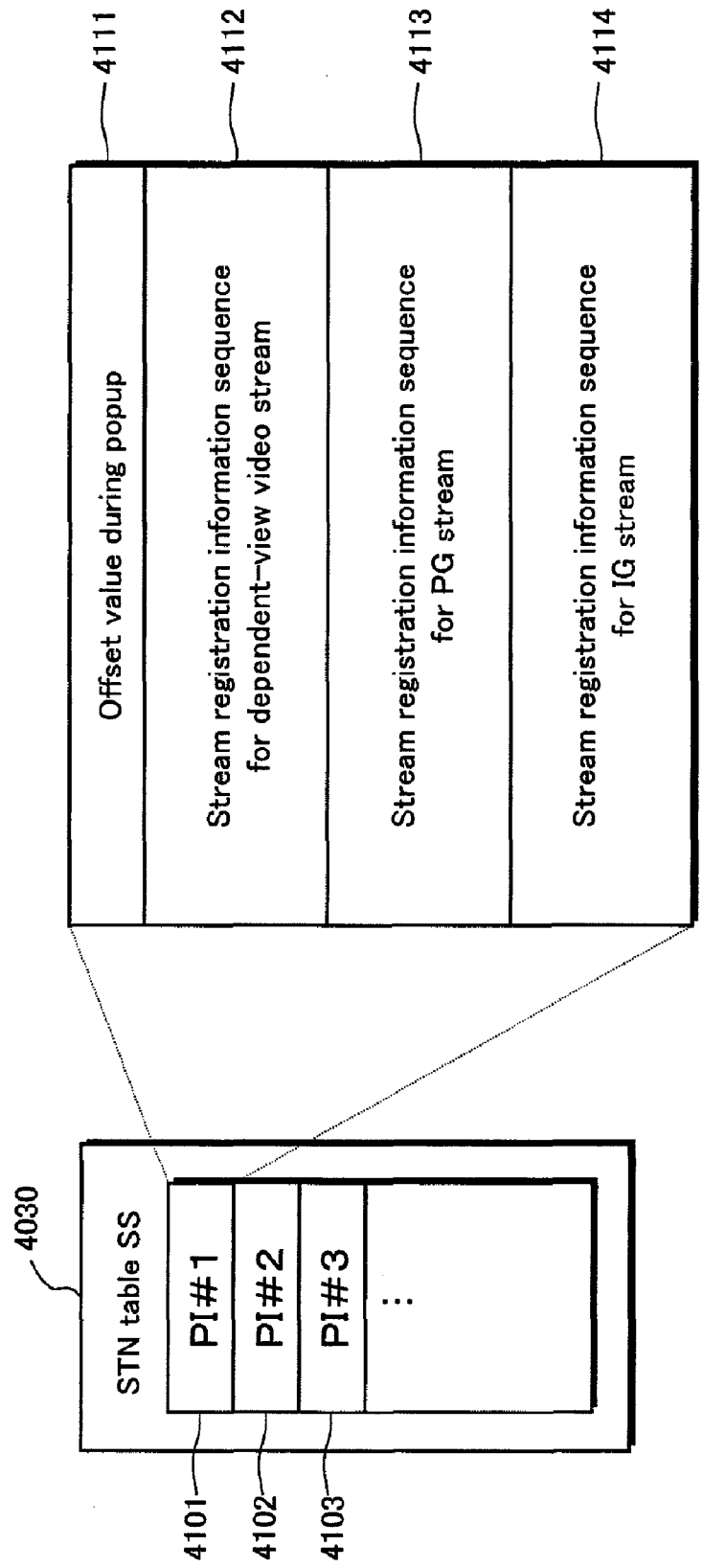
FIG. 41 is a schematic diagram showing the data structure of the STN table SS 4030 shown in FIG. 40.

FIG. 41 is a schematic diagram showing the data structure of an STN table SS 4030. As shown in FIG. 41, an STN table SS 4030 includes stream registration information sequences 4101, 4102, 4103, . . . . The stream registration information sequences 4101, 4102, 4103, . . . individually correspond to the PI#1, PI#2, PI#3, . . . in the main path 4001 and are used by the playback device 102 in 3D playback mode in combination with the stream registration information sequences included in the STN tables in the corresponding PIs. The stream registration information sequence 4101 corresponding to each PI includes an offset during popup (Fixed_offset_during_Popup) 4111, stream registration information sequence 4112 for the dependent-view video streams, stream registration information sequence 4113 for the PG stream, and stream registration information sequence 4114 for the IG stream.

The offset during popup 4111 indicates whether a popup menu is played back from the IG stream. The playback device 102 in 3D playback mode changes the presentation mode of the video plane and the PG plane in accordance with the value of the offset 4111. There are two types of presentation modes for the video plane: base-view (B)-dependent-view (D) presentation mode and B-B presentation mode. There are three types of presentation modes for the PG plane and IG plane: 2 plane mode, 1 plane+offset mode, and 1 plane+zero offset mode. For example, when the value of the offset during popup 4111 is "0", a popup menu is not played back from the IG stream. At this point, B-D presentation mode is selected as the video plane presentation mode, and 2 plane mode or 1 plane+offset mode is selected as the presentation mode for the PG plane. On the other hand, when the value of the offset during popup 4111 is "1", a popup menu is played back from the IG stream. At this point, B-B presentation mode is selected as the video plane presentation mode, and 1 plane+zero offset mode is selected as the presentation mode for the PG plane.

In "B-D presentation mode", the playback device 102 alternately outputs plane data decoded from the left-view and right-view video streams. Accordingly, since left-view and right-view video frames representing video planes are alternately displayed on the screen of the display device 103, a viewer perceives these frames as 3D video images. In "B-B presentation mode", the playback device 102 outputs plane data decoded only from the base-view video stream twice for a frame while maintaining the operation mode in 3D playback mode (in particular, maintaining the frame rate at the value for 3D playback, e.g. 48 frames/second). Accordingly, only either the left-view or right-view frames are displayed on the screen of the playback device 103, and thus a viewer perceives these frames simply as 2D video images.

In "2 plane mode", when the sub-TS includes both left-view and right-view graphics streams, the playback device 102 decodes and alternately outputs left-view and right-view graphics plane data from the graphics streams. In "1 plane+offset mode", the playback device 102 generates a pair of left-view plane data and right-view plane data from the graphics stream in the main TS via cropping processing and alternately outputs these pieces of plane data. In both of these modes, left-view and right-view PG planes are alternately displayed on the screen of the display device 103, and thus a viewer perceives these frames as 3D video images. In "1 plane+zero offset mode", the playback device 102 temporarily stops cropping processing and outputs plane data decoded from the graphics stream in the main TS twice for a frame while maintaining the operation mode in 3D playback mode. Accordingly, only either the left-view or right-view PG planes are displayed on the screen of the playback device 103, and thus a viewer perceives these planes simply as 2D video images.

The playback device 102 in 3D playback mode refers to the offset during popup 4111 for each PI and selects B-B presentation mode and 1 plane+zero offset mode when a popup menu is played back from an IG stream. While a pop-up menu is displayed, other 3D video images are thus temporarily changed to 2D video images. This improves the visibility and usability of the popup menu.

The stream registration information sequence 4112 for the dependent-view video stream, the stream registration information sequence 4113 for the PG streams, and the stream registration information sequence 4114 for the IG streams each include stream registration information indicating the dependent-view video streams, PG streams, and IG streams that can be selected for playback from the sub-TS. These stream registration information sequences 4112, 4113, and 4114 are each used in combination with stream registration information sequences, located in the STN table of the corresponding PI, that respectively indicate base-view streams, PG streams, and IG streams. When reading a piece of stream registration information from an STN table, the playback device 102 in 3D playback mode automatically also reads the stream registration information sequence, located in the STN table SS, that has been combined with the piece of stream registration information. When simply switching from 2D playback mode to 3D playback mode, the playback device 102 can thus maintain already recognized STNs and stream attributes such as language.

Figure 42:
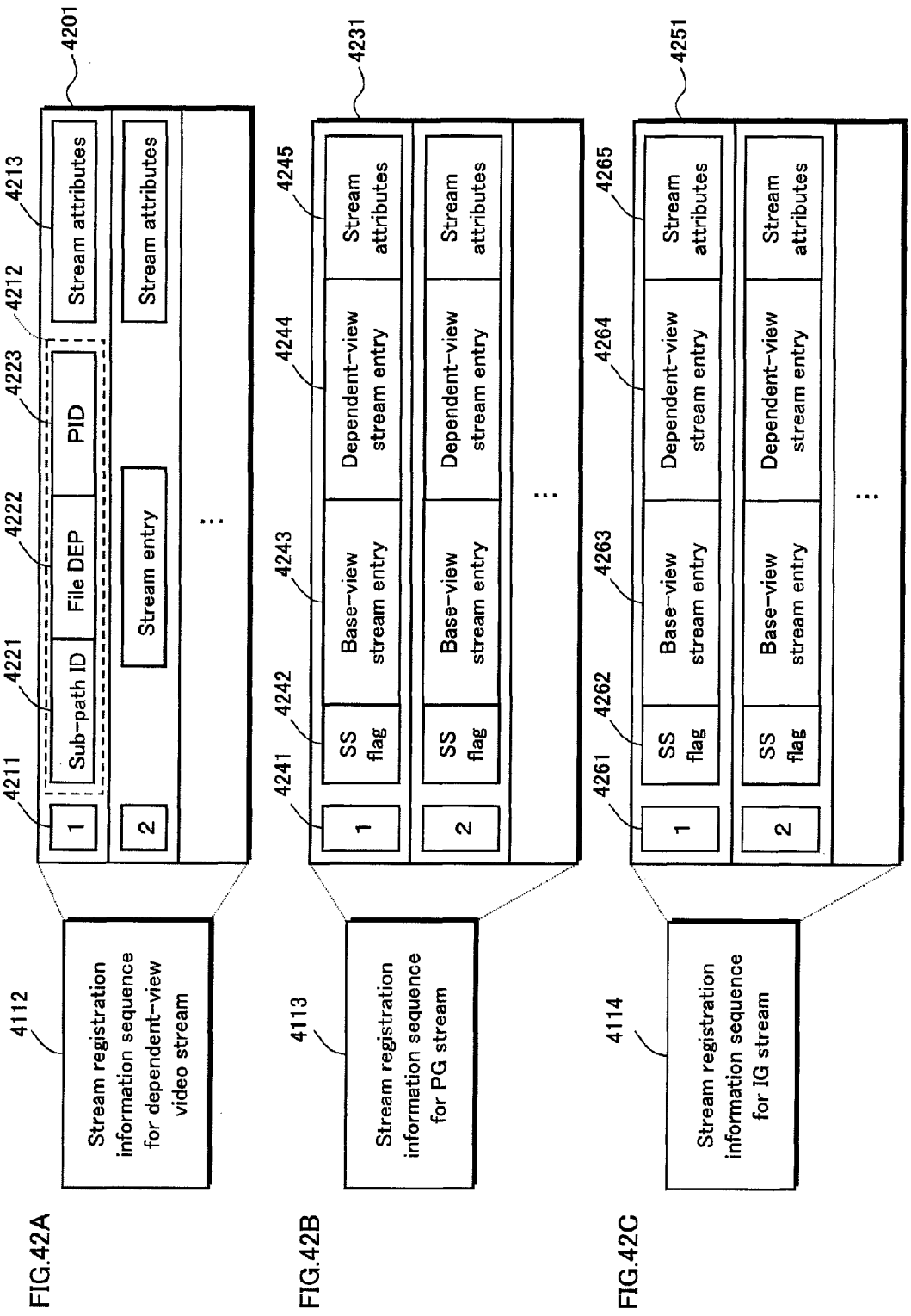
FIGS. 42A, 42B, and 42C are schematic diagrams respectively showing the data structures of a stream registration information sequence 4112 for dependent-view video streams, stream registration information sequence 4113 for PG streams, and stream registration information sequence 4114 for IG streams, which are shown in FIG. 41.

FIG. 42A is a schematic diagram showing the data structure of a stream registration information sequence 4112 for dependent-view video streams. As shown in FIG. 42A, this stream registration information sequence 4112 generally includes a plurality of pieces of stream registration information (SS_dependent_view_block) 4201. These are the same in number as the pieces of stream registration information in the corresponding PI that indicate the base-view video stream. Each piece of stream registration information 4201 includes an STN 4211, stream entry 4212, and stream attribute information 4213. The STN 4211 is a serial number assigned individually to pieces of stream registration information 4201 and is the same as the STN of the piece of stream registration information, located in the corresponding PI, with which each piece of stream registration information 4201 is combined. The stream entry 4212 includes sub-path ID reference information (ref_to_subpath_id) 4221, stream file reference information (ref_to_subclip_entry_id) 4222, and PID (ref_to_stream_PID_subclip) 4223. The sub-path ID reference information 4221 indicates the sub-path ID of the sub-path that specifies the playback path of the dependent-view video stream. The stream file reference information 4222 is information to identify the file DEP storing this dependent-view video stream. The PID 4223 is the PID for this dependent-view video stream. The stream attribute information 4213 includes attributes for this dependent-view video stream, such as frame rate, resolution, and video format. In particular, these attributes are the same as those for the base-view video stream shown by the piece of stream registration information, located in the corresponding PI, with which each piece of stream registration information 4201 is combined.

FIG. 42B is a schematic diagram showing the data structure of a stream registration information sequence 4113 for PG streams. As shown in FIG. 423, this stream registration information sequence 4113 generally includes a plurality of pieces of stream registration information 4231. These are the same in number as the pieces of stream registration information in the corresponding PI that indicates the PG streams. Each piece of stream registration information 4231 includes an STN 4241, stereoscopic flag (is_SS_PG) 4242, base-view stream entry (stream_entry_for_base_view) 4243, dependent-view stream entry (stream_entry_for_dependent_view) 4244, and stream attribute information 4245. The STN 4241 is a serial number assigned individually to pieces of stream registration information 4231 and is the same as the STN of the piece of stream registration information, located in the corresponding PI, with which each piece of stream registration information 4231 is combined. The stereoscopic flag 4242 indicates whether both base-view and dependent-view, e.g. left-view and right-view, PG streams are included on a BD-ROM disc 101. If the stereoscopic flag 4242 is on, both PG streams are included in the sub-TS. Accordingly, the playback device reads all of the fields in the base-view stream entry 4243, the dependent-view stream entry 4244, and the stream attribute information 4245. If the stereoscopic flag 4242 is off, the playback device ignores all of these fields 4243-4245. Both the base-view stream entry 4243 and the dependent-view stream entry 4244 include sub-path ID reference information, stream file reference information, and a PID. The sub-path ID reference information indicates the sub-path IDs of the sub-paths that specify the playback paths of the base-view and dependent-view PG streams. The stream file reference information is information to identify the file DEP storing the PG streams. The PIDs are the PIDs for the PG streams. The stream attribute information 4245 includes attributes for the PG streams, e.g. language type.

FIG. 42C is a schematic diagram showing the data structure of a stream registration information sequence 4114 for IG streams. As shown in FIG. 42C, this stream registration information sequence 4114 generally includes a plurality of pieces of stream registration information 4251. These are the same in number as the pieces of stream registration information in the corresponding PI that indicates the IG streams. Each piece of stream registration information 4251 includes an STN 4261, stereoscopic flag (is_SS_IG) 4262, base-view stream entry 4263, dependent-view stream entry 4264, and stream attribute information 4265. The STN 4261 is a serial number assigned individually to pieces of stream registration information 4251 and is the same as the STN of the piece of stream registration information, located in the corresponding PI, with which each piece of stream registration information 4251 is combined. The stereoscopic flag 4262 indicates whether both base-view and dependent-view, e.g. left-view and right-view, IG streams are included on a BD-ROM disc 101. If the stereoscopic flag 4262 is on, both IG streams are included in the sub-TS. Accordingly, the playback device reads all of the fields in the base-view stream entry 4263, the dependent-view stream entry 4264, and the stream attribute information 4265. If the stereoscopic flag 4262 is off, the playback device ignores all of these fields 4263-4265. Both the base-view stream entry 4263 and the dependent-view stream entry 4264 include sub-path ID reference information, stream file reference information, and a PID. The sub-path ID reference information indicates the sub-path IDs of the sub-paths that specify the playback paths of the base-view and dependent-view IG streams. The stream file reference information is information to identify the file DEP storing the IG streams. The PIDs are the PIDs for the IG streams. The stream attribute information 4265 includes attributes for the IG streams, e.g. language type.

[Playback of 3D Video Images in Accordance with a 3D Playlist File]

Figure 43:
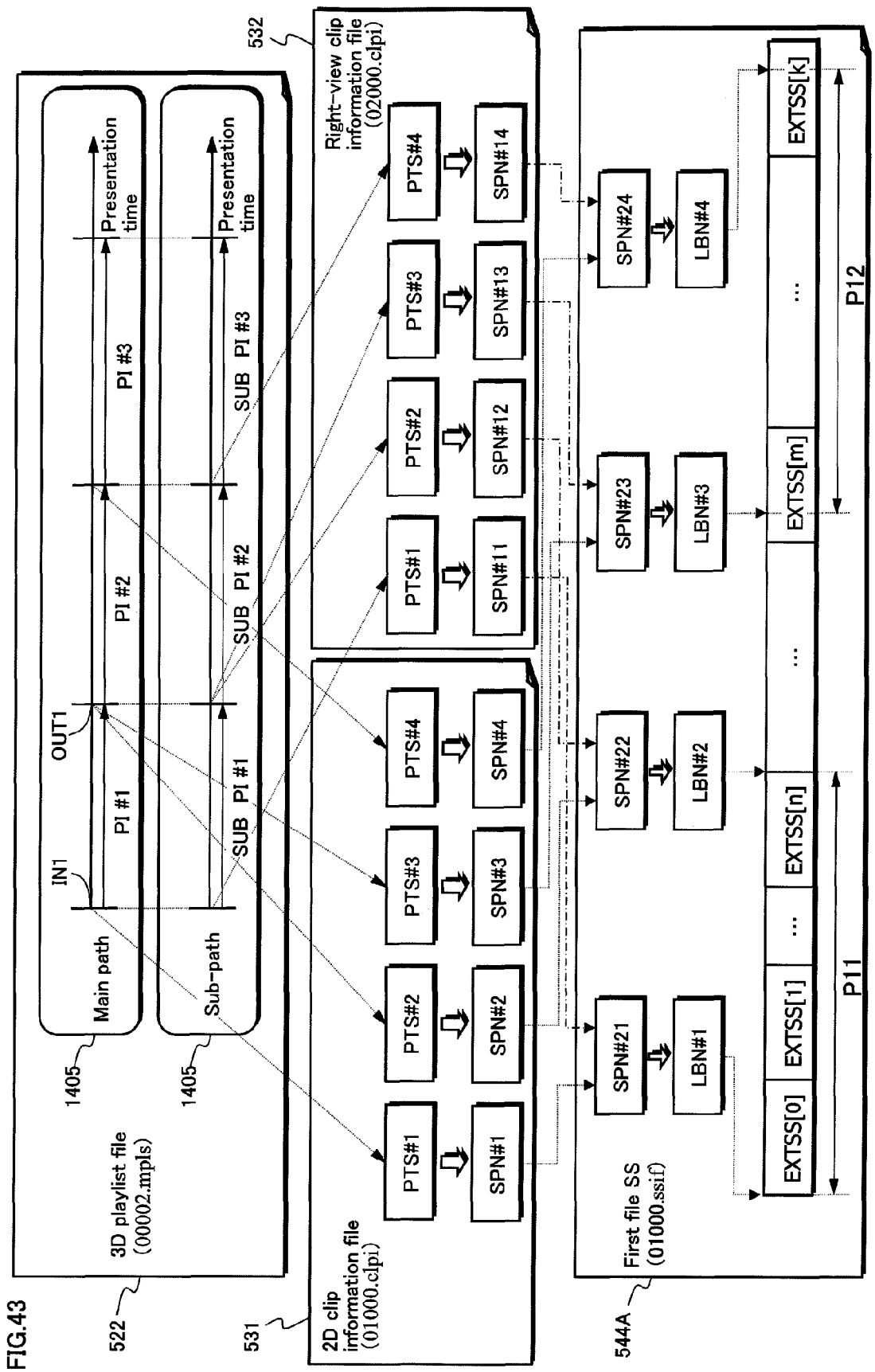
FIG. 43 is a schematic diagram showing the relationships between the PTSs indicated by the 3D playlist file (00002.mpls) 522 shown in FIG. 40 and the sections played back from the first file SS (01000.ssif) shown in FIG. 5.

FIG. 43 is a schematic diagram showing the relationships between the PTSs indicated by the 3D playlist file (00002.mpls) 522 and the sections played back from the first file SS (01000.ssif). As shown in FIG. 43, in the main path 4301 of the 3D playlist file 522, the PI#1 specifies a PTS#1, which indicates a playback start time IN1, and a PTS#2, which indicates a playback end time OUT1. The reference clip information for the PI#1 indicates the 2D clip information file (01000.clpi) 531. In the sub-path 4302, which indicates that the sub-path type is "3D L/R", the SUB_PI#1 specifies the same PTS#1 and PTS#2 as the PI#1. The reference clip information for the SUB_PI#1 indicates the right-view clip information file (02000.clpi) 532.

When playing back 3D video images in accordance with the 3D playlist file 522, the playback device 102 first reads PTS#1 and PTS#2 from the PI#1 and SUB_PI#1. Next, the playback device 102 refers to the entry map in the 2D clip information file 531 to retrieve from the file 2D 541 the SPN#1 and SPN#2 that correspond to the PTS#1 and PTS#2. In parallel, the playback device 102 refers to the entry map in the right-view clip information file 532 to retrieve from the first file DEP 542 the SPN#11 and SPN#12 that correspond to the PTS#1 and PTS#2. As described with reference to FIG. 33E, the playback device 102 then uses the extent start points 3042 and 3320 in the clip information files 531 and 532 to calculate, from SPN#1 and SPN#11, the number of source packets SPN#21 from the top of the first file SS 544A to the position to start playback. Similarly, the playback device 102 calculates, from SPN#2 and SPN#12, the number of source packets SPN#22 from the top of the first file SS 544A to the position to start playback. The playback device 102 further calculates the numbers of sectors corresponding to the SPN#21 and SPN#22. Next, the playback device 102 refers to these numbers of sectors and the allocation descriptors in the file entry for the file SS 544A to specify the LBN#1 and LBN#2 at the beginning and end, respectively, of the sector group P11 on which the 3D extent group EXTSS[0], . . . , EXTSS[n] to be played back is recorded. Calculation of the numbers of sectors and specification of the LBNs are as per the description of FIG. 33E. Finally, the playback device 102 indicates the range from LBN#1 to LBN#2 to the BD-ROM drive 121. The source packet group belonging to the 3D extent group EXTSS[0], . . . , EXTSS[n] is thus read from the sector group P11 in this range. Similarly, the pair PTS#3 and PTS#4 indicated by the PI#2 and SUB_PI#2 are first converted into a pair of SPN#3 and SPN#4 and a pair of SPN#13 and SPN#14 by referring to the entry maps in the clip information files 531 and 532. Then, the number of source packets SPN#23 from the top of the first file SS 544A to the position to start playback is calculated from SPN#3 and SPN#13, and the number of source packets SPN#24 from the top of the first file SS 544A to the position to end playback is calculated from SPN#4 and SPN#14. Next, referring to the allocation descriptors in the file entry for the first file SS 544A, the pair of SPN#23 and SPN#24 are converted into a pair of LBN#3 and LBN#4. Furthermore, a source packet group belonging to the 3D extent group is read from the sector group P12 in a range from the LBN#3 to the LBN#4.

In parallel with the above-described read processing, as described with reference to FIG. 33E, the playback device 102 refers to the extent start points 3042 and 3320 in the clip information files 531 and 532 to extract base-view extents from each 3D extent and decode the base-view extents in parallel with the remaining right-view extents. The playback device 102 can thus play back 3D video images from the first file SS 544A in accordance with the 3D playlist file 522.

<<Index Table>>

Figure 44:
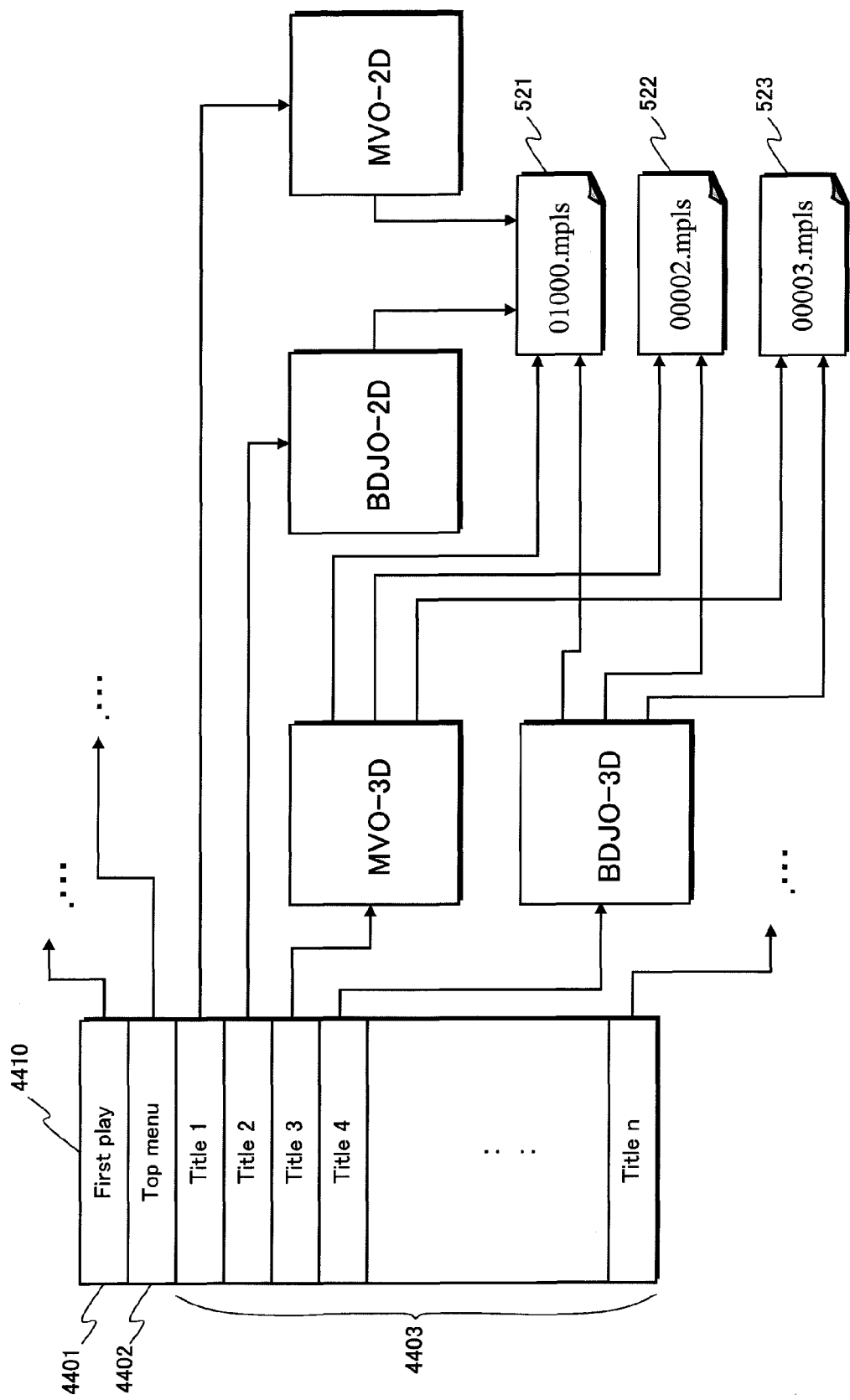
FIG. 44 is a schematic diagram showing an index table 4410 in the index file (index.bdmv) 511 shown in FIG. 5.

FIG. 44 is a schematic diagram showing an index table 4410 20, in the index file (index.bdmv) 511 shown in FIG. 5. As shown in FIG. 44, the index table 4410 stores the items "first play" 4401, "top menu" 4402, and "title k" 4403 (k=1, 2, . . . , n; an integer n is equal to or greater than one). Each item is associated with either a movie object MVO-2D, MVO-3D, . . . , or with a BD-J object BDJO-2D, BDJO-3D, . . . . Each time a title or a menu is called in response to a user operation or an application program, a control unit in the playback device 102 refers to a corresponding item in the index table 4410. Furthermore, the control unit calls an object associated with the item from the BD-ROM disc 101 and accordingly executes a variety of processes. Specifically, the "first play" 4401 specifies an object to be called when the disc 101 is loaded into the BD-ROM drive 121. The "top menu" 4402 specifies an object for displaying a menu on the display device 103 when a command "go back to menu" is input, for example, by user operation. In the "title k" 4403, the titles that constitute the content on the disc 101 are individually allocated. For example, when a title for playback is specified by user operation, in the item "title k" in which the title is allocated, the object for playing back a video from the AV stream file corresponding to the title is specified.

In the example shown in FIG. 44, the items "title 1" and "title 2" are allocated to titles of 2D video images. The movie object associated with the item "title 1", MVO-2D, includes a group of commands related to playback processes for 2D video images using the 2D playlist file (00001.mpls) 521. When the playback device 102 refers to the item "title 1", then in accordance with the movie object MVO-2D, the 2D playlist file 521 is read from the disc 101, and playback processes for 2D video images are executed in accordance with the playback path specified therein. The BD-J object associated with the item "title 2", BDJO-2D, includes an application management table related to playback processes for 2D video images using the 2D playlist file 521. When the playback device 102 refers to the item "title 2", then in accordance with the application management table in the BD-J object BDJO-2D, a Java application program is called from the JAR file 561 and executed. In this way, the 2D playlist file 521 is read from the disc 101, and playback processes for 2D video images are executed in accordance with the playback path specified therein.

Furthermore, in the example shown in FIG. 44, the items "title 3" and "title 4" are allocated to titles of 3D video images. The movie object associated with the item "title 3", MVO-3D, includes, in addition to a group of commands related to playback processes for 2D video images using the 2D playlist file 521, a group of commands related to playback processes for 3D video images using either 3D playlist file (00002.mpls) 522 or (00003.mpls) 523. In the BD-J object associated with the item "title 4", BDJO-3D, the application management table specifies, in addition to a Java application program related to playback processes for 2D video images using the 2D playlist file 521, a Java application program related to playback processes for 3D video images using either 3D playlist file 522 or 523.

When the playback device 102 refers to item "title 3", the following four determination processes are performed in accordance with the movie object MVO-3D: (1) Does the playback device 102 itself support playback of 3D video images? (2) Has the user selected playback of 3D video images? (3) Does the display device 103 support playback of 3D video images? and (4) Is the 3D video playback mode of the playback device 102 in L/R mode or depth mode? Next, in accordance with the results of these determinations, one of the playlist files 521-523 is selected for playback. When the playback device 102 refers to item "title 4", a Java application program is called from the JAR file 561, in accordance with the application management table in the BD-J object BDJO-3D, and executed. The above-described determination processes are thus performed, and a playlist file is then selected in accordance with the results of determination.

[Selection of Playlist File when Selecting a 3D Video Title]

Figure 45:
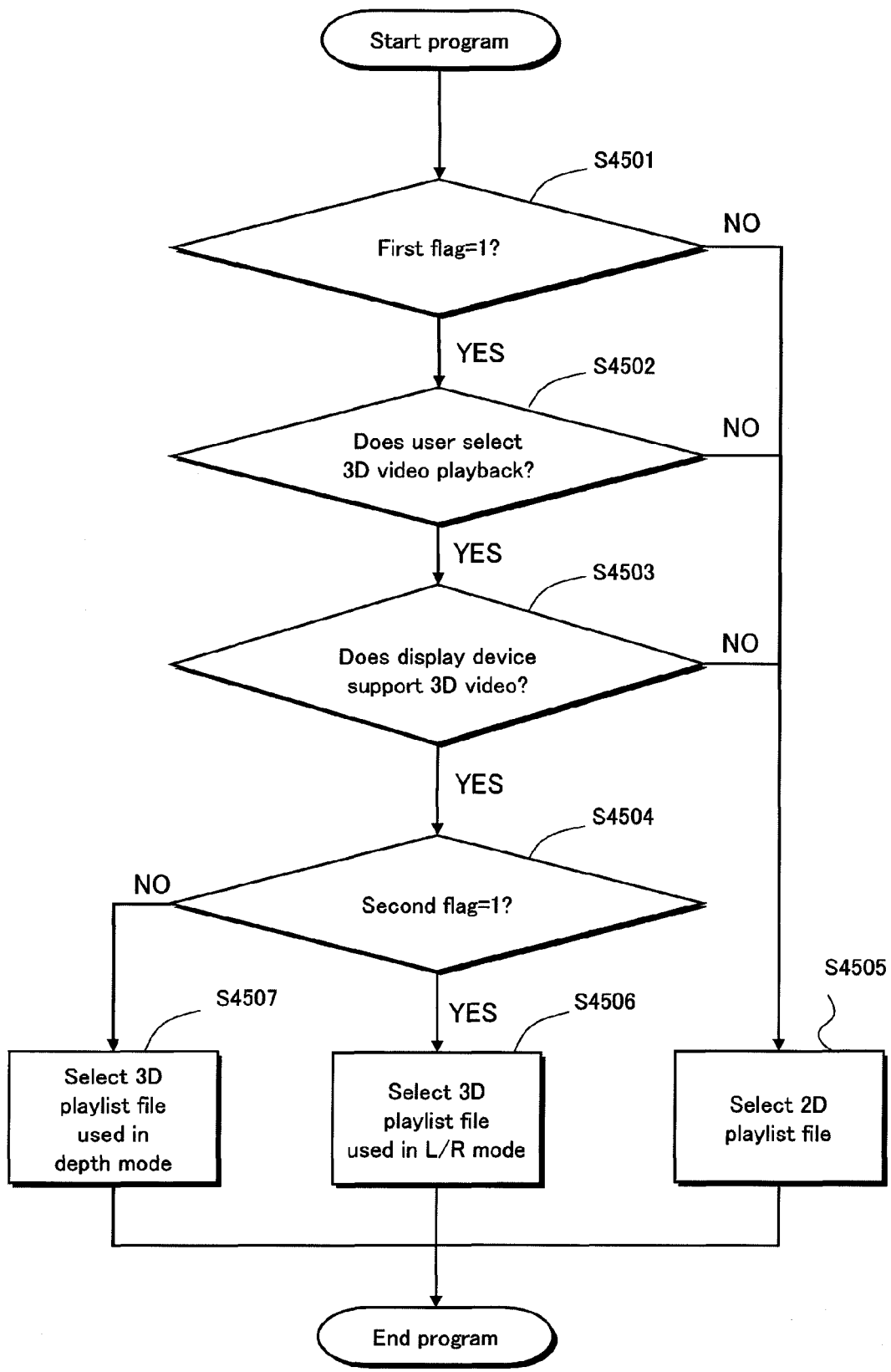
FIG. 45 is a flowchart of selection processing for a playlist file to be played back, the processing being performed when a 3D video title is selected by the playback device 102 shown in FIG. 1.

FIG. 45 is a flowchart of selection processing for a playlist file to be played back, the processing being performed when a 3D video title is selected. In the index table 4410 shown in FIG. 44, selection processing is performed in accordance with the movie object MVO-3D when referring to the item "title 3", and selection processing is performed in accordance with the Java application program specified by the BD-J object BDJO-3D when referring to the item "title 4".

In light of this selection processing, it is assumed that the playback device 102 includes a first flag and a second flag. A value of "0" for the first flag indicates that the playback device 102 only supports playback of 2D video images, whereas "1" indicates support of 3D video images as well. A value of "0" for the second flag indicates that the playback device 102 is in L/R mode, whereas "1" indicates depth mode.

In step S4501, the playback device 102 checks the value of the first flag. If the value is 0, processing proceeds to step S4505. If the value is 1, processing proceeds to step S4502.

In step S4502, the playback device 102 displays a menu on the display device 103 for the user to select playback of either 2D or 3D video images. If the user selects playback of 2D video images via operation of a remote control 105 or the like, processing proceeds to step S4505, whereas if the user selects 3D video images, processing proceeds to step S4503.

In step S4503, the playback device 102 checks whether the display device 103 supports playback of 3D video images. Specifically, the playback device 102 exchanges CEC messages with the display device 103 via an HDMI cable 122 to check with the display device 103 as to whether it supports playback of 3D video images. If the display device 103 does support playback of 3D video images, processing proceeds to step S4504. If not, processing proceeds to step S4505.

In step S4504, the playback device 102 checks the value of the second flag. If this value is 0, processing proceeds to step S4506. If this value is 1, processing proceeds to step S4507.

In step S4505, the playback device 102 selects for playback the 2D playlist file 521. Note that, at this time, the playback device 102 may cause the display device 103 to display the reason why playback of 3D video images was not selected.

In step S4506, the playback device 102 selects for playback the 3D playlist file 522 used in L/R mode.

In step S4507, the playback device 102 selects for playback the 3D playlist file 523 used in depth mode.

<Structure of 2D Playback Device>

Figure 46:
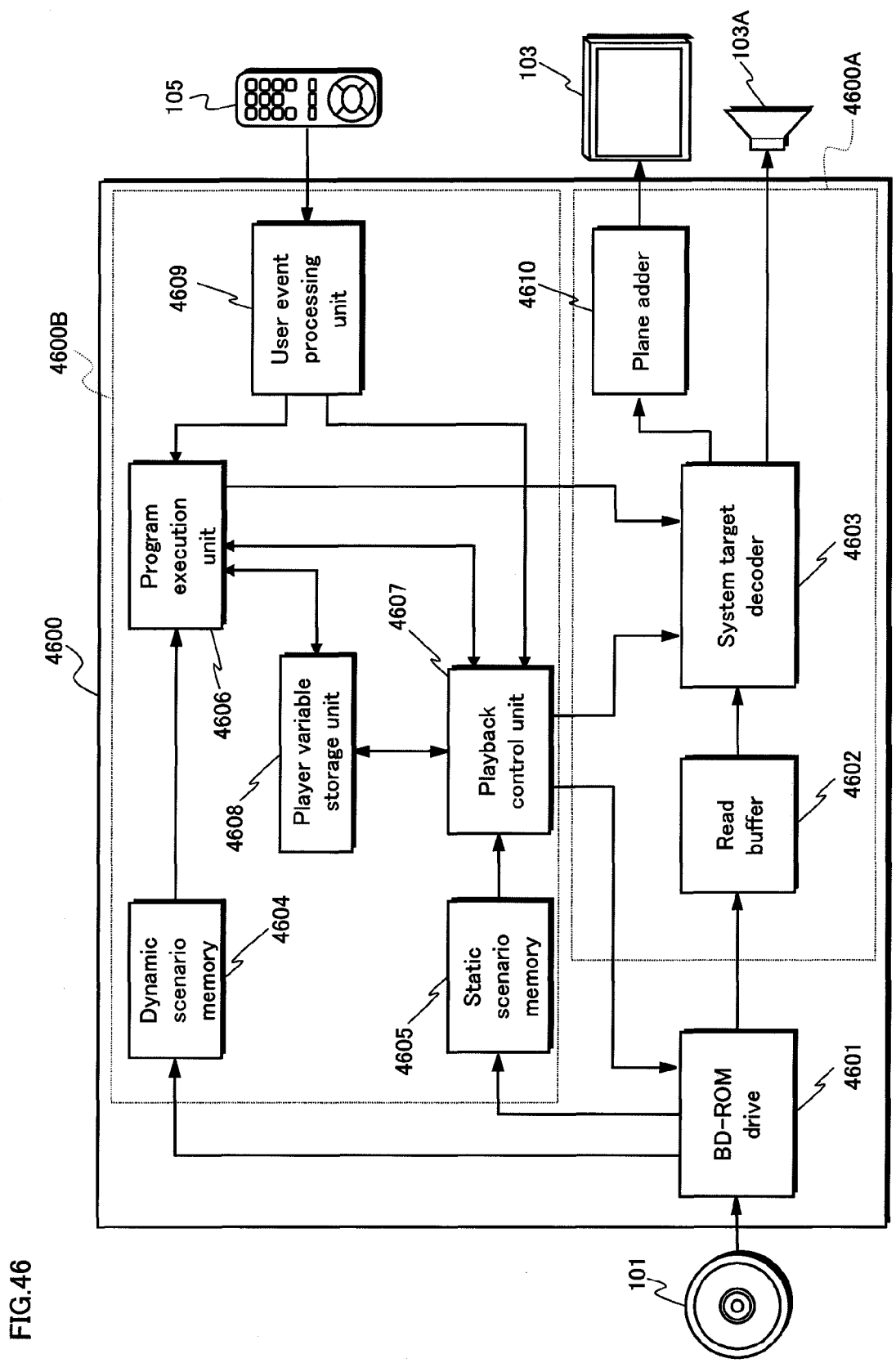
FIG. 46 is a functional block diagram of the playback device 102 in 2D playback mode shown in FIG. 1.

When playing back 2D video contents from a BD-ROM disc 101 in 2D playback mode, the playback device 102 operates as a 2D playback device. FIG. 46 is a functional block diagram of a 2D playback device 4600. As shown in FIG. 46, the 2D playback device 4600 has a BD-ROM drive 4601, a playback unit 4600A, and a control unit 4600B. The playback unit 4600A has a read buffer 4602, a system target decoder 4603, and a plane adder 4610. The control unit 4600B has a dynamic scenario memory 4604, a static scenario memory 4605, a program execution unit 4606, a playback control unit 4607, a player variable storage unit 4608, and a user event processing unit 4609. The playback unit 4600A and the control unit 4600B are each implemented on a different integrated circuit, but may alternatively be implemented on a single integrated circuit.

When the BD-ROM disc 101 is loaded into the BD-ROM drive 4601, the BD-ROM drive 4601 radiates laser light to the disc 101 and detects change in the light reflected from the disc 101. Furthermore, using the change in the amount of reflected light, the BD-ROM drive 4601 reads data recorded on the disc 101. Specifically, the BD-ROM drive 4601 has an optical pickup, i.e. an optical head. The optical head has a semiconductor laser, a collimate lens, a beam splitter, an objective lens, a collecting lens, and an optical detector. A beam of light radiated from the semiconductor laser sequentially passes through the collimate lens, the beam splitter, and the objective lens to be collected on a recording layer of the disc 101. The collected beam is reflected and diffracted by the recording layer. The reflected and diffracted light passes through the objective lens, the beam splitter, and the collecting lens, and is collected onto the optical detector. The optical detector generates a playback signal at a level in accordance with the amount of collected light. Furthermore, data is decoded from the playback signal.

The BD-ROM drive 4601 reads data from the BD-ROM disc 101 based on a request from the playback control unit 4607. Out of the read data, the extents in the file 2D, i.e. the 2D extents, are transferred to the read buffer 4602; dynamic scenario information is transferred to the dynamic scenario memory 4604; and static scenario information is transferred to the static scenario memory 4605. "Dynamic scenario information" includes an index file, movie object file, and BD-J object file. "Static scenario information" includes a 2D playlist file and a 2D clip information file.

The read buffer 4602, the dynamic scenario memory 4604, and the static scenario memory 4605 are each a buffer memory. A memory device in the playback unit 4600A is used as the read buffer 4602. Memory devices in the control unit 4600B are used as the dynamic scenario memory 4604 and the static scenario memory 4605. In addition, different areas in a single memory device may be used as these buffer memories 4602, 4604 and 4605. The read buffer 4602 stores 2D extents, the dynamic scenario memory 4604 stores dynamic scenario information, and the static scenario memory 4605 stores static scenario information.

The system target decoder 4603 reads 2D extents from the read buffer 4602 in units of source packets and demultiplexes the 2D extents. The system target decoder 4603 then decodes each of the elementary streams obtained by the demultiplexing. At this point, information necessary for decoding each elementary stream, such as the type of codec and attribute of the stream, is transferred from the playback control unit 4607 to the system target decoder 4603. For each VAU, the system target decoder 4603 outputs a primary video stream, a secondary video stream, an IG stream, and a PG stream as primary video plane data, secondary video plane data, IG plane data, and PG plane data, respectively. On the other hand, the system target decoder 4603 mixes the decoded primary audio stream and secondary audio stream and transmits the resultant data to an audio output device, such as an internal speaker 103A of the display device 103. In addition, the system target decoder 4603 receives graphics data from the program execution unit 4606. The graphics data is used for rendering graphics such as a GUI menu on a screen and is in a raster data format such as JPEG and PNG. The system target decoder 4603 processes the graphics data and outputs the data as image plane data. Details of the system target decoder 4603 are described below.

The user event processing unit 4609 detects a user operation via the remote control 105 or the front panel of the playback device 102. Based on the user operation, the user event processing unit 4609 requests the program execution unit 4606 or the playback control unit 4607 to perform a relevant process. For example, when a user instructs to display a pop-up menu by pushing a button on the remote control 105, the user event processing unit 4609 detects the push and identifies the button. The user event processing unit 4609 further requests the program execution unit 4606 to execute a command corresponding to the button, i.e. a command to display the pop-up menu. On the other hand, when a user pushes a fast-forward or a rewind button on the remote control 105, for example, the user event processing unit 4609 detects the push, identifies the button, and requests the playback control unit 4607 to fast-forward or rewind the playlist currently being played back.

The playback control unit 4607 controls transfer of different types of data, such as 2D extents, an index file, etc. from the BD-ROM disc 101 to the read buffer 4602, the dynamic scenario memory 4604, and the static scenario memory 4605. A file system managing the directory file structure shown in FIG. 5 is used for this control. That is, the playback control unit 4607 causes the BD-ROM drive 4601 to transfer the files to each of the buffer memories 4602, 4604 and 4605 using a system call for opening files. The file opening is composed of a series of the following processes. First, a file name to be detected is provided to the file system by a system call, and an attempt is made to detect the file name from the directory/file structure. When the detection is successful, the file entry for the target file is first transferred to memory in the playback control unit 4607, and an FCB (File Control Block) is generated in the memory. Subsequently, a file handle for the target file is returned from the file system to the playback control unit 4607. After this, the playback control unit 4607 can transfer the target file from the BD-ROM disc 101 to each of the buffer memories 4602, 4604 and 4605 by showing the file handle to the BD-ROM drive 4601.

The playback control unit 4607 decodes the file 2D to output video data and audio data by controlling the BD-ROM drive 4601 and the system target decoder 4603. Specifically, the playback control unit 4607 first reads a 2D playlist file from the static scenario memory 4605, in response to an instruction from the program execution unit 4606 or a request from the user event processing unit 4609, and interprets the content of the file. In accordance with the interpreted content, particularly with the playback path, the playback control unit 4607 then specifies a file 2D to be played back and instructs the BD-ROM drive 4601 and the system target decoder 4603 to read and decode this file. Such playback processing based on a playlist file is called "playlist playback". In addition, the playback control unit 4607 sets various types of player variables in the player variable storage unit 4608 using the static scenario information. With reference to the player variables, the playback control unit 4607 further specifies to the system target decoder 4603 elementary streams to be decoded and provides the information necessary for decoding the elementary streams.

The player variable storage unit 4608 is composed of a group of registers for storing player variables. Types of player variables include system parameters (SPRM) and general parameters (GPRM). FIG. 47 is a list of SPRMs. Each SPRM is assigned a serial number 4701, and each serial number 4701 is associated with a unique variable value 4702. The contents of major SPRMs are shown below. Here, the numbers in parentheses indicate the serial numbers 4701.

SPRM(0): Language code
SPRM(1): Primary audio stream number
SPRM(2): Subtitle stream number
SPRM(3): Angle number
SPRM(4): Title number
SPRM(5): Chapter number
SPRM(6): Program number
SPRM(7): Cell number
SPRM(8): Key name
SPRM(9): Navigation timer
SPRM(10): Current playback time
SPRM(11): Player audio mixing mode for Karaoke
SPRM(12): Country code for parental management
SPRM(13): Parental level
SPRM(14): Player configuration for Video
SPRM(15): Player configuration for Audio
SPRM(16): Language code for audio stream
SPRM(17): Language code extension for audio stream
SPRM(18): Language code for subtitle stream
SPRM(19): Language code extension for subtitle stream
SPRM(20): Player region code
SPRM(21): Secondary video stream number
SPRM(22): Secondary audio stream number
SPRM(23): Player status
SPRM(24): Reserved
SPRM(25): Reserved
SPRM(26): Reserved
SPRM(27): Reserved
SPRM(28): Reserved
SPRM(29): Reserved
SPRM(30): Reserved
SPRM(31): Reserved The SPRM(10) indicates the PTS of the picture currently being decoded and is updated every time a picture is decoded and written into the primary video plane memory. Accordingly, the current playback point can be known by referring to the SPRM(10).

The language code for the audio stream of the SPRM(16) and the language code for the subtitle stream of the SPRM (18) show default language codes of the playback device 102. These codes may be changed by a user with use of the OSD or the like for the playback device 102, or may be changed by an application program via the program execution unit 4606. For example, if the SPRM(16) shows "English", in playback processing of a playlist, the playback control unit 4607 first searches the STN table in the PI for a stream entry having the language code for "English". The playback control unit 4607 then extracts the PID from the stream identification information of the stream entry and transmits the extracted PID to the system target decoder 4603. As a result, an audio stream having the same PID is selected and decoded by the system target decoder 4603. These processes can be executed by the playback control unit 4607 with use of the movie object file or the BD-J object file.

During playback processing, the playback control unit 4607 updates the player variables in accordance with the status of the playback. The playback control unit 4607 updates the SPRM(1), the SPRM(2), the SPRM(21) and the SPRM(22) in particular. These SPRM respectively show, in the stated order, the STN of the audio stream, the subtitle stream, the secondary video stream, and the secondary audio stream that are currently being processed. As an example, assume that the audio stream number SPRM(1) has been changed by the program execution unit 4606. In this case, the playback control unit 4607 first searches the STN in the PI currently being played back for a stream entry that includes an STN indicating the changed SPRM(1). The playback control unit 4607 then extracts the PID from the stream identification information in the stream entry and transmits the extracted PID to the system target decoder 4603. As a result, the audio stream having the same PID is selected and decoded by the system target decoder 4603. This is how the audio stream targeted for playback is switched. The subtitle stream and the secondary video stream to be played back can be similarly switched.

The program execution unit 4606 is a processor and executes programs stored in the movie object file or the BD-J object file. The program execution unit 4606 executes the following controls in particular in accordance with the programs. (1) The program execution unit 4606 instructs the playback control unit 4607 to perform playlist playback processing. (2) The program execution unit 4606 generates graphics data for a menu or a game as PNG or JPEG raster data, and transfers the generated data to the system target decoder 4603 to be composited with other video data. Specific contents of these controls can be designed relatively flexibly through program designing. That is, the contents of the controls are determined by the programming procedure of the movie object file and the BD-J object file in the authoring procedure of the BD-ROM disc 101.

The plane adder 4610 receives primary video plane data, secondary video plane data, IG plane data, PG plane data, and image plane data from the system target decoder 4603 and composites these data into a video frame or a field by superimposition. The plane adder 4610 outputs the resultant composited video data to the display device 103 for display on the screen.

<<System Target Decoder>>

Figure 48:
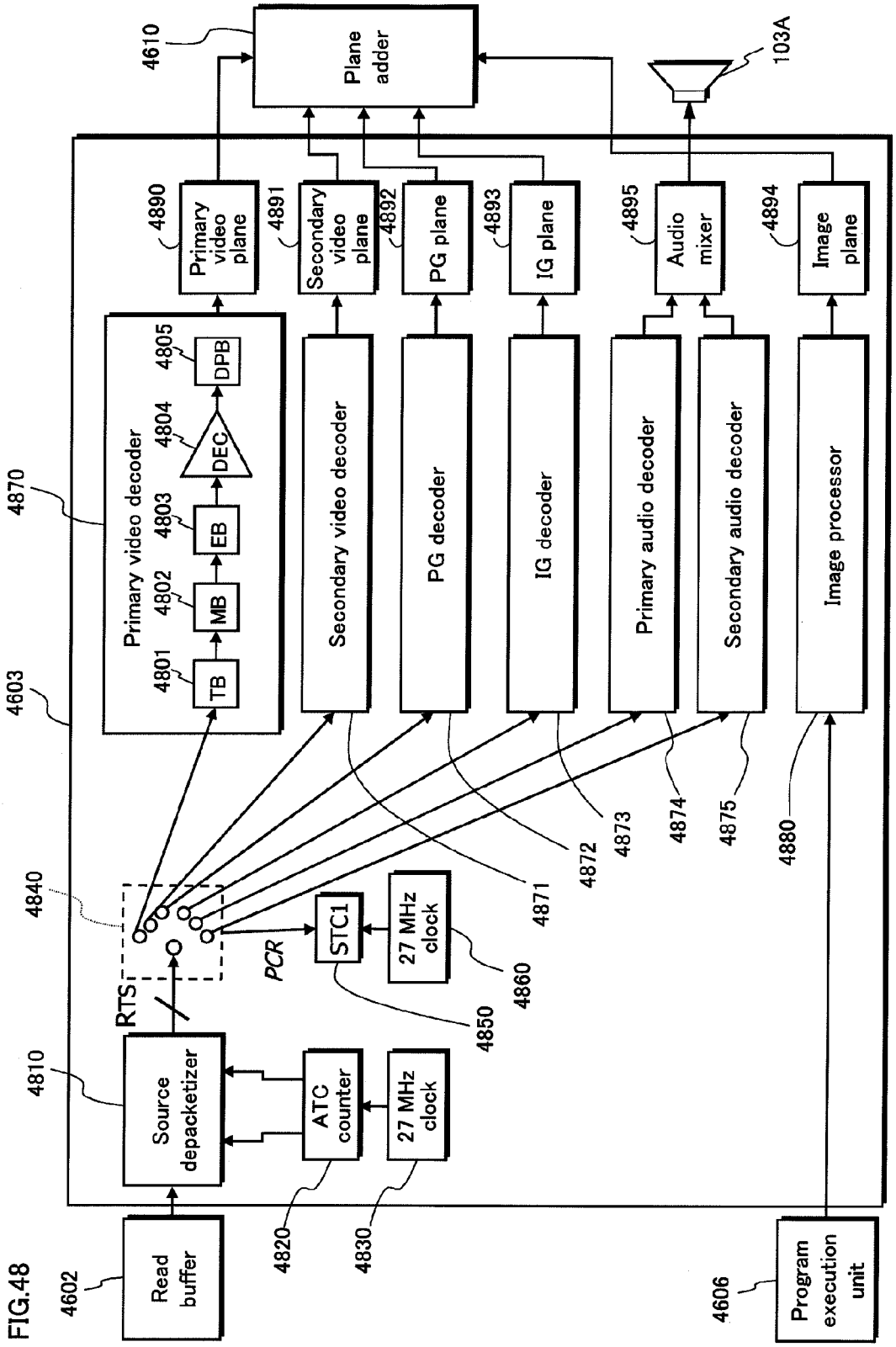
FIG. 48 is a functional block diagram of the system target decoder 4603 shown in FIG. 46.

FIG. 48 is a functional block diagram of the system target decoder 4603. As shown in FIG. 48, the system target decoder 4603 includes a source depacketizer 4810, ATC counter 4820, first 27 MHz clock 4830, PID filter 4840, STC counter (STC1) 4850, second 27 MHz clock 4860, primary video decoder 4870, secondary video decoder 4871, PG decoder 4872, IG decoder 4873, primary audio decoder 4874, secondary audio decoder 4875, image processor 4880, primary video plane memory 4890, secondary video plane memory 4891, PG plane memory 4892, IG plane memory 4893, image plane memory 4894, and audio mixer 4895.

The source depacketizer 4810 reads source packets from the read buffer 4602, extracts the TS packets from the read source packets, and transfers the TS packets to the PID filter 4840. The source depacketizer 4810 further adjusts the time of the transfer in accordance with the ATS of each source packet. Specifically, the source depacketizer 4810 first monitors the value of the ATC generated by the ATC counter 4820. In this case, the value of the ATC depends on the ATC counter 4820, and is incremented in accordance with a pulse of the clock signal of the first 27 MHz clock 4830. Subsequently, at the instant the value of the ATC matches the ATS of a source packet, the source depacketizer 4810 transfers the TS packets extracted from the source packet to the PID filter 4840. By adjusting the time of transfer in this way, the mean transfer rate $R_{TS}$ of TS packets from the source depacketizer 4810 to the PID filter 4840 does not surpass the system rate 3111 shown by the 2D clip information file in FIG. 31.

The PID filter 4840 first monitors PIDs that include the TS packets output by the source depacketizer 4810. When a PID matches a PID pre-specified by the playback control unit 4807, the PID filter 4840 selects the TS packets and transfers them to the decoder 4870-4875 appropriate for decoding of the elementary stream indicated by the PID. For example, if a PID is 0x1011, the TS packets are transferred to the primary video decoder 4870, whereas TS packets with PIDs ranging from 0x1B00-0x1B1F, 0x1100-0x111F, 0x1A00-0x1A1F, 0x1200-0x121F, and 0x1400-0x141F are transferred to the secondary video decoder 4871, the primary audio decoder 4874, the secondary audio decoder 4875, the PG decoder 4872, and the IG decoder 4873, respectively.

The PID filter 4840 further detects PCRs from each TS packet using the PID of the TS packet. At this point, the PID filter 4840 sets the value of the STC counter 4850 to a predetermined value. In this case, the value of the STC counter 4850 is incremented in accordance with a pulse of the clock signal of the second 27 MHz clock 4860. In addition, the value to which the STC counter 4850 is set to is indicated to the PID filter 4840 from the playback control unit 4807 in advance. The decoders 4870-4875 each use the value of the STC counter 4850 as the STC. That is, the decoders 4870-4875 adjust the timing of decoding processing of the TS packets output from the PID filter 4840 in accordance with the time indicated by the PTS or the DTS included in the TS packets.

The primary video decoder 4870, as shown in FIG. 48, includes a transport stream buffer (TB) 4801, multiplexing buffer (MB) 4802, elementary stream buffer (EB) 4803, compressed video decoder (DEC) 4804, and decoded picture buffer (DPB) 4805. The TB 4801, MB 4802, EB 4803, and DPB 4805 are each a buffer memory and use an area of a memory device internally provided in the primary video decoder 4870. Alternatively, some or all of the TB 4801, the MB 4802, the EB 4803, and the DPB 4805 may be separated in different memory devices. The TB 4801 stores the TS packets received from the PID filter 4840 as they are. The MB 4802 stores PES packets reconstructed from the TS packets stored in the TB 4801. Note that when the TS packets are transferred from the TB 4801 to the MB 4802, the TS header is removed from each TS packet. The EB 4803 extracts encoded VAUs from the PES packets and stores the extracted, encoded VAUs therein. A VAU includes compressed pictures, i.e., an I picture, B picture, and P picture. Note that when data is transferred from the MB 4802 to the EB 4803, the PES header is removed from each PES packet. The DEC 4804 decodes pictures from each VAU in the EB 4803 at the time shown by the DTS included in the original TS packet. The DEC 4804 may also refer to the decoding switch information 1401 shown in FIG. 14 to decode pictures from each VAU sequentially, regardless of the DTS. The DEC 4804 switches the decoding scheme in accordance with the compression encoding formats, e.g., MPEG-2, MPEG-4 AVC, and VC1, and the stream attribute of the compressed pictures stored in each VAU. The DEC 4804 further transfers the decoded pictures, i.e., a frame or field, to the DPB 4805. The DPB 4805 temporarily stores the decoded pictures. When decoding a P picture or a B picture, the DEC 4804 refers to the decoded pictures stored in the DPB 4805. The DPB 4805 further writes each of the stored pictures into the primary video plane memory 4890 at the time shown by the PTS included in the original TS packet.

The secondary video decoder 4871 includes the same structure as the primary video decoder 4870. The secondary video decoder 4871 first decodes the TS packets of the secondary video stream received from the PID filter 4840 into uncompressed pictures. Subsequently, the secondary video decoder 4871 writes the resultant uncompressed pictures into the secondary video plane memory 4891 at the time shown by the PTS included in the TS packet.

The PG decoder 4872 decodes the TS packets received from the PID filter 4840 into uncompressed graphics data and writes the resultant uncompressed graphics data to the PG plane memory 4892 at the time shown by the PTS included in the TS packet.

The IG decoder 4873 decodes the TS packets received from the PID filter 4840 into uncompressed graphics data and writes the resultant uncompressed graphics data to the IG plane memory 4893 at the time shown by the PTS included in the TS packet.

The primary audio decoder 4874 first stores the TS packets received from the PID filter 4840 in a buffer provided therein. Subsequently, the primary audio decoder 4874 removes the TS header and the PES header from each TS packet in the buffer, and decodes the remaining data into uncompressed LPCM audio data. Furthermore, the primary audio decoder 4874 transmits the resultant audio data to the audio mixer 4895 at the time shown by the PTS included in the TS packet. The primary audio decoder 4874 changes a decoding scheme of the uncompressed audio data in accordance with the compression encoding format, e.g. AC-3 or DTS, and the stream attribute of the primary audio stream, which are included in the TS packets.

The secondary audio decoder 4875 has the same structure as the primary audio decoder 4874. The secondary audio decoder 4875 first decodes the TS packets of the secondary audio stream received from the PID filter 4840 into uncompressed LPCM audio data. Subsequently, the secondary audio decoder 4875 transmits the uncompressed LPCM audio data to the audio mixer 4895 at the time shown by the PTS included in the TS packet. The secondary audio decoder 4875 changes a decoding scheme of the uncompressed audio data in accordance with the compression encoding format, e.g. Dolby Digital Plus or DTS-HD LBR, and the stream attribute of the primary audio stream, included in the TS packets.

The audio mixer 4895 receives uncompressed audio data from both the primary audio decoder 4874 and from the secondary audio decoder 4875 and then mixes (superimposes) the received data. The audio mixer 4895 also transmits the resultant composited audio to an internal speaker 103A of the display device 103 or the like.

The image processor 4880 receives graphics data, i.e., PNG or JPEG raster data, along with the PTS thereof from the program execution unit 4806. Upon the reception of the graphics data, the image processor 4880 renders the graphics data and writes the graphics data to the image plane memory 4894.

<Structure of 3D Playback Device>

When playing back 3D video contents from a BD-ROM disc 101 in 3D playback mode, the playback device 102 operates as a 3D playback device. The fundamental part of the device's structure is identical to the 2D playback device shown in FIGS. 46 to 48. Therefore, the following is a description of sections of the structure of the 2D playback device that are enlarged or modified, incorporating by reference the above description of the 2D playback device for details on the fundamental parts thereof. Regarding the playback processing of 2D video images in accordance with 2D playlist files, i.e. the playback processing of the 2D playlist, the 3D playback device has the same structure as the 2D playback device. Accordingly, the details on this structure are hereby incorporated from the description of the 2D playback device by reference. The following description assumes playback processing of 3D video images in accordance with 3D playlist files, i.e. 3D playlist playback processing.

Figure 49:
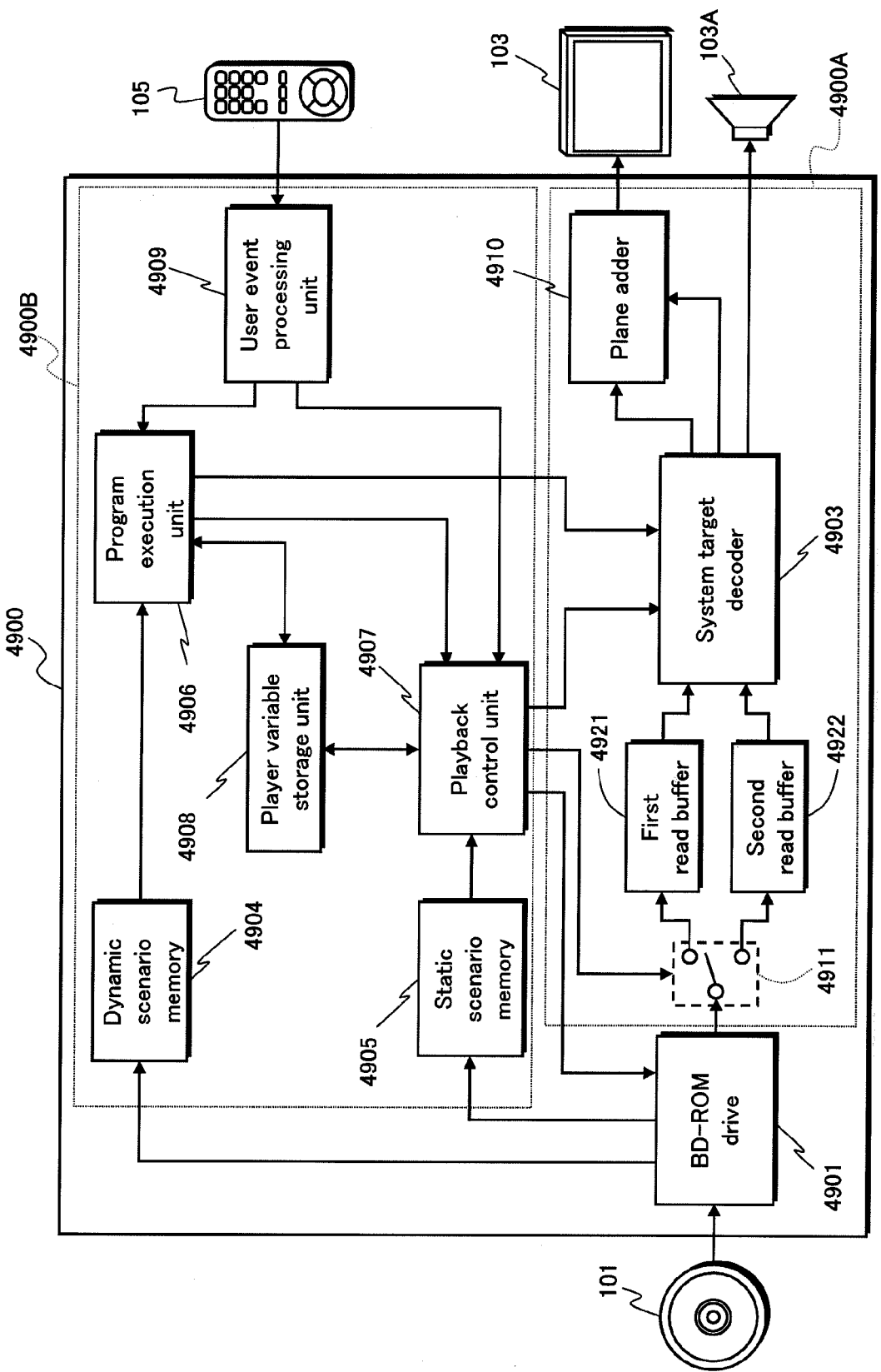
FIG. 49 is a functional block diagram of the playback device 102 shown in FIG. 1 in 3D playback mode.

FIG. 49 is a functional block diagram of the 3D playback device 4900. The 3D playback device 4900 includes a BD-ROM drive 4901, a playback unit 4900A, and a control unit 4900B. The playback unit 4900A includes a switch 4911, a first read buffer 4921, a second read buffer 4922, a system target decoder 4903, and a plane adder 4910. The control unit 4900B includes a dynamic scenario memory 4904, a static scenario memory 4905, a program execution unit 4906, a playback control unit 4907, a player variable storage unit 4908, and a user event processing unit 4909. The playback unit 4900A and the control unit 4900B are mounted on a different integrated circuit, but may alternatively be mounted on a single integrated circuit. In particular, the dynamic scenario memory 4904, the static scenario memory 4905, the program execution unit 4906, and the user event processing unit 4909 have an identical structure with the 2D playback device shown in FIG. 46. Accordingly, details thereof are incorporated by reference to the above explanation of the 2D playback device.

The BD-ROM drive 4901 includes elements identical to the BD-ROM drive 4601 in the 2D playback device shown in FIG. 46. When the playback control unit 4907 indicates a range of LBN, the BD-ROM drive 4901 reads data from the sector group on the BD-ROM disc 101 indicated by the range. In particular, a source packet group belonging to extents in the file SS, i.e. 3D extents, is transferred from the BD-ROM drive 4901 to the switch 4911. In this case, each 3D extent includes one or more pairs of a base-view and dependent-view data block, as shown in FIGS. 19D and 34. These data blocks need to be transferred in parallel to different read buffers, i.e. read buffers 4921 and 4922. Accordingly, the BD-ROM drive 4901 needs to have at least the same access speed as the BD-ROM drive 4601 in the 2D playback device.

The switch 4911 receives 3D extents from the BD-ROM drive 4901. On the other hand, the switch 4911 receives, from the playback control unit 4907, information indicating the boundary in each data block included in the 3D extents, e.g. the number of source packets from the beginning of the 3D extent to each boundary. In this case, the playback control unit 4907 generates this information by referring to the extent start point in the clip information file. The switch 4911 further refers to this information to extract base-view data blocks from each 3D extent, then transmitting the data blocks to the first read buffer 4921. Conversely, the switch 4911 transmits the remaining dependent-view data blocks to the second read buffer 4922.

The first read buffer 4921 and the second read buffer 4922 are buffer memories that use a memory element in the playback unit 4900A. In particular, different areas in a single memory element are used as the read buffers 4921 and 4922. Alternatively, different memory elements may be used as the read buffers 4921 and 4922. The first read buffer 4921 receives base-view data blocks from the switch 4911 and stores these data blocks. The second read buffer 4922 receives dependent-view data blocks from the switch 4911 and stores these data blocks.

First, the system target decoder 4903 alternately reads base-view data blocks stored in the first read buffer 4921 and dependent-view data blocks stored in the second read buffer 4922. Next, the system target decoder 4903 separates elementary streams from each source packet via demultiplexing and furthermore, from the separated streams, decodes the data shown by the PID indicated by the playback control unit 4907. The system target decoder 4903 then writes the decoded elementary streams in internal plane memory according to the type thereof. The base-view video stream is written in the left-view video plane memory, and the dependent-view video stream is written in the right-view plane memory. On the other hand, the secondary video stream is written in the secondary video plane memory, the IG stream in the IG plane memory, and the PG stream in the PG plane memory. When stream data other than the video stream is composed of a pair of base-view stream data and dependent-view stream data, a pair of corresponding plane memories are prepared for the left-view plane data and right-view plane data. The system target decoder 4903 also processes graphics data from the program execution unit 4906, such as JPEG or PNG raster data, and writes this data in the image plane memory.

The system target decoder 4903 associates the output of plane data from the left-video and right-video plane memories with B-D presentation mode and B-B presentation mode. When the playback control unit 4907 indicates B-D presentation mode, the system target decoder 4903 alternately outputs plane data from the left-video and right-video plane memories. On the other hand, when the playback control unit 4907 indicates B-B presentation mode, the system target decoder 4903 outputs plane data from only the left-video or right-video plane memory twice per frame while maintaining the operation mode in 3D playback mode.

Furthermore, the system target decoder 4903 associates the output of the graphics plane memories, i.e. various types of graphics plane data from the PG plane memory, IG plane memory, and image plane memory, with 2 plane mode, 1 plane mode+offset mode, and 1 plane+zero offset mode. When the playback control unit 4907 indicates 2 plane mode, the system target decoder 4903 alternately outputs left-view and right-view graphics plane data from each of the graphics plane memories. When the playback control unit 4907 indicates 1 plane+offset mode or 1 plane+zero offset mode, the system target decoder 4903 outputs graphics plane data from each of the graphics plane memories while maintaining the operation mode in 3D playback mode. When the playback control unit 4907 indicates 1 plane+offset mode, the system target decoder 4903 furthermore outputs the offset value designated by the playback control unit 4907 to the plane adder 4910. In this case, the playback control unit 4907 sets the offset value based on the offset table in the clip information file. On the other hand, when the playback control unit 4907 indicates 1 plane+zero offset mode, the system target decoder 4903 outputs "0" as the offset value to the plane adder 4910.

Upon receiving a request from, for example, the program execution unit 4906 for performing 3D playlist playback processing, the playback control unit 4907 first refers to the 3D playlist file stored in the static scenario memory 4905. Next, in accordance with the 3D playlist file and following the sequence shown in FIG. 43, the playback control unit 4907 indicates to the BD-ROM drive 4901 the ranges of the LBN for the sector group on which the 3D extent is to be read is recorded. The playback control unit 4907 also refers to the 3D meta data in the clip information file stored in the static scenario memory 4905 to search for the extent start point for each 3D extent to be read. The playback control unit 4907 furthermore generates information that indicates the boundary of the data blocks included in each 3D extent and then transmits this information to the switch 4911.

Additionally, the playback control unit 4907 refers to the STN table and STN table SS in the 3D playlist file to control the operation requirements of the system target decoder 4903 and the plane adder 4910. For example, the playback control unit 4907 selects the PID for the elementary stream to be played back and outputs the PID to the system target decoder 4903. The playback control unit 4907 also selects the presentation mode for each plane in accordance with the offset during popup 4111 in the STN table SS and indicates these presentation modes to the system target decoder 4903 and plane adder 4910.

As in the 2D playback device, the player variable storage unit 4908 includes the SPRM shown in FIG. 47. However, any two of the SPRM(24)-(32) that were reserved in FIG. 47 include the first flag and second flag shown in FIG. 45. For example, the SPRM(24) may include the first flag, and the SPRM(25) the second flag. In this case, when the SPRM(24) is "0", the playback device 102 only supports playback of 2D video images, and when it is "1", the playback device 102 also supports 3D video image playback. When the SPRM(25) is "0", the 3D video image playback mode of the playback device 102 is L/R mode, and when it is "1", the 3D video image playback mode is depth mode.

The plane adder 4910 receives each type of plane data from the system target decoder 4903 and superimposes the pieces of plane data to create one composite frame or field. In particular, in L/R mode, the left-video plane data represents the left-view video plane, and the right-video plane data represents the right-view video plane. Accordingly, from among the other pieces of plane data, the plane adder 4910 superimposes pieces that represent the left-view on the left-view plane data and pieces that represent the right-view on the right-view plane data. On the other hand, in depth mode, the right-video plane data represents a depth map for a video plane representing the left-video plane data. Accordingly, the plane adder 4910 first generates a pair of left-view video plane data and right-view video plane data from both pieces of video plane data. Subsequently, the plane adder 4910 performs the same composition processing as in L/R mode.

When receiving an indication of 1 plane+offset mode or 1 plane+zero offset mode from the playback control unit 4907 as the presentation mode for the secondary video plane, PG plane, IG plane, or image plane, the plane adder 4910 performs cropping processing on the plane data received from the system target decoder 4903. A pair of left-view plane data and right-view plane data is thus generated. In particular, when 1 plane+offset mode is indicated, the cropping processing refers to the offset value indicated by the system target decoder 4903 or the program execution unit 4906. On the other hand, when 1 plane+zero offset mode is indicated, the offset value is set to "0" during cropping processing. Accordingly, the same plane data is output repeatedly to represent the left-view and right-view. Subsequently, the plane adder 4910 performs the same composition processing as in L/R mode. The composited frame or field is output to the display device 103 and displayed on the screen.

<<System Target Decoder>>

Figure 50:
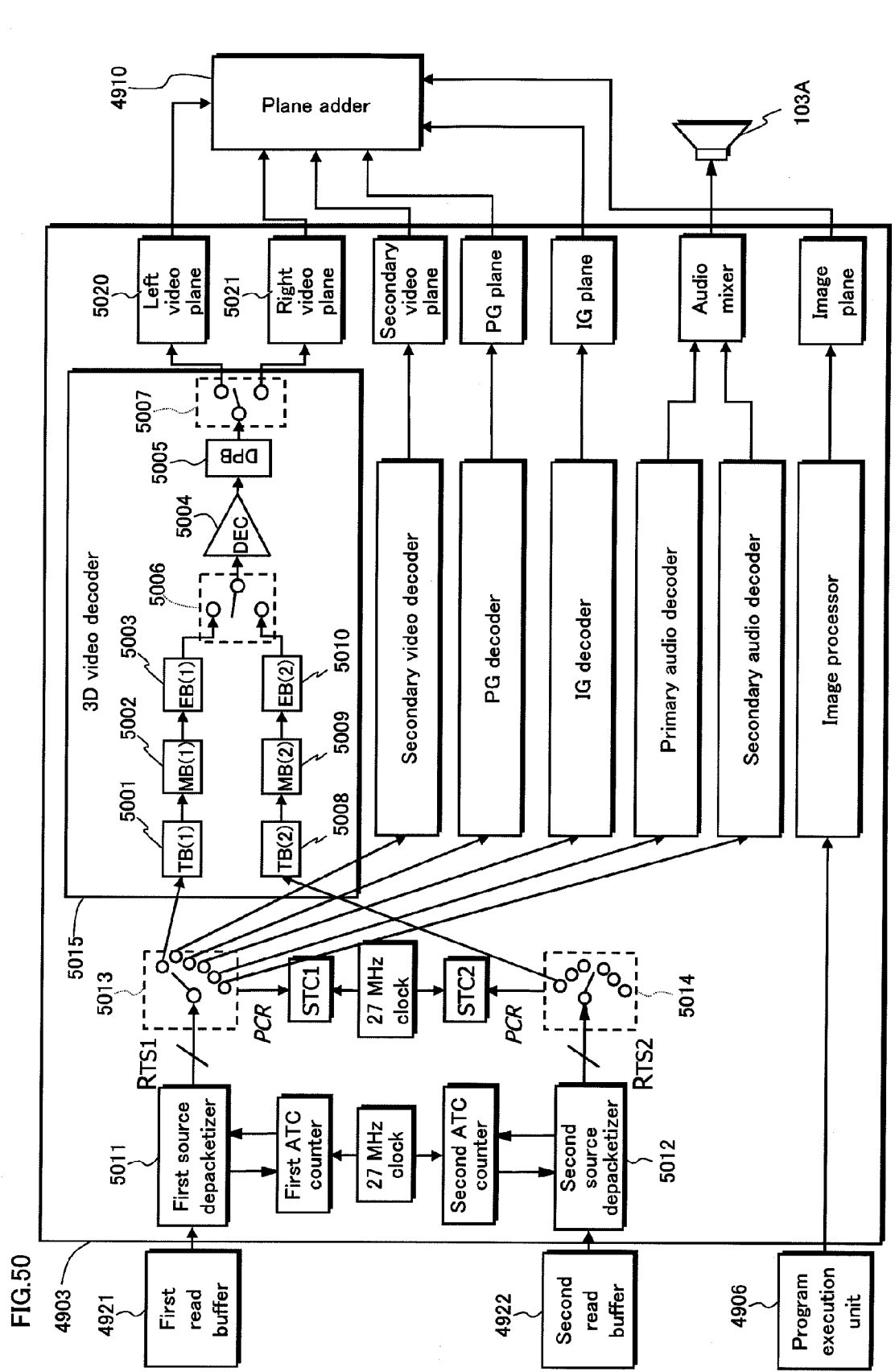
FIG. 50 is a functional block diagram of the system target decoder 4903 shown in FIG. 49.

FIG. 50 is a functional block diagram of the system target decoder 4903. The structural elements shown in FIG. 50 differ from the 2D playback device 4603 shown in FIG. 46 in the following two points: 1) the input channel from the read buffer to each decoder is doubled, and 2) the main video decoder supports 3D playback mode, and the secondary video decoder, PG decoder, and IG decoder support 2 plane mode. That is, these video decoders can all alternately decode a base-view stream and a dependent-view stream. On the other hand, the primary audio decoder, secondary audio decoder, audio mixer, image processor, and plane memories are similar to those in the 2D playback device shown in FIG. 46. Accordingly, among the structural elements shown in FIG. 50, those differing from the structural elements shown in FIG. 46 are described below, and details about similar structural elements are incorporated by reference to the description of FIG. 46. Furthermore, since the video decoders each have a similar structure, only the structure of the primary video decoder 5015 is described below, with this description being incorporated by reference with regards to the structure of other video decoders.

The first source depacketizer 5011 reads source packets from the first read buffer 4921, retrieves TS packets included in the source packets, and transmits the TS packets to the first PID filter 5013. The second source depacketizer 5012 reads source packets from the second read buffer 4922, retrieves TS packets included in the source packets, and transmits the TS packets to the second PID filter 5014. Each of the source depacketizers 5011 and 5012 further adjusts the time of transferring the TS packets in accordance with the ATS of the source packets. This adjustment is made with the same method as the source depacketizer 4610 shown in FIG. 46, and therefore the description thereof provided for FIG. 46 is hereby incorporated by reference. With this sort of adjustment, the mean transfer rate $R_{TS1}$ of TS packets from the first source depacketizer 5011 to the first PID filter 5013 does not exceed the system rate 3011 indicated by the 2D clip information file shown in FIG. 30. Similarly, the mean transfer rate $R_{TS2}$ of TS packets from the second source depacketizer 5012 to the second PID filter 5014 does not exceed the system rate indicated by the dependent-view clip information file.

The first PID filter 5013 compares the PID of each TS packet received from the first source depacketizer 5011 with the selected PID. The playback control unit 4907 designates the selected PID beforehand in accordance with the STN table in the 3D playlist file. When the two PIDs match, the first PID filter 5013 transfers the TS packets to the decoder assigned to the PID. For example, if a PID is 0x1011, the TS packets are transferred to TB(1) 5001 in the primary video decoder 5015, whereas TS packets with PIDs ranging from 0x1B00-0x1B1F, 0x1100-0x111F, 0x1A00-0x1A1F, 0x1200-0x121F, and 0x1400-0x141F are transferred to the secondary video decoder, primary audio decoder, secondary audio decoder, PG decoder, or IG decoder respectively.

The second PID filter 5014 compares the PID of each TS packet received from the second source depacketizer 5012 with the selected PID. The playback control unit 4907 designates the selected PID beforehand in accordance with the STN table SS in the 3D playlist file. Specifically, when the two PIDs match, the second PID filter 5014 transfers the TS packet to the decoder assigned to the PID. For example, if a PID is 0x1012 or 0x1013, the TS packets are transferred to TB(2) 5008 in the primary video decoder 5015, whereas TS packets with PIDs ranging from 0x1B20-0x1B3F, 0x1220-0x127F, and 0x1420-0x147F are transferred to the secondary video decoder, PG decoder, or IG decoder respectively.

The primary video decoder 5015 includes a TB(1) 5001, MB(1) 5002, EB(1) 5003, TB(2) 5008, MB(2) 5009, EB(2) 5010, buffer switch 5006, DEC 5004, DPB 5005, and picture switch 5007. The TB(1) 5001, MB(1) 5002, EB(1) 5003, TB(2) 5008, MB(2) 5009, EB(2) 5010 and DPB 5005 are all buffer memories, each of which uses an area of the memory elements included in the primary video decoder 5015. Note that some or all of these buffer memories may be separated on different memory elements.

The TB(1) 5001 receives TS packets that include a base-view video stream from the first PID filter 5013 and stores the TS packets as they are. The MB(1) 5002 stores PES packets reconstructed from the TS packets stored in the TB(1) 5001. The TS headers of the TS packets are removed at this point. The EB(1) 5003 extracts and stores encoded VAUs from the PES packets stored in the MB(1) 5002. The PES headers of the PES packets are removed at this point.

The TB(2) 5008 receives TS packets that include a dependent-view video stream from the second PID filter 5014 and stores the TS packets as they are. The MB(2) 5009 stores PES packets reconstructed from the TS packets stored in the TB(2) 5008. The TS headers of the TS packets are removed at this point. The EB(2) 5010 extracts and stores encoded VAUs from the PES packets stored in the MB(2) 5009. The PES headers of the PES packets are removed at this point.

The buffer switch 5006 transfers the VAUs stored in the EB(1) 5003 and the EB(2) 5010 to the DEC 5004 at the times indicated by the DTSs included in the original TS packets. In this case, the DTSs for a pair of pictures belonging to the same 3D VAU between the base-view video stream and dependent-view stream are the same. Accordingly, from among the pairs of VAUs that have the same DTSs and that are stored by the EB(1) 5003 and the EB(2) 5010, the buffer switch 5006 first transmits a pair stored in the EB(1) 5003 to the DEC 5004. Additionally, the buffer switch 5006 may receive back from the DEC 5004 the decode switch information 1401, shown in FIG. 14, in the VAU. In such a case, the buffer switch 5006 can determine if it should transfer the next VAU to the EB(1) 5003 or to the EB(2) 5010 by referring to the decode switch information 1401.

The DEC 5004 decodes VAUs transferred from the buffer switch 5006. In this case, the DEC 5004 uses different decoding methods according to the encoding format (e.g. MPEG-2, MPEG-4 AVC and VC1) of the compressed pictures contained in the VAU and according to the stream attribute. The DEC 5004 further transfers the decoded pictures, namely the video frames or fields, to the DPB 5005.

The DPB 5005 temporarily stores the decoded, uncompressed pictures. When the DEC 5004 decodes a P picture or a B picture, the DPB 5005 supplies the DEC 5004 with reference pictures from among the stored, uncompressed pictures in accordance with a request from the DEC 5004.

The picture switch 5007 writes the uncompressed pictures from the DPB 5005 to either the left-video plane memory 5020 or the right-video plane memory 5021 at the time indicated by the PTS included in the original TS packet. In this case, the PTSs for a pair of pictures belonging to the same 3D VAU between the base-view video stream and dependent-view video stream are the same. Accordingly, from among the pairs of pictures that have the same PTSs and that are stored by the DPB 5005, the picture switch 5007 first writes the picture belonging to the base-view video stream in the left-video plane memory 5020 and then writes the picture belonging to the dependent-view video stream in the right-video plane memory 5021.

<<Plane Adders>>

Figure 51:
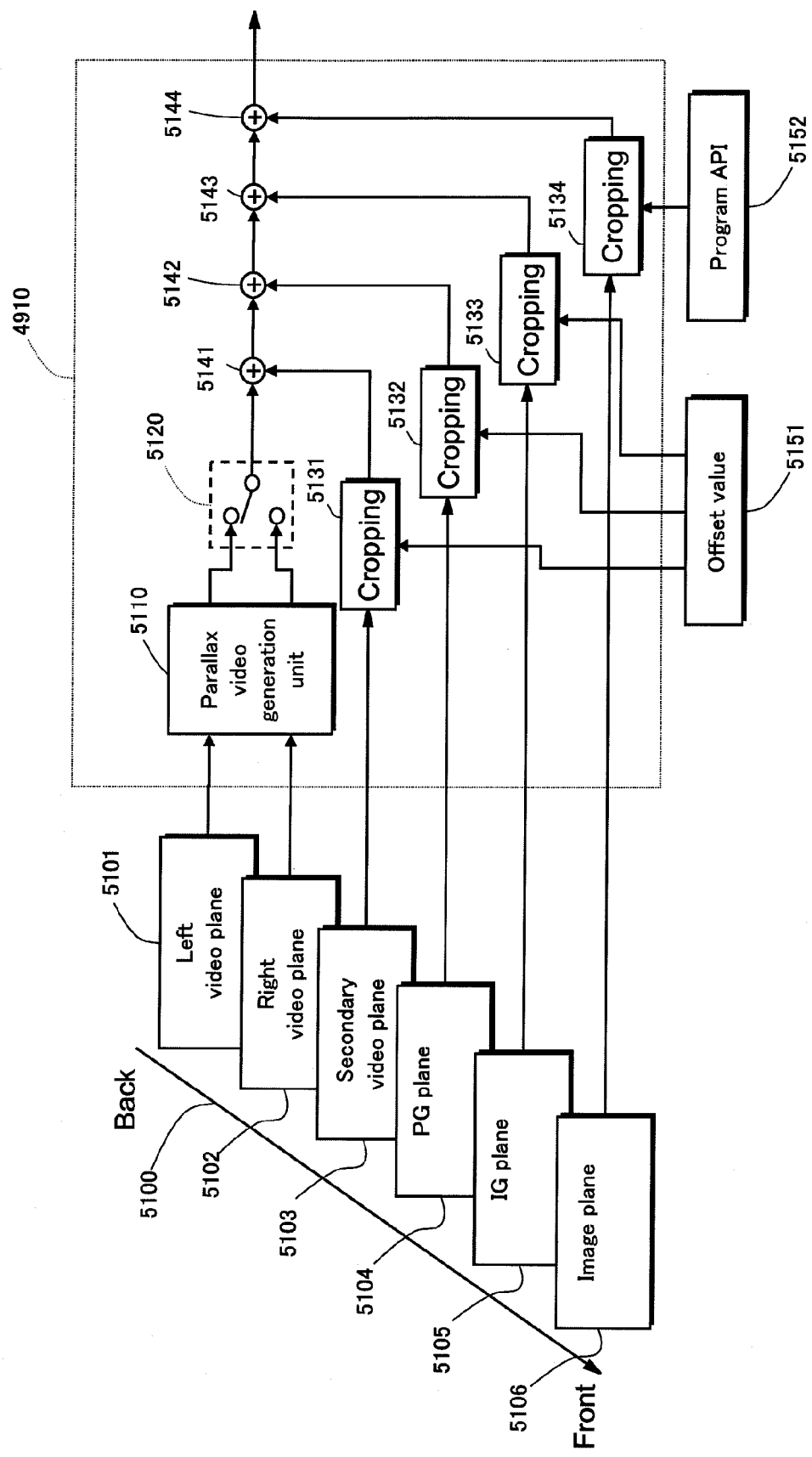
FIG. 51 is a functional block diagram of the plane adder 4910 shown in FIG. 49.

FIG. 51 is a functional block diagram of the plane adder 4910. As shown in FIG. 51, the plane adder 4910 includes a parallax video generation unit 5110, a switch 5120, four cropping processing units 5131-5134, and four adders 5141-5144.

The parallax video generation unit 5110 receives left-video plane data 5101 and right-video plane data 5102 from the system target decoder 4903. When the playback device 102 is in L/R mode, the left-video plane data 5101 represents the left-view video plane, and the right-video plane data 5102 represents the right-view video plane. At this point, the parallax video generation unit 5110 transmits the left-video plane data 5101 and the right-video plane data 5102 as they are to the switch 5120. On the other hand, when the playback device 102 is in depth mode, the left-video plane data 5101 represents the video plane for 2D video images, and the right-video plane data 5102 represents a depth map for the 2D video images. In this case, the parallax video generation unit 5110 first calculates the binocular parallax for each element in the 2D video images using the depth map. Next, the parallax video generation unit 5110 processes the left-video plane data 5101 to shift the presentation position of each element in the video plane for 2D video images to the left or right according to the calculated binocular parallax. This generates a pair of video planes representing the left-view and right-view. The parallax video generation unit 5110 further transmits the pair of video planes to the switch 5120 as a pair of pieces of left-video and right-video plane data.

When the playback control unit 4907 indicates B-D presentation mode, the switch 5120 transmits left-video plane data 5101 and right-video plane data 5102 with the same PTS to the first adder 5141 in that order. When the playback control unit 4907 indicates B-B presentation mode, the switch 5120 transmits one of the left-video plane data 5101 and right-video plane data 5102 with the same PTS twice per frame to the first adder 5141, discarding the other piece of plane data.

The cropping processing units 5131-5134 include the same structure as a pair of the parallax video generation unit 5110 and switch 5120. These structures are used in 2 plane mode. When the playback device 102 is in depth mode, the plane data from the system target decoder 4903 is converted into a pair of left-view and right-view pieces of plane data. When the playback control unit 4907 indicates B-D presentation mode, the left-view and right-view pieces of plane data are alternately transmitted to each of the adders 5141-5144. On the other hand, when the playback control unit 4907 indicates B-B presentation mode, one of the left-view and right-view pieces of plane data is transmitted twice per frame to each of the adders 5141-5144, and the other piece of plane data is discarded.

In 1 plane+offset mode, the first cropping processing unit 5131 receives an offset value 5151 from the system target decoder 4903 and refers to this value to perform cropping on the secondary video plane data 5103. The secondary video plane data 5103 is thus converted into a pair of pieces of secondary video plane data that represent a left-view and a right-view and are alternately transmitted. On the other hand, in 1 plane+zero offset mode, the secondary video plane data 5103 is transmitted twice.

In 1 plane+offset mode, the second cropping processing unit 5132 receives an offset value 5151 from the system target decoder 4903 and refers to this value to perform cropping on the PG plane data 5104. The PG plane data 5104 is thus converted into a pair of pieces of PG plane data that represent a left-view and a right-view and are alternately transmitted. On the other hand, in 1 plane+zero offset mode, the PG plane data 5104 is transmitted twice.

In 1 plane+offset mode, the third cropping processing unit 5133 receives an offset value 5151 from the system target decoder 4903 and refers to this value to perform cropping on the IG plane data 5105. The IG plane data 5105 is thus converted into a pair of pieces of IG plane data that represent a left-view and a right-view and are alternately transmitted. On the other hand, in 1 plane+zero offset mode, the IG plane data 5105 is transmitted twice.

FIGS. 52A and 52B are schematic diagrams showing cropping processing by the second cropping processing unit 5132. In FIGS. 52A and 52B, a pair of left-view PG plane data 5204L and right-view PG plane data 5204R are generated from PG plane data 5104 as follows. First, the second cropping processing unit 5132 retrieves the offset value assigned to the PG plane from the offset value 5151. Next, the second cropping processing unit 5132 shifts the left-view and right-view presentation positions of the graphics video indicated by the PG plane data 5104 in accordance with the offset value. This results in a left-view and right-view pair of pieces of PG plane data. Note that in 1 plane+zero offset mode, the offset value is "0", and thus the original PG plane data is preserved as is. The first cropping processing unit 5131 similarly performs cropping processing on the secondary video plane data 5103, and the third cropping processing unit 5133 similarly performs cropping processing on the IG plane data 5105.

As shown in FIG. 52A, when the sign of the offset value indicates that the depth of a 3D video image is closer than the screen, the second cropping processing unit 5132 first shifts each piece of pixel data in the PG plane data 5104 from its original position to the right by a number of pixels 5201L, which is the same as the offset value. When the sign of the offset value indicates that the depth of a 3D video image is deeper than the screen, the second cropping processing unit 5132 shifts pixel data to the left. Next, the second cropping processing unit 5132 removes the section of pixel data 5202L that protrudes outside the range of the PG plane data 5104 to the right (or left). The second cropping processing unit 5132 then outputs the remaining pixel data 5204L as the left-view PG plane data.

As shown in FIG. 52B, when the sign of the offset value indicates that the depth of a 3D video image is closer than the screen, the second cropping processing unit 5132 first shifts each piece of pixel data in the PG plane data 5104 from its original position to the left by a number of pixels 5201R, which is the same as the offset value. When the sign of the offset value indicates that the depth of a 3D video image is deeper than the screen, the second cropping processing unit 5132 shifts pixel data to the right. Next, the second cropping processing unit 5132 removes the section of pixel data 5202R that protrudes outside the range of the PG plane data 5104 to the left (or right). The second cropping processing unit 5132 then outputs the remaining pixel data 5204R as the right-view PG plane data.

Figure 53A:
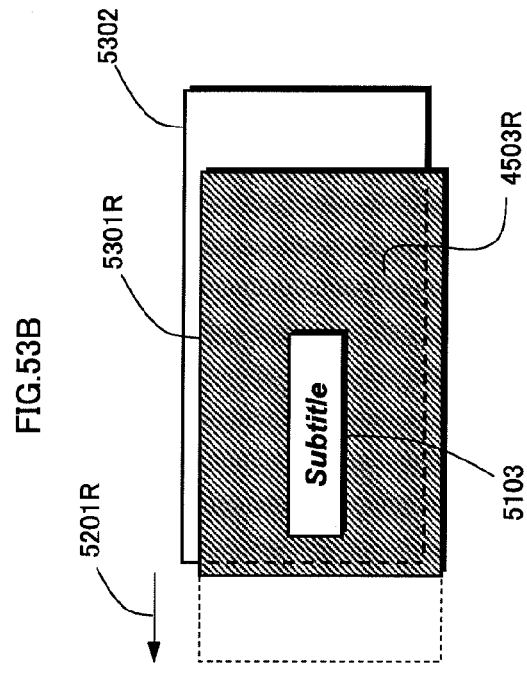
FIGS. 53A, 53B, and 53C are schematic diagrams respectively showing the left-view and right-view PG planes generated by the cropping processing shown in FIGS. 52A and 52B, as well as the 3D video image perceived by a viewer based on these PG planes.
Figure 53B:
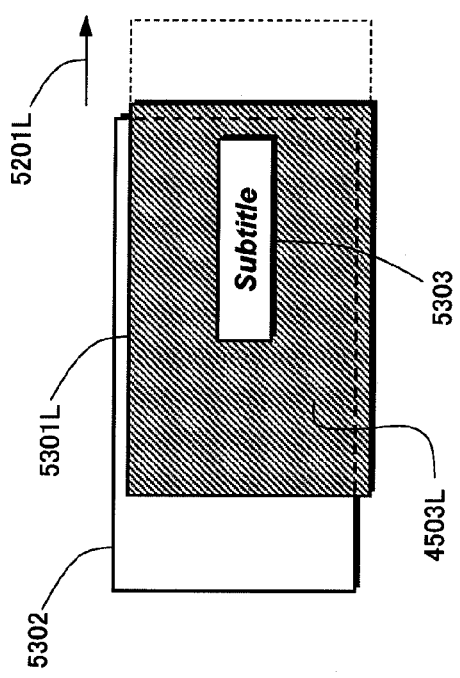
Figure 53C:
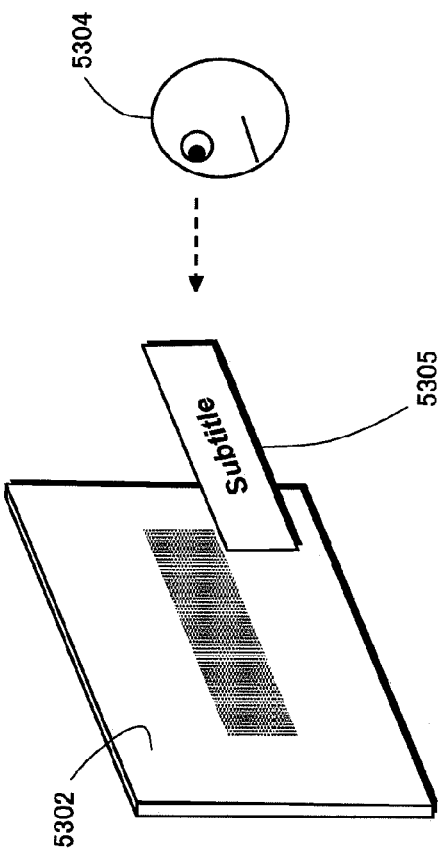

FIGS. 53A, 53B, and 53C are schematic diagrams respectively showing the left-view and right-view PG planes generated by the cropping processing shown in FIG. 52, as well as the 3D video image perceived by a viewer based on these PG planes. As shown in FIG. 53A, the left-view PG plane 5301L is shifted to the right from the range of the screen 5302 by an offset value 5201L. As a result, the subtitle 2D video image 5303 in the left-view PG plane 5301L appears shifted to the right from its original position by the offset value 5201L. As shown in FIG. 53B, the right-view PG plane 5301R is shifted to the left from the range of the screen 5302 by an offset value 5201R. As a result, the subtitle 2D video image 5303 in the right-view PG plane 5301R appears shifted to the left from its original position by the offset value 5201R. When these PG planes 5301L and 5301R are alternately displayed on the screen 5302, then as shown in FIG. 53C, a viewer 5304 perceives the subtitle 3D video image 5305 as closer than the screen 5302. The distance between the 3D video image 5305 and the screen 5302 can be adjusted with the offset values 5201L and 5201R. When the position of each piece of pixel data in the PG plane data 5104 is shifted in the opposite direction than is shown in FIGS. 52A and 52B, the viewer 5304 perceives the subtitle 3D video image 5305 to be further back than the screen 5302.

In 1 plane+offset mode, cropping processing is thus used to generate a pair of a left-view and right-view pieces of plane data from a single piece of plane data. This allows a parallax video image to be displayed from just one piece of plane data. In other words, a sense of depth can be given to a planar image. In particular, a viewer can be made to perceive this planar image as closer or further back than the screen. Note that in 1 plane+zero offset mode, the offset value is "0", and thus the planar image is preserved as is.

Once again referring to FIG. 51, the image plane data 5106 is graphics data transmitted from the program execution unit 4906 to the system target decoder 4903 and decoded by the system target decoder 4903. The graphics data is raster data such as JPEG data or PNG data, and shows a GUI graphics component such as a menu. The fourth cropping processing unit 5134 performs the cropping processing on the image plane data 5106 as do the other cropping processing units 5131-5133. However, unlike the other cropping processing units 5131-5133, the fourth cropping processing unit 5134 receives the offset value from a program API 5152 instead of from the system target decoder 4903. In this case, the program API 5152 is executed by the program execution unit 4906. In this way, the offset information corresponding to the depth of the image represented by the graphics data is calculated and output to the fourth cropping processing unit 5134.

First, the first adder 5141 receives video plane data from the switch 5120 and receives secondary plane data from the first cropping processing unit 5131. Next, the first adder 5141 superimposes one set of video plane data and secondary plane data at a time, outputting the result to the second adder 5142. The second adder 5142 receives PG plane data from the second cropping processing unit 5132, superimposes the PG plane data on the plane data from the first adder 5141, and outputs the result to the third adder 5143. The third adder 5143 receives IG plane data from the third cropping processing unit 5133, superimposes the IG plane data on the plane data from the second adder 5142, and outputs the result to the fourth adder 5144. The fourth adder 5144 receives image plane data from the fourth cropping processing unit 5134, superimposes the image plane data on the plane data from the third adder 5143, and outputs the result to the display device 103. As a result, the left-video plane data 5101 or right-video plane data 5102, the secondary plane data 5103, the PG plane data 5104, the IG plane data 5105, and the image plane data 5106 are superimposed in the order shown by the arrow 5100 in FIG. 51. Via this composition processing, for each video image shown by plane data, the left-video image plane or right-video image plane, secondary video plane, IG plane, PG plane, and image plane appear to overlap in this order on the screen of the display device 103.

In addition to the above-stated processing, the plane adder 4910 performs processing to convert an output format of the plane data combined by the four adders 5141-5144 into a format that complies with the 3D display method adopted in a device such as the display device 103 to which the data is output. If an alternate-frame sequencing method is adopted in the device, for example, the plane adder 4910 outputs the composited plane data pieces as one frame or one field. On the other hand, if a method that uses a lenticular lens is adopted in the device, the plane adder 4910 composites a pair of left-view and right-view pieces of plane data as one frame or one field of video data with use of the built-in buffer memory. Specifically, the plane adder 4910 temporarily stores and holds in the buffer memory the left-view plane data that has been composited first. Subsequently, the plane adder 4910 composites the right-view plane data, and further composites the resultant data with the left-view plane data held in the buffer memory. During composition, the left-view and right-view pieces of plane data are each divided, in a vertical direction, into small rectangular areas that are long and thin, and the small rectangular areas are arranged alternately in the horizontal direction in one frame or one field so as to reconstitute the frame or the field. In this way, the pair of left-view and right-view pieces of plane data is combined into one video frame or field, which the plane adder 4910 then outputs to the corresponding device.

<Conditions that the Size of Data Blocks should Meet for Seamless Playback of Video Images>

As shown in FIGS. 16 and 34, a BD-ROM disc 101 according to an embodiment of the present invention has an interleaved arrangement wherein base-view data blocks and dependent-view data blocks are alternately arranged one at a time. Furthermore, at locations where a long jump is necessary, such as layer boundaries, a base-view data block and duplicate data thereof are arranged as a block exclusively for 2D playback and a block exclusively for 3D playback, as shown in FIGS. 21-29 and 34. The arrangement of these data blocks is in accordance with the above description and is useful for seamless playback of both 2D video images and 3D video images. To further ensure such seamless playback, it is sufficient for the size of each data block to meet conditions based on the capability of the playback device 102. The following is a description of these conditions.

<<Conditions Based on Capability in 2D Playback Mode>>

Figure 54:
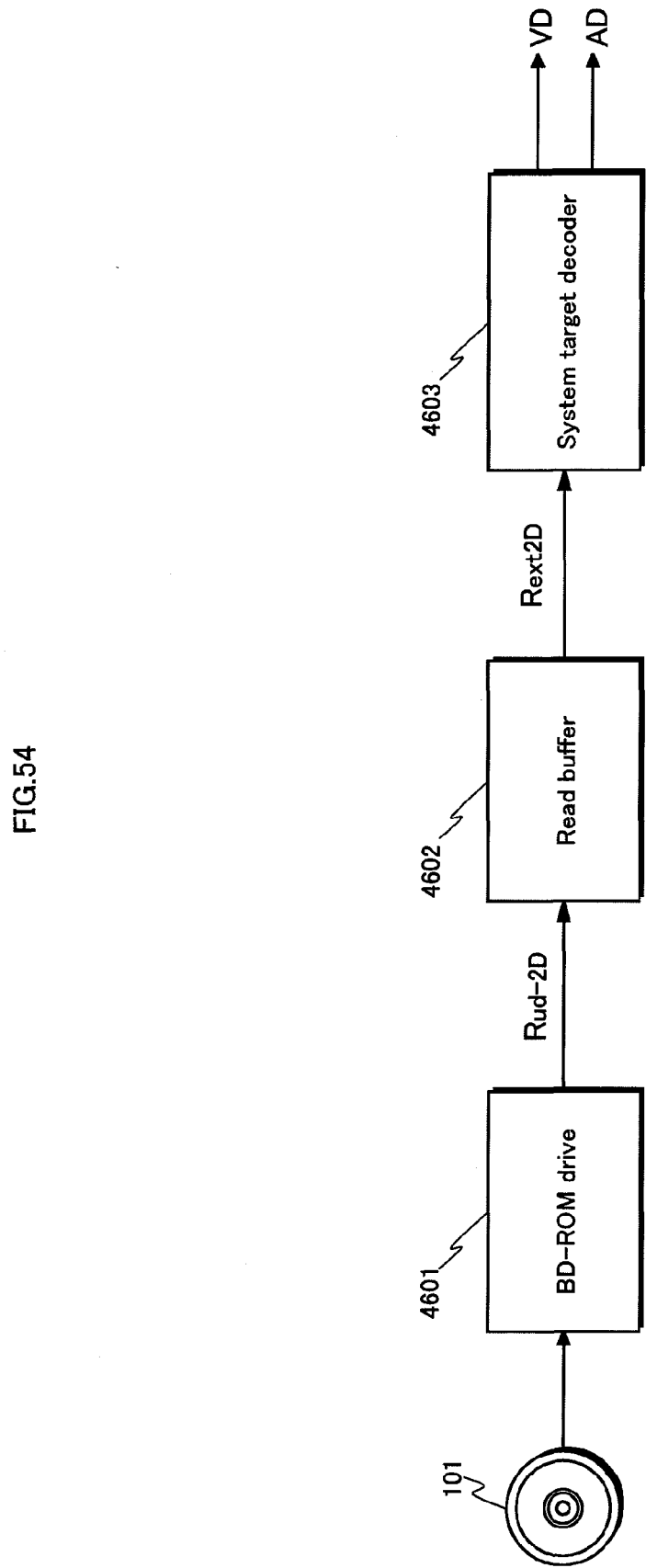
FIG. 54 is a schematic diagram showing the playback processing system in the playback device 102 in 2D playback mode shown in FIG. 46.

FIG. 54 is a schematic diagram showing the playback processing system in the playback device 102 in 2D playback mode. As shown in FIG. 54, from among the elements shown in FIG. 46, this playback processing system includes the BD-ROM drive 4601, read buffer 4602, and system target decoder 4603. The BD-ROM drive 4601 reads 2D extents from the BD-ROM disc 101 and transfers the 2D extents to the read buffer 4602 at a read rate $R_{ud-2D}$. The system target decoder 4603 reads source packets from each 2D extent accumulated in the read buffer 4602 at a mean transfer rate $R_{ext2D}$ and decodes the source packets into video data VD and audio data AD.

The mean transfer rate $R_{ext2D}$ is the same as 192/188 times the mean transfer rate $R_{TS}$ of TS packets from the source depacketizer 3711 to the PID filter 3713 shown in FIG. 37. In general, this mean transfer rate $R_{ext2D}$ changes for each 2D extent. The maximum value $R_{max2D}$ of the mean transfer rate $R_{ext2D}$ is the same as 192/188 times the system rate for the file 2D. In this case, the 2D clip information file specifies the system rate, as shown in FIG. 31. Also, the above coefficient 192/188 is the ratio of bytes in a source packet to bytes in a TS packet. The mean transfer rate $R_{ext2D}$ is conventionally represented in bits/second and specifically equals the value of the size of a 2D extent expressed in bits divided by the extent ATC time. The "size of an extent expressed in bits" is eight times the product of the number of source packets in the extent and the number of bytes per source packet (=192 bytes).

The read rate $R_{ud-2D}$ is conventionally expressed in bits/second and is set at a higher value, e.g. 54 Mbps, than the maximum value $R_{max2D}$ of the mean transfer rate $R_{ext2D}$: $R_{ud-2D} > R_{max2D}$. This prevents underflow in the read buffer 4602 due to decoding processing by the system target decoder 4603 while the BD-ROM drive 4601 is reading a 2D extent from the BD-ROM disc 101.

Figures 55A, 55B:
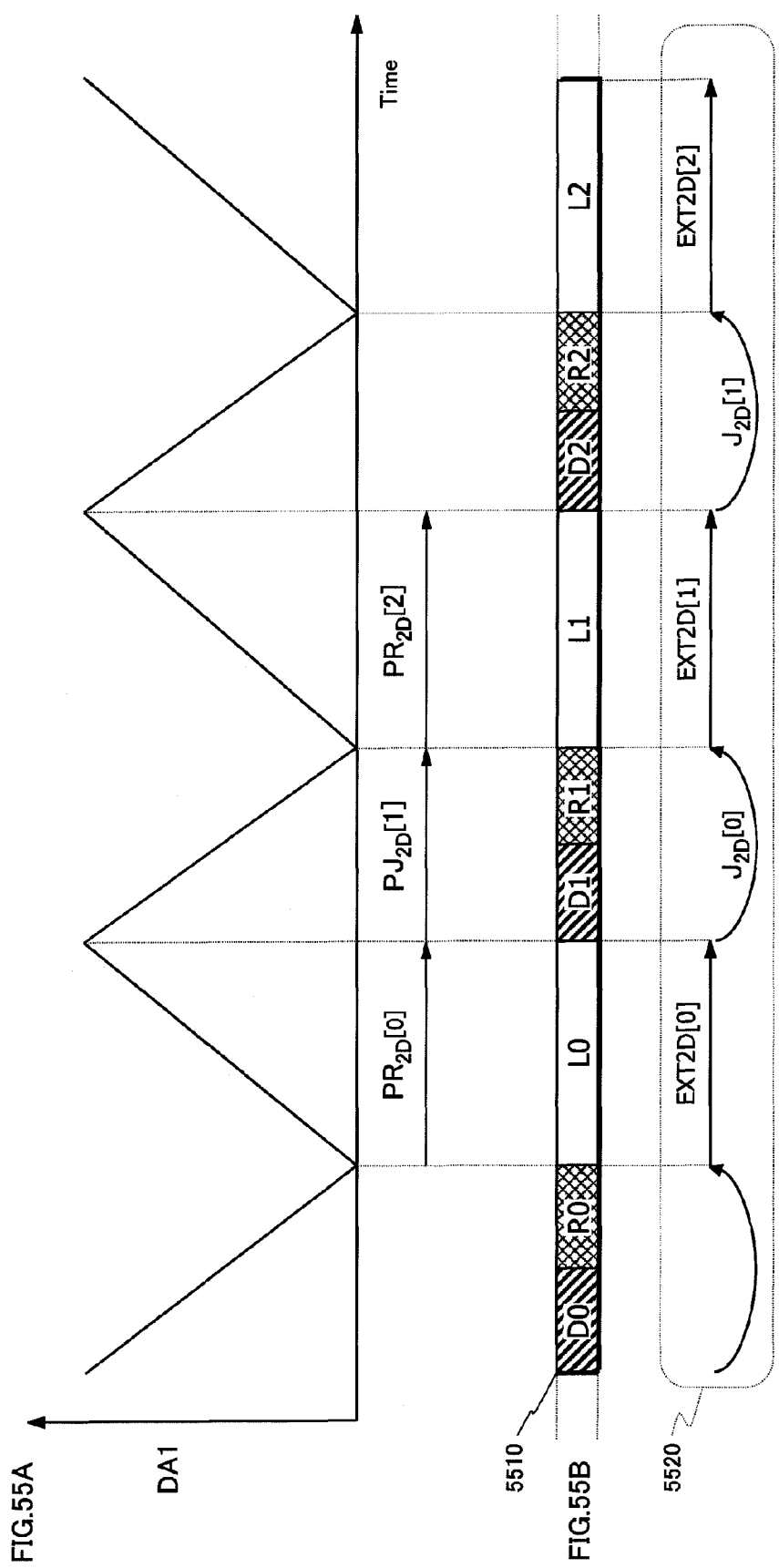
FIG. 55A is a graph showing the change in the data amount DA stored in the read buffer 4602 during playback processing of 2D extents by the playback processing system shown in FIG. 54.
FIG. 55B is a schematic diagram showing the relationship between a 3D extent block 5510 that includes these 2D extents and a playback path 5520 in 2D playback mode.

FIG. 55A is a graph showing the change in the data amount DA stored in the read buffer 4602 during playback processing of 2D extents. FIG. 55B is a schematic diagram showing the relationship between a 3D extent block 5510 that includes these 2D extents and a playback path 5520 in 2D playback mode. As shown in FIG. 55B, the 3D extent block 5510 is composed of a base-view data block group and a dependent-view data block group in an interleaved arrangement. In accordance with the playback path 5520, the base-view data blocks L0, L1, . . . are each treated as one 2D extent EXT2D[0], EXT2D[1], . . . and are read from the BD-ROM disc 101 into the read buffer 4602. First, during the read period $PR_{2D}[0]$ for the top base-view data block L0, i.e. the 2D extent EXT2D[0], the accumulated data amount DA increases at a rate equal to $R_{ud-2D} - R_{ext2D}[0]$, the difference between the read rate $R_{ud-2D}$ and the mean transfer rate $R_{ext2D}[0]$, as shown in FIG. 55A.

When the top 2D extent EXT2D[0] is read to the end, a first jump $J_{2D}[0]$ occurs. During the jump period $PJ_{2D}[0]$, reading of the subsequent two data blocks D1 and R1 is skipped, and reading of data from the BD-ROM disc 101 is suspended. Accordingly, during the first jump period $PJ_{2D}[0]$, the accumulated data amount DA decreases at the mean transfer rate $R_{ext2D}[0]$, as shown in FIG. 55A.

The following is assumed here: the data amount accumulated in the read buffer 4602 during the first read period $PR_{2D}[0]$, i.e. the size $S_{ext2D}[0]$ of the top 2D extent EXT2D [0], is the same as the data amount transferred from the read buffer 4602 to the system target decoder 4603 from the read period $PR_{2D}[0]$ through the first jump period $PJ_{2D}[0]$. In this case, as shown in FIG. 55A, upon completion of the first jump period $PJ_{2D}[0]$, the accumulated data amount DA does not fall below the value at the start of the first read period $PR_{2D}[0]$.

After the first jump $J_{2D}[0]$, reading of the next base-view data block L1, i.e. the 2D extent EXT2D[1], begins. During the read period $PR_{2D}[1]$, the accumulated data amount DA increases again at a rate equal to $R_{ud-2D}-R_{ext2D}[1]$, the difference in data transfer rates, as shown in FIG. 55A.

Reading and transfer operations by the BD-ROM drive 4601 are not actually performed continuously, but rather intermittently, as shown in FIG. 55A. During the read periods $PR_{2D}[0]$, $PR_{2D}[1]$, ... for each 2D extent, this prevents the accumulated data amount DA from exceeding the capacity of the read buffer 4602, i.e. overflow in the read buffer 4602. Accordingly, the graph in FIG. 55A represents what is actually a step-wise increase as an approximated straight increase.

In this way, in accordance with the playback path 5520, reading of a 2D extent Ln=EXT2D[n] (n=0, 1, 2 . . . ) and a jump $J_{2D}[n]$ to skip over the recording area of a pair of a dependent-view data blocks Dn, Rn are alternately repeated in 2D playback mode. Accordingly, the accumulated data amount DA in the read buffer 4602 increases during a read period $PR_{2D}[n]$ at a rate of $R_{ud-2D}-R_{ext2D}[n]$ and decreases during a jump period $PJ_{2D}[n]$ at a rate of $R_{ext2D}[n]$. Therefore, in order to seamlessly play back 2D video images from these 2D extents EXT2D[n], it suffices to meet the following conditions [1] and [2].

[1] While maintaining provision of data from the read buffer 4602 to the system target decoder 4603 during each jump period $PJ_{2D}[n]$, it is necessary to ensure continual output from the system target decoder 4603. As is clear from FIG. 55A, if the data amount accumulated in the read buffer 4602 during each read period $PR_{2D}[n]$, i.e. the size $S_{ext2D}[n]$ of each 2D extent EXT2D[n], is the same as the data amount transferred from the read buffer 4602 to the system target decoder 4603 from the read period $PR_{2D}[n]$ through the next jump period $PJ_{2D}[n]$, then the accumulated data amount DA does not return to the value immediately before the read period $PR_{2D}[n]$ during the jump period $PJ_{2D}[n]$. In particular, underflow does not occur in the read buffer 4602. In this case, the length of the read period $PR_{2D}[n]$ equals $S_{ext2D}[n]/R_{ud-2D}$, the value obtained by dividing the size $S_{ext2D}[n]$ of a 2D extent EXT2D[n] by the read rate $R_{ud-2D}$. Accordingly, it suffices for the size $S_{ext2D}[n]$ of each 2D extent EXT2D[n] to satisfy expression 1.

$$S_{ext2D}[n] \geq \left(\frac{S_{ext2D}[n]}{R_{ud-2D}} + T_{jump-2D}[n]\right) \times R_{ext2D}[n] \quad (1)$$

$$\therefore S_{ext2D}[n] \geq \text{CEIL}\left(\frac{R_{ext2D}[n]}{8} \times \frac{R_{ud-2D}}{R_{ud-2D} - R_{ext2D}[n]} \times T_{jump-2D}[n]\right)$$

In expression 1, the jump time $T_{jump-2D}[n]$ represents the length of the jump period $PJ_{2D}[n]$ in seconds. The read rate $R_{ud-2D}$ and the mean transfer rate $R_{ext2D}$ are both expressed in bits per second. Accordingly, in expression 1, the mean transfer rate $R_{ext2D}$ is divided by 8 to convert the size $S_{ext2D}[n]$ of the 2D extent from bits to bytes. That is, the size $S_{ext2D}[n]$ of the 2D extent is expressed in bytes. The function CEIL( ) is an operation to round up fractional numbers after the decimal point of the value in parentheses.

[2] Since the capacity of the read buffer 4602 is limited, the maximum value of the jump period $T_{jump-2D}[n]$ is limited. In other words, even if the accumulated data amount DA immediately before a jump period $PJ_{2D}[n]$ is the maximum capacity of the read buffer 4602, if the jump time $T_{jump-2D}[n]$ is too long, the accumulated data amount DA will reach zero during the jump period $PJ_{2D}[n]$, and there is a danger of underflow occurring in the read buffer 4602. Hereinafter, the time for the accumulated data amount DA to decrease from the maximum capacity of the read buffer 4602 to zero while data supply from the BD-ROM disc 101 to the read buffer 4602 has stopped, that is, the maximum value of the jump time $T_{jump-2D}$ that guarantees seamless playback, is referred to as the "maximum jump time".

In standards of optical discs, the relationships between jump distances and maximum jump times are determined from the access speed of the optical disc drive and other factors. FIG. 56 is an example of a correspondence table between jump distances $S_{jump}$ and maximum jump times $T_{jump}$ for a BD-ROM disc. In FIG. 56, jump distances $S_{jump}$ are represented in units of sectors, and maximum jump times $T_{jump}$ are represented in milliseconds. In this figure, 1 sector=2,048 bytes. As shown in FIG. 56, when a jump distance $S_{jump}$ is zero sectors or is within a range of 1-10,000 sectors, 10,001-20,000 sectors, 20,001-40,000 sectors, 40,001 sectors-1/10 stroke, and 1/10 stroke or greater, the corresponding maximum jump time $T_{jump}$ is 50 ms, 250 ms, 300 ms, 350 ms, 700 ms, and 1400 ms, respectively.

When the jump distance $S_{jump}$ is equal to zero sectors, the maximum jump time is particularly referred to as a "zero sector transition time $T_{jump-0}$". A "zero sector transition" is a movement of the optical pickup between two consecutive data blocks. During a zero sector transition period, the optical pickup head temporarily suspends its read operation and waits. The zero sector transition time may include, in addition to the time for shifting the position of the optical pickup head via revolution of the BD-ROM disc 101, overhead caused by error correction processing. "Overhead caused by error correction processing" refers to excess time caused by performing error correction processing twice using an ECC block when the boundary between ECC blocks does not match the boundary between two consecutive data blocks. A whole ECC block is necessary for error correction processing. Accordingly, when two consecutive data blocks share a single ECC block, the whole. ECC block is read and used for error correction processing during reading of either data block. As a result, each time one of these data blocks is read, a maximum of 32 sectors of excess data is additionally read. The overhead caused by error correction processing is assessed as the total time for reading the excess data, i.e. 32 sectors×2,048 bytes×8 bits/byte×2 instances/read rate $R_{ud-2D}$. Note that by configuring each data block in ECC block units, the overhead caused by error correction processing may be removed from the zero sector transition time.

When the BD-ROM disc 101 is a multilayer disc, during a long jump caused by switching layers, in addition to the maximum jump time $T_{jump}$ specified in FIG. 56, a designated time, such as 350 ms, for switching between recording layers, e.g. for performing a focus jump, is also necessary. Hereinafter, this time is referred to as a "layer switching time".

Based on the above considerations, the jump time $T_{jump-2D}$ [n] to be substituted into expression 1 is determined by the sum of two parameters, TJ[n] and TL[n]: $T_{jump-2D}[n]=TJ[n]+TL[n]$. The first parameter TJ[n] represents the maximum jump time specified for each jump distance by BD-ROM disc standards. The first parameter TJ[n] equals, for example, the maximum jump time in the table in FIG. 56 that corresponds to the number of sectors from the end of the $n^{th}$ 2D extent EXT2D[n] to the top of the $(n+1)^{th}$ 2D extent EXT2D[n+1], i.e. the jump distance. When there is the layer boundary LB between the $n^{th}$ 2D extent EXT2D[n] and the $(n+1)^{th}$ 2D extent EXT2D[n+1], the second parameter TL[n] equals the layer switching time, e.g. 350 ms, and when there is no layer boundary LB, the second parameter TL[n] equals zero. For example, when the maximum value of the jump time $T_{jump-2D}[n]$ is limited to 700 ms, then the jump distance between the two 2D extents EXT2D[n] and EXT2D[n+1] is permitted to be up to ⅒ strokes (approximately 1.2 GB) when there is no layer boundary between these 2D extents and 40,000 sectors (approximately 78.1 MB) when there is a layer boundary.

<<Conditions Based on 3D Playback Mode>>

Figure 57:
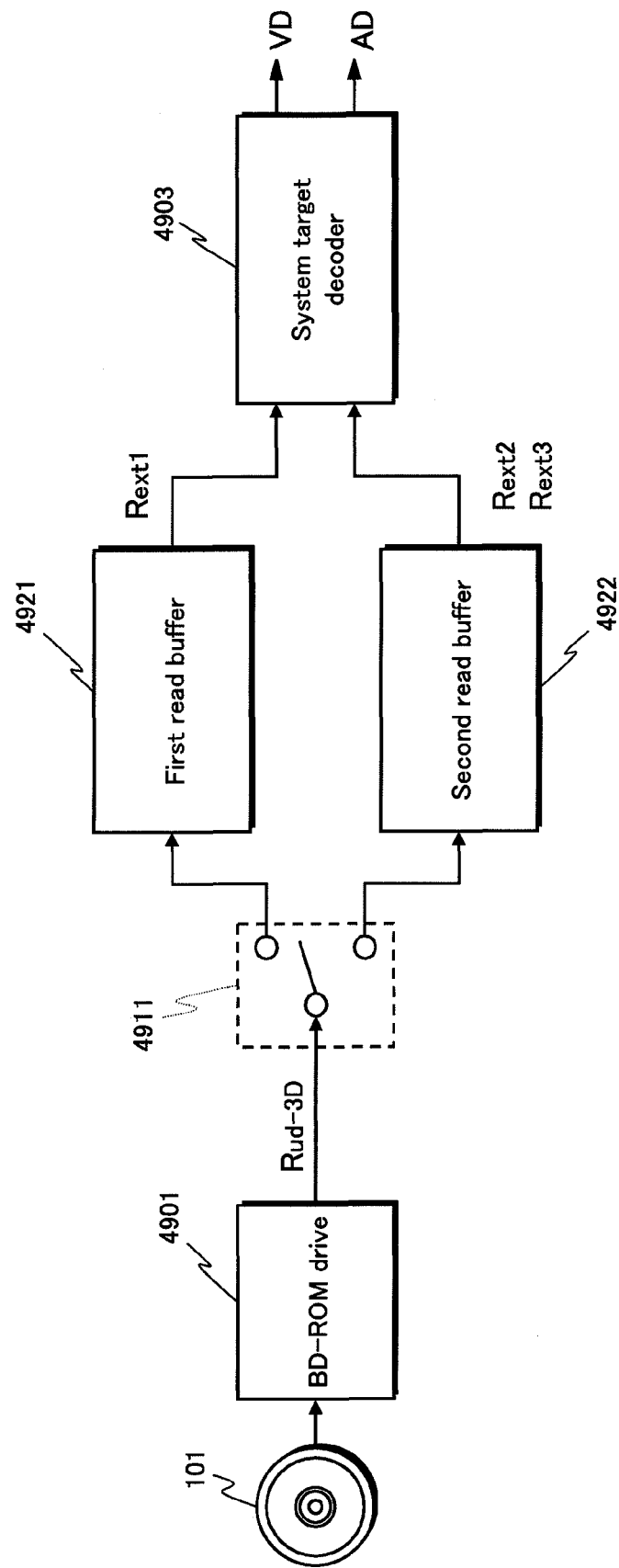
FIG. 57 is a schematic diagram showing the playback processing system in the playback device 102 in 3D playback mode shown in FIG. 49.

FIG. 57 is a schematic diagram showing the playback processing system in the playback device 102 in 3D playback mode. As shown in FIG. 57, from among the elements shown in FIG. 49, this playback processing system includes the BD-ROM drive 4901, switch 4911, first read buffer 4921, second read buffer 4922, and system target decoder 4903. The BD-ROM drive 4901 reads 3D extents from the BD-ROM disc 101 and transfers the 3D extents to the switch 4911 at a read rate $R_{ud-3D}$. The switch 4911 extracts base-view extents and dependent-view extents from 3D extents and separates the extracted extents. The base-view extents are stored in the first read buffer 4921, and the dependent-view extents are stored in the second read buffer 4922. The accumulated data in the second read buffer 4922 consists of right-view extents in L/R mode and of depth map extents in depth mode. The system target decoder 4903 reads source packets from the base-view extents accumulated in the first read buffer 4921 at a first mean transfer rate $R_{ext1}$. The system target decoder 4903 in L/R mode reads source packets from the right-view extents accumulated in the second read buffer 4922 at a second mean transfer rate $R_{ext2}$. The system target decoder 4903 in depth mode reads source packets from the depth map extents accumulated in the second read buffer 4922 at a third mean transfer rate $R_{ext3}$. The system target decoder 4903 also decodes pairs of read base-view extents and dependent-view extents into video data VD and audio data AD.

The first mean transfer rate $R_{ext1}$ is referred to as the "base-view transfer rate". The base-view transfer rate $R_{ext1}$ equals 192/188 times the mean transfer rate $R_{TS1}$ of TS packets from the first source depacketizer 5011 to the first PID filter 5013 shown in FIG. 50. In general, this base-view transfer rate $R_{ext1}$ changes for each base-view extent. The maximum value $R_{max1}$ of the base-view transfer rate $R_{ext1}$ equals 192/188 times the system rate for the file 2D. The 2D clip information file specifies the system rate. The base-view transfer rate $R_{ext1}$ is conventionally represented in bits/second and specifically equals the value of the size of a base-view extent expressed in bits divided by the extent ATC time. The extent ATC time represents the range of the ATSs assigned to source packets in the base-view extent. Accordingly, the extent ATC time equals the time necessary to transfer all of the source packets in the base-view extent from the first read buffer 4921 to the system target decoder 4903.

The second mean transfer rate $R_{ext2}$ is referred to as the "right-view transfer rate", and the third mean transfer rate $R_{ext3}$ is referred to as the "depth map transfer rate". Both transfer rates $R_{ext2}$ and $R_{ext3}$ equal 192/188 times the mean transfer rate $R_{TS2}$ of TS packets from the second source depacketizer 5012 to the second PID filter 5014. In general, these transfer rates $R_{ext2}$ and $R_{ext3}$ change for each dependent-view extent. The maximum value $R_{max2}$ of the right-view transfer rate $R_{ext2}$ equals 192/188 times the system rate for the first file DEP, and the maximum value $R_{max3}$ of the depth map transfer rate $R_{ext3}$ equals 192/188 times the system rate for the second file DEP. The right-view clip information file and depth map clip information file specify the respective system rates. The transfer rates $R_{ext2}$ and $R_{ext3}$ are conventionally represented in bits/second and specifically equal the value of the size of each dependent-view extent expressed in bits divided by the extent ATC time. The extent ATC time represents the range of the ATSs assigned to source packets in the dependent-view extent. Accordingly, the extent ATC time equals the time necessary to transfer all of the source packets in the dependent-view extent from the second read buffer 4922 to the system target decoder 4903.

The read rate $R_{ud-3D}$ is conventionally expressed in bits/second and is set at a higher value, e.g. 72 Mbps, than the maximum values $R_{max1}$-$R_{max3}$ of the first through third mean transfer rates $R_{ext1}$-$R_{ext3}$: $R_{ud-3D} > R_{max1}$, $R_{ud-3D} > R_{max2}$, $R_{ud-3D} > R_{max3}$. This prevents underflow in the read buffers 4921 and 4922 due to decoding processing by the system target decoder 4903 while the BD-ROM drive 4901 is reading a 3D extent from the BD-ROM disc 101.

[L/R Mode]

Figure 58:
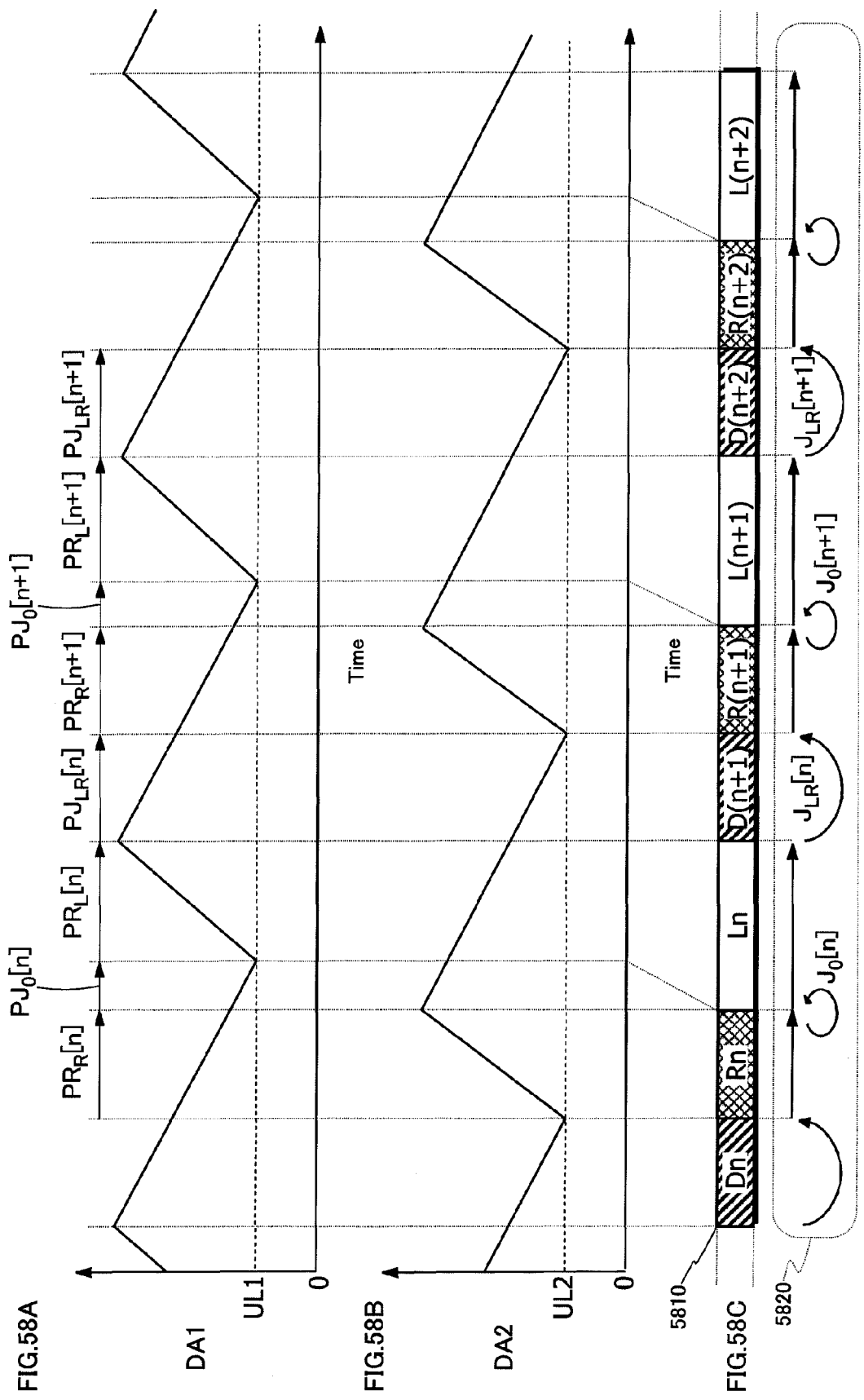
FIGS. 58A and 58B are graphs showing the change in data amounts DA1 and DA2 accumulated in the read buffers 4921 and 4922 during playback processing of a 3D extent block in L/R mode by the playback processing system shown in FIG. 57.
FIG. 58C is a schematic diagram showing the relationship between a 3D extent block 5810 and a playback path 5820 in L/R mode.

FIGS. 58A and 58B are graphs showing the change in data amounts DA1 and DA2 accumulated in the read buffers 4921 and 4922 during playback processing of a 3D extent block in L/R mode. FIG. 58C is a schematic diagram showing the relationship between a 3D extent block 5810 and a playback path 5820 in L/R mode. As shown in FIG. 58C, the 3D extent block 5810 is composed of a base-view data block group and a dependent-view data block group in an interleaved arrangement. In accordance with the playback path 5820, each pair of adjacent right-view data blocks Rk and base-view data blocks Lk (k=0, 1, 2, . . . ) is read as one 3D extent EXTSS[k]. For convenience of explanation, it is assumed that (n−1) 3D extents have already been read, and that an integer n is sufficiently larger than one. In this case, the accumulated data amounts DA1 and DA2 in the read buffers 4921 and 4922 are already maintained at or above the respective lower limits UL1 and UL2. These lower limits UL1 and UL2 are referred to as a "buffer margin amount". The method for guaranteeing the buffer margin amounts UL1 and UL2 is described later.

As shown in FIG. 58C, during the $(2n-1)^{th}$ read period $PR_R[n]$ the $n^{th}$ right-view extent Rn is read from the BD-ROM disc 101 into the second read buffer 4922. During the $(2n-1)^{th}$ read period $PR_R[n]$, the accumulated data amount DA2 in the second read buffer 4922 increases at a rate equal to $R_{ud-3D} - R_{ext2}[n]$, the difference between the read rate $R_{ud-3D}$ and a right-view transfer rate $R_{ext2}[n]$, as shown in FIG. 58B. Conversely, as shown in FIG. 58A, the accumulated data amount DA1 in the first read buffer 4921 decreases at a base-view transfer rate $R_{ext1}[n-1]$.

When the end of the $n^{th}$ right-view extent Rn is read, an $n^{th}$ zero sector transition $J_0[n]$ occurs. During the $n^{th}$ zero sector transition period $PJ_0[n]$, reading of data from the BD-ROM disc 101 is suspended. Accordingly, the accumulated data amount DA1 in the first read buffer 4921 continues to decrease at the base-view transfer rate $R_{ext1}[n-1]$, and the accumulated data amount DA2 in the second read buffer 4922 decreases at the right-view transfer rate $R_{ext2}[n]$ Upon completion of the $n^{th}$ zero sector transition period $PJ_0[n]$, the $2n^{th}$ read period $PR_L[n]$ begins. During the $2n^{th}$ read period $PR_L[n]$, the $n^{th}$ base-view extent Ln is read from the BD-ROM disc 101 into the first read buffer 4921. Accordingly, the accumulated data amount DA1 in the first read buffer 4921 increases at a rate equal to $R_{ud-3D}-R_{ext1}[n]$, the difference between the read rate $R_{ud-3D}$ and a base-view transfer rate $R_{ext1}[n]$, as shown in FIG. 58A. Conversely, as shown in FIG. 58B, the accumulated data amount DA2 in the second read buffer 4922 continues to decrease at the right-view transfer rate $R_{ext2}[n]$.

When the end of the $n^{th}$ base-view extent Ln is read, an $n^{th}$ jump $J_{LR}[n]$ occurs. During the $n^{th}$ jump period $PJ_{LR}[n]$, reading of the $(n+1)^{th}$ depth map extent D $(n+1)$ is skipped, and therefore reading of data from the BD-ROM disc 101 is suspended. Accordingly, during the $n^{th}$ jump period $PJ_{LR}[n]$, the accumulated data amount DA1 in the first read buffer 4921 decreases at the base-view transfer rate $R_{ext1}[n]$, as shown in FIG. 58A. Meanwhile, the accumulated data amount DA2 in the second read buffer 4922 continues to decrease at the right-view transfer rate $R_{ext2}[n]$, as shown in FIG. 58B.

The following is assumed here: the data amount accumulated in the second read buffer 4922 during the $(2n-1)^{th}$ read period $PR_R[n]$, i.e. the size $S_{ext2}[n]$ of the $n^{th}$ right-view extent Rn, is at least equal to the data amount transferred from the second read buffer 4922 to the system target decoder 4903 from the $(2n-1)^{th}$ read period $PR_R[n]$ through the $n^{th}$ jump period $PJ_{LR}[n]$. In this case, as shown in FIG. 58B, upon completion of the jump period $PJ_{LN}[n]$, the accumulated data amount DA2 in the second read buffer 4922 does not fall below the second buffer margin amount UL2.

Upon completion of the $n^{th}$ jump period $PJ_{LR}[n]$, the $(2n+1)^{th}$ read period $PR_R[n+1]$ begins. During the $(2n+1)^{th}$ read period $PR_R[n+1]$, the $(n+1)^{th}$ right-view extent $R(n+1)$ is read from the BD-ROM disc 101 into the second read buffer 4922. Accordingly, as shown in FIG. 58B, the accumulated data amount DA2 in the second read buffer 4922 increases at a rate equal to $R_{ud-3D}-R_{ext2}[n+1]$, the difference between the read rate $R_{ud-3D}$ and a right-view transfer rate $R_{ext2}[n+1]$. Conversely, the accumulated data amount DA1 in the first read buffer 4921 continues to decrease at the base-view transfer rate $R_{ext1}[n]$, as shown in FIG. 58A.

When the end of the $(n+1)^{th}$ right-view extent $R(n+1)$ is read, an $(n+1)^{th}$ zero sector transition $J_0[n+1]$ occurs. During the $(n+1)^{th}$ zero sector transition period $PJ_0[n+1]$, reading of data from the BD-ROM disc 101 is suspended. Accordingly, the accumulated data amount DA1 in the first read buffer 4921 continues to decrease at the base-view transfer rate $R_{ext1}[n]$, and the accumulated data amount DA2 in the second read buffer 4922 decreases at the right-view transfer rate $R_{ext2}[n+1]$.

The following is assumed here: the data amount accumulated in the first read buffer 4921 during the $2n^{th}$ read period $PR_L[n]$, i.e. the size $S_{ext1}[n]$ of the $n^{th}$ base-view extent Ln, is at least equal to the data amount transferred from the first read buffer 4921 to the system target decoder 4903 from the $2n^{th}$ read period $PR_L[n]$ through the $(n+1)^{th}$ zero sector transition period $PJ_0[n+1]$. In this case, as shown in FIG. 58A, upon completion of the $(n+1)^{th}$ zero sector transition period $PJ_0[n+1]$, the accumulated data amount DA1 in the first read buffer 4921 does not fall below the first buffer margin amount UL1.

For seamless playback of 3D video images from the 3D extents $EXTSS[n]=Rn+Ln$, $EXTSS[n+1]=R(n+1)+L(n+1)$, ... despite the jumps between these extents, it suffices to repeat the above changes in the accumulated data amounts DA1 and DA2. To do so, the following three conditions [3], [4], and [5] should be met.

[3] The size $S_{ext1}[n]$ of the $n^{th}$ base-view extent Ln is at least equal to the data amount transferred from the first read buffer 4921 to the system target decoder 4903 from the $2n^{th}$ read period $PR_L[n]$ through the $(n+1)^{th}$ zero sector transition period $PJ_0[n+1]$. The length of the $2n^{th}$ read period $PR_L[n]$ equals $S_{ext1}[n]/R_{ud-3D}$, the value obtained by dividing the size $S_{ext1}[n]$ of the $n^{th}$ base-view extent Ln by the read rate $R_{ud-3D}$. The length of the $(2n+1)^{th}$ read period $PR_R[n+1]$ equals $S_{ext2}[n+1]/R_{ud-3D}$, the value obtained by dividing the size $S_{ext2}[n+1]$ of the $(n+1)^{th}$ right-view extent $R(n+1)$ by the read rate $R_{ud-3D}$. Accordingly, suffices for the size $S_{ext1}[n]$ of the $n^{th}$ base-view extent Ln to satisfy expression 2.

$$S_{ext1}[n] \geq \qquad (2)$$

$$\left(\frac{S_{ext1}[n]}{R_{ud-3D}} + T_{jump-3D}[n] + \frac{S_{ext2}[n+1]}{R_{ud-3D}} + T_{jump-0}[n+1]\right) \times R_{ext1}[n]$$

$$\therefore S_{ext1}[n] \geq \text{CEIL}\left\{\frac{R_{ext1}[n]}{8} \times \frac{R_{ud-3D}}{R_{ud-3D} - R_{ext1}[n]} \times \left(T_{jump-3D}[n] + \frac{S_{ext2}[n+1]}{R_{ud-3D}} + T_{jump-0}[n+1]\right)\right\}$$

[4] The size $S_{ext2}[n]$ of the $n^{th}$ right-view extent Rn is at least equal to the data amount transferred from the second read buffer 4922 to the system target decoder 4903 from the $(2n-1)^{th}$ read period $PR_R[n]$ through the $n^{th}$ jump period $PJ_{LR}[n]$. The length of the $(2n-1)^{th}$ read period $PR_R[n]$ equals $S_{ext2}[n]/R_{ud-3D}$, the value obtained by dividing the size $S_{ext2}[n]$ of the $n^{th}$ right-view extent Rn by the read rate $R_{ud-3D}$. Accordingly, it suffices for the size $S_{ext2}[n]$ of the $n^{th}$ right-view extent Rn to satisfy expression 3.

$$S_{ext1}[n] \geq \qquad (3)$$

$$\left(\frac{S_{ext1}[n]}{R_{ud-3D}} + T_{jump-3D}[n] + \frac{S_{ext2}[n+1]}{R_{ud-3D}} + T_{jump-0}[n+1]\right) \times R_{ext1}[n]$$

$$\therefore S_{ext1}[n] \geq \text{CEIL}\left\{\frac{R_{ext1}[n]}{8} \times \frac{R_{ud-3D}}{R_{ud-3D} - R_{ext1}[n]} \times \left(T_{jump-3D}[n] + \left(\frac{S_{ext2}[n+1]}{R_{ud-3D}} + T_{jump-0}[n+1]\right)\right)\right\}$$

[5] Unlike the jump time $T_{jump-2D}[n]$ substituted into expression 1, the jump time $T_{jump-3D}[n]$ to be substituted into expressions 2 and 3 is determined by only the first parameter $TJ[n]$: $T_{jump-3D}[n]=TJ[n]$. The first parameter $TJ[n]$ equals, for example, the maximum jump time in the table in FIG. 56 that corresponds to the number of sectors from the end of the $n^{th}$ base-view extent Ln to the top of the $(n+1)^{th}$ right-view extent $R(n+1)$, i.e. the jump distance.

[Depth Mode]

Figure 59:
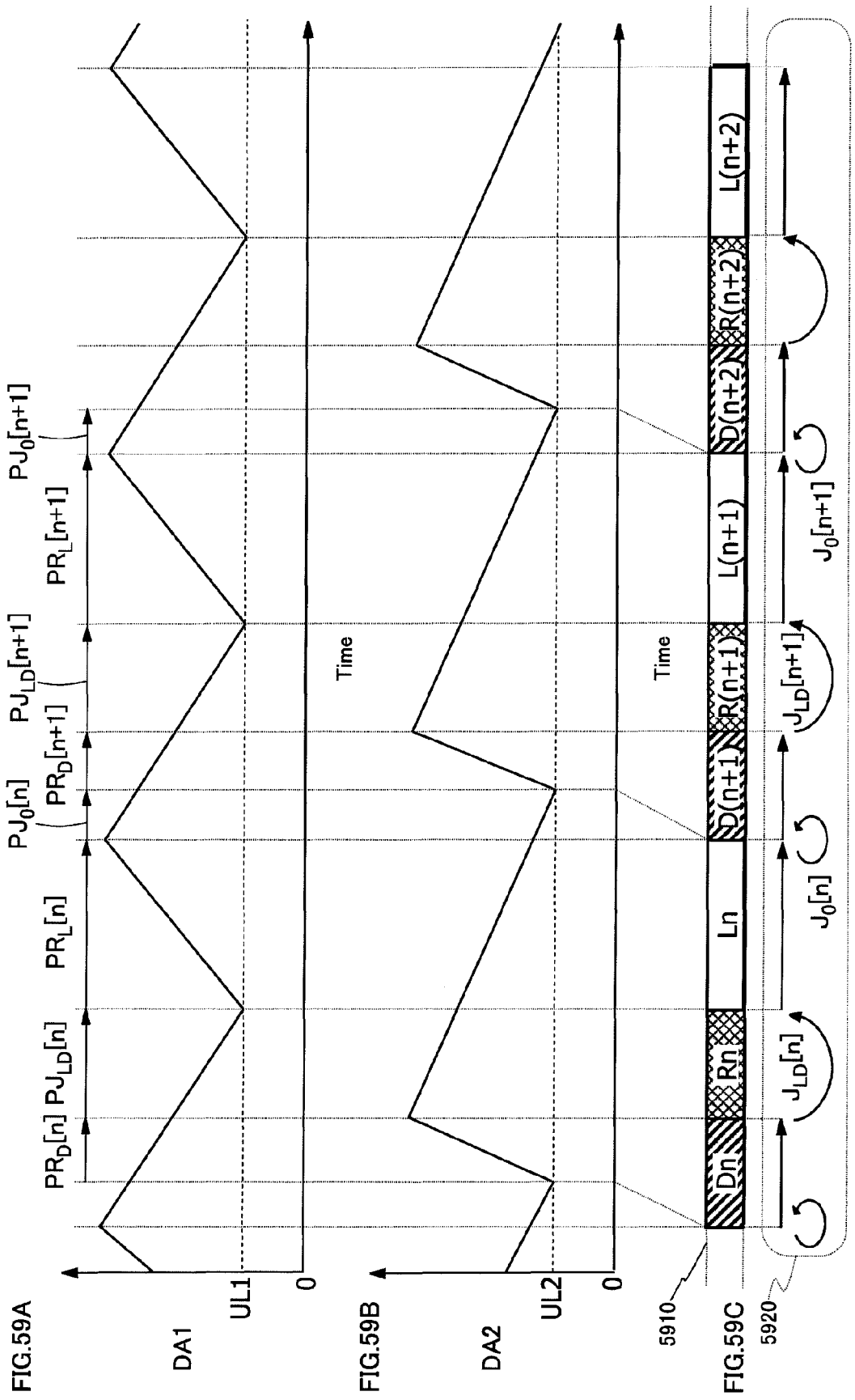
FIGS. 59A and 59B are graphs showing the change in data amounts DA1 and DA2 stored in the read buffers 4921 and 4922 during playback processing of a 3D extent block in depth mode by the playback processing system shown in FIG. 57.
FIG. 59C is a schematic diagram showing the relationship between a 3D extent block 5910 and a playback path 5920 in depth mode.

FIGS. 59A and 59B are graphs showing the change in data amounts DA1 and DA2 stored in the read buffers 4921 and 4922 during playback processing of a 3D extent block in depth mode. FIG. 59C is a schematic diagram showing the relationship between a 3D extent block 5910 and a playback path 5920. As shown in FIG. 59C, the 3D extent block 5810 is composed of data block groups in an interleaved arrangement similar to the 3D extent block 5810 shown in FIG. 58C. In accordance with the playback path 5920, depth map data blocks Dk and base-view data blocks Lk (k=0, 1, 2, ...) are read as one extent. As in FIG. 58, it is assumed that (n−1) 3D extents have already been read, and that an integer n is sufficiently larger than one. In this case, the accumulated data amounts DA1 and DA2 in the read buffers 4921 and 4922 are already maintained at or above the respective buffer margin amounts UL1 and UL2.

As shown in FIG. 59C, during the $(2n-1)^{th}$ read period $PR_D[n]$, the $n^{th}$ depth map extent Dn is read from the BD- ROM disc 101 into the second read buffer 4922. During the $(2n-1)^{th}$ read period $PR_D[n]$, the accumulated data amount DA2 in the second read buffer 4922 increases at a rate equal to $R_{ud-3D}-R_{ext3}[n]$, the difference between the read rate $R_{ud-3D}$ and a depth map transfer rate $R_{ext3}[n]$ as shown in FIG. 59B. Conversely, as shown in FIG. 59A, the accumulated data amount DA1 in the first read buffer 4921 decreases at a base-view transfer rate $R_{ext1}[n-1]$.

When the end of the $n^{th}$ depth map extent Dn is read, an $n^{th}$ jump $J_{LD}[n]$ occurs. During the $n^{th}$ jump period $PJ_{LD}[n]$, reading of the $n^{th}$ right-view extent Rn is skipped, and therefore reading of data from the BD-ROM disc 101 is suspended. Accordingly, during the $n^{th}$ jump period $PJ_{LD}[n]$, the accumulated data amount DA1 in the first read buffer 4921 continues to decrease at the base-view transfer rate $R_{ext1}[n-1]$, as shown in FIG. 59A. Meanwhile, the accumulated data amount DA2 in the second read buffer 4922 decreases at the depth map transfer rate $R_{ext3}[n]$ as shown in FIG. 59B.

After completion of the $n^{th}$ jump period $PJ_{LD}[n]$, the $2n^{th}$ read period $PR_L[n]$ begins. During the $2n^{th}$ read period $PR_L[n]$, the $n^{th}$ base-view extent Ln is read from the BD-ROM disc 101 into the first read buffer 4921. Accordingly, as shown in FIG. 59A, the accumulated data amount DA1 in the first read buffer 4921 increases at a rate equal to $R_{ud-3D}-R_{ext1}[n]$, the difference between the read rate $R_{ud-3D}$ and a base-view transfer rate $R_{ext1}[n]$. Conversely, the accumulated data amount DA2 in the second read buffer 4922 continues to decrease at the depth map transfer rate $R_{ext3}[n]$, as shown in FIG. 59B.

When the end of the $n^{th}$ base-view extent Ln is read, an $n^{th}$ zero sector transition $J_0[n]$ occurs. During the $n^{th}$ zero sector transition period $PJ_0[n]$, reading of data from the BD-ROM disc 101 is suspended. Accordingly, the accumulated data amount DA1 in the first read buffer 4921 decreases at the base-view transfer rate $R_{ext1}[n]$, and the accumulated data amount DA2 in the second read buffer 4922 continues to decrease at the depth map transfer rate $R_{ext3}[n]$.

The following is assumed here: the data amount accumulated in the second read buffer 4922 during the $(2n-1)^{th}$ read period $PR_D[n]$, i.e. the size $S_{ext3}[n]$ of the $n^{th}$ depth map extent Dn, is at least equal to the data amount transferred from the second read buffer 4922 to the system target decoder 4903 from the $(2n-1)^{th}$ read period $PR_D[n]$ through the $n^{th}$ zero sector transition period $PJ_0n$. In this case, as shown in FIG. 59B, upon completion of the $n^{th}$ zero sector transition period $PJ_0[n]$, the accumulated data amount DA2 in the second read buffer 4922 does not fall below the second buffer margin amount UL2.

Upon completion of the $n^{th}$ zero sector transition period $PJ_0[n]$, the $(2n+1)^{th}$ read period $PR_D[n+1]$ begins. During the $(2n+1)^{th}$ read period $PR_D[n+1]$, the $(n+1)^{th}$ depth map extent $D(n+1)$ is read from the BD-ROM disc 101 into the second read buffer 4922. Accordingly, the accumulated data amount DA1 in the first read buffer 4921 continues to decrease at the base-view transfer $R_{ext1}[n]$, as shown in FIG. 59A. Conversely, as shown in FIG. 59B, the accumulated data amount DA2 in the second read buffer 4922 increases at a rate of $R_{ud-3D}-R_{ext3}[n+1]$.

When the end of the $(n+1)^{th}$ depth map extent $D(n+1)$ is read, an $(n+1)^{th}$ $J_{LD}[n+1]$ occurs. During the $(n+1)^{th}$ jump period $PJ_{LD}[n+1]$, reading of the $(n+1)^{th}$ right-view extent $R(n+1)$ is skipped, and therefore reading of data from the BD-ROM disc 101 is suspended. Accordingly, during the $(n+1)^{th}$ jump period $PJ_{LD}[n+1]$, the accumulated data amount DA1 in the first read buffer 4921 continues to decrease at the base-view transfer rate $R_{ext1}[n]$, and the accumulated data amount DA2 in the second read buffer 4922 decreases at a depth map transfer rate $R_{ext3}[n+1]$.

Upon completion of the $(n+1)^{th}$ jump period $PJ_{LD}[n+1]$, the $(2n+2)^{th}$ read period $PR_L[n+1]$ begins. During the $(2n+2)^{th}$ read period $PR_L[n+1]$, the $(n+1)^{th}$ base-view extent L $(n+1)$ is read from the BD-ROM disc 101 into the first read buffer 4921. Accordingly, as shown in FIG. 59A, the accumulated data amount DA1 in the first read buffer 4921 increases at a rate of $R_{ud-3D}-R_{ext1}[n+1]$. Conversely, the accumulated data amount DA2 in the second read buffer 4922 continues to decrease at the depth map transfer rate $R_{ext3}[n+1]$, as shown in FIG. 59B.

The following is assumed here: the data amount accumulated in the first read buffer 4921 during the $2n^{th}$ read period $PR_L[n]$, i.e. the size $S_{ext1}[n]$ of the $n^{th}$ base-view extent Ln, is at least equal to the data amount transferred from the first read buffer 4921 to the system target decoder 4903 from the $2n^{th}$ read period $PR_L[n]$ through the $(n+1)^{th}$ jump period $PJ_{LD}[n+1]$. In this case, as shown in FIG. 59A, upon completion of the $(n+1)^{th}$ jump period $PJ_{LD}[n+1]$, the accumulated data amount DA1 in the first read buffer 4921 does not fall below the first buffer margin amount UL1

For seamless playback of 3D video images from the depth map extents Dn, $D(n+1)$, . . . and the base-view extents Ln, $L(n+1)$, . . . despite the jumps between these extents, it suffices to repeat the above changes in the accumulated data amounts DA1 and DA2. To do so, the following conditions [6], [7], and [8] need to be met.

[6] The size $S_{ext1}[n]$ of the $n^{th}$ base-view extent Ln is at least equal to the data amount transferred from the first read buffer 4921 to the system target decoder 4903 from the $2n^{th}$ read period $PR_L[n]$ through the $(n+1)^{th}$ jump period $PJ_{LD}[n+1]$. The length of the $2n^{th}$ read period $PR_L[n]$ equals $S_{ext1}[n]/R_{ud-3D}$, the value obtained by dividing the size $S_{ext1}[n]$ of the $n^{th}$ base-view extent Ln by the read rate $R_{ud-3D}$. The length of the $(2n+1)^{th}$ read period $PR_D[n+1]$ equals $S_{ext3}[n+1]/R_{ud-3D}$, the value obtained by dividing the size $S_{ext3}[n+1]$ of the $(n+1)^{th}$ depth map extent $D(n+1)$ by the read rate $R_{ud-3D}$. Accordingly, it suffices for the size $S_{ext1}[n]$ of the $n^{th}$ base-view extent Ln to satisfy expression 4.

$$S_{ext1}[n] \geq \qquad (4)$$
$$\left( \frac{S_{ext1}[n]}{R_{ud-3D}} + T_{jump-0}[n] + \frac{S_{ext3}[n+1]}{R_{ud-3D}} + T_{jump-3D}[n+1] \right) \times R_{ext1}[n]$$
$$\therefore S_{ext1}[n] \geq \text{CEIL} \left\{ \frac{R_{ext1}[n]}{8} \times \frac{R_{ud-3D}}{R_{ud-3D}-R_{ext1}[n]} \times \right.$$
$$\left. \left( T_{jump-0}[n] + \frac{S_{ext3}[n+1]}{R_{ud-3D}} + T_{jump-3D}[n+1] \right) \right\}$$

[7] The size $S_{ext3}[n]$ of the $n^{th}$ depth map extent Dn is at least equal to the data amount transferred from the second read buffer 4922 to the system target decoder 4903 from the $(2n-1)^{th}$ read period $PR_D[n]$ through the $n^{th}$ zero sector transition period $PJ_0[n]$. The length of the $(2n-1)^{th}$ read period $PR_D[n]$ equals $S_{ext3}[n]/R_{ud-3D}$, the value obtained by dividing the size $S_{ext3}[n]$ of the $n^{th}$ depth map extent Dn by the read rate $R_{ud-3D}$. Accordingly, it suffices for the size $S_{ext3}[n]$ of the $n^{th}$ depth map extent Dn to satisfy expression 5.

$$S_{ext3}[n] \geq \left( \frac{S_{ext3}[n]}{R_{ud-3D}} + T_{jump-3D}[n] + \frac{S_{ext1}[n]}{R_{ud-3D}} + T_{jump-0}[n] \right) \times R_{ext3}[n] \quad (5)$$

$$\therefore S_{ext3}[n] \geq \text{CEIL}\left\{ \frac{R_{ext3}[n]}{8} \times \frac{R_{ud-3D}}{R_{ud-3D} - R_{ext3}[n]} \times \left( T_{jump-3D}[n] + \frac{S_{ext1}[n]}{R_{ud-3D}} + T_{jump-0}[n] \right) \right\}$$

[8] The jump time $T_{jump-3D}[n]$ to be substituted into expressions 4 and 5 equals, for example, the maximum jump time in the table in FIG. 56 that corresponds to the number of sectors from the end of the $n^{th}$ depth map extent Dn to the top of the $n^{th}$ base-view extent Ln, i.e. the jump distance. Note that in the arrangement of data block groups in this embodiment of the present invention, a pair of a depth map extent Dn and a base-view extent Ln with the same extent ATC times are not arranged with a layer boundary therebetween.

The zero sector transition time $T_{jump-0}[n]$ equals the specified value determined only by the time required for an actual zero sector transition, regardless of whether there is the layer boundary LB between the $n^{th}$ base-view extent Ln and the $(n+1)^{th}$ depth map extent D(n+1).

Based on the above considerations, in order to permit seamless playback of 2D video images, of 3D video images in L/R mode, and of 3D video images in depth mode from the data block groups in an interleaved arrangement, it suffices for the size of each data block to satisfy all of the above expressions 1-5. In particular, the size of the base-view data block should be equal to or greater than the largest value among the right-hand side of expressions 1, 3, and 5. Hereinafter, the lower limit on the size of a data block that satisfies all of the expressions 1-5 is referred to as the "minimum extent size".

<Read Buffer Margin Amount>

The lower limits UL1 and UL2 of the accumulated data amounts DA1 and DA2 in the read buffers 4921 and 4922, shown in FIGS. 58A, 58B, 59A, and 59B, represent buffer margin amounts. The "buffer margin amount" is the lower limit of the accumulated data amount that is to be maintained in each read buffer during reading of a single 3D extent block, i.e. successive data block groups in an interleaved arrangement. During reading of stream data, a long jump occurs between two different 3D extent blocks when the recording layer being read is switched or when read processing is interrupted to read from another file. The term "another file" refers to a file other than the AV stream file shown in FIG. 5 and includes, for example, a movie object file 512, BD-J object file 551, and JAR file 561. The long jump is longer than jumps that occur within the 3D extent block that is derived from expressions 2-5. Furthermore, the timing of a long jump caused by interruption to read another file is irregular and may occur even during the reading of a single data block. Accordingly, rather than setting the minimum extent size by substituting the maximum jump time of a long jump into expressions 2-5, it is more advantageous to maintain the buffer margin amount at a level capable of preventing underflow in the read buffers during a long jump.

Figure 60:
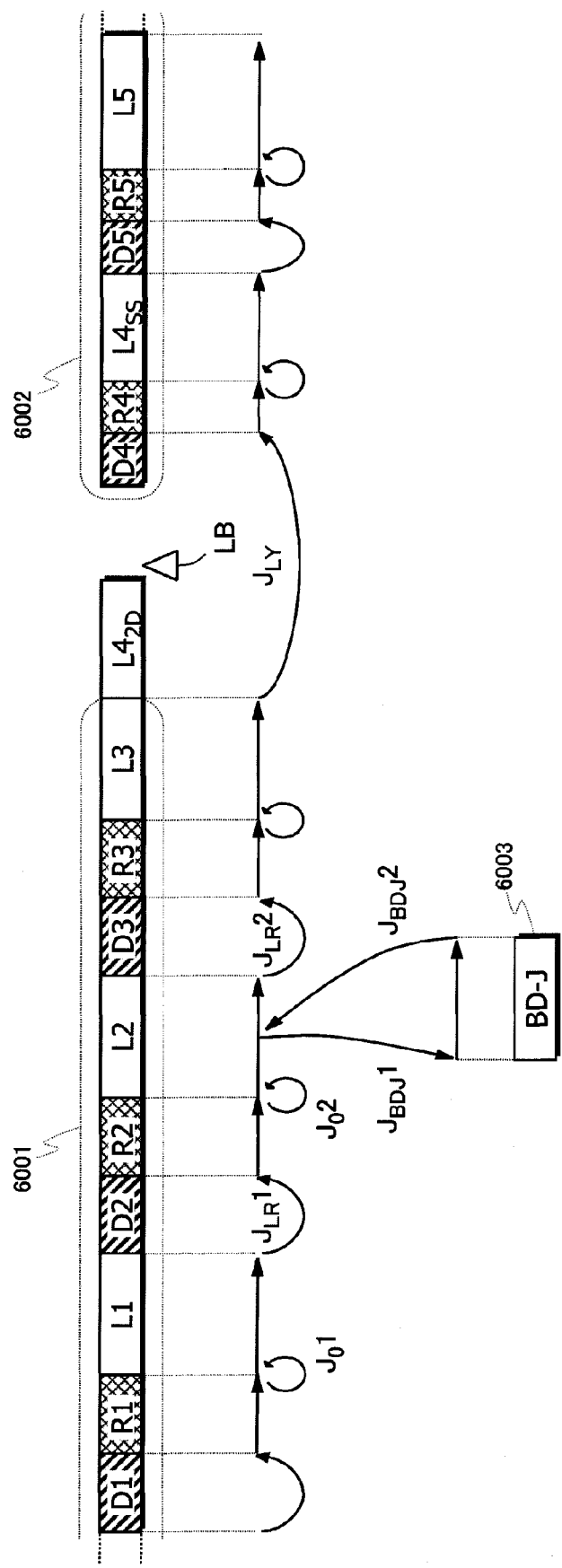
FIG. 60 is a schematic diagram showing the long jumps $J_{LY}$, $J_{BDJ}1$, and $J_{BDJ}2$ produced during playback processing in L/R mode by the playback processing system shown in FIG. 57.

FIG. 60 is a schematic diagram showing the long jumps $J_{LY}$, $J_{BDJ}1$, and $J_{BDJ}2$ produced during playback processing in L/R mode. As shown in FIG. 60, a first 3D extent block 6001 is arranged on the first recording layer, which is located before the layer boundary LB. Between the end of the first 3D extent block 6001 L3 and the layer boundary LB, a block exclusively for 2D playback L4$_{2D}$ is recorded. On the other hand, a second 3D extent block 6002 is recorded on the second recording layer, which is located after the layer boundary LB. Furthermore, a BD-J object file 6003 is recorded in an area distant from both 3D extent blocks 6001 and 6002. During playback processing from the first 3D extent block 6001 to the second 3D extent block 6002, a long jump $J_{LY}$ occurs when switching layers. In contrast, reading of the first 3D extent block 6001 is interrupted for reading of the BD-J object file 6003, and thus a pair of long jumps $J_{BDJ}1$ and $J_{BDJ}2$ occur. The buffer margin amounts UL1 and UL2 necessary for the long jumps $J_{LY}$ and $J_{BDJ}$ are calculated as follows.

The maximum jump time $T_{jump-LY}$ for a long jump $J_{LY}$ caused by layer switching equals the sum of the layer switching time and the maximum jump time, as per the table in FIG. 56, corresponding to the jump distance of the first long jump $J_{LY}$. This jump distance equals the number of sectors between the end of the base-view data block L3, the last block in the first 3D extent block 6001, and the beginning of the top right-view data block R4 in the second 3D extent block 6002. Note also that the base-view transfer rate $R_{ext1}$ does not exceed the maximum value $R_{max1}$. It thus follows that the data amount consumed from the first read buffer 4921 during the long jump $J_{LY}$ does not exceed the product of the maximum value $R_{max1}$ of the base-view transfer rate and the maximum jump time $T_{jump-LY}$. The value of this product is set as the first buffer margin amount UL1. In other words, the first buffer margin amount UL1 is calculated via equation 6.

$$UL1 = \text{CEIL}\left( \frac{R_{max1}}{8} \times T_{jump-LY} \right) \quad (6)$$

For example, when the maximum jump distance is 40,000 sectors, then as per the table in FIG. 56, the maximum jump time $T_{jump-LY}$ is 700 ms, which includes the layer switching time of 350 ms. Accordingly, when the system rate corresponding to the file 2D is 48 Mbps, the first buffer margin amount UL1 equals (48 Mbps×192/188)×0.7 seconds=approximately 4.09 MB.

Similarly, the maximum value of the data amount consumed from the second read buffer 4922 during the long jump $J_{LY}$, i.e. the product of the maximum value $R_{max2}$ of the right-view transfer rate and the maximum jump time $T_{jump-LY}$, is determined to be the second buffer margin amount UL2. In other words, the second buffer margin amount UL2 is calculated via equation 7.

$$UL2 = \text{CEIL}\left( \frac{R_{max2}}{8} \times T_{jump-LY} \right) \quad (7)$$

For example, when the maximum jump distance is 40,000 sectors, meaning that the maximum jump time $T_{jump-LY}$ is 700 ms, and when the system rate corresponding to the first file DEP is 16 Mbps, the second buffer margin amount UL2 equals (16 Mbps×192/188)×0.7 seconds=approximately 1.36 MB.

Referring again to FIG. 60, when reading of the BD-J object file 6003 interrupts the read period of the first 3D extent block 6001, a first long jump $J_{BDJ}1$ occurs. In this way, the position targeted for reading shifts from the recording area of the second base-view data block L2 to the recording area of the BD-J object file 6003. The corresponding jump time $T_{BDJ}$ is set to a predetermined fixed value, e.g. 900 ms. Next, the BD-J object file 6003 is read. The time required for reading equals the value of eight times the size $S_{BDJ}$ of the extent belonging to the file 6003 divided by the read rate $R_{ud-3D}$, or $8 \times S_{BDJ}[n]/R_{ud-3D}$ (normally, the extent size $S_{BDJ}$ is expressed in bytes, and the read rate $R_{ud-3D}$ in bits/second; therefore, it is necessary to multiply by eight). Next, a second long jump $J_{BDJ}2$ occurs. The position targeted for reading thus returns from the recording area of the BD-J object file 6003 back to the recording area of the second base-view data block L2. The corresponding jump time $T_{BDJ}$ is equal to the first jump period, e.g. 900 ms. During the two jumps $J_{BDJ}1$ and $J_{BDJ}2$ and the reading of the BD-J object file 6003, data is not read into the first read buffer 4921. Accordingly, the maximum value of the amount of data consumed from the first read buffer 4921 during this time is determined to be the first read buffer margin amount UL1. In other words, the first read buffer margin amount UL1 is calculated via equation 8.

$$UL1 = \text{CEIL}\left(\frac{R_{max1}}{8} \times \left(2 \times T_{BDJ} + \frac{8 \times S_{BDJ}}{R_{ud-3D}}\right)\right) \quad (8)$$

Similarly, the maximum value of the data amount consumed from the second read buffer 4922 during the two long jumps $J_{BDJ}1$ and $J_{BDJ}2$ and reading of the BD-J object file 6003 is determined to be the second buffer margin amount UL2. In other words, the second buffer margin amount UL2 is calculated via equation 9.

$$UL2 = \text{CEIL}\left(\frac{R_{max2}}{8} \times \left(2 \times T_{BDJ} + \frac{8 \times S_{BDJ}}{R_{ud-3D}}\right)\right) \quad (9)$$

The first buffer margin amount UL1 is set to the larger of the values of the right-hand side of equations 6 and 8. The second buffer margin amount UL2 is set to the larger of the values of the right-hand side of equations 7 and 9.

<Minimum Capacity of the Read Buffers>

During playback processing of the successive 3D extent blocks shown in FIGS. 58C and 59C, the minimum value of the capacity necessary for each of the read buffers 4921 and 4922 is calculated as follows.

When the $n^{th}$ base-view data block Ln (n=0, 1, 2, ...) is read in 3D playback mode, it suffices for the capacity RB1[$n$] necessary for the first read buffer 4921 to be equal to or greater than the highest value of the peaks in the graphs shown in FIGS. 58A and 59A. If the size $S_{ext1}$ of the base-view data block to be read is fixed, then the peak value reaches its maximum when the base-view transfer rate $R_{ext1}$ equals its maximum value $R_{max1}$. Accordingly, the capacity RB1[$n$] should satisfy expression 10 in both L/R mode and depth mode.

$$RB1[n] \geq \text{CEIL}\left(UL1 + \frac{R_{ud-3D} - R_{max1}[n]}{8} \times \frac{S_{ext1}[n]}{R_{ud-3D}}\right) \quad (10)$$

When the $n^{th}$ right-view data block Rn is read in L/R mode, it suffices for the capacity RB2$_{LR}$[n] necessary for the second read buffer 4922 to be equal to or greater than the highest value of the peaks in the graph shown in FIG. 58B. If the size $S_{ext2}$ of the right-view data block to be read is fixed, then the peak value reaches its maximum when the right-view transfer rate $R_{ext2}$ equals its maximum value $R_{max2}$. Accordingly, the capacity RB2$_{LR}$[n] should satisfy expression 11.

$$RB2_{LR}[n] \geq \max\left\{\begin{array}{c}\text{CEIL}\left(UL2 + \frac{R_{ud-3D} - R_{max2}}{8} \times \frac{S_{ext2}[n]}{R_{ud-3D}}\right), \\ S_{ext2}[n]\end{array}\right\} \quad (11)$$

In this embodiment, any of the right-view data blocks may be read first by interrupt playback. In such a case, the system target decoder 4903 does not read data from the second read buffer 4922 until the entire right-view data block that is read first is stored in the second read buffer 4922. Accordingly, unlike the capacity RB1[$n$] of the first read buffer 4921, the capacity RB2$_{LR}$[n] of the second read buffer 4922 needs to further meet the condition of being "at least larger than the size $S_{ext2}$[n] of the $n^{th}$ right-view data block Rn".

Similarly, when reading the $n^{th}$ depth map data block Dn, the capacity RB2$_{LD}$[n] of the second read buffer 4922 should satisfy expression 12.

$$RB2_{LD}[n] \geq \max\left\{\begin{array}{c}\text{CEIL}\left(UL2 + \frac{R_{ud-3D} - R_{max3}}{8} \times \frac{S_{ext3}[n]}{R_{ud-3D}}\right), \\ S_{ext3}[n]\end{array}\right\} \quad (12)$$

<Advantages of Separating Playback Paths Before and After a Layer Boundary>

On a BD-ROM disc 101 according to this embodiment of the present invention, the data block groups before and after a layer boundary are recorded in one of the arrangements 1, 2, and 3 shown in FIGS. 22, 25, and 27. As a result, before and after layer switching, a specified portion of the base-view video stream is played back from the block exclusively for 2D playback Ln$_{2D}$ in 2D playback mode and from the block exclusively for 3D playback Ln$_{SS}$ in 3D playback mode. In this case, unlike the arrangement shown in FIG. 23, the size $S_{ext2D}$ of the 2D extent storing the specified portion equals the sum of the size $S_{ext1}$ of the base-view extent and the size of the block exclusively for 2D playback Ln$_{2D}$. While expression 1 is satisfied by this sum $S_{ext2D}$, expressions 2-5 are satisfied by the size of data blocks other than the block exclusively for 2D playback Ln$_{2D}$. Accordingly, the lower limit of the sizes $S_{ext2}$ and $S_{ext3}$ of the dependent-view extents that satisfy expressions 2-5, i.e. the minimum extent sizes, can effectively be further reduced independently of adjusting the size of the block exclusively for 2D playback Ln$_{2D}$ in order for the size $S_{ext2D}$ of the entire 2D extent to satisfy expression 1. Therefore, as is clear from expressions 11 and 12, the minimum capacities RB2$_{LR}$ and RB2$_{LD}$ of the second read buffer 4922 can effectively be further reduced independently of expression 1.

<Extent ATC Time in a 3D Extent Block>

In a 3D extent block, i.e. a data block group in an interleaved arrangement, consecutive data blocks Dn, Rn, Ln (n=0, 1, 2, ...) all have the same extent ATC time. In other words, the difference in ATSs from the source packet at the top of each data block until the source packet at the top of the next data block is the same. However, when calculating this difference, the occurrence of wraparound in the ATS needs to be taken into consideration. In this case, within the same time measured by the ATC, the first source depacketizer 5011 retrieves TS packets from all of the source packets in the base-view data block Ln and transfers the TS packets to the first PID filter 5013, and the second source depacketizer 5012 retrieves TS packets from all of the source packets in the dependent-view data block Dn or Rn and transfers the TS packets to the second PID filter 5014. Accordingly, particularly during interrupt playback, the primary video decoder 5015 can easily synchronize decoding of TS packets between the base-view video stream and the dependent-view video stream.

<Conditional Expressions of Extent Size Referring to Extent ATC Time>

In expressions 2-5, the size of base-view extents and dependent-view extents is restricted by the size of subsequently located extents. However, from the perspective of using extents in the authoring process, it is preferable that the conditions on the size of each extent be expressed in a form that does not depend on the size of other extents. Accordingly, expressions 2-5 are redefined by conditional expressions that refer to extent ATC time.

As already described, three contiguous extents Dn, Rn, Ln (n=0, 1, 2, ...) all have the same extent ATC time $T_{ext}[n]$. The minimum value of these extent ATC times is set as the minimum extent ATC time $minT_{ext}$, and the maximum value as the maximum extent ATC time $maxT_{ext}$: $minT_{ext} \leq T_{ext}[n] \leq maxT_{ext}$. In this case, the sizes $S_{ext1}[n]$, $S_{ext2}[n]$, and $S_{ext3}[n]$ of the $n^{th}$ extents EXT1[$n$], EXT2[$n$], and EXT3[$n$] are limited to the ranges in expressions 13, 14, and 15.

$$\text{CEIL}(R_{ext1}[n] \times minT_{ext}/8) \leq S_{ext1}[n] \leq \text{CEIL}(R_{ext1}[n] \times maxT_{ext}/8) \tag{13}$$

$$\text{CEIL}(R_{ext2}[n] \times minT_{ext}/8) \leq S_{ext2}[n] \leq \text{CEIL}(R_{ext2}[n] \times maxT_{ext}/8) \tag{14}$$

$$\text{CEIL}(R_{ext3}[n] \times minT_{ext}/8) \leq S_{ext3}[n] \leq \text{CEIL}(R_{ext3}[n] \times maxT_{ext}/8) \tag{15}$$

Subsequently, the difference between the maximum extent ATC time $maxT_{ext}$ and the minimum extent ATC time $minT_{ext}$ is set as a fixed value Tm: $maxT_{ext} = minT_{ext} + Tm$. In this case, the minimum extent ATC time $minT_{ext}$ is calculated as follows, referring to the minimum extent sizes, i.e. the right-hand side of expressions 2-5.

When the size of the $n^{th}$ base-view extent equals the minimum extent size, then from expressions 2 and 13, the minimum extent ATC time $minT_{ext}$ satisfies expression 16.

$$R_{ext1}[n] \times minT_{ext} \geq R_{ext1}[n] \times \frac{R_{ud-3D}}{R_{ud-3D} - R_{ext1}[n]} \times \tag{16}$$

$$\left(T_{jump-3D}[n] + \frac{S_{ext2}[n+1]}{R_{ud-3D}} + T_{jump-0}[n+1]\right)$$

$$\therefore minT_{ext} \geq \frac{R_{ud-3D}}{R_{ud-3D} - R_{ext1}[n]} \times$$

$$\left(T_{jump-3D}[n] + \frac{S_{ext2}[n+1]}{R_{ud-3D}} + T_{jump-0}[n+1]\right)$$

The size $S_{ext2}[n+1]$ of the $(n+1)^{th}$ right-view extent is allowed to be up to the product of the maximum value $R_{max2}$ of the right-view transfer rate $R_{ext2}$ and the maximum extent ATC time $maxT_{ext}$: $S_{ext2}[n+1] \leq R_{max2} \times maxT_{ext} = R_{max2} \times (minT_{ext} + Tm)$. Furthermore, the base-view transfer rate $R_{ext1}[n]$ does not exceed the maximum value $R_{max1}$: $R_{ext1}[n] \leq R_{max1}$. Since the minimum extent ATC time $minT_{ext}$ should be the upper limit of the right-hand side of expression 16, expression 17 should be satisfied.

$$minT_{ext} \geq \frac{R_{ud-3D}}{R_{ud-3D} - R_{max1}} \times \tag{17}$$

$$\left(T_{jump-3D}[n] + \frac{R_{max2} \times maxT_{ext}}{R_{ud-3D}} + T_{jump-0}[n+1]\right) =$$

$$\frac{R_{ud-3D}}{R_{ud-3D} - R_{max1}} \times$$

$$\left(T_{jump-3D}[n] + \frac{R_{max2} \times (minT_{ext} + Tm)}{R_{ud-3D}} + T_{jump-0}[n+1]\right)$$

$$\therefore minT_{ext} \geq \frac{R_{ud-3D} - R_{max1}}{R_{ud-3D} - R_{max1} - R_{max2}} \times$$

$$\left(T_{jump-3D}[n] + \frac{R_{max2} \times Tm}{R_{ud-3D}} + T_{jump-0}[n+1]\right)$$

If expression 4 is similarly modified instead of expression 2, the minimum extent ATC time $minT_{ext}$ should further satisfy expression 18.

$$minT_{ext} \geq \frac{R_{ud-3D} - R_{max1}}{R_{ud-3D} - R_{max1} - R_{max3}} \times \tag{18}$$

$$\left(T_{jump-0}[n] + \frac{R_{max3} \times Tm}{R_{ud-3D}} + T_{jump-3D}[n+1]\right)$$

On the other hand, when the size of the $n^{th}$ base-view extent equals the minimum extent size, the corresponding extent ATC time equals the minimum extent ATC time $minT_{ext}$. Since the $n^{th}$ right-view extent shares the same extent ATC time as the base-view extent, then from expressions 3 and 14, the minimum extent ATC time $minT_{ext}$ satisfies expression 19.

$$R_{ext2}[n] \times minT_{ext} \geq R_{ext2}[n] \times \frac{R_{ud-3D}}{R_{ud-3D} - R_{ext2}[n]} \times \tag{19}$$

$$\left(T_{jump-0}[n] + \frac{S_{ext1}[n]}{R_{ud-3D}} + T_{jump-3D}[n]\right) =$$

$$R_{ext2}[n] \times \frac{R_{ud-3D}}{R_{ud-3D} - R_{ext2}[n]} \times$$

$$\left(T_{jump-0}[n] + \frac{R_{ext1}[n] \times minT_{ext}}{R_{ud-3D}} + T_{jump-3D}[n]\right)$$

$$\therefore minT_{ext} \geq \frac{R_{ud-3D}}{R_{ud-3D} - R_{ext2}[n]} \times$$

$$\left(T_{jump-0}[n] + \frac{R_{ext1}[n] \times minT_{ext}}{R_{ud-3D}} + T_{jump-3D}[n]\right)$$

The right-view transfer rate $R_{ext2}[n]$ does not exceed the maximum value $R_{max2}$, and the base-view transfer rate $R_{ext1}[n]$ does not exceed the maximum value $R_{max1}$: $R_{ext2}[n] \leq R_{max2}$, and $R_{ext1}[n] \leq R_{max1}$. Since the minimum extent ATC time $minT_{ext}$ should be the upper limit of the right-hand side of expression 19, expression 20 should be satisfied.

$$minT_{ext} \geq \tag{20}$$

$$\frac{R_{ud-3D}}{R_{ud-3D} - R_{max2}} \times \left(T_{jump-0}[n] + \frac{R_{max1} \times minT_{ext}}{R_{ud-3D}} + T_{jump-3D}[n]\right)$$

$$\therefore minT_{ext} \geq \frac{R_{ud-3D} - R_{max2}}{R_{ud-3D} - R_{max1} - R_{max2}} \times (T_{jump-0}[n] + T_{jump-3D}[n])$$

If expression 5 is used instead of expression 3, then similarly the minimum extent ATC time $minT_{ext}$ should satisfy expression 21.

$$minT_{ext} \geq \frac{R_{ud-3D} - R_{max3}}{R_{ud-3D} - R_{max1} - R_{max3}} \times \begin{pmatrix} T_{jump-3D}[n] + \\ T_{jump-0}[n] \end{pmatrix} \quad (21)$$

As a result, the minimum extent ATC time $minT_{ext}$ is specified as the maximum value among the right-hand side of expressions 17, 18, 20, and 21. In this case, the zero sector transition time $T_{jump-0}$, the jump time $T_{jump-3D}$, and the fluctuation range Tm of the extent ATC time can be restricted to predetermined, fixed values. In particular, in modification (F) described below, the jump time $T_{jump-3D}$ may be assessed with reference to the maximum jump distance MAX_EXTJUMP3D. In this way, the minimum extent ATC time $minT_{ext}$ can substantially be determined only by constants such as the maximum value $R_{max}$ of the mean transfer time. Accordingly, the conditions on the extent size shown in expressions 13-15 are useful during the authoring process.

<Guaranteeing the Buffer Margin Amount>

The buffer margin amounts UL1 and UL2 are guaranteed in the following way. First, the condition that "the extent ATC time $T_{ext}$ is equal to or greater than the minimum extent ATC time $minT_{ext}$" is placed on the design of each data block. In this case, the minimum extent ATC time $minT_{ext}$ is a value calculated when the mean transfer rate $R_{ext1}$, $R_{ext2}$ and $R_{ext3}$ equal their respective maximum values $R_{max1}$, $R_{max2}$ and $R_{max3}$. The actual mean transfer rates $R_{ext1}$, $R_{ext2}$, and $R_{ext3}$, however, are generally lower than their respective maximum values $R_{max1}$, $R_{max2}$, and $R_{max3}$. Accordingly, the actual sizes of the data blocks $R_{ext1} \times T_{ext}$, $R_{ext2} \times T_{ext}$, and $R_{ext3} \times T_{ext}$ are generally smaller than the values assumed in the above conditions, i.e. $R_{max1} \times T_{ext}$, $R_{max2} \times T_{ext}$, and $R_{max3} \times T_{ext}$. Therefore, after the start of reading of each data block, reading of the next data block begins before the extent ATC time $T_{ext}$ passes. In other words, the accumulated data amounts DA1 and DA2 in the read buffers 4921 and 4922 generally start to increase again before returning to their value at the start of reading, unlike the case shown in FIGS. 58A, 58B, 59A, and 59B. The accumulated data amounts DA1 and DA2 therefore increase by a predetermined amount each time a pair of a base-view and a dependent-view data block is read. As a result, by continuously reading a certain number of data blocks into the read buffers 4921 and 4922, the buffer margin amounts UL1 and UL2 are guaranteed.

Figure 61A:
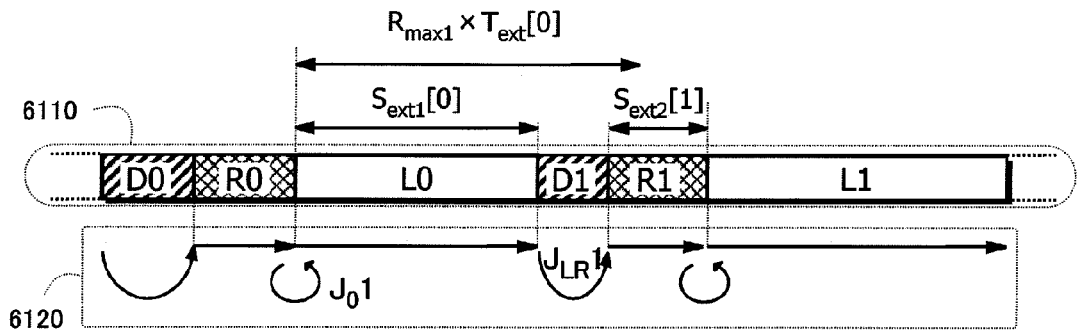
FIG. 61A is a schematic diagram showing the relationship between a 3D extent block 6110 and a playback path 6120 in L/R mode.

FIG. 61A is a graph showing the relationship between a 3D extent block 6110 and a playback path 6120 in L/R mode. As shown in FIG. 61A, the 3D extent block 6110 is composed of base-view data block groups Lk and dependent-view data block groups Dk and Rk (k=0, 1, 2, ... ) in an interleaved arrangement. In accordance with the playback path 6120, each pair of adjacent right-view data blocks Rk and base-view data blocks Lk is read as one 3D extent, i.e. as a pair of a dependent-view extent and a base-view extent. The extent size $S_{ext1}[k]$ of the base-view extent Lk equals the product of the base-view transfer rate $R_{ext1}[k]$ and the extent ATC time $T_{ext}[k]$: $S_{ext1}[k]=R_{ext1}[k] \times T_{ext}[k]$. This extent size $S_{ext1}[k]$ is generally smaller than the product of the maximum value $R_{max1}$ of the base-view transfer rate and the extent ATC time $T_{ext}[k]$: $S_{ext1}[k]<R_{max1} \times T_{ext}[k]$. The same is true for the extent sizes $S_{ext3}[k]$ and $S_{ext2}[k]$ of the dependent-view extents Dk and Rk.

Figure 61B:
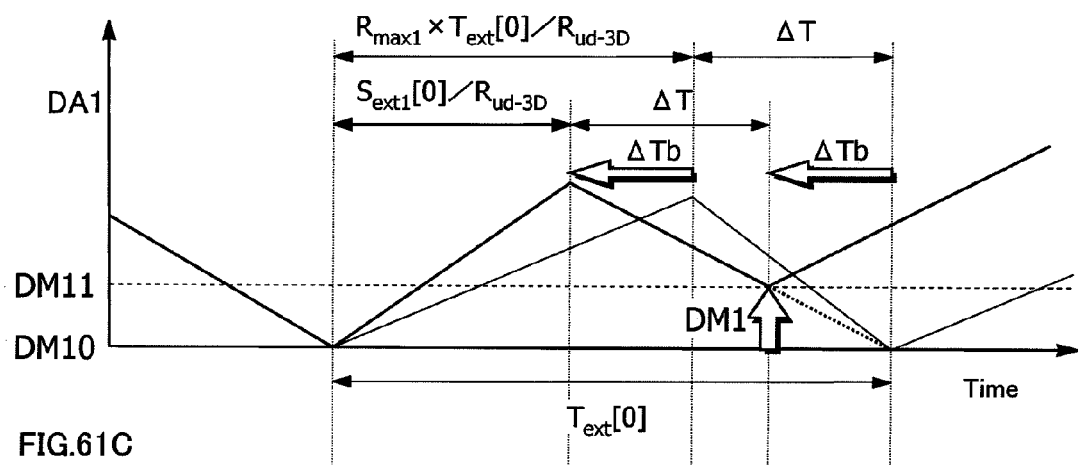
FIGS. 61B and 61C are graphs showing the change in data amounts DA1 and DA2 stored in the read buffers 4921 and 4922 when a 3D extent block, composed of data blocks having a size equal to or larger than the expanded minimum extent size, is read by the playback processing system shown in FIG. 57.

FIG. 61B is a graph showing the change in the data amount DA1 in the first read buffer 4921 when the 3D extent block 6110 is read in accordance with the playback path 6120 in L/R mode. The thin line indicates changes when the mean transfer rates $R_{ext1}[k]$, $R_{ext2}[k]$, and $R_{ext3}[k]$ equal the maximum values $R_{max1}$, $R_{max2}$ and $R_{max3}$. On the other hand, the thick line indicates changes when the transfer rate $R_{ext1}[0]$ of the top base-view extent L0 is lower than the maximum value $R_{max1}$. Note that for convenience of explanation, it is assumed that the dependent-view transfer rates $R_{ext2}[k]$ and $R_{ext3}[k]$ equal their respective maximum values $R_{max2}$ and $R_{max3}$. In this case, the sizes $R_{ext2}[k] \times T_{ext}[k]$ and $R_{ext3}[k] \times T_{ext}[k]$ of the dependent-view extents equal the maximum possible assumed values, $R_{max2}[k] \times T_{ext}[k]$ and $R_{max3}[k] \times T_{ext}[k]$ As shown in FIG. 61B, for the thin line, after an extent ATC time $T_{ext}[0]$ has passed from the start of reading of the top base-view extent L0, reading of the next base-view extent L1 begins. Accordingly, the accumulated data amount DA1 at this point is substantially equal to the value DM10 at the start of reading. Conversely, for the thick line, a time $S_{ext1}[0]/R_{ud-3D}$ is necessary to read the entire top base-view extent L0 from the BD-ROM disc 101 into the first read buffer 4921. This time is shorter than the time $R_{max1}[k] \times T_{ext}[0]/R_{ud-3D}$ in the thin line by a time $\Delta Tb$: $\Delta Tb = S_{ext1}[0]/R_{ud-3D} - R_{max1} \times T_{ext}[0]/R_{ud-3D} = (R_{ext1}[0] - R_{max1}) \times T_{ext}[0]/R_{ud-3D}$. Accordingly, the accumulated data amount DA1 reaches its peak in the thick line earlier than in the thin line by a time of $\Delta Tb$. On the other hand, the sizes $S_{ext2}[1]$ and $S_{ext3}[1]$ of the dependent-view extents D1 and R1 are the same for both lines: $R_{max2} \times T_{ext}[1]$ and $R_{max3} \times T_{ext}[1]$. Accordingly, the time $\Delta T$ from the peak of the accumulated data amount DA1 until the start of reading of the next base-view extent L1 is the same for both lines. As a result, unlike the thin line, reading of the next base-view extent L1 begins in the thick line at a time that is $\Delta Tb$ earlier than the extent ATC time $T_{ext}$ has passed from the start of reading of the top base-view extent L0. As a result, the value DM11 of the accumulated data amount DA1 at that point increases over the value DM10 at the start of reading of the top base-view extent L0 by an increment DM1[0]. As is clear from FIG. 61B, this increase DM1[0] equals the product of the actual rate of decrease $R_{ext1}[0]$ of the accumulated data amount DA1 and the time $\Delta Tb$: $DM1[0]=R_{ext1}[0] \times \Delta Tb = R_{ext1}[0] \times (R_{ext1}[0] R_{max1}) \times T_{ext}[0]/R_{ud-3D}$.

Figure 61C:
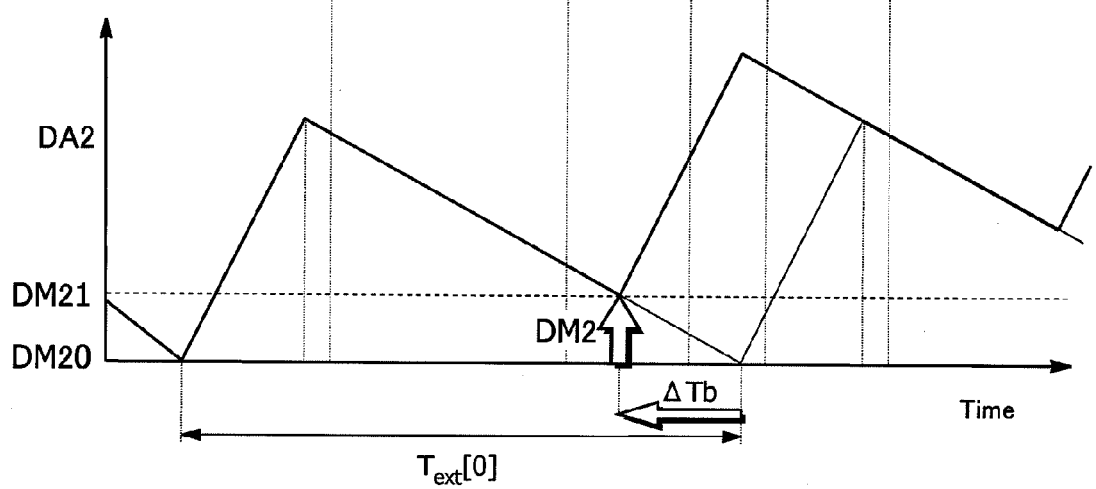

FIG. 61C is a graph showing the change in the data amount DA2 in the second read buffer 4922 while the data amount DA1 in the first read buffer 4921 changes as shown in FIG. 61B. The thin line indicates changes when the mean transfer rates $R_{ext1}[k]$, $R_{ext2}[k]$, and $R_{ext3}[k]$ equal the maximum values $R_{max1}$, $R_{max2}$ and $R_{max3}$. On the other hand, the thick line indicates changes when the transfer rate $R_{ext1}[0]$ of the top base-view extent L0 is lower than the maximum value $R_{max1}$. Note that for convenience of explanation, it is assumed that the dependent-view transfer rates $R_{ext2}[k]$ and $R_{ext3}[k]$ equal their respective maximum values $R_{max2}$ and $R_{max3}$.

As shown in FIG. 61C, for the thin line, after an extent ATC time $T_{ext}[0]$ has passed from the start of reading of the top right-view extent R0, reading of the next right-view extent R1 begins. Accordingly, the accumulated data amount DA2 at this point is substantially equal to the value DM20 at the start of reading. Conversely, for the thick line, the entire top base-view extent L0 is read from the BD-ROM disc 101 into the first read buffer 4921 earlier than in the thin line by a time $\Delta Tb$. Accordingly, reading of the next right-view extent R1 begins in the thick line earlier than in the thin line by a time $\Delta Tb$, i.e. at a time $\Delta Tb$ earlier than the extent ATC time $T_{ext}$ has passed from the start of reading of the top right-view extent R0. As a result, the value DM21 of the accumulated data amount DA2 at that point increases over the value DM20 at the start of reading of the top right-view extent R0 by an increment DM2[0]. As is clear from FIG. 61C, this increase DM2[0] equals the product of the actual rate of decrease $R_{ext2}[0]$ of the accumulated data amount DA2 and the time $\Delta Tb$: $DM2[0]=R_{ext2}[0]\times\Delta Tb=R_{ext2}[0]\times(R_{ext1}[0]-R_{max1})\times T_{ext}[0]/R_{ud\text{-}3D}$.

In FIG. 61, it is assumed that the dependent-view transfer rates $R_{ext2}[k]$ and $R_{ext3}[k]$ equal their respective maximum values $R_{max2}$ and $R_{max3}$. The actual dependent-view transfer rates $R_{ext2}[k]$ and $R_{ext3}[k]$, however, are generally lower than their respective maximum values $R_{max2}$ and $R_{max3}$. In this case, as in FIG. 61B, the accumulated data amount DA2 in FIG. 61C reaches its peak earlier by a time $\Delta Td$: $\Delta Td=S_{ext2}[0]$ $R_{ud\text{-}3D}-R_{max2}\times T_{ext}[0]/R_{ud\text{-}3D}=(R_{ext2}[0]-R_{max2})\times T_{ext}[0]/R_{ud\text{-}3D}$. In the graph in FIG. 61B, the time $\Delta T$ from the peak of the accumulated data amount DA1 to the start of reading of the next base-view extent L1 is shortened by the same time $\Delta Td$. In light of these changes, each time a pair of a base-view extent Lk and a right-view extent Rk is processed, the accumulated data amounts DA1 and DA2 in the read buffers increase by increments DM1[k] and DM2[k], as shown in expressions 22 and 23.

$$DM1[k] = R_{ext1}[k]\times(\Delta Tb + \Delta Td) \quad (22)$$
$$= R_{ext1}[k]\times\{(R_{ext1}[k] - R_{max1}) +$$
$$(R_{ext2}[k] - R_{max2})\}\times T_{ext}[k]/R_{ud\text{-}3D}$$

$$DM2[k] = R_{ext2}[k]\times(\Delta Tb + \Delta Td) \quad (23)$$
$$= R_{ext2}[k]\times\{(R_{ext1}[k] - R_{max1}) +$$
$$(R_{ext2}[k] - R_{max2})\}\times T_{ext}[k]/R_{ud\text{-}3D}$$

In L/R mode, each time a base-view extent Lk and a right-view extent Rk are read from a 3D extent EXTSS[k] into the read buffers 4921 and 4922, the accumulated data amounts DA1 and DA2 increase by increments DM1[k] and DM2[k]. Similarly in depth mode, each time a base-view extent Lk and a depth-map extent Dk are read into the read buffers 4921 and 4922, the accumulated data amounts DA1 and DA2 increase by increments DM3[k] and DM4[k]. These increments DM3[k] and DM4[k] are shown in expressions 24 and 25.

$$DM3[k]=R_{ext1}[k]\times\{(R_{ext1}[k]-R_{max1})+(R_{ext3}[k]-R_{max3})\}\times T_{ext}[k]/R_{ud\text{-}3D} \quad (24)$$

$$DM4[k]=R_{ext3}[k]\times\{(R_{ext1}[k]-R_{max1})+(R_{ext3}[k]-R_{max3})\}\times T_{ext}[k]/R_{ud\text{-}3D} \quad (25)$$

Accordingly, when the total $Tsum=T_{ext}[0]+T_{ext}[1]+T_{ext}[2]+\ldots$ of the extent ATC time for the entire 3D extent block 6110 satisfies expression 26, the buffer margin amounts UL1 and UL2 in the read buffers 4921 and 4922 can be guaranteed by reading the entire 3D extent block 6110.

$$UL1 \le \min\left(\sum_k DM1[k], \sum_k DM3[k]\right) \approx \quad (26)$$
$$\min\left(R_{ext1\text{-}av}\times\frac{(R_{max1}+R_{max2})-(R_{ext1\text{-}av}+R_{ext2\text{-}av})}{R_{ud\text{-}3D}}\times T_{sum},\right.$$
$$\left.R_{ext1\text{-}av}\times\frac{(R_{max1}+R_{max3})-(R_{ext1\text{-}av}+R_{ext3\text{-}av})}{R_{ud\text{-}3D}}\times T_{sum}\right)$$

$$UL2 \le \min\left(\sum_k DM2[k], \sum_k DM4[k]\right) \approx$$
$$\min\left(R_{ext2\text{-}av}\times\frac{(R_{max1}+R_{max2})-(R_{ext1\text{-}av}+R_{ext2\text{-}av})}{R_{ud\text{-}3D}}\times T_{sum},\right.$$
$$\left.R_{ext3\text{-}av}\times\frac{(R_{max1}+R_{max3})-(R_{ext1\text{-}av}+R_{ext3\text{-}av})}{R_{ud\text{-}3D}}\times T_{sum}\right)$$

-continued
$$\therefore T_{sum} \ge \max\left(\frac{UL1\times R_{ud\text{-}3D}}{R_{ext1\text{-}av}\times\{(R_{max1}+R_{max2})-(R_{ext1\text{-}av}+R_{ext2\text{-}av})\}},\right.$$
$$\frac{UL1\times R_{ud\text{-}3D}}{R_{ext1\text{-}av}\times\{(R_{max1}+R_{max3})-(R_{ext1\text{-}av}+R_{ext3\text{-}av})\}},$$
$$\frac{UL2\times R_{ud\text{-}3D}}{R_{ext2\text{-}av}\times\{(R_{max1}+R_{max2})-(R_{ext1\text{-}av}+R_{ext2\text{-}av})\}},$$
$$\left.\frac{UL2\times R_{ud\text{-}3D}}{R_{ext3\text{-}av}\times\{(R_{max1}+R_{max3})-(R_{ext1\text{-}av}+R_{ext3\text{-}av})\}}\right)$$

The following approximation is used here: throughout the 3D extent block 6110, the base-view transfer rate $R_{ext1}[k]$ equals the mean value $R_{ext1\text{-}av}$, and the dependent-view transfer rates $R_{ext2}[k]$ and $R_{ext3}[k]$ respectively equal the mean values $R_{ext2\text{-}av}$ and $R_{ext3\text{-}av}$.

Note that during reading of successive 3D extent blocks, the accumulated data amounts DA1 and DA2 in the read buffers continue to increase, provided that a long jump does not occur. Accordingly, when the accumulated data amounts DA1 and DA2 exceed a predetermined threshold, the playback device 102 causes the BD-ROM drive 4901 to stop reading and transfer operations. The read rate $R_{ud\text{-}3D}$ thus decreases, which restricts the rise in the accumulated data amounts DA1 and DA2. Overflow in the read buffers 4921 and 4922 can thus be avoided.

<Modifications>

(A) Embodiment 1 of the present invention pertains to the arrangement of extents when storing 3D video images on a recording medium. However, the present invention can also be used for storage of high frame rate video on a recording medium. Specifically, the high frame rate video can for example be divided into an odd-numbered frame group and an even-numbered frame group, which can be considered as a base-view video stream and a dependent-view video stream and recorded on a recording medium with the arrangement of extents as described in embodiment 1. A playback device that only supports video playback at a normal frame rate can play back video for the odd-numbered frame group from the recording medium. Conversely, a playback device that supports video playback at a high frame rate can choose to play back video for only the odd-numbered frame group or video for both frame groups. In this way, compatibility with a playback device that only supports video playback at a normal frame rate can be ensured on a recording medium on which high frame rate video is stored.

(B) In embodiment 1 of the present invention, the base-view video stream represents the left-view, and the dependent-view video stream represents the right-view. Conversely, however, the base-view video stream may represent the right-view and the dependent-view video stream the left-view.

(C) The offset table 3041 shown in FIG. 32A includes a table 3210 of offset entries 3203 for each PID. The offset table may additionally include a table of offset entries for each plane. In this case, analysis of the offset table by the 3D playback device can be simplified. Furthermore, a lower limit, such as one second, may be placed on the length of the valid section of an offset entry in conjunction with the capabilities of the 3D playback device with regards to plane composition.

(D) The 3D playlist file shown in FIG. 40 includes one sub-path indicating the playback path of the sub-TS. Alternatively, the 3D playlist file may include sub-paths indicating playback paths for different sub-TSs. For example, the sub-path type of one sub-path may be "3D L/R", and the sub-path type of another sub-path may be "3D depth". When 3D video images are played back in accordance with this 3D playlist file, the playback device 102 can easily switch between L/R mode and depth mode by switching the sub-path for playback between these two types of sub-paths. In particular, this switching processing can be performed faster than switching the 3D playlist file itself.

The 3D playlist file may include multiple sub-paths of the same sub-path type. For example, when 3D video images for the same scene are represented with different binocular parallaxes by using multiple right-views that share the same left-view, a different file DEP is recorded on the BD-ROM disc 101 for each different right-view video stream. The 3D playlist file then contains multiple sub-paths with a sub-path type of "3D L/R". These sub-paths individually specify the playback path for the different files DEP. Additionally, one file 2D may include two or more types of depth map stream. In this case, the 3D playlist file includes multiple sub-paths with a sub-path type of "3D depth". These sub-paths individually specify the playback path for the files DEP that include the depth map streams. When 3D video images are played back in accordance with such a 3D playlist file, the sub-path for playback can quickly be switched, for example in accordance with user operation, and thus the binocular parallax for 3D video images can be changed without substantial delay. In this way, users can easily be allowed to select a desired binocular parallax for 3D video images.

(E) In order to accurately calculate the extent ATC time when evaluating the mean transfer rate $R_{ext}$ of data from the read buffer to the system target decoder, the size of each extent can be regulated as a fixed multiple of the source packet length. Furthermore, when a particular extent includes more source packets than this multiple, the sum of (i) the product of the number of source packets exceeding the multiple and the transfer time per source packet (=188×8/system rate) and (ii) the extent ATC time corresponding to the multiple can be considered to be the extent ATC time for the particular extent. Additionally, the extent ATC time can be defined as the sum of (iii) the value of the time interval from the ATS of the top source packet in an extent until the ATS of the last source packet in the same extent and (iv) the transfer time per source packet. In this case, reference to the next extent is unnecessary for calculation of the extent ATC time, and thus the calculation can be simplified. Note that in the above-described calculation of extent ATC time, the occurrence of wraparound in the ATS needs to be taken into consideration.

(F) Among data block groups in an interleaved arrangement, extents that belong to a different file, for example a BD-J object file, may be recorded. FIG. 62A is a schematic diagram showing data blocks in an interleaved arrangement that includes only multiplexed stream data. FIG. 62B is a schematic diagram showing data blocks in an interleaved arrangement that includes extents belonging to another file.

As shown in FIG. 62A, the data block group 6201 includes depth map data blocks D1, D2, and D3, right-view data blocks R1, R2, and R3, and base-view data blocks L1, L2, and L3 in an alternating arrangement. In the playback path 6202 in L/R mode, pairs of adjacent right-view and left-view data blocks R1+L1, R2+L2, and R3+L3 are read in order. In each pair, a zero sector transition $J_0$ occurs between the right-view data block and the base-view data block. Furthermore, reading of each depth map data block D1, D2, and D3 is skipped by a jump $J_{LR}$. In the playback path 6203 in depth mode, depth map data blocks D1, D2, and D3 and base-view data blocks L1, L2, and L3 are alternately read. A zero sector transition jump $J_0$ occurs between adjacent base-view data blocks and depth map data blocks. Furthermore, reading of each right-view data block R1, R2, and R3 is skipped by a jump $J_{LD}$.

On the other hand, as shown in FIG. 62B, extents A1 and A2 belonging to a different file are inserted among the data block group 6204, which is the same as in FIG. 62A. This "different file" may be, for example, a movie object file, BD-J object file, or JAR file. These extents A1 and A2 are both inserted between a depth map data block and right-view data block that are adjacent in FIG. 62A. In this case, in the playback path 6205 in L/R mode, the distance of the jump $J_{LR}$ is longer than in the playback path 6202 shown in FIG. 62A. However, the zero sector transition jump $J_0$ need not be changed into a regular jump, which is not the case if the extents A1 and A2 are inserted next to a base-view data block. The same is true for the playback path 6206 in depth mode. As is clear from FIG. 56, the maximum jump time generally increases more when changing a zero sector transition to a regular jump than when changing the jump distance. Accordingly, as is clear from expressions 2-5, the minimum extent size generally increases more when changing a zero sector transition to a regular jump than when changing the jump distance. Therefore, when inserting extents A1 and A2 into the data block group 6201, which has an interleaved arrangement, the extents A1 and A2 are inserted between depth map data blocks and right-view data blocks, as shown in FIG. 62B. The increase in minimum extent size caused by this insertion is thereby suppressed, making it possible to avoid increasing the minimum capacity of the read buffers.

Furthermore, in the arrangement shown in FIG. 62B, the sizes in sectors G1 and G2 of the extents A1 and A2 may be restricted to be equal to or less than the maximum jump distance MAX_EXTJUMP3D: G1≦MAX_EXTJUMP3D and G2≦MAX_EXTJUMP3D. This maximum jump distance MAX_EXTJUMP3D represents, in sectors, the maximum jump distance among the jumps $J_{LR}$ and $J_{LD}$ occurring within the data block group 6204. With this restriction, the maximum jump time that is to be substituted in the right-hand side of expressions 2-5 does not easily increase, and thus the minimum extent size does not easily increase. Accordingly, it is possible to avoid an increase in the minimum capacity of the read buffers due to insertion of the extents A1 and A2.

Additionally, the sums of (i) the sizes G1 and G2 of the extents A1 and A2 and (ii) the sizes $S_{ext3}[2]$, $S_{ext2}[2]$, $S_{ext3}[3]$, and $S_{ext2}[3]$ of the dependent-view data blocks D2, R2, D3, and R3 adjacent to the extents A1 and A2 may be restricted to be equal to or less than the maximum jump distance MAX_EXTJUMP3D.

$$\text{CEIL}(S_{ext3}[2]/2{,}048) + G1 \leq \text{MAX\_EXTJUMP3D},$$

$$\text{CEIL}(S_{ext2}[2]/2{,}048) + G1 \leq \text{MAX\_EXTJUMP3D},$$

$$\text{CEIL}(S_{ext3}[3]/2{,}048) + G2 \leq \text{MAX\_EXTJUMP3D},$$

$$\text{CEIL}(S_{ext2}[3]/2{,}048) + G2 \leq \text{MAX\_EXTJUMP3D}.$$

In these expressions, the size in bytes of a dependent-view data block is divided by 2,048, the number of bytes per sector, to change the units of the size from bytes to sectors. As long as these conditions are met, the maximum jump time to be inserted into the right-hand side of expressions 2-5 does not exceed a fixed value. For example, if the maximum jump distance MAX_EXTJUMP3D is fixed at 40,000 sectors, then the maximum jump time from FIG. 56 does not exceed 350 ms. Accordingly, the minimum extent size does not exceed a fixed value. It is thus possible to reliably avoid an increase in the minimum capacity of the read buffers due to insertion of the extents A1 and A2.

Apart from the above restrictions, the sums of (i) the sizes G1 and G2 of the extents A1 and A2 and (ii) the sizes $S_{ext3}[2]$, $S_{ext2}[2]$, $S_{ext3}[3]$, and $S_{ext2}[3]$ of the dependent-view data blocks D2, R2, D3, and R3 adjacent to the extents A1 and A2 may be further restricted to be equal to or less than the maximum jump distance MAX_JUMP(•) corresponding to the size of each dependent-view data block.

$$\text{CEIL}(S_{ext3}[2]/2{,}048)+G1 \leq \text{MAX\_JUMP}(S_{ext3}[2]),$$

$$\text{CEIL}(S_{ext2}[2]/2{,}048)+G1 \leq \text{MAX\_JUMP}(S_{ext2}[2]),$$

$$\text{CEIL}(S_{ext3}[3]/2{,}048)+G2 \leq \text{MAX\_JUMP}(S_{ext3}[3]),$$

$$\text{CEIL}(S_{ext2}[3]/2{,}048)+G2 \leq \text{MAX\_JUMP}(S_{ext2}[3]).$$

When the size of the dependent-view data block is expressed in sectors and the corresponding maximum jump time obtained from the table in FIG. 56, the maximum jump distance MAX_JUMP (•) refers to the maximum value of the range of sectors to which the maximum jump time corresponds. For example, if the size of the dependent-view data block is 5,000 sectors, then the maximum jump time in the table in FIG. 56 for 5,000 sectors is 250 ms, which corresponds to a range of 1-10,000 sectors. Accordingly, the maximum jump distance MAX_JUMP (5,000×2,048 bytes) is the maximum value in this range, i.e. 10,000 sectors. As long as the above conditions are met, the maximum jump time to be inserted into the right-hand side of expressions 2-5 does not change, and thus the minimum extent size does not change. Accordingly, it is possible to reliably avoid an increase in the minimum capacity of the read buffers due to insertion of the extents A1 and A2.

Embodiment 2

The following describes, as the second embodiment of the present invention, a recording device and a recording method for recording the recording medium of embodiment 1 of the present invention.

The recording device described here is called an authoring device. The authoring device, generally located at a creation studio that creates movie contents to be distributed, is used by authoring staff. First, in accordance with operations by the authoring staff, the recording apparatus converts movie content into a digital stream that is compression encoded in accordance with an MPEG specification, i.e. into an AV stream file. Next, the recording device generates a scenario, which is information defining how each title included in the movie content is to be played back. Specifically, the scenario includes the above-described dynamic scenario information and static scenario information. Then, the recording device generates a volume image or an update kit for a BD-ROM disc from the aforementioned digital stream and scenario. Lastly, the recording device records the volume image on the recording medium in accordance with the arrangements of extents explained in embodiment 1.

Figure 63:
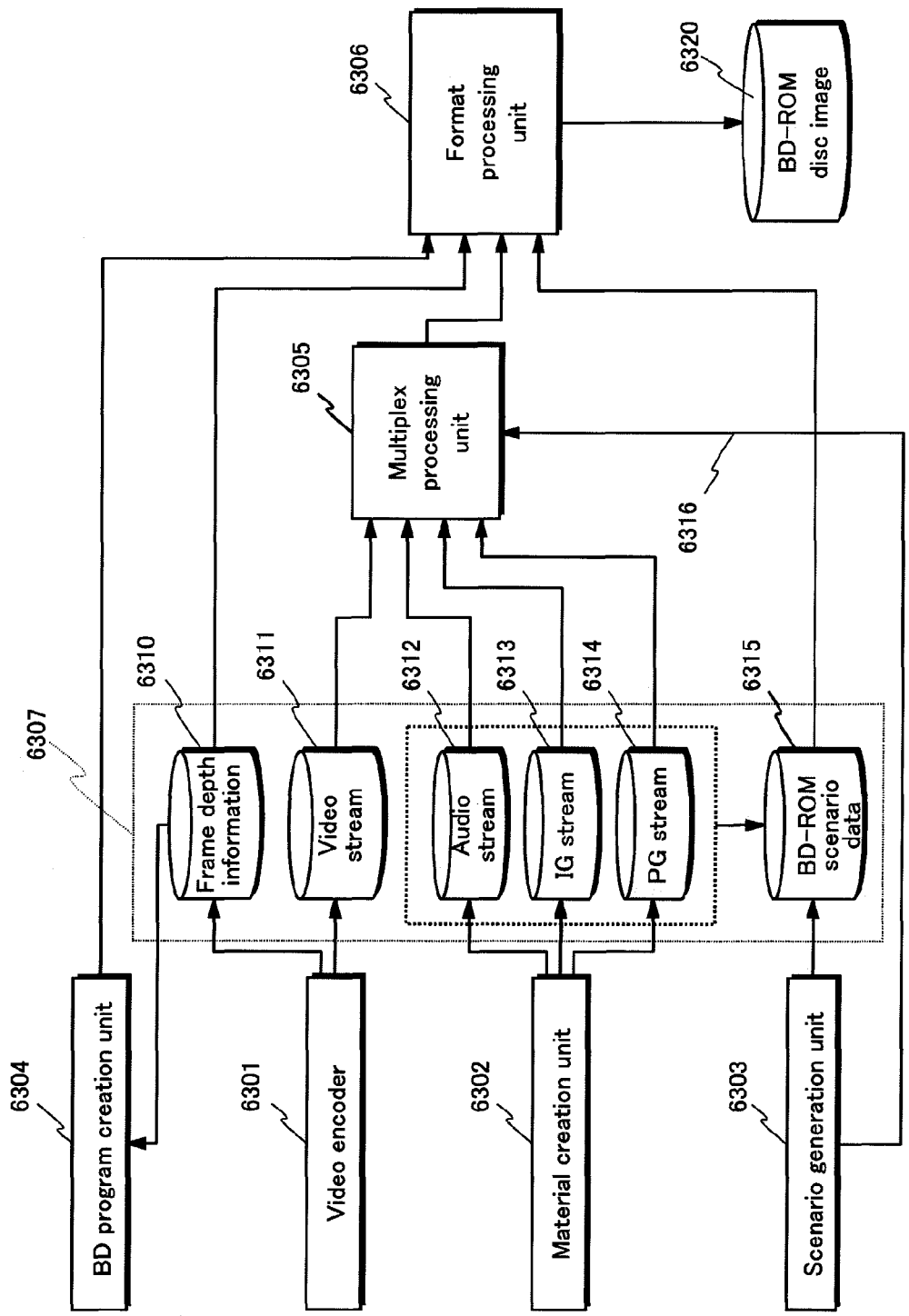
FIG. 63 is a block diagram showing the internal structure of a recording device according to embodiment 2 of the present invention.

FIG. 63 is a block diagram showing the internal structure of the above-described recording device. As shown in FIG. 63, the recording device includes a video encoder 6301, material creation unit 6302, scenario generation unit 6303, BD program creation unit 6304, multiplex processing unit 6305, format processing unit 6306, and database unit 6307.

The database unit 6307 is a nonvolatile storage device embedded in the recording device and is in particular a hard disk drive (HDD). Alternatively, the database unit 6307 may be an external HDD connected to the recording device, a nonvolatile semiconductor memory device embedded in the recording device, or an external nonvolatile semiconductor memory device connected to the recording device.

The video encoder 6301 receives video data, such as uncompressed bitmap data, from the authoring staff, and compresses the received video data in accordance with a compression/encoding scheme such as MPEG-4 AVC or MPEG-2. This process converts primary video data into a primary video stream and secondary video data into a secondary video stream. In particular, 3D video image data is converted into a base-view video stream and a dependent-view video stream. As shown in FIG. 9, the video encoder 6301 converts the left-view video stream into a base-view video stream by performing inter-picture predictive encoding with the pictures in the left-view video stream. On the other hand, the video encoder 6301 converts the right-view video stream into a dependent-view video stream by performing inter-picture predictive encoding with not only the pictures in the right-view video stream but also the pictures in the base-view video stream. Note that the right-view video stream may be converted into a base-view video stream. Furthermore, the left-view video stream may be converted into the dependent-view video stream. The converted video streams 6311 are stored in the database unit 6307.

During the above-described process of inter-picture predictive encoding, the video encoder 6301 further detects motion vectors between left video images and right video images and calculates depth information of each 3D video image based on the detected motion vectors. The calculated depth information of each 3D video image is organized into the frame depth information 6310 that is stored in the database unit 6307.

FIGS. 64A and 64B are schematic diagrams showing a left-video image picture and a right-video image picture used in display of one scene in a 3D video image, and FIG. 64C is a schematic diagram showing depth information calculated from these pictures by a video encoder 6301.

The video encoder 6301 first compresses each picture using the redundancy between the left and right pictures. At that time, the video encoder 6301 compares an uncompressed left picture and an uncompressed right picture on a per-macroblock basis (each macroblock containing a matrix of 8×8 or 16×16 pixels) so as to detect a motion vector for each image in the two pictures. Specifically, as shown in FIGS. 64A and 64B, a left video picture 6401 and a right video picture 6402 are each divided into macroblocks 6403, the entirety of which represents a matrix. Next, the areas occupied by the image data in picture 6401 and picture 6402 are compared for each macroblock 6403, and a motion vector between these pieces of image data is detected based on the result of the comparison. For example, the area occupied by image 6404 showing a "house" in picture 6401 is substantially the same as that in picture 6402. Accordingly, a motion vector is not detected from such areas. On the other hand, the area occupied by image 6405 showing a "circle" in picture 6401 is substantially different from the area in picture 6402. Accordingly, a motion vector indicating the displacement between the images 6405 showing the "circles" in the pictures 6401 and 6402 is detected from these areas.

The video encoder 6301 next makes use of the detected motion vector not only when compressing the pictures 6401 and 6402, but also when calculating the binocular parallax pertaining to a 3D video image constituted from the pieces of image data 6404 and 6405. Furthermore, in accordance with the binocular parallax thus obtained, the video encoder 6301 calculates the "depths" of each image, such as the images 6404 and 6405 of the "house" and "circle". The information indicating the depth of each image may be organized, for example, into a matrix 6406 the same size as the matrix of the macroblocks in pictures 6401 and 6402 as shown in FIG. 64C. The frame depth information 6310 shown in FIG. 63 includes this matrix 6406. In this matrix 6406, blocks 6407 are in one-to-one correspondence with the macroblocks 6403 in pictures 6401 and 6402. Each block 6407 indicates the depth of the image shown by the corresponding macroblocks 6403 by using, for example, a depth of eight bits. In the example shown in FIGS. 64A-C, the depth of the image 6405 of the "circle" is stored in each of the blocks in an area 6408 in the matrix 6406. This area 6408 corresponds to the entire areas in the pictures 6401 and 6402 that represent the image 6405.

Referring again to FIG. 63, the material creation unit 6302 creates elementary streams other than video streams, such as an audio stream 6312, PG stream 6313, and IG stream 6314 and stores the created streams into the database unit 6307. For example, the material creation unit 6302 receives uncompressed LPCM audio data from the authoring staff, encodes the uncompressed LPCM audio data in accordance with a compression/encoding scheme such as AC-3, and converts the encoded LPCM audio data into the audio stream 6312. The material creation unit 6302 additionally receives a subtitle information file from the authoring staff and creates the PG stream 6313 in accordance with the subtitle information file. The subtitle information file defines image data for showing subtitles, display timings of the subtitles, and visual effects to be added to the subtitles (e.g., fade-in and fade-out). Furthermore, the material creation unit 6302 receives bitmap data and a menu file from the authoring staff and creates the IG stream 6314 in accordance with the bitmap data and the menu file. The bitmap data shows images that are to be presented on a menu. The menu file defines how each button on the menu is to be transitioned from one status to another and defines visual effects to be added to each button.

The scenario generation unit 6303 creates BD-ROM scenario data 6315 in accordance with an instruction that has been issued by the authoring staff and received via GUI and then stores the created BD-ROM scenario data 6315 in the database unit 6307. The BD-ROM scenario data 6315 described here is a file group that defines methods of playing back the elementary streams 6311-6314 stored in the database unit 6307. Of the file group shown in FIG. 5, the BD-ROM scenario data 6315 includes the index file 511, the movie object file 512, and the playlist files 521-523. The scenario generation unit 6303 further creates a parameter file 6316 and transfers the created parameter file 6316 to the multiplex processing unit 6305. The parameter file 6316 defines, from among the elementary streams 6311-6314 stored in the database unit 6307, stream data to be multiplexed into the main TS and sub-TS.

The BD program creation unit 6304 provides the authoring staff with a programming environment for programming a BD-J object and Java application programs. The BD program creation unit 6304 receives a request from a user via GUI and creates each program's source code according to the request. The BD program creation unit 6304 further creates the BD-J object file 551 from the BD-J object and compresses the Java application programs in the JAR file 561. The files 551 and 561 are transferred to the format processing unit 6306.

Here, it is assumed that the BD-J object is programmed in the following way: the BD-J object causes the program execution units 4606 and 4906 shown in FIGS. 46 and 49 to transfer graphics data for GUI to the system target decoders 4603 and 4903. Furthermore, the BD-J object causes the system target decoders 4603 and 4903 to process graphics data as image plane data. In this case, the BD program creation unit 6304 may set offset information corresponding to the image plane data in the BD-J object by using the frame depth information 6310 stored in the database unit 6307.

In accordance with the parameter file 6316, the multiplex processing unit 6305 multiplexes each of the elementary streams 6311-6314 stored in the database unit 6307 to form a stream file in MPEG-2 TS format. More specifically, as shown in FIG. 7, each of the elementary streams 6311-6314 is converted into a source packet sequence, and the source packets included in each sequence are assembled to construct a single piece of multiplexed stream data. In this manner, the main TS and sub-TS are created.

In parallel with the aforementioned processing, the multiplex processing unit 6305 creates the 2D clip information file and dependent-view clip information file by the following procedure. First, the entry map 3130 shown in FIG. 32 is generated for each file 2D and file DEP. Next, referring to each entry map 3130, the extent start point list 3320 shown in FIG. 33 is created. Afterwards, the stream attribute information shown in FIG. 31 is extracted from each elementary stream to be multiplexed into the main TS and sub-TS. Furthermore, as shown in FIG. 31, a combination of an entry map, a piece of 3D meta data, and a piece of stream attribute information is associated with a piece of clip information.

The format processing unit 6306 creates a BD-ROM disc image 6320 of the directory structure shown in FIG. 5 from (i) the BD-ROM scenario data 6315 stored in the database unit 6307, (ii) a group of program files including, among others, a BD-J object file created by the BD program creation unit 6304, and (iii) multiplexed stream data and clip information files generated by the multiplex processing unit 6305. In this directory structure, UDF is used as a file system.

When creating file entries for each of the files 2D, files DEP, and files SS, the format processing unit 6306 refers to the entry maps and 3D meta data included in each of the 2D clip information files and dependent-view clip information files. The SPN for each entry point and extent start point is thereby used in creating each allocation descriptor. In particular, allocation descriptors are created so as to represent the interleaved arrangement shown in FIG. 16. The file SS and file 2D thus share each base-view data block, and the file SS and file DEP thus share each dependent-view data block. On the other hand, at locations where a long jump is necessary, allocation descriptors are created so as to represent one of the arrangements 1-3 shown in FIGS. 21, 24, and 26. In particular, some base-view data blocks are only referred to by allocation descriptors in the file 2D as blocks exclusively for 2D playback, and duplicate data thereof is only referred to by allocation descriptors in the file SS as blocks exclusively for 3D playback. Furthermore, the size of each extent for the base-view and the dependent-view is set so as to satisfy expressions 1-5, and the value of the logical address shown by each allocation descriptor is determined accordingly.

In addition, by using the frame depth information 6310 stored in the database unit 6307, the format processing unit 6306 creates the offset table shown in FIG. 32A for each secondary video stream 6311, PG stream 6313, and IG stream 6314. The format processing unit 6306 furthermore stores the offset table in the 3D meta data for the 2D clip information file. At this point, the positions of image data pieces within left and right video frames are automatically adjusted so that 3D video images represented by one stream avoid overlap with 3D video images represented by other streams in the same visual direction. Furthermore, the offset value for each video frame is also automatically adjusted so that depths of 3D video images represented by one stream avoid agreement with depths of 3D video images represented by other streams.

Thereafter, the BD-ROM disc image 6320 generated by the format processing unit 6306 is converted into data suited for pressing of a BD-ROM disc. This data is then recorded on a BD-ROM disc master. Mass production of the BD-ROM disc 101 pertaining to embodiment 1 of the present invention is made possible by pressing the master.

Embodiment 3

Figure 65:
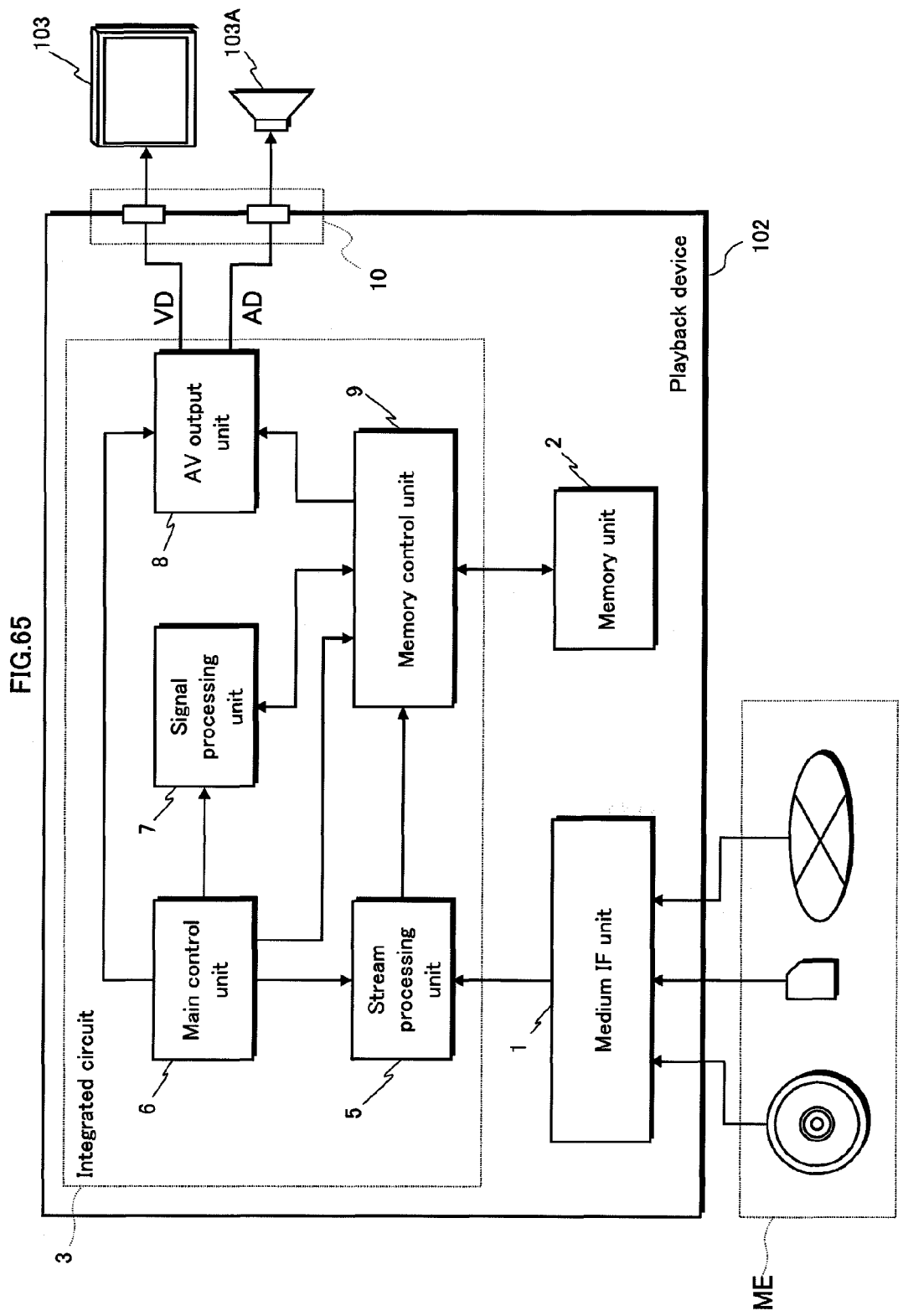
FIG. 65 is a functional block diagram of the integrated circuit 3 according to embodiment 3 of the present invention.

FIG. 65 is a functional block diagram of the integrated circuit 3 according to embodiment 3 of the present invention. As shown in FIG. 65, the integrated circuit 3 is mounted on a playback device 102 according to embodiment 1. This playback device 102 includes a medium interface (IF) unit 1, memory unit 2, and output terminal 10 in addition to the integrated circuit 3.

The medium IF unit 1 receives or reads data from an external medium ME and transmits the data to the integrated circuit 3. This data includes, in particular, data on the BD-ROM disc 101 according to embodiment 1. Types of medium ME include disc recording media, such as optical discs, hard disks, etc.; semiconductor memory such as an SD card, USB memory, etc.; broadcast waves such as CATV or the like; and networks such as the Ethernet™, wireless LAN, and wireless public networks. In conjunction with the type of medium ME, types of medium IF unit 1 include a disc drive, card IF, CAN tuner, Si tuner, and network IF.

The memory unit 2 temporarily stores both the data that is received or read from the medium ME by the medium IF unit 1 and data that is being processed by the integrated circuit 3. A synchronous dynamic random access memory (SDRAM), double-data-rate x synchronous dynamic random access memory (DDRx SDRAM; x=1, 2, 3, . . . ), etc. is used as the memory unit 2. The memory unit 2 is a single memory element. Alternatively, the memory unit 2 may include a plurality of memory elements.

The integrated circuit 3 is a system LSI and performs video and audio processing on the data transmitted from the medium IF unit 1. As shown in FIG. 65, the integrated circuit 3 includes a main control unit 6, stream processing unit 5, signal processing unit 7, memory control unit 9, and AV output unit 8.

The main control unit 6 includes a processor core and program memory. The processor core includes a timer function and an interrupt function. The program memory stores basic software such as the OS. The processor core controls the entire integrated circuit 3 in accordance with the programs stored, for example, in the program memory.

Under the control of the main control unit 6, the stream processing unit 5 receives data from the medium ME transmitted via the medium IF unit 1. Furthermore, the stream processing unit 5 stores the received data in the memory unit 2 via a data bus in the integrated circuit 3. Additionally, the stream processing unit 5 separates visual data and audio data from the received data. As previously described, the data received from the medium ME includes data configured according to embodiment 1. In this case, "visual data" includes a primary video stream, secondary video streams, PG streams, and IG streams. "Audio data" includes a primary audio stream and secondary audio streams. In particular, the data configured according to embodiment 1 is separated into a plurality of extents for the base-view stream and dependent-view stream and alternately arranged. When receiving this data, under the control of the main control unit 6, the stream processing unit 5 extracts the base-view stream and stores it in a first area in the memory unit 2. The stream processing unit 5 also extracts the dependent-view stream and stores it in a second area in the memory unit 2. The first area and second area in the memory unit 2 referred to here are a logical division of a single memory element. Alternatively, each area may be included in physically different memory elements.

The visual data and audio data separated by the stream processing unit 5 are compressed via coding. Types of coding methods for visual data include MPEG-2, MPEG-4 AVC, MPEG-4 MVC, SMPTE VC-1, etc. Types of coding of audio data include Dolby AC-3, Dolby Digital Plus, MLP, DTS, DTS-HD, linear PCM, etc. Under the control of the main control unit 6, the signal processing unit 7 decodes the visual data and audio data via a method appropriate for the coding method used. The signal processing unit 7 corresponds, for example, to each of the decoders shown in FIG. 50.

The memory control unit 9 arbitrates access to the memory unit 2 by the function blocks 5-8 in the integrated circuit 3.

Under the control of the main control unit 6, the AV output unit 8 processes the visual data and audio data decoded by the signal processing unit 7 into appropriate forms and, via separate output terminals 10, outputs the results to the display device 103 and to speakers in the display device 103. Such processing of data includes superimposing visual data, converting the format of each piece of data, mixing audio data, etc.

Figure 66:
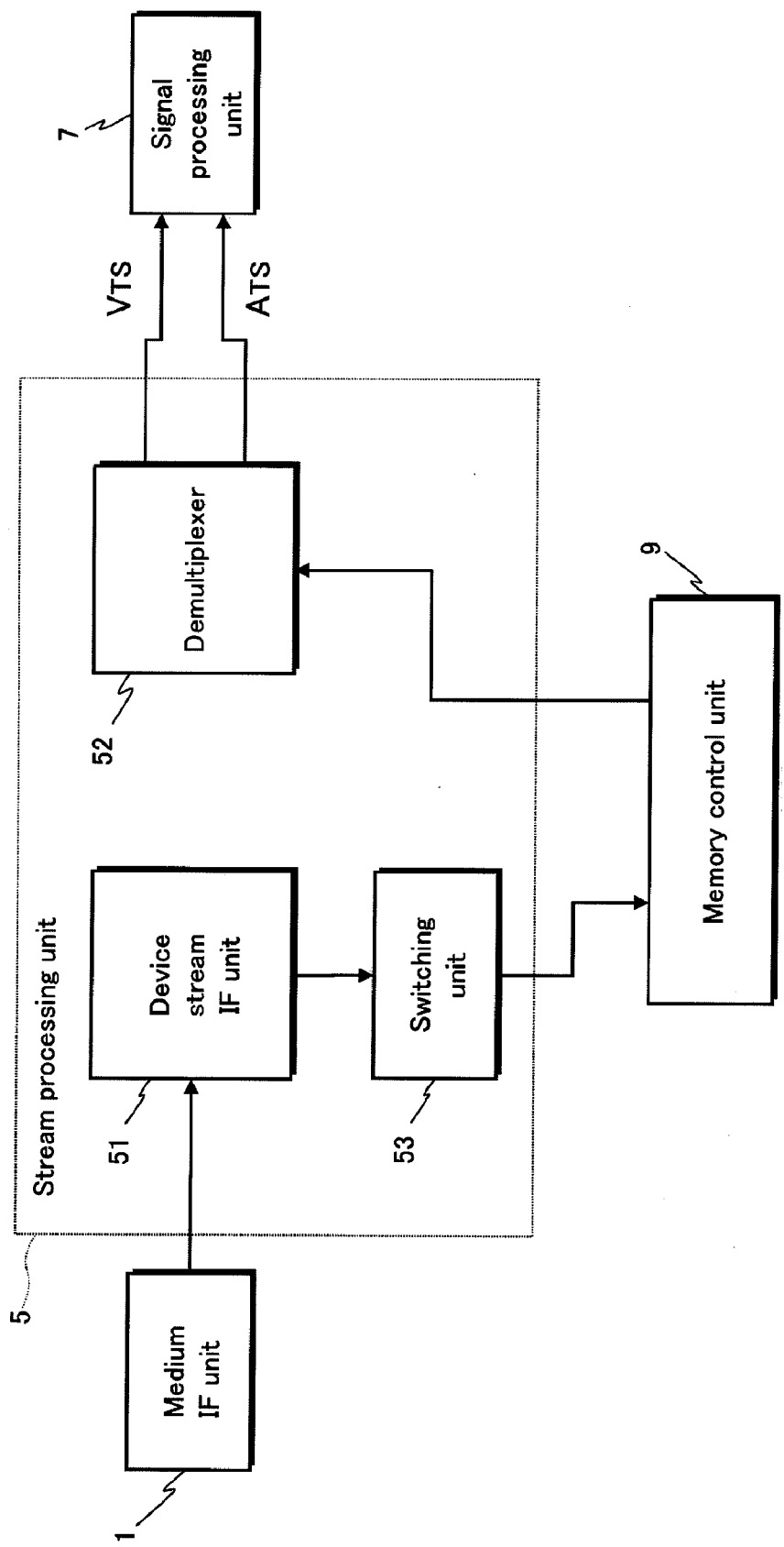
FIG. 66 is a functional block diagram showing a typical structure of the stream processing unit 5 shown in FIG. 65.

FIG. 66 is a functional block diagram showing a typical structure of the stream processing unit 5. As shown in FIG. 66, the stream processing unit 5 includes a device stream IF unit 51, a demultiplexer 52, and a switching unit 53.

The device stream IF unit 51 is an interface that transfers data between the medium IF unit 1 and the other function blocks 6-9 in the integrated circuit 3. For example, if the medium ME is an optical disc or a hard disk, the device stream IF unit 51 includes a serial advanced technology attachment (SATA), advanced technology attachment packet interface (ATAPI), or parallel advanced technology attachment (PATA). When the medium ME is a semiconductor memory such as an SD card, USB memory, etc., the device stream IF unit 51 includes a card IF. When the medium ME is a broadcast wave such as CATV or the like, the device stream IF unit 51 includes a tuner IF. When the medium ME is a network such as the Ethernet™, a wireless LAN, or wireless public network, the device stream IF unit 51 includes a network IF. Depending on the type of medium ME, the device stream IF unit 51 may achieve part of the functions of the medium IF unit 1. Conversely, when the medium IF unit 1 is internal to the integrated circuit 3, the device stream IF unit 51 may be omitted.

From the memory control unit 9, the demultiplexer 52 receives data transmitted from the medium ME to the memory unit 2 and separates visual data and audio data from the received data. Each extent included in data structured according to embodiment 1 consists of source packets for a video stream, audio stream, PG stream, IG stream, etc., as shown in FIG. 7. In some cases, however, the dependent-view stream may not include an audio stream. The demultiplexer 52 reads PIDs from source packets and, in accordance with the PIDs, separates a source packet group into visual TS packets $V_{TS}$ and audio TS packets $A_{TS}$. The separated TS packets $V_{TS}$ and $A_{TS}$ are transferred to the signal processing unit 7 either directly or after temporary storage in the memory unit 2. The demultiplexer 52 corresponds, for example, to the source depacketizers 5011 and 5012 and the PID filters 5013 and 5014 shown in FIG. 50.

The switching unit 53 switches the output destination in accordance with the type of data received by the device stream IF unit 51. For example, when the device stream IF unit 51 receives the base-view stream, the switching unit 53 switches the storage location of the stream to the first area in the memory unit 2. Conversely, when the device stream IF unit 51 receives the dependent-view stream, the switching unit 53 switches the storage location of the stream to the second area in the memory unit 2.

Figure 67:
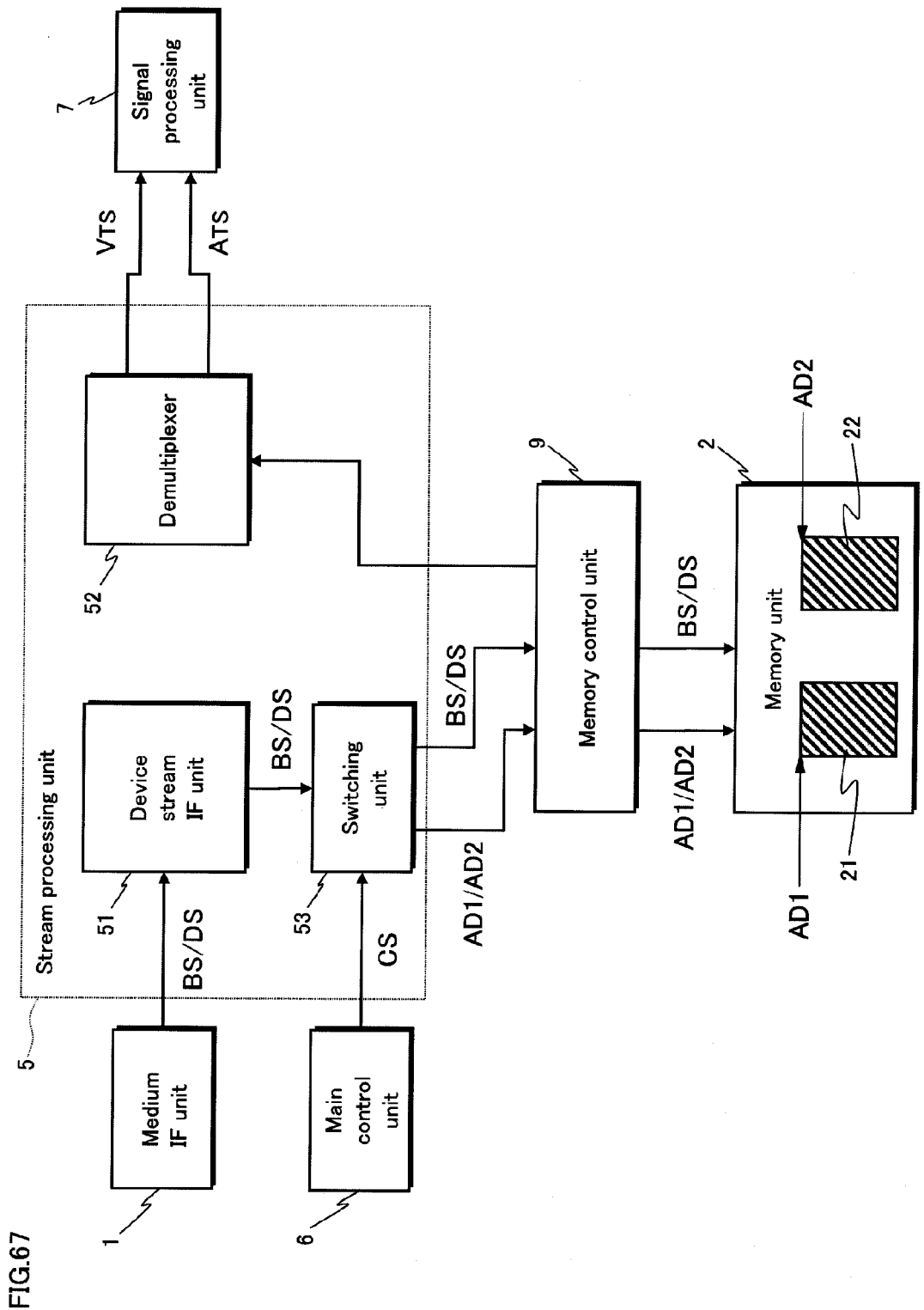
FIG. 67 is a schematic diagram showing the surrounding configuration when the switching unit 53 shown in FIG. 66 is a DMAC.

The switching unit 53 is, for example, a direct memory access controller (DMAC). FIG. 67 is a schematic diagram showing the surrounding configuration of the switching unit 53 in this case. Under the control of the main control unit 6, the DMAC 53 transmits data received by the device stream IF unit 51 as well as the address of the location for storage of the data to the memory control unit 9. Specifically, when the device stream IF unit 51 receives a base-view stream BS, the DMAC 53 transmits the base-view stream BS along with an address 1 AD1. This address 1 AD1 indicates the top address AD1 in the first storage area 21 in the memory unit 2. On the other hand, when the device stream IF unit 51 receives a dependent-view stream DS, the DMAC 53 transmits the dependent-view stream DS along with an address 2 AD2. This address 2 AD2 indicates the top address AD2 in the second storage area 22 in the memory unit 2. The DMAC 53 thus switches the output destination, in particular the storage location in the memory unit 2, in accordance with the type of data received by the device stream IF unit 51. The memory control unit 9 stores the streams BS and DS received from the DMAC 53 in the respective areas 21 and 22 of the memory unit 2 shown by the addresses AD1 and AD2 received with the streams.

The main control unit 6 refers to the extent start points in the clip information file for the switching unit 53 to switch the storage location. In this case, the clip information file is received before the streams BS and DS and is stored in the memory unit 2. In particular, the main control unit 6 refers to the file base to recognize that the data received by the device stream IF unit 51 is a base-view stream. Conversely, the main control unit 6 refers to the file DEP to recognize that the data received by the device stream IF unit 51 is a dependent-view stream. Furthermore, the main control unit 6 transmits a control signal CS to the switching unit 53 in accordance with the results of recognition and causes the switching unit 53 to switch the storage location. Note that the switching unit 53 may be controlled by a dedicated control circuit separate from the main control unit 6.

In addition to the function blocks 51, 52, and 53 shown in FIG. 66, the stream processing unit 5 may be further provided with an encryption engine, a security control unit, and a controller for direct memory access. The encryption engine decrypts encrypted data, key data, etc. received by the device stream IF unit 51. The security control unit stores the private key and uses it to control execution of a device authentication protocol or the like between the medium ME and the playback device 102.

In the above example, when data received from the medium ME is stored in the memory unit 2, the storage location thereof is switched according to whether the data is a base-view stream BS or a dependent-view stream DS. Alternatively, regardless of type, the data received from the medium ME may be temporarily stored in the same area in the memory unit 2 and separated into a base-view stream BS and a dependent-view stream DS when subsequently being transferred to the demultiplexer 52.

Figure 68:
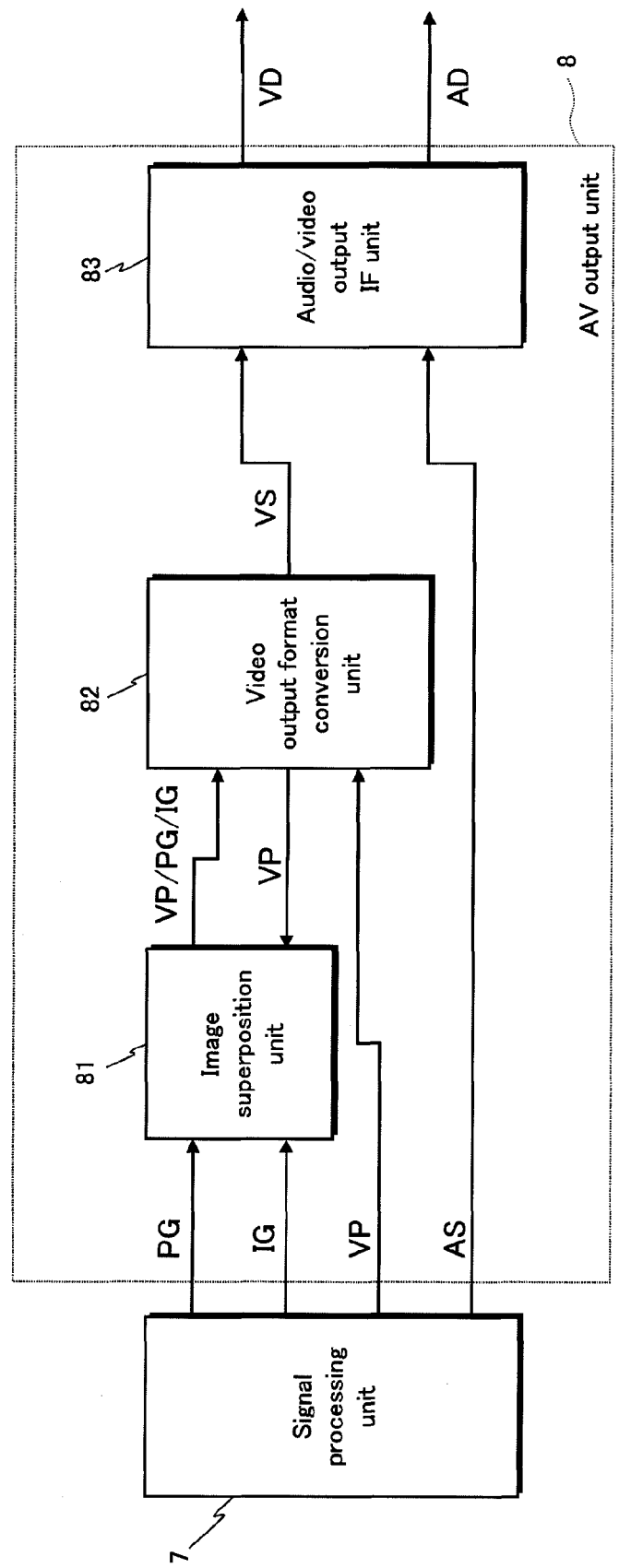
FIG. 68 is a functional block diagram showing a typical structure of the AV output unit 8 shown in FIG. 65.

FIG. 68 is a functional block diagram showing a typical structure of the AV output unit 8. As shown in FIG. 68, the AV output unit 8 is provided with an image superposition unit 81, video output format conversion unit 82, and audio/video output IF unit 83.

The image superposition unit 81 superimposes visual data VP, PG, and IG decoded by the signal processing unit 7. Specifically, the image superposition unit 81 first receives processed right-view or left-view video plane data from the video output format conversion unit 82 and decoded PG plane data PG and IG plane data IG from the signal processing unit 7. Next, the image superposition unit 81 superimposes PG plane data PG and IG plane data IG on the video plane data VP in units of pictures. The image superposition unit 81 corresponds, for example, to the plane adder 4910 shown in FIGS. 50 and 51.

The video output format conversion unit 82 receives decoded video plane data VP from the signal processing unit 7 and superimposed visual data VP/PG/IG from the image superposition unit 81. Furthermore, the video output format conversion unit 82 performs various processing on the visual data VP and VP/PG/IG as necessary. Such processing includes resizing, IP conversion, noise reduction, and frame rate conversion. Resizing is processing to enlarge or reduce the size of the visual images. IP conversion is processing to convert the scanning method between progressive and interlaced. Noise reduction is processing to remove noise from the visual images. Frame rate conversion is processing to convert the frame rate. The video output format conversion unit 82 transmits processed video plane data VP to the image superposition unit 81 and transmits processed visual data VS to the audio/video output IF unit 83.

The audio/video output IF unit 83 receives visual data VS from the video output format conversion unit 82 and receives decoded audio data AS from the signal processing unit 7. Furthermore, the audio/video output IF unit 83 performs processing such as coding on the received data VS and AS in conjunction with the data transmission format. As described below, part of the audio/video output IF unit 83 may be provided externally to the integrated circuit 3.

Figure 69:
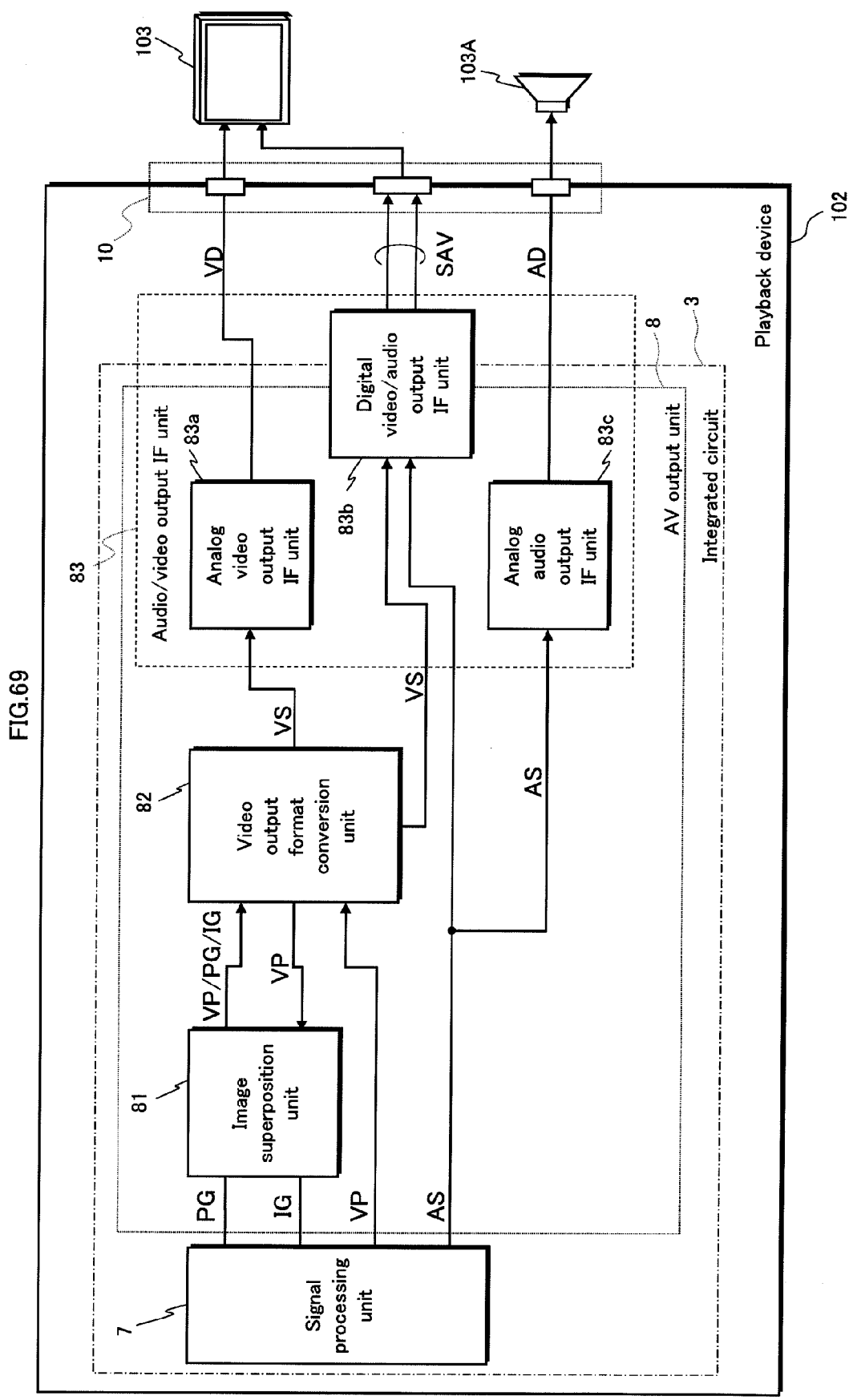
FIG. 69 is a schematic diagram showing details regarding data output by the playback device 102, which includes the AV output unit 8 shown in FIG. 68.

FIG. 69 is a schematic diagram showing details regarding data output by the playback device 102, which includes the AV output unit 8. As shown in FIG. 69, the audio/video output IF unit 83 includes an analog video output IF unit 83*a*, digital video/audio output IF unit 83*b*, and analog audio output IF unit 83*c*. The integrated circuit 3 and playback device 102 are thus compatible with various formats for transmitting visual data and audio data, as described below.

The analog video output IF unit 83*a* receives visual data VS from the video output format conversion unit 82, converts/encodes this data VS into data VD in analog video signal format, and outputs the data VD. The analog video output IF unit 83*a* includes a composite video encoder, S video signal (Y/C separation) encoder, component video signal encoder, D/A converter (DAC), etc. compatible with, for example, one of the following formats: NTSC, PAL, and SECAM.

The digital video/audio output IF unit 83*b* receives decoded audio data AS from the signal processing unit 7 and receives visual data VS from the video output format conversion unit 82. Furthermore, the digital video/audio output IF unit 83*b* unifies and encrypts the data AS and data VS. Afterwards, the digital video/audio output IF unit 83*b* encodes the encrypted data SVA in accordance with data transmission standards and outputs the result. The digital video/audio output IF unit 83*b* corresponds, for example, to a high-definition multimedia interface (HDMI) or the like.

The analog audio output IF unit 83*c* receives decoded audio data AS from the signal processing unit 7, converts this data into analog audio data AD via D/A conversion, and outputs the audio data AD. The analog audio output IF unit 83*c* corresponds, for example, to an audio DAC.

The transmission format for the visual data and audio data can switch in accordance with the type of the data reception device/data input terminal provided in the display device 103/speaker 103A. The transmission format can also be switched by user selection. Furthermore, the playback device 102 can transmit data for the same content not only in a single transmission format but also in multiple transmission formats in parallel.

The AV output unit 8 may be further provided with a graphics engine in addition to the function blocks 81, 82, and 83 shown in FIGS. 68 and 69. The graphics engine performs graphics processing, such as filtering, screen composition, curve rendering, and 3D presentation processing on the data decoded by the signal processing unit 7.

The function blocks shown in FIGS. 65, 66, 68, and 69 are included in the integrated circuit 3. This is not a requirement, however, and part of the function blocks may be external to the integrated circuit 3. Also, unlike the structure shown in FIG. 65, the memory unit 2 may be included in the integrated circuit 3. Furthermore, the main control unit 6 and signal processing unit 7 need not be completely separate function blocks. The main control unit 6 may, for example, perform part of the processing corresponding to the signal processing unit 7.

Figure 70A:
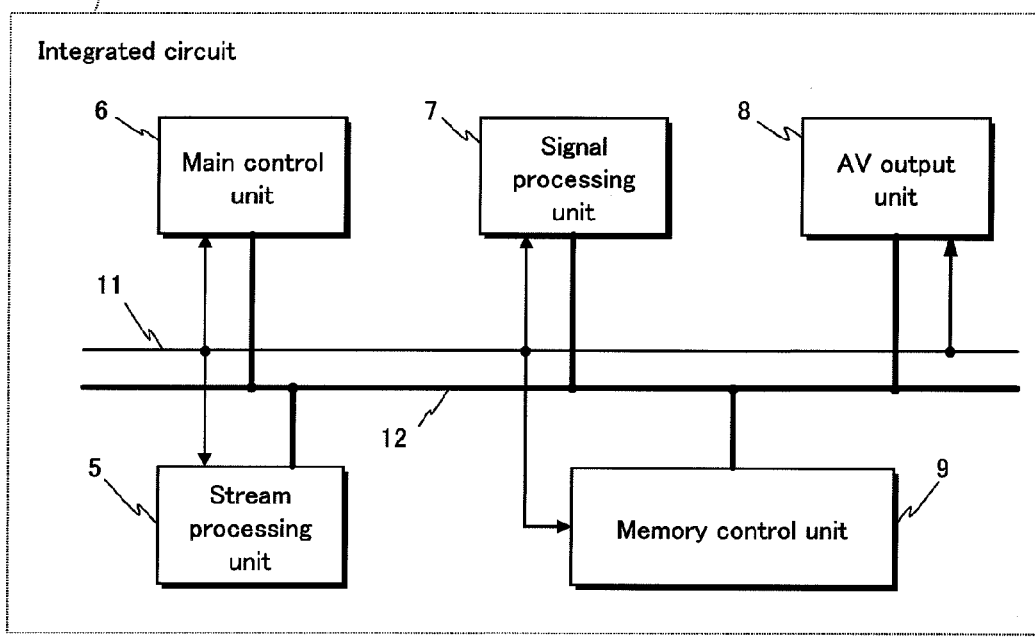
FIGS. 70A and 70B are schematic diagrams showing examples of the topology of a control bus and data bus in the integrated circuit 3 shown in FIG. 65.
Figure 70B:
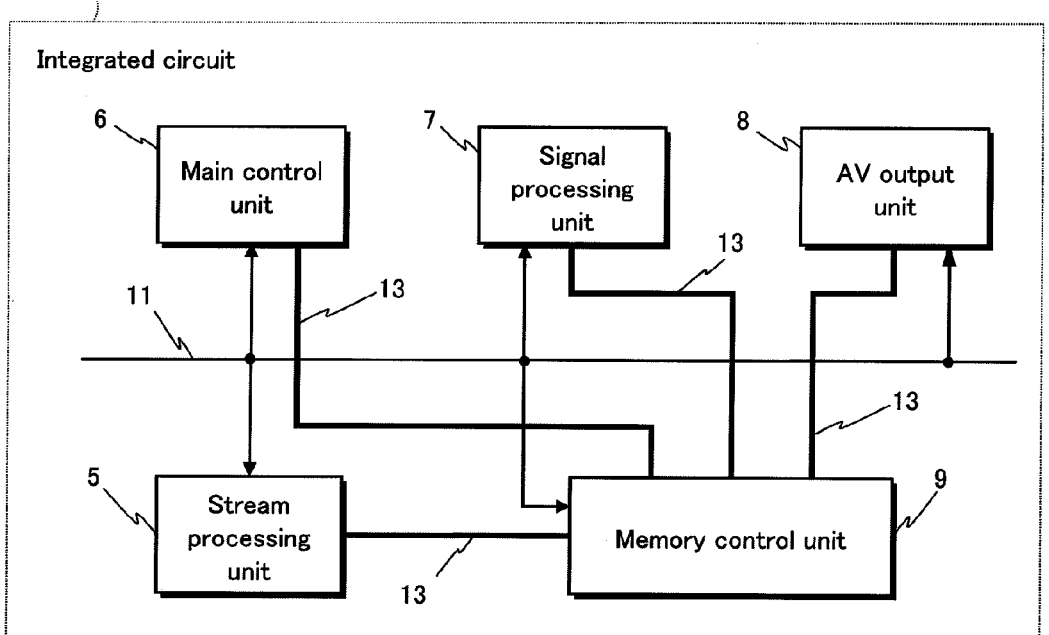

The topology of the control bus and data bus that connect the function blocks in the integrated circuit 3 may be selected in accordance with the order and the type of the processing by each function block. FIGS. 70A and 70B are schematic diagrams showing examples of the topology of a control bus and data bus in the integrated circuit 3. As shown in FIG. 70A, both the control bus 11 and data bus 12 are configured so as to directly connect each of the function blocks 5-9 with all of the other function blocks. Alternatively, as shown in FIG. 70B, the data bus 13 may be configured so as to directly connect each of the function blocks 5-8 with only the memory control unit 9. In this case, each of the function blocks 5-8 transmits data to the other function blocks via the memory control unit 9 and, additionally, the memory unit 2.

Instead of an LSI integrated on a single chip, the integrated circuit 3 may be a multi-chip module. In this case, since the plurality of chips composing the integrated circuit 3 are sealed in a single package, the integrated circuit 3 looks like a single LSI. Alternatively, the integrated circuit 3 may be configured using a field programmable gate array (FPGA) or a reconfigurable processor. An FPGA is an LSI that can be programmed after manufacture. A reconfigurable processor is an LSI whose connections between internal circuit cells and settings for each circuit cell can be reconfigured.

<Playback Processing by the Playback Device 102 Using the Integrated Circuit 3>

FIG. 71 is a flowchart of playback processing by a playback device 102 that uses the integrated circuit 3. This playback processing begins when the medium IF unit 1 is connected to the medium ME so as to be capable of data transmission, as for example when an optical disc is inserted into the disc drive. During this processing, the playback device 102 receives data from the medium ME and decodes the data. Subsequently, the playback device 102 outputs the decoded data as a video signal and an audio signal.

Step S1: the medium IF unit 1 receives or reads data from the medium ME and transmits the data to the stream processing unit 5. Processing then proceeds to step S2.

Step S2: the stream processing unit 5 separates the data received or read in step S1 into visual data and audio data. Processing then proceeds to step S3.

Step S3: the signal processing unit 7 decodes each piece of data separated in step S2 by the stream processing unit 5 using a method appropriate for the coding method. Processing then proceeds to step S4.

Step S4: the AV output unit 8 superimposes the pieces of visual data decoded by the signal processing unit 7 in step S3. Processing then proceeds to step S5.

Step S5: the AV output unit 8 outputs the visual data and audio data processed in steps S2-4. Processing then proceeds to step S6.

Step S6: the main control unit 6 determines whether the playback device 102 should continue playback processing. When, for example, data that is to be newly received or read from the medium ME via the medium IF unit 1 remains, processing is repeated starting at step S1. Conversely, processing ends when the medium IF unit 1 stops receiving or reading data from the medium ME due to the optical disc being removed from the disc drive, the user indicating to stop playback, etc.

FIG. 72 is a flowchart showing details on steps S1-6 shown in FIG. 71. The steps S101-110 shown in FIG. 72 are performed under the control of the main control unit 6. Step S101 corresponds mainly to details on step S1, steps S102-S104 correspond mainly to details on step S2, step S105 corresponds mainly to details on step S3, steps S106-S108 correspond mainly to details on step S4, and steps S109 and S110 correspond mainly to details on step S5.

Step S101: before reading or receiving from the medium ME, via the medium IF unit 1, data to be played back, the device stream IF unit 51 reads or receives data necessary for such playback, such as a playlist and clip information file. Furthermore, the device stream IF unit 51 stores this data in the memory unit 2 via the memory control unit 9. Processing then proceeds to step S102.

Step S102: from the stream attribute information included in the clip information file, the main control unit 6 identifies the coding method of the video data and audio data stored in the medium ME. Furthermore, the main control unit 6 initializes the signal processing unit 7 so that decoding can be performed in accordance with the identified coding method. Processing then proceeds to step S103.

Step S103: the device stream IF unit 51 receives or reads video data and audio data for playback from the medium ME via the medium IF unit 1. In particular, this data is received or read in units of extents. Furthermore, the device stream IF unit 51 stores this data in the memory unit 2 via the switching unit 53 and the memory control unit 9. When the base-view stream is received or read, the main control unit 6 switches the storage location of the stream to the first area in the memory unit 2 by controlling the switching unit 53. Conversely, when the dependent-view stream is received or read, the main control unit 6 switches the storage location of the stream to the second area in the memory unit 2 by controlling the switching unit 53. Processing then proceeds to step S104.

Step S104: the stream stored in the memory unit 2 is transferred to the demultiplexer 52 in the stream processing unit 5. The demultiplexer 52 first reads a PID from each source packet composing the stream. Next, in accordance with the PID, the demultiplexer 52 identifies whether the TS packets included in the source packet are visual data or audio data. Furthermore, in accordance with the results of identification, the demultiplexer 52 transmits each TS packet to the corresponding decoder in the signal processing unit 7. Processing then proceeds to step S105.

Step S105: each decoder in the signal processing unit 7 decodes transmitted TS packets using an appropriate method. Processing then proceeds to step S106.

Step S106: each picture in the left-view video stream and right-view video stream that were decoded in the signal processing unit 7 are transmitted to the video output format conversion unit 82. The video output format conversion unit 82 resizes these pictures to match the resolution of the display device 103. Processing then proceeds to step S107.

Step S107: the image superposition unit 81 receives video plane data, which is composed of pictures resized in step S106, from the video output format conversion unit 82. On the other hand, the image superposition unit 81 receives decoded PG plane data and IG plane data from the signal processing unit 7. Furthermore, the image superposition unit 81 superimposes these pieces of plane data. Processing then proceeds to step S108.

Step S108: the video output format conversion unit 82 receives the plane data superimposed in step S107 from the image superposition unit 81. Furthermore, the video output format conversion unit 82 performs IP conversion on this plane data. Processing then proceeds to step S109.

Step S109: the audio/video output IF unit 83 receives visual data that has undergone IP conversion in step S108 from the video output format conversion unit 82 and receives decoded audio data from the signal processing unit 7. Furthermore, the audio/video output IF unit 83 performs coding, D/A conversion, etc. on these pieces of data in accordance with the data output format in the display device 103/speaker 103A and with the format for transmitting data to the display device 103/speaker 103A. The visual data and audio data are thus converted into either an analog output format or a digital output format. Analog output formats of visual data include, for example, a composite video signal, S video signal, component video signal, etc. Digital output formats of visual data/audio data include HDMI or the like. Processing then proceeds to step S110.

Step S110: the audio/video output IF unit 83 transmits the audio data and visual data processed in step S109 to the display device 103/speaker 103A. Processing then proceeds to step S6, for which the above description is cited.

Each time data is processed in each of the above steps, the results are temporarily stored in the memory unit 2. The resizing and IP conversion by the video output format conversion unit 82 in steps S106 and S108 may be omitted as necessary. Furthermore, in addition to or in lieu of these processes, other processing such as noise reduction, frame rate conversion, etc. may be performed. The order of processing may also be changed wherever possible.

<Supplementary Explanation>
<<Principle of 3D Video Image Playback>>

Playback methods of 3D video images are roughly classified into two categories: methods using a holographic technique, and methods using parallax video.

A method using a holographic technique is characterized by allowing a viewer to perceive objects in video as stereoscopic by giving the viewer's visual perception substantially the same information as optical information provided to visual perception by human beings of actual objects. However, although a technical theory for utilizing these methods for moving video display has been established, it is extremely difficult to construct, with present technology, a computer that is capable of real-time processing of the enormous amount of calculation required for moving video display and a display device having super-high resolution of several thousand lines per 1 mm. Accordingly, at the present time, the realization of these methods for commercial use is hardly in sight.

"Parallax video" refers to a pair of 2D video images shown to each of a viewer's eyes for the same scene, i.e. the pair of a left-view and a right-view. A method using a parallax video is characterized by playing back the left-view and right-view of a single scene so that the viewer sees each view in only one eye, thereby allowing the user to perceive the scene as stereoscopic.

Figure 73B:
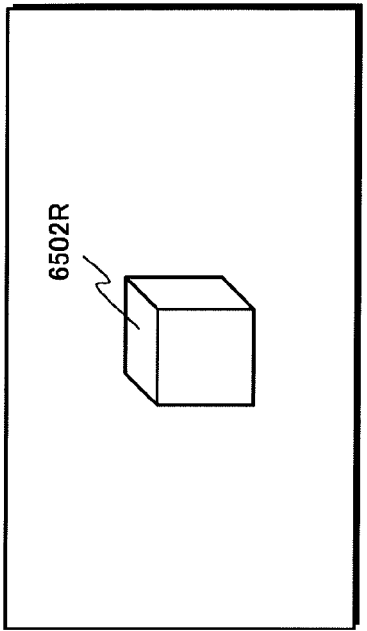
FIGS. 73A, 73B, and 73C are schematic diagrams illustrating the principle of playing back 3D video images according to a method using parallax video.
Figure 73C:
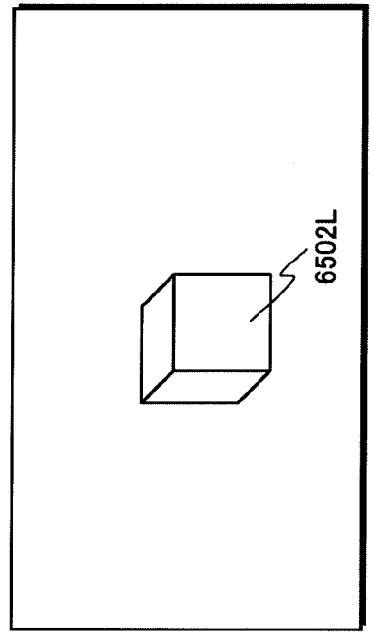
Figure 73A:
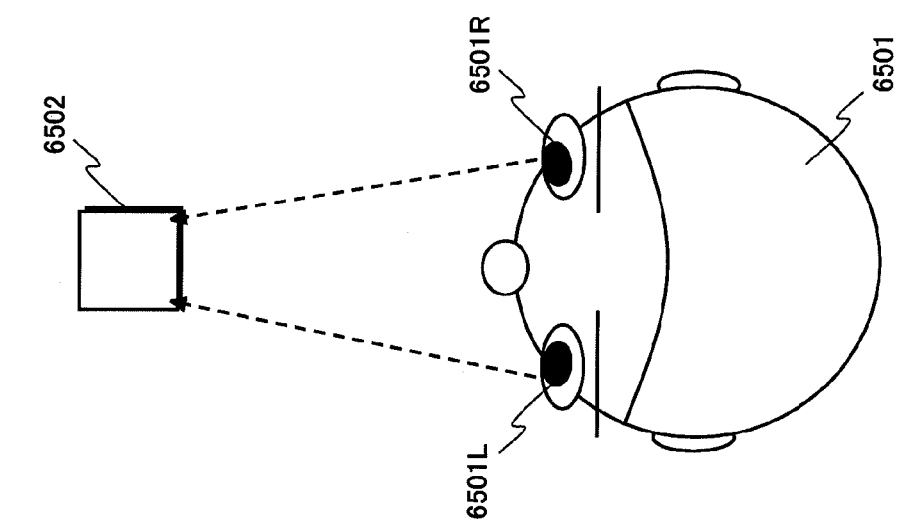

FIGS. 73A, 73B, 73C are schematic diagrams illustrating the principle of playing back 3D video images (stereoscopic video) according to a method using parallax video. FIG. 73A is a top view of a viewer 6501 looking at a cube 6502 placed directly in front of the viewer's face. FIGS. 73B and 73C are schematic diagrams showing the outer appearance of the cube 6502 as a 2D video image as perceived respectively by the left eye 6501L and the right eye 65018 of the viewer 6501. As is clear from comparing FIG. 73B and FIG. 73C, the outer appearances of the cube 6502 as perceived by the eyes are slightly different. The difference in the outer appearances, i.e., the binocular parallax allows the viewer 6501 to recognize the cube 6502 as three-dimensional. Thus, according to a method using parallax video, left and right 2D video images with different viewpoints are first prepared for a single scene. For example, for the cube 6502 shown in FIG. 73A, the left view of the cube 6502 shown in FIG. 73B and the right view shown in FIG. 73C are prepared. At this point, the position of each viewpoint is determined by the binocular parallax of the viewer 6501. Next, each video image is played back so as to be perceived only by the corresponding eye of the viewer 6501. Consequently, the viewer 6501 recognizes the scene played back on the screen, i.e., the video image of the cube 6502, as stereoscopic. Unlike methods using a holography technique, methods using parallax video thus have the advantage of requiring preparation of 2D video images from merely two viewpoints.

Several concrete methods for how to use parallax video have been proposed. From the standpoint of how these methods show left and right 2D video images to the viewer's eyes, the methods are divided into alternate frame sequencing methods, methods that use a lenticular lens, and two-color separation methods.

In alternate frame sequencing, left and right 2D video images are alternately displayed on a screen for a predetermined time, while the viewer observes the screen using shutter glasses. Here, each lens in the shutter glasses is, for example, formed by a liquid crystal panel. The lenses pass or block light in a uniform and alternate manner in synchronization with switching of the 2D video images on the screen. That is, each lens functions as a shutter that periodically blocks an eye of the viewer. More specifically, while a left video image is displayed on the screen, the shutter glasses make the left-side lens transmit light and the right-hand side lens block light. Conversely, while a right video image is displayed on the screen, the shutter glasses make the right-side glass transmit light and the left-side lens block light. As a result, the viewer sees afterimages of the right and left video images overlaid on each other and thus perceives a single 3D video image.

According to the alternate-frame sequencing, as described previously, right and left video images are alternately displayed in a predetermined cycle. For example, when 24 video frames are displayed per second for playing back a normal 2D movie, 48 video frames in total for both right and left eyes need to be displayed for a 3D movie. Accordingly, a display device capable of quickly executing rewriting of the screen is preferred for this method.

In a method using a lenticular lens, a right video frame and a left video frame are respectively divided into reed-shaped small and narrow areas whose longitudinal sides lie in the vertical direction of the screen. In the screen, the small areas of the right video frame and the small areas of the left video frame are alternately arranged in the landscape direction of the screen and displayed at the same time. Here, the surface of the screen is covered by a lenticular lens. The lenticular lens is a sheet-shaped lens constituted from parallel-arranged multiple long and thin hog-backed lenses. Each hog-backed lens lies in the longitudinal direction on the surface of the screen. When a viewer sees the left and right video frames through the lenticular lens, only the viewer's left eye perceives light from the display areas of the left video frame, and only the viewer's right eye perceives light from the display areas of the right video frame. This is how the viewer sees a 3D video image from the parallax between the video images respectively perceived by the left and right eyes. Note that according to this method, another optical component having similar functions, such as a liquid crystal device, may be used instead of the lenticular lens. Alternatively, for example, a longitudinal polarization filter may be provided in the display areas of the left image frame, and a lateral polarization filter may be provided in the display areas of the right image frame. In this case, the viewer sees the display through polarization glasses. Here, for the polarization glasses, a longitudinal polarization filter is provided for the left lens, and a lateral polarization filter is provided for the right lens. Consequently, the right and left video images are each perceived only by the corresponding eye, thereby allowing the viewer to perceive a stereoscopic video image.

In a method using parallax video, in addition to being constructed from the start by a combination of left and right video images, the 3D video content can also be constructed from a combination of 2D video images and a depth map. The 2D video images represent 3D video images projected on a hypothetical 2D picture plane, and the depth map represents the depth of each pixel in each portion of the 3D video image as compared to the 2D picture plane. When the 3D content is constructed from a combination of 2D video images with a depth map, the 3D playback device or the display device first constructs left and right video images from the combination of 2D video images with a depth map and then creates 3D video images from these left and right video images using one of the above-described methods.

Figure 74:
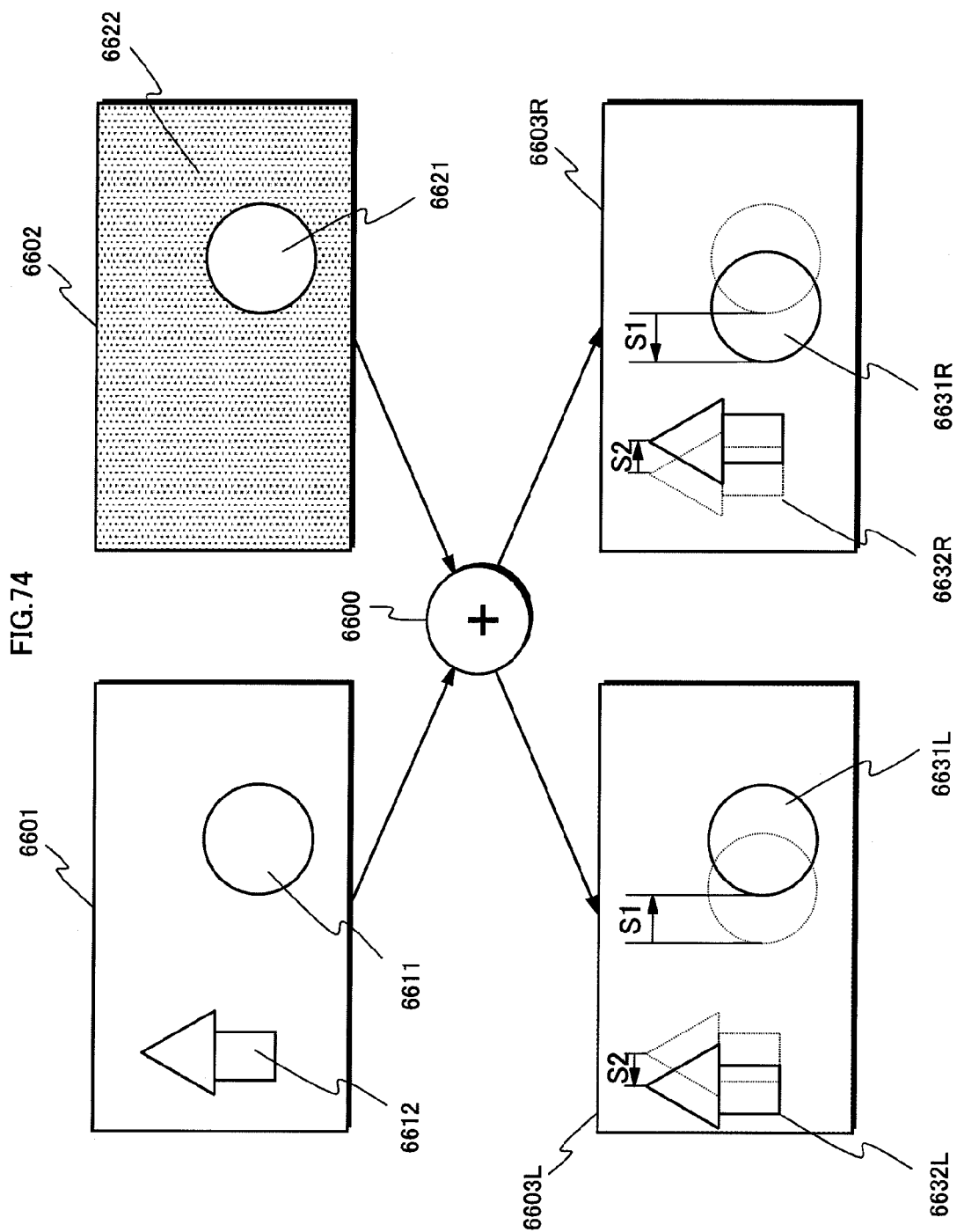
FIG. 74 is a schematic diagram showing an example of constructing a left-view 6603L and a right-view 6603R from the combination of a 2D video image 6601 and a depth map 6602.
Figure 75:
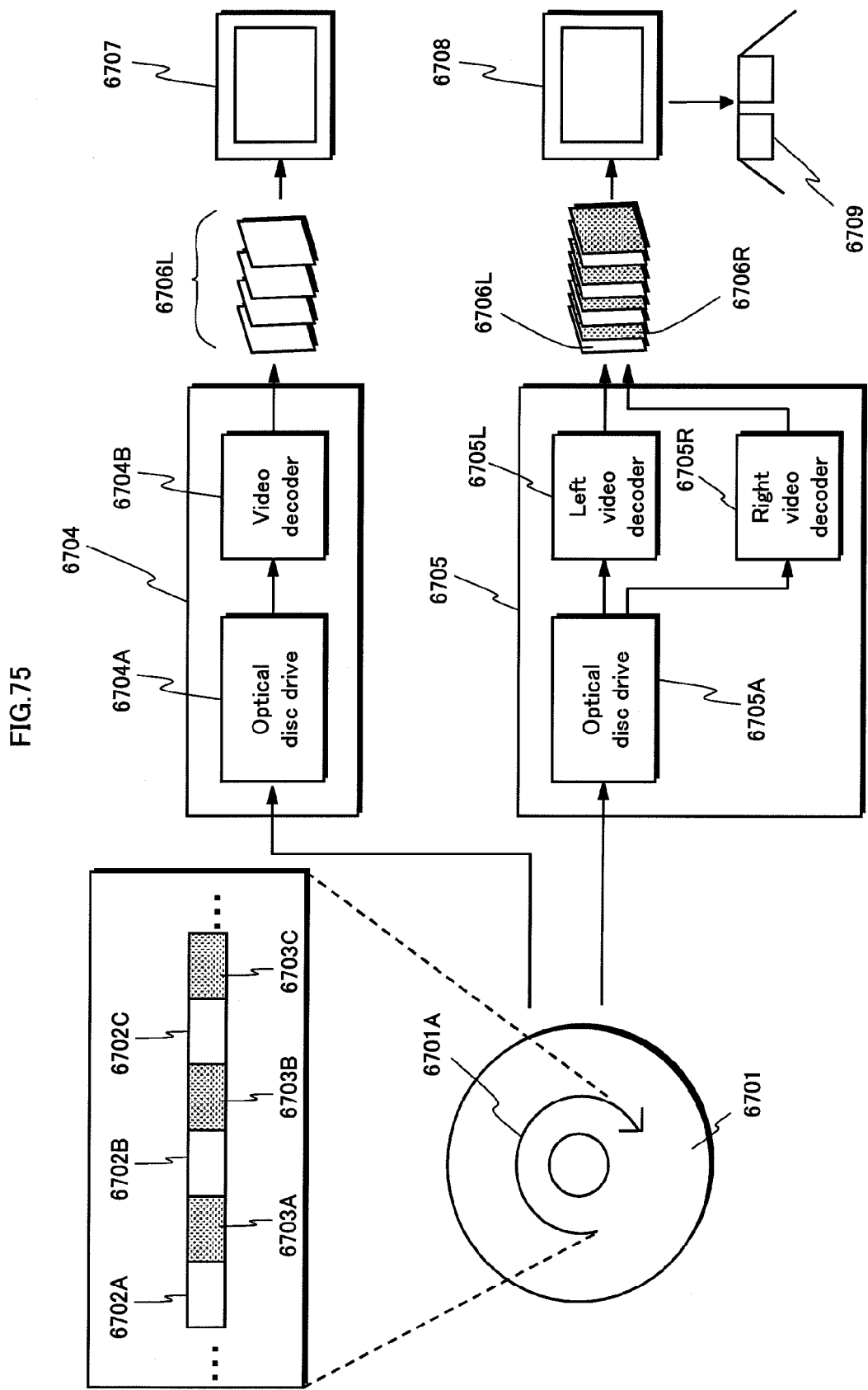
FIG. 75 is a schematic diagram showing technology to guarantee compatibility of an optical disc on which 3D video content is recorded with a 2D playback device.

FIG. 74 is a schematic diagram showing an example of constructing a left-view 6603L and a right-view 6603R from a combination of a 2D video image 6601 and a depth map 6602. As shown in FIG. 74, a circular plate 6611 is shown in the background 6612 of the 2D video image 6601. The depth map 6602 indicates the depth for each pixel in each portion of the 2D video image 6601. According to the depth map 6602, in the 2D video image 6601, the display area 6621 of the circular plate 6611 is closer to the viewer than the screen, and the display area 6622 of the background 6612 is deeper than the screen. The parallax video generation unit 6600 in the playback device 102 first calculates the binocular parallax for each portion of the 2D video image 6601 using the depth of each portion indicated by the depth map 6602. Next, the parallax video generation unit 6600 shifts the presentation position of each portion in the 2D video image 6601 in accordance with the calculated binocular parallax to construct the left-view 6603L and the right-view 6603R. In the example shown in FIG. 74, the parallax video generation unit 6600 shifts the presentation position of the circular plate 6611 in the 2D video image 6601 as follows: the presentation position of the circular plate 6631L in the left-view 6603L is shifted to the right by half of its binocular parallax, S1, and the presentation position of the circular plate 6631R in the right-view 6603R is shifted to the left by half of its binocular parallax, S1. In this way, the viewer perceives the circular plate 6611 as being closer than the screen. Conversely, the parallax video generation unit 6600 shifts the presentation position of the background 6612 in the 2D video image 6601 as follows: the presentation position of the background 6632L in the left-view 6603L is shifted to the left by half of its binocular parallax, S2, and the presentation position of the background 6632R in the right-view 6603R is shifted to the right by half of its binocular parallax, S2. In this way, the viewer perceives the background 6612 as being deeper than the screen.

A playback system for 3D video images with use of parallax video has already been established for use in movie theaters, attractions in amusement parks, and the like. Accordingly, this method is also useful for implementing home theater systems that can play back 3D video images. In the embodiments of the present invention, among methods using parallax video, an alternate-frame sequencing method or a method using polarization glasses is assumed to be used. However, apart from these methods, the present invention can also be applied to other, different methods, as long as they use parallax video. This will be obvious to those skilled in the art from the above explanation of the embodiments.

<<Data Distribution via Broadcasting or Communication Circuit>>

The recording medium according to embodiment 1 of the present invention may be, in addition to an optical disc, a general removable medium available as a package medium, such as a portable semiconductor memory device including an SD memory card. Also, embodiment 1 describes an example of an optical disc in which data has been recorded beforehand, namely, a conventionally available read-only optical disc such as a BD-ROM or a DVD-ROM. However, the embodiment of the present invention is not limited to these. For example, when a terminal device writes a 3D video content that has been distributed via broadcasting or a network into a conventionally available writable optical disc such as a BD-RE or a DVD-RAM, arrangement of the extents according to the above-described embodiment may be used. Here, the terminal device may be incorporated in a playback device, or may be a device different from the playback device.

<<Playback of Semiconductor Memory Card>>

The following describes a data read unit of a playback device in the case where a semiconductor memory card is used as the recording medium according to embodiment 1 of the present invention instead of an optical disc.

A part of the playback device that reads data from an optical disc is composed of, for example, an optical disc drive. Conversely, a part of the playback device that reads data from a semiconductor memory card is composed of an exclusive interface (I/F). Specifically, a card slot is provided with the playback device, and the I/F is mounted in the card slot. When the semiconductor memory card is inserted into the card slot, the semiconductor memory card is electrically connected with the playback device via the I/F. Furthermore, the data is read from the semiconductor memory card to the playback device via the I/F.

<<Copyright Protection Technique for Data Stored in BD-ROM Disc>>

Here, the mechanism for protecting copyright of data recorded on a BD-ROM disc is described, as an assumption for the following supplementary explanation.

From a standpoint, for example, of improving copyright protection or confidentiality of data, there are cases in which a part of the data recorded on the BD-ROM is encrypted. The encrypted data is, for example, a video stream, an audio stream, or other stream. In such a case, the encrypted data is decoded in the following manner.

The playback device has recorded thereon beforehand a part of data necessary for generating a "key" to be used for decoding the encrypted data recorded on the BD-ROM disc, namely, a device key. On the other hand, the BD-ROM disc has recorded thereon another part of the data necessary for generating the "key", namely, a media key block (MKB), and encrypted data of the "key", namely, an encrypted title key. The device key, the MKB, and the encrypted title key are associated with one another, and each are further associated with a particular ID written into a BCA 201 recorded on the BD-ROM disc 101 shown in FIG. 2, namely, a volume ID. When the combination of the device key, the MKB, the encrypted title key, and the volume ID is not correct, the encrypted data cannot be decoded. In other words, only when the combination is correct, the above-mentioned "key", namely the title key, can be generated. Specifically, the encrypted title key is first decrypted using the device key, the MKB, and the volume ID. Only when the title key can be obtained as a result of the decryption, the encrypted data can be decoded using the title key as the above-mentioned "key".

When a playback device tries to play back the encrypted data recorded on the BD-ROM disc, the playback device cannot play back the encrypted data unless the playback device has stored thereon a device key that has been associated beforehand with the encrypted title key, the MKB, the device, and the volume ID recorded on the BD-ROM disc. This is because a key necessary for decoding the encrypted data, namely a title key, can be obtained only by decrypting the encrypted title key based on the correct combination of the MKB, the device key, and the volume ID.

In order to protect the copyright of at least one of a video stream and an audio stream that are to be recorded on a BD-ROM disc, a stream to be protected is encrypted using the title key, and the encrypted stream is recorded on the BD-ROM disc. Next, a key is generated based on the combination of the MKB, the device key, and the volume ID, and the title key is encrypted using the key so as to be converted to an encrypted title key. Furthermore, the MKB, the volume ID, and the encrypted title key are recorded on the BD-ROM disc. Only a playback device storing thereon the device key to be used for generating the above-mentioned key can decode the encrypted video stream and/or the encrypted audio stream recorded on the BD-ROM disc using a decoder. In this manner, it is possible to protect the copyright of the data recorded on the BD-ROM disc.

The above-described mechanism for protecting the copyright of the data recorded on the BD-ROM disc is applicable to a recording medium other than the BD-ROM disc. For example, the mechanism is applicable to a readable and writable semiconductor memory device and in particular to a portable semiconductor memory card such as an SD card.

<<Recording Data on a Recording Medium through Electronic Distribution>>

The following describes processing to transmit data, such as an AV stream file for 3D video images (hereinafter, "distribution data"), to the playback device according to embodiment 1 of the present invention via electronic distribution and to cause the playback device to record the distribution data on a semiconductor memory card. Note that the following operations may be performed by a specialized terminal device for performing the processing instead of the above-mentioned playback device. Also, the following description is based on the assumption that the semiconductor memory card that is a recording destination is an SD memory card.

The playback device includes the above-described card slot. An SD memory card is inserted into the card slot. The playback device in this state first transmits a transmission request of distribution data to a distribution server on a network. At this point, the playback device reads identification information of the SD memory card from the SD memory card and transmits the read identification information to the distribution server together with the transmission request. The identification information of the SD memory card is, for example, an identification number specific to the SD memory card and, more specifically, is a serial number of the SD memory card. The identification information is used as the above-described volume ID.

The distribution server has stored thereon pieces of distribution data. Distribution data that needs to be protected by encryption such as a video stream and/or an audio stream has been encrypted using a predetermined title key. The encrypted distribution data can be decrypted using the same title key.

The distribution server stores thereon a device key as a private key common with the playback device. The distribution server further stores thereon an MKB in common with the SD memory card. Upon receiving the transmission request of distribution data and the identification information of the SD memory card from the playback device, the distribution server first generates a key from the device key, the MKB, and the identification information and encrypts the title key using the generated key to generate an encrypted title key.

Next, the distribution server generates public key information. The public key information includes, for example, the MKB, the encrypted title key, signature information, the identification number of the SD memory card, and a device list. The signature information includes for example a hash value of the public key information. The device list is a list of devices that need to be invalidated, that is, devices that have a risk of performing unauthorized playback of encrypted data included in the distribution data. The device list specifies the device key and the identification number for the playback device, as well as an identification number or function (program) for each element in the playback device such as the decoder.

The distribution server transmits the distribution data and the public key information to the playback device. The playback device receives the distribution data and the public key information and records them in the SD memory card via the exclusive I/F of the card slot.

Encrypted distribution data recorded on the SD memory card is decrypted using the public key information in the following manner, for example. First, three types of checks are performed as authentication of the public key information. These checks may be performed in any order.

(1) Does the identification information of the SD memory card included in the public key information match the identification number stored in the SD memory card inserted into the card slot?

(2) Does a hash value calculated based on the public key information match the hash value included in the signature information?

(3) Is the playback device excluded from the device list indicated by the public key information, and specifically, is the device key of the playback device excluded from the device list?

If at least any one of the results of the checks (1) to (3) is negative, the playback device stops decryption processing of the encrypted data. Conversely, if all of the results of the checks (1) to (3) are affirmative, the playback device authorizes the public key information and decrypts the encrypted title key included in the public key information using the device key, the MKB, and the identification information of the SD memory card, thereby obtaining a title key. The playback device further decrypts the encrypted data using the title key, thereby obtaining, for example, a video stream and/or an audio stream.

The above mechanism has the following advantage. If a playback device, compositional elements, and a function (program) that have the risk of being used in an unauthorized manner are already known when data is transmitted via the electronic distribution, the corresponding pieces of identification information are listed in the device list and are distributed as part of the public key information. On the other hand, the playback device that has requested the distribution data inevitably needs to compare the pieces of identification information included in the device list with the pieces of identification information of the playback device, its compositional elements, and the like. As a result, if the playback device, its compositional elements, and the like are identified in the device list, the playback device cannot use the public key information for decrypting the encrypted data included in the distribution data even if the combination of the identification number of the SD memory card, the MKB, the encrypted title key, and the device key is correct. In this manner, it is possible to effectively prevent distribution data from being used in an unauthorized manner.

The identification information of the semiconductor memory card is desirably recorded in a recording area having high confidentiality included in a recording area of the semiconductor memory card. This is because if the identification information such as the serial number of the SD memory card has been tampered with in an unauthorized manner, it is possible to realize an illegal copy of the SD memory card easily. In other words, if the tampering allows generation of a plurality of semiconductor memory cards having the same identification information, it is impossible to distinguish between authorized products and unauthorized copy products by performing the above check (1). Therefore, it is necessary to record the identification information of the semiconductor memory card on a recording area with high confidentiality in order to protect the identification information from being tampered with in an unauthorized manner.

The recording area with high confidentiality is structured within the semiconductor memory card in the following manner, for example. First, as a recording area electrically disconnected from a recording area for recording normal data (hereinafter, "first recording area"), another recording area (hereinafter, "second recording area") is provided. Next, a control circuit exclusively for accessing the second recording area is provided within the semiconductor memory card. As a result, access to the second recording area can be performed only via the control circuit. For example, assume that only encrypted data is recorded on the second recording area and a circuit for decrypting the encrypted data is incorporated only within the control circuit. As a result, access to the data recorded on the second recording area can be performed only by causing the control circuit to store therein an address of each piece of data recorded in the second recording area. Also, an address of each piece of data recorded on the second recording area may be stored only in the control circuit. In this case, only the control circuit can identify an address of each piece of data recorded on the second recording area.

In the case where the identification information of the semiconductor memory card is recorded on the second recording area, then when an application program operating on the playback device acquires data from the distribution server via electronic distribution and records the acquired data in the semiconductor memory card, the following processing is performed. First, the application program issues an access request to the control circuit via the memory card I/F for accessing the identification information of the semiconductor memory card recorded on the second recording area. In response to the access request, the control circuit first reads the identification information from the second recording area. Then, the control circuit transmits the identification information to the application program via the memory card I/F. The application program transmits a transmission request of the distribution data together with the identification information. The application program further records, in the first recording area of the semiconductor memory card via the memory card I/F, the public key information and the distribution data received from the distribution server in response to the transmission request.

Note that it is preferable that the above-described application program check whether the application program itself has been tampered with before issuing the access request to the control circuit of the semiconductor memory card. The check may be performed using a digital certificate compliant with the X.509 standard. Furthermore, it is only necessary to record the distribution data in the first recording area of the semiconductor memory card, as described above. Access to the distribution data need not be controlled by the control circuit of the semiconductor memory card.

<<Application to Real-Time Recording>>

Embodiment 2 of the present invention is based on the assumption that an AV stream file and a playlist file are recorded on a BD-ROM disc using the prerecording technique of the authoring system, and the recorded AV stream file and playlist file are provided to users. Alternatively, it may be possible to record, by performing real-time recording, the AV stream file and the playlist file on a writable recording medium such as a BD-RE disc, a BD-R disc, a hard disk, or a semiconductor memory card (hereinafter, "BD-RE disc or the like") and provide the user with the recorded AV stream file and playlist file. In such a case, the AV stream file may be a transport stream that has been obtained as a result of real-time decoding of an analog input signal performed by a recording device. Alternatively, the AV stream file may be a transport stream obtained as a result of partialization of a digitally input transport stream performed by the recording device.

The recording device performing real-time recording includes a video encoder, an audio encoder, a multiplexer, and a source packetizer. The video encoder encodes a video signal to convert it into a video stream. The audio encoder encodes an audio signal to convert it into an audio stream. The multiplexer multiplexes the video stream and audio stream to convert them into a digital stream in the MPEG-2 TS format. The source packetizer converts TS packets in the digital stream in MPEG-2 TS format into source packets. The recording device stores each source packet in the AV stream file and writes the AV stream file on the BD-RE disc or the like.

In parallel with the processing of writing the AV stream file, the control unit of the recording device generates a clip information file and a playlist file in the memory and writes the files on the BD-RE disc or the like. Specifically, when a user requests performance of recording processing, the control unit first generates a clip information file in accordance with an AV stream file and writes the file on the BD-RE disc or the like. In such a case, each time a head of a GOP of a video stream is detected from a transport stream received from outside, or each time a GOP of a video stream is generated by the video encoder, the control unit acquires a PTS of an I picture positioned at the head of the GOP and an SPN of the source packet in which the head of the GOP is stored. The control unit further stores a pair of the PTS and the SPN as one entry point in an entry map of the clip information file. At this time, an "is_angle_change" flag is added to the entry point.

The is_angle_change flag is set to "on" when the head of the GOP is an IDR picture, and "off" when the head of the GOP is not an IDR picture. In the clip information file, stream attribute information is further set in accordance with an attribute of a stream to be recorded. In this manner, after writing the AV stream file and the clip information file into the BD-RE disc or the like, the control unit generates a playlist file using the entry map in the clip information file, and writes the file on the BD-RE disc or the like.

<<Managed Copy>>

The playback device according to embodiment 1 of the present invention may write a digital stream recorded on the BD-ROM disc 101 on another recording medium via a managed copy. Here, managed copy refers to a technique for permitting copy of a digital stream, a playlist file, a clip information file, and an application program from a read-only recording medium such as a BD-ROM disc to a writable recording medium only in the case where authentication via communication with the server succeeds. This writable recording medium may be a writable optical disc, such as a BD-R, BD-RE, DVD-R, DVD-RW, or DVD-RAM, a hard disk, or a portable semiconductor memory device such as an SD memory card, Memory Stick™, Compact Flash™, Smart Medial™ or Multimedia Card™. A managed copy allows for limitation of the number of backups of data recorded on a read-only recording medium and for charging a fee for backups.

When a managed copy is performed from a BD-ROM disc to a BD-R disc or a BD-RE disc and the two discs have an equivalent recording capacity, the bit streams recorded on the original disc may be copied in order as they are.

If a managed copy is performed between different types of recording media, a trans code needs to be performed. This "trans code" refers to processing for adjusting a digital stream recorded on the original disc to the application format of a recording medium that is the copy destination. For example, the trans code includes the process of converting an MPEG-2 TS format into an MPEG-2 program stream format and the process of reducing a bit rate of each of a video stream and an audio stream and re-encoding the video stream and the audio stream. During the trans code, an AV stream file, a clip information file, and a playlist file need to be generated in the above-mentioned real-time recording.

<<Method for Describing Data Structure>>

Among the data structures in embodiment 1 of the present invention, a repeated structure "there is a plurality of pieces of information having a predetermined type" is defined by describing an initial value of a control variable and a cyclic condition in a "for" sentence. Also, a data structure "if a predetermined condition is satisfied, predetermined information is defined" is defined by describing, in an "if" sentence, the condition and a variable to be set at the time when the condition is satisfied. In this manner, the data structure described in embodiment 1 is described using a high level programming language. Accordingly, the data structure is converted by a computer into a computer readable code via the translation process performed by a compiler, which includes "syntax analysis", "optimization", "resource allocation", and "code generation", and the data structure is then recorded on the recording medium. By being described in a high level programming language, the data structure is treated as a part other than the method of the class structure in an object-oriented language, specifically, as an array type member variable of the class structure, and constitutes apart of the program. In other words, the data structure is substantially equivalent to a program. Therefore, the data structure needs to be protected as a computer related invention.

<<Management of Playlist File and Clip Information File by Playback Program>>

When a playlist file and an AV stream file are recorded on a recording medium, a playback program is recorded on the recording medium in an executable format. The playback program makes the computer play back the AV stream file in accordance with the playlist file. The playback program is loaded from a recording medium to a memory device of a computer and is then executed by the computer. The loading process includes compile processing or link processing. By these processes, the playback program is divided into a plurality of sections in the memory device. The sections include a text section, a data section, a bss section, and a stack section. The text section includes a code array of the playback program, an initial value, and non-rewritable data. The data section includes variables with initial values and rewritable data. In particular, the data section includes a file, recorded on the recording device, that can be accessed at any time. The bss section includes variables having no initial value. The data included in the bss section is referenced in accordance with commands indicated by the code in the text section. During the compile processing or link processing, an area for the bss section is set aside in the computer's internal RAM. The stack section is a memory area temporarily set aside as necessary. During each of the processes by the playback program, local variables are temporarily used. The stack section includes these local variables. When the program is executed, the variables in the bss section are initially set at zero, and the necessary memory area is set aside in the stack section.

As described above, the playlist file and the clip information file are already converted on the recording device into computer readable code. Accordingly, at the time of execution of the playback program, these files are each managed as "non-rewritable data" in the text section or as a "file accessed at any time" in the data section. In other words, the playlist file and the clip information file are each included as a compositional element of the playback program at the time of execution thereof. Therefore, the playlist file and the clip information file fulfill a greater role in the playback program than mere presentation of data.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A non-transitory recording medium, comprising:
a base-view stream used for monoscopic video playback;
a dependent-view stream used for stereoscopic video playback in combination with the base-view stream;
a first file used in the monoscopic video playback;
a second file used in the stereoscopic video playback;
a shared stereoscopic/monoscopic area, the shared stereoscopic/monoscopic area being a physical area of the non-transitory recording medium;
a dedicated stereoscopic area, the dedicated stereoscopic area being a physical area of the non-transitory recording medium; and
a dedicated monoscopic area, the dedicated monoscopic area being a physical area of the non-transitory recording medium,
wherein the shared stereoscopic/monoscopic area is accessed both in the stereoscopic video playback and in the monoscopic video playback, wherein the dedicated stereoscopic area is accessed in the stereoscopic video playback, wherein the dedicated monoscopic area is exclusively accessed in the monoscopic video playback and is not accessed in the stereoscopic video playback, wherein a plurality of base-view data blocks recorded in the shared stereoscopic/monoscopic area are formed from the base-view stream, wherein a plurality of base-view data blocks recorded in the dedicated stereoscopic area are formed from the base-view stream, wherein a plurality of base-view data blocks recorded in the dedicated monoscopic area are formed from the base-view stream, wherein the plurality of base-view data blocks recorded in the dedicated monoscopic area are identical to the plurality of base-view data blocks recorded in the dedicated stereoscopic area, wherein a plurality of dependent-view data blocks recorded in the shared stereoscopic/monoscopic area are formed from the dependent-view stream, wherein a plurality of dependent-view data blocks recorded in the dedicated stereoscopic area are formed from the dependent-view stream, wherein the first file refers to the plurality of base-view data blocks recorded in the shared stereoscopic/monoscopic area and to the plurality of base-view data blocks recorded in the dedicated monoscopic area, wherein the second file refers to the plurality of base-view data blocks recorded in the shared stereoscopic/monoscopic area and to the plurality of base-view data blocks recorded in the dedicated stereoscopic area, and wherein the second file has a plurality of packet numbers for a plurality of top packets of the plurality of base-view data blocks recorded in the shared stereoscopic/monoscopic area and the plurality of base-view data blocks recorded in the dedicated stereoscopic area.

2. The non-transitory recording medium of claim 1, wherein the non-transitory recording medium further includes a third file used in the stereoscopic video playback, and wherein the third file refers to the plurality of base-view data blocks recorded in the shared stereoscopic/monoscopic area and the plurality of dependent-view data blocks recorded in the shared stereoscopic/monoscopic area as a sequence of data in the stereoscopic video playback.

3. The non-transitory recording medium of claim 1, wherein the shared stereoscopic/monoscopic area is a contiguous area in which the plurality of base-view data blocks and the plurality of dependent-view data blocks are recorded in an interleaved arrangement, wherein both the dedicated stereoscopic area and the dedicated monoscopic area are contiguous areas subsequent to the shared stereoscopic/monoscopic area, wherein the dedicated stereoscopic area is accessed immediately before a long jump that occurs in the stereoscopic video playback, wherein the plurality of base-view data blocks and the plurality of dependent-view data blocks that are respectively subsequent to the plurality of base-view data blocks and the plurality of dependent-view data blocks recorded in the shared stereoscopic/monoscopic area are recorded in the dedicated stereoscopic area in an interleaved arrangement, and wherein the dedicated monoscopic area is accessed immediately before a long jump that occurs in the monoscopic video playback.

4. A playback device for playing back a non-transitory recording medium having a base-view stream, a dependent-view stream, a first file, and a second file, the playback device comprising:

a reading unit operable to read, from the non-transitory recording medium, the base-view stream, the dependent-view stream, the first file, and the second file, wherein the base-view stream is used for monoscopic video playback, wherein the dependent-view stream is used for stereoscopic video playback in combination with the base-view stream, wherein the first file is used in the monoscopic video playback, wherein the second file is used in the stereoscopic video playback, wherein the non-transitory recording medium includes a shared stereoscopic/monoscopic area, a dedicated stereoscopic area, and a dedicated monoscopic area, each of the shared stereoscopic/monoscopic area, the dedicated stereoscopic area, and the dedicated monoscopic area being a physical area of the non-transitory recording medium, wherein the shared stereoscopic/monoscopic area is accessed both in the stereoscopic video playback and in the monoscopic video playback, wherein the dedicated stereoscopic area is accessed in the stereoscopic video playback, wherein the dedicated monoscopic area is exclusively accessed in the monoscopic video playback and is not accessed in the stereoscopic video playback, wherein a plurality of base-view data blocks recorded in the shared stereoscopic/monoscopic area are formed from the base-view stream, wherein a plurality of base-view data blocks recorded in the dedicated stereoscopic area are formed from the base-view stream, wherein a plurality of base-view data blocks recorded in the dedicated monoscopic area are formed from the base-view stream, wherein the plurality of base-view data blocks recorded in the dedicated monoscopic area are identical to the plurality of base-view data blocks recorded in the dedicated stereoscopic area, wherein a plurality of dependent-view data blocks recorded in the shared stereoscopic/monoscopic area are formed from the dependent-view stream, wherein a plurality of dependent-view data blocks recorded in the dedicated stereoscopic area are formed from the dependent-view stream, wherein the first file refers to the plurality of base-view data blocks recorded in the shared stereoscopic/monoscopic area and to the plurality of base-view data blocks recorded in the dedicated monoscopic area, wherein the second file refers to the plurality of base-view data blocks recorded in the shared stereoscopic/monoscopic area and to the plurality of base-view data blocks recorded in the dedicated stereoscopic area, wherein the second file has a plurality of packet numbers for a plurality of top packets of the plurality of base-view data blocks recorded in the shared stereoscopic/monoscopic area and the plurality of base-view data blocks recorded in the dedicated stereoscopic area, wherein the playback device uses the first file when the playback device reads the plurality of base-view data blocks recorded in the shared stereoscopic/monoscopic area and the plurality of base-view data blocks recorded in the dedicated monoscopic area in the monoscopic video playback, and wherein the playback device uses the second file when the playback device reads the plurality of base-view data blocks recorded in the shared stereoscopic/monoscopic area and the plurality of base-view data blocks recorded in the dedicated stereoscopic area in the stereoscopic video playback.

5. A playback system, comprising:

a non-transitory recording medium; and a playback device, wherein the non-transitory recording medium includes a base-view stream used for monoscopic video playback, a dependent-view stream used for stereoscopic video playback in combination with the base-view stream, a first file used in the monoscopic video playback, and a second file used in the stereoscopic video playback, wherein the non-transitory recording medium includes a shared stereoscopic/monoscopic area, a dedicated stereoscopic area, and a dedicated monoscopic area, each of the shared stereoscopic/monoscopic area, the dedicated stereoscopic area, and the dedicated monoscopic area being a physical area of the non-transitory recording medium, wherein the shared stereoscopic/monoscopic area is accessed both in the stereoscopic video playback and in the monoscopic video playback, wherein the dedicated stereoscopic area is accessed in the stereoscopic video playback, wherein the dedicated monoscopic area is exclusively accessed in the monoscopic video playback and is not accessed in the stereoscopic video playback, wherein a plurality of base-view data blocks recorded in the shared stereoscopic/monoscopic area are formed from the base-view stream, wherein a plurality of base-view data blocks recorded in the dedicated stereoscopic area are formed from the base-view stream, wherein a plurality of base-view data blocks recorded in the dedicated monoscopic area are formed from the base-view stream, wherein the plurality of base-view data blocks recorded in the dedicated monoscopic area are identical to the plurality of base-view data blocks recorded in the dedicated stereoscopic area, wherein a plurality of dependent-view data blocks recorded in the shared stereoscopic/monoscopic area are formed from the dependent-view stream, wherein a plurality of dependent-view data blocks recorded in the dedicated stereoscopic area are formed from the dependent-view stream, wherein the first file refers to the plurality of base-view data blocks recorded in the shared stereoscopic/monoscopic area and to the plurality of base-view data blocks recorded in the dedicated monoscopic area, wherein the second file refers to the plurality of base-view data blocks recorded in the shared stereoscopic/monoscopic area and to the plurality of base-view data blocks recorded in the dedicated stereoscopic area, wherein the second file has a plurality of packet numbers for a plurality of top packets of the plurality of base-view data blocks recorded in the shared stereoscopic/monoscopic area and the plurality of base-view data blocks recorded in the dedicated stereoscopic area, wherein the playback device includes a reading unit operable to read, from the non-transitory recording medium, the base-view stream, the dependent-view stream, the first file, and the second file, wherein the playback device uses the first file when the playback device reads the plurality of base-view data blocks recorded in the shared stereoscopic/monoscopic area and the plurality of base-view data blocks recorded in the dedicated monoscopic area in the monoscopic video playback, and wherein the playback device uses the second file when the playback device reads the plurality of base-view data blocks recorded in the shared stereoscopic/monoscopic area and the plurality of base-view data blocks recorded in the dedicated stereoscopic area in the stereoscopic video playback.

6. A recording method, comprising:

a generation step of generating a base-view stream, a dependent-view stream, a first file, and a second file; and a recording step of recording the generated base-view stream, the generated dependent-view stream, the generated first file, and the generated second file onto a non-transitory recording medium, wherein the base-view stream is used for monoscopic video playback, wherein the dependent-view stream is used for stereoscopic video playback in combination with the base-view stream, wherein the first file is used in the monoscopic video playback, wherein the second file is used in the stereoscopic video playback, wherein the non-transitory recording medium includes a shared stereoscopic/monoscopic area, a dedicated stereoscopic area, and a dedicated monoscopic area, each of the shared stereoscopic/monoscopic area, the dedicated stereoscopic area, and the dedicated monoscopic area being a physical area of the non-transitory recording medium, wherein the shared stereoscopic/monoscopic area is accessed both in the stereoscopic video playback and in the monoscopic video playback, wherein the dedicated stereoscopic area is accessed in the stereoscopic video playback, wherein the dedicated monoscopic area is exclusively accessed in the monoscopic video playback and is not accessed in the stereoscopic video playback, wherein a plurality of base-view data blocks recorded in the shared stereoscopic/monoscopic area are formed from the base-view stream, wherein a plurality of base-view data blocks recorded in the dedicated stereoscopic area are formed from the base-view stream, wherein a plurality of base-view data blocks recorded in the dedicated monoscopic area are formed from the base-view stream, wherein the plurality of base-view data blocks recorded in the dedicated monoscopic area are identical to the plurality of base-view data blocks recorded in the dedicated stereoscopic area, wherein a plurality of dependent-view data blocks recorded in the shared stereoscopic/monoscopic area are formed from the dependent-view stream, wherein a plurality of dependent-view data blocks recorded in the dedicated stereoscopic area are formed from the dependent-view stream, wherein the first file refers to the plurality of base-view data blocks recorded in the shared stereoscopic/monoscopic area and to the plurality of base-view data blocks recorded in the dedicated monoscopic area, wherein the second file refers to the plurality of base-view data blocks recorded in the shared stereoscopic/monoscopic area and to the plurality of base-view data blocks recorded in the dedicated stereoscopic area, and wherein the second file has a plurality of packet numbers for a plurality of top packets of the plurality of base-view data blocks recorded in the shared stereoscopic/monoscopic area and the plurality of base-view data blocks recorded in the dedicated stereoscopic area.

7. A playback device for playing back the non-transitory recording medium of claim 1, the playback device comprising:

a reading unit operable to read, from the non-transitory recording medium, the base-view stream, the dependent-view stream, the first file, and the second file.

* * * * *